United States Patent [19]
Kyrtsos et al.

[11] Patent Number: 5,375,059
[45] Date of Patent: Dec. 20, 1994

[54] VEHICLE POSITION DETERMINATION SYSTEM AND METHOD

[75] Inventors: Christos T. Kyrtsos, Peoria; Adam J. Gudat, Edelstein; Dana A. Christensen, Peoria; Douglas W. Friedrich, Pekin; Darrell E. Stafford, Dunlap, all of Ill.

[73] Assignee: Caterpillar Inc., Peoria, Ill.

[21] Appl. No.: 19,542

[22] Filed: Feb. 18, 1993

Related U.S. Application Data

[60] Division of Ser. No. 628,560, Dec. 3, 1990, abandoned, which is a continuation-in-part of Ser. No. 487,980, Feb. 5, 1990.

[51] Int. Cl.$^5$ ............................................. G06F 15/50
[52] U.S. Cl. .................................. 364/449; 364/459; 342/357; 342/457
[58] Field of Search ............... 364/443, 449, 455, 459; 342/357, 358, 450, 451, 457; 73/178 R

[56] References Cited

U.S. PATENT DOCUMENTS

| | | | |
|---|---|---|---|
| 3,630,079 | 12/1971 | Hughes | 73/178 |
| 3,664,701 | 5/1972 | Kondur . | |
| 3,769,710 | 11/1973 | Reister . | |
| 4,114,155 | 9/1978 | Raab . | |
| 4,402,049 | 8/1983 | Gray | 364/447 |
| 4,445,118 | 4/1984 | Taylor et al. . | |
| 4,471,273 | 9/1984 | Melocik et al. . | |
| 4,472,663 | 9/1984 | Melocik . | |
| 4,485,383 | 11/1984 | Maher . | |
| 4,508,999 | 4/1985 | Melocik et al. . | |
| 4,511,947 | 4/1985 | Melocik et al. . | |
| 4,514,665 | 4/1985 | Melocik et al. . | |
| 4,518,902 | 5/1985 | Melocik et al. . | |
| 4,521,885 | 6/1985 | Melocik et al. . | |
| 4,529,919 | 7/1985 | Melocik et al. . | |
| 4,555,651 | 11/1985 | Melocik et al. . | |
| 4,564,085 | 1/1986 | Melocik et al. . | |
| 4,567,757 | 2/1986 | Melocik et al. . | |
| 4,578,678 | 3/1986 | Hurd . | |
| 4,599,620 | 7/1986 | Evans . | |
| 4,633,966 | 1/1987 | Fotheringham . | |
| 4,637,488 | 1/1987 | Fotheringham et al. . | |
| 4,638,445 | 1/1987 | Mattaboni | 364/424.01 |
| 4,646,096 | 2/1987 | Brown . | |
| 4,647,784 | 3/1987 | Stephens . | |
| 4,652,884 | 3/1987 | Starker . | |
| 4,659,970 | 4/1987 | Melocik . | |
| 4,667,203 | 5/1987 | Counselman, III . | |
| 4,674,048 | 6/1987 | Okumura . | |
| 4,678,329 | 7/1987 | Lukowsky, Jr. et al. . | |
| 4,680,715 | 7/1987 | Pawelek . | |
| 4,684,247 | 8/1987 | Hammill, III . | |
| 4,690,610 | 9/1987 | Fotheringham . | |
| 4,691,149 | 9/1987 | Baumgartner et al. . | |
| 4,691,385 | 9/1987 | Tupman . | |
| 4,706,772 | 11/1987 | Dawson et al. . | |
| 4,709,195 | 11/1987 | Hellekson et al. | 318/254 |
| 4,713,767 | 12/1987 | Sato et al. | 364/453 |
| 4,727,492 | 2/1988 | Reeve et al. . | |

(List continued on next page.)

FOREIGN PATENT DOCUMENTS 0181012  5/1986  European Pat. Off. .

(List continued on next page.)

OTHER PUBLICATIONS

Brown, R., *Random Signal Analysis & Kalman Filtering*, Chapter 5, pp. 181–209, no date.

(List continued on next page.)

*Primary Examiner*—Gary Chin
*Attorney, Agent, or Firm*—James R. Yee

[57] ABSTRACT

Systems and methods allow for the accurate determination of the terrestrial position of an autonomous vehicle in real time. A first position estimate of the vehicle 102 is derived from satellites of a global positioning system and/or a pseudolite(s). The pseudolite(s) may be used exclusively when the satellites are not in the view of the vehicle. A second position estimate is derived from an inertial reference unit and/or a vehicle odometer. The first and second position estimates are combined and filtered using novel techniques to derive a more accurate third position estimate of the vehicle's position. Accordingly, accurate autonomous navigation of the vehicle can be effectuated using the third position estimate.

2 Claims, 90 Drawing Sheets

U.S. PATENT DOCUMENTS

| | | |
|---|---|---|
| 4,727,962 | 3/1988 | Nelson . |
| 4,730,690 | 3/1988 | McNutt et al. . |
| 4,740,778 | 4/1988 | Harding et al. . |
| 4,741,412 | 5/1988 | Sable . |
| 4,743,913 | 5/1988 | Takai . |
| 4,751,512 | 6/1988 | Longaker . |
| 4,751,983 | 6/1988 | Leskovec et al. . |
| 4,755,905 | 7/1988 | Tlecky, Jr. . |
| 4,758,959 | 7/1988 | Thoone et al. ............... 364/454 |
| 4,772,410 | 2/1988 | Melocik et al. . |
| 4,781,514 | 11/1988 | Schneider . |
| 4,785,463 | 11/1988 | Janc et al. . |
| 4,786,164 | 11/1988 | Kawata ............................ 356/4 |
| 4,790,402 | 12/1988 | Field et al. . |
| 4,792,995 | 12/1988 | Harding . |
| 4,804,893 | 2/1989 | Melocik . |
| 4,807,714 | 2/1989 | Blau et al. . |
| 4,809,178 | 2/1989 | Ninomiya et al. ............ 364/443 |
| 4,814,711 | 3/1989 | Olsen et al. . |
| 4,818,171 | 4/1989 | Burkholder . |
| 4,821,294 | 4/1989 | Thomas . |
| 4,823,901 | 4/1989 | Harding . |
| 4,829,442 | 5/1989 | Kadonoff et al. . |
| 4,837,700 | 6/1989 | Ando et al. . |
| 4,839,835 | 6/1989 | Hagenbuch . |
| 4,846,297 | 7/1989 | Field et al. . |
| 4,849,731 | 7/1989 | Melocik ............................ 340/435 |
| 4,861,220 | 8/1989 | Smith . |
| 4,864,284 | 9/1989 | Crayton et al. . |
| 4,866,450 | 9/1989 | Chisholm . |
| 4,869,635 | 9/1989 | Krahn . |
| 4,870,422 | 9/1989 | Counselman, III . |
| 4,876,659 | 10/1989 | Devereux et al. ............. 364/717 |
| 4,894,655 | 1/1990 | Jognet et al. ................... 340/988 |
| 4,899,285 | 2/1990 | Nakayama et al. ............ 364/453 |
| 4,903,211 | 2/1990 | Ando ............................... 364/443 |
| 4,903,212 | 2/1990 | Yokouchi et al. ............. 342/357 |
| 4,918,609 | 4/1990 | Yamawaki ...................... 364/449 |
| 4,924,699 | 5/1990 | Kuroda et al. ................. 73/178 R |
| 4,928,107 | 5/1990 | Kuroda et al. ................. 342/451 |
| 4,949,268 | 8/1990 | Nishikawa et al. ............ 342/357 |
| 4,954,837 | 9/1990 | Baird et al. .................... 342/458 |
| 4,954,959 | 9/1990 | Moroto et al. ................. 364/449 |
| 4,986,384 | 1/1991 | Okamoto et al. ............. 180/167 |
| 5,083,256 | 1/1992 | Trovato et al. ................. 364/448 |
| 5,101,356 | 3/1992 | Timothy et al. ................ 364/449 |
| 5,128,874 | 7/1992 | Bhanu et al. ................... 364/461 |
| 5,155,491 | 10/1992 | Ando ............................... 342/357 |

FOREIGN PATENT DOCUMENTS

| | | |
|---|---|---|
| 0309293A2 | 3/1989 | European Pat. Off. . |
| 2554612 | 5/1985 | France . |
| 3310111 | 9/1984 | Germany . |
| 3538908A1 | 5/1987 | Germany . |
| 3912353A1 | 11/1989 | Germany . |
| 2126040 | 1/1987 | United Kingdom . |
| WO87/07056 | 11/1987 | WIPO . |

OTHER PUBLICATIONS

Jorgensen, "18-Satellite Constellations," pp. 9–12, 1980.

Iijima, J., et al., "A Locomotion Control System for Mobile Robots," no date.

Kanayama, Y., et al., "Trajectory Generation for Mobile Robots," no date.

Kanayama, Y., et al., "A Vehicle Control Architecture-Smooth Driver," Stanford University, no date.

Dickmans, E., "Vehicle Guidance by Computer Vision," no date.

Mueller, C., et al., "Laser Gyro Land Navigation System Performance Predictions and Field Results," *IEEE*, 1984.

Sennott, J. W., "Experimental Measurement and Characterization of Ionospheric Multipath Errors In Differential GPS", no date.

Johnson, C. "In-Flight Transfer Alignment/Calibration of a Strapdown INS that Employs Carouseled Instruments and IMV Indexing," no date.

Culshaw, B., et al., "Fibre Optic Gyroscopes In Inertial Navigation," no date.

Savkoor, A. R., "The Lateral Flexibility of Pneumatic Tyre and Its Application to the Lateral Rolling Contackt Problem," pp. 367–381, no date.

Brodie, K., et al., *Performance Analysis of Integrated Navigation Systems, computer applications software technology*, no date.

Nitao, J., et al., "A Pilot for a Robotic Vehicle *System*," pp. 951–955, no date.

Robotech Laboratory Company.

Jacob, T., *Integrated Navigation System for Approach Guidance for Regional Air-Traffic Using GPS*, no date.

Denavit, J. et al., "A Kinematic Notation for Lower—Pair Mechanisms Bases on Matrices," pp. 215–221, Jun., 1955.

(List continued on next page.)

OTHER PUBLICATIONS

Sheridan, T. "Three Models of Preview Control," *IEEE Transactions on Human Factors in Electronics*, pp. 91–102, Jun. 1966.

Bundorf, R. "The Influence of Vehicle Design Parameters on Characteristic Speed and Understeer," Jan. 1967.

Sorenson, W., "Least–Squares estimation: From Gauss to Kalman," *IEEE Spectrum*, pp. 63–68, Jul. 1970.

Sheth, P., et al., "A Generalized Symbolic Notation for Mechanism," *Transactions of the ASME*, pp. 102–112, Feb. 1971.

Nedley, A., et al., "A New Laboartory Facility for Measuring Vehicle Parameters Affecting Understeer and Brakesteer," pp. 1–20, Jun. 2, 1972.

Brockstein, A., "GPS–Kalman–Augmented Inertial Navigation System Performance," *Naecom '76 Record*, pp. 864–868, 1976.

Martin, E., "Aiding GPS Navigation Functions," *Naecom '76 Record*, pp. 849–856, 1976.

Lozano-Perez, T., et al., "An Algorithm for Planning Collision-free Paths among Polyhedral Obstacles," *Communications of the ACN*, pp. 560–570, Oct. 1979.

Luh, J., et al., "Resolved–acceleration Control of Mechanical Manipulators," *IEEE Transactions on Automatic Control*, pp. 468–475, Jun. 1980.

Euler, W., et al., "A Perspective on Civil Use of GPS," *The Institute of Navigation*, 36th Annual Meeting, pp. 1–7, 1980.

Sakai, H., "Theoretical and Experimental Studies on the Dynamic Properties of Tyres Part I: Review of Rubber Friction," *International Journal of Vehicle Design*, pp. 78–110, 1981.

Sakai, H., "Theoretical and Experimental Studies on the Dynamic Properties of Tyres, Part II: Experimental Investigation of Rubber Friction and Deformation of a Tyre," International Journal of *Vehicle Design*, pp. 182–226, 1981.

Sakai, H., "Theoretical and Experimental Studies on the Dynamic Properties of Tyres, Part III: Calculation of the Six Components of Force and Moment of Tyre," International Journal of Vehicle Design, pp. 335–372, 1981.

Sennott, J., "Real–Time GPS and Loran–C Dynamical Performance for Critical Marine Applications," *IEEE*, pp. 1006–1009, 1981.

Sennott, J., et al., "A Queueing Model for Analysis of a Bursty Multipe–Access Communication Channel," *IEEE*, pp. 317–321, 1981.

MacAdam, C., "Application of an Optimal Preview Control for Simulation of Closed–Loop Automobile Driving," *IEEE Transactions on Systems, Man, and Cybernetics*, pp. 393–399, Jun. 1981.

Orin, D., "Supervisory Control of a Multi–legged Robot," *The International Journal of Robotics Research*, pp. 79–91, Spring 1982.

Greenspan, R., et al., "Accuracy of Relative Positioning by Interferometry with Reconstucted Carrier CPS: Experimental Results," *Third International Symposium on Satellite Doppler Positioning*, pp. 1–19, Feb. 1982.

Upadhyay, T., et al., "Benefits of Integrating GPS and Inertial Navigation," pp. 1–13, Jun. 1982.

Daum, F., et al., "Decoupled Kalman Filters for Phased Array Radar Tracking," *IEEE Transactions on Automatic Control*, pp. 269–283, Mar. 1983.

Kao, M., et al., "Multiconfiguration Kalman Filter Design for High–Performance GPS Navigation," *IEEE Transactions on Automatic Control*, pp. 304–314, Mar. 1983.

Brooks, R., "Solving the Fine–Path Problem by Good Representation of Free Space," *IEEE Transactions on Systems, Man, and Cybernetics*, pp. 190–197, Mar.–Apr., 1983.

Schwartz, H., "Sensitivity Analysis of an Integrated Navstar GPS/INS Navigation System to Component Failure," *Journal of the Institute of Navigation*, vol. 3, No. 4, pp. 325–337, 1983.

"New Airbuses to Use Laser Inertial Reference Systems for Navigation," *Litton Systems, Aircraft Engineering*, pp. 10–11, Jun. 1983.

Parkinson, B., et al., "NAVSTAR: Global Positioning System–Ten Years Later," Proceedings of the IEEE, pp. 1178–1186, 1983.

Kuritsky, M., et al., "Inertial Navigation," *Proceedings of the IEEE*, pp. 1156–1176, Oct. 1983.

Brown, R., "Kalman Filtering Study Guide–A Guided Tour," Iowa State University, pp. 1–19, 1984.

Divakaruni, S., et al., "Fast Reaction and High Reliability of Strapdown Navigation Systems Using Ring Laser Gyros," *IEEE pp. 315–322, 1984.*

Auch, W., et al., "Fibre Optic Gyroscope," 1984.

Ashjaee, J., et al., "Precise Positioning Using a 4–Channel C/A Code GPS Receiver," *IEEE* pp. 236–244, 1984.

(List continued on next page.)

OTHER PUBLICATIONS

*Vehicle Dynamics Terminology*, SAE J670e, 1984.

Lerner, E., "Gyros in Business Aircraft," *Aerospace America*, pp. 66–69, Oct. 1984.

Canny, J., "A Computational Approach to Edge Detection," pp. 184–203, 1985.

Khatib, O., "Real-time Obstacle Avoidance for Manipulators and Mobile Robots", pp. 500–505, 1985.

Vaurus, J., "A Simulation of an Imbedded Software System for Global Positioning System Navigation," *Proceeding of the 1985 Winter Simulation Conference*, pp. 586–590, 1985.

Raol, J., et al. "On the Orbit Determination Problem," *IEEE Transactions on Aerospace and Electronic Systems*, pp. 274–290, May 1985.

Dickmanns, E. et al., "Guiding Land Vehicles Along Roadways by ComputerVision", *The Tools for Tomorrow*, Oct. 23, 1985.

E. Udd, "Fiberoptic v. Ring Laser Gyros: An Assessment of the Technology," *Laser Focus/Electro-Optics*, pp. 64–74, Dec. 1985.

H. Hatwal et al., "Some Inverse Solutions to an Automobile Path-tracking Problem with Input Control of Steering and Brakes," *Vehicle System Dynamics*, pp. 61–71, 1986.

H. Wunsche, "Detection and Control of Mobile Robot Motion by Real-Time Computer Vision," *Mobile Robots*, pp. 100–104, 1986.

R. Majure et al., "Comparison of Laser Gyro IMU Configurations for Reentry Systems," *IEEE*, pp. 96–100, 1986.

R. Cox et al., "Design for Maintainability: Litton's New Family of RLG Inertial Navigation Systems," *IEEE*, pp. 115–119, 1986.

S. Divakaruni et al., "Ring Laser Gyro Inertial and GPS Integrated Navigation System for Commercial Aviation," *IEEE*, pp. 73–80, 1986.

J. Oliver et al., "A Navigation Algorithm for an Intelligent Vehicle with a Laser Rangefinder," pp. 1145–1150, 1986.

M. Grewal et al., "Application of Kalman Filtering to the Calibration and Alignment of Inertial Navigation Systems," *IEEE*, pp. 65–72, 1986.

J. Nielson, et al. "GPS Aided Inertial Navigation," *IEEE AES Magazine*, pp. 20–26, Mar. 1986.

D. Feng, "Satisficing Feedback Strategies for Local Navigation of Autonomous Mobile Robots," May 5, 1989.

H. Nii, "Blackboard Systems: The Blackboard Model Problem-solving and the Evolution of Blackboard Architectures," *The AI Magazine*, pp. 38–53, Summer 1986.

H. Nii, "Blackboard Application Systems, Blackboard Systems from a Knowledge Engineering Perspective," *The AI Magazine*, pp. 82–89, Aug. 1986.

E. Dickmanns et al., "A Curvature-based Scheme for Improving Road Vehicle Guidance by Computer Vision," *SPIE's Cambridge Symposium on Optical and Optoelectronic Engineering*, Oct. 1986.

D. Kuan et al., "Model-based Geometric Reasoning for Autonomous Road Following," pp. 416–423, 1987.

R. Dork, "Satellite Navigation Systems for Land Vehicles," *IEEE AES Magazine*, pp. 2–5, May 1987.

J. Sennott et al., "Study of Differential Processing and Kalman Filtering of Bay Saint Louis Test Data, Ch 1–5, 1987.

J. Collins, "GPS Equipment Survey, GPS-What does it all mean?," *P.O.B.*, Jun.–Jul. 1987 pp. 12–22.

*Navstar GPS Space Segment/Navigation User Interface*, Rockwell International Corporation, Nov. 30, 1987.

G. Geier, et al., "Design of an Integrated Navigation System for Robotic Vehicle Application," *Journal of the Institute of Navigation*.

R. Dunlay, "Obstacle Avoidance Perception Processing for the Autonomous Land Vehicle," pp. 912–917, 1988.

I. Cox, "Blanche: An Autonomous Robot Vehicle for Structured Environments," AT&T Bell Laboratories, pp. 978–982, 1988.

W. Nelson, et al., "Local Path Control for an Autonomous Vehicle," AT&T Bell Laboratories, pp. 1504–1510, 1988.

G. Wilfong, "Motion Planning for an Autonomous Vehicle," AT&T Bell Laboratories, pp. 529–533, 1988.

M. Dailey et al., "Autonomous Cross-Country Navigation with the ALV," Hughes Artificial Intelligence Center, pp. 718–726, 1988.

H. Nasr et al., "Landmark Recognition for Autonomous Mobile Robots," pp. 1218–1223, 1988.

D. Kriegman et al., "Generic Models for Robot Navigation," pp. 746–751, 1988.

(List continued on next page.)

OTHER PUBLICATIONS

C. McGillem et al., "Infra-Red Location System for Navigation of Autonomous Vehicles," *IEEE*, pp. 1236–1238, 1988.

J. Dixon, "Linear and Non-linear Steady State Vehicle Handling," *Proceedings of the Institute of Mechanical Engineers*, pp. 173–186, 1988.

Y. Kanayama et al., "A Locomotion Control Method for Autonomous Vehicles," pp. 1315–1317, 1988.

Y. Kanayama et al., "Smooth Local Path-Planning for Autonomous Vehicles," Center for Robotic Systems and Microelectronics, University of California at Santa Barbara, Mar. 7, 1988.

W. Nelson, "Continuous Steering-Function Control of Robot Carts," AT&T Bell Laboratories, Apr. 1988.

D. Kuan, "Autonomous Robotic Vehicle Road Following," *IEEE Transactions on Pattern Analysis and Machine Intelligence*, pp. 647–658, 1988.

J. Crowley, "Asynchronous Control of Orientation and Displacement in a Robot Vehicle," pp. 1277–1288, 1989.

J. Crowley, "Part 3: Knowledge Based Supervision of Robotics Systems," 1989 IEEE Conference on Robotics and Automation, pp. 37–42, 1989.

J. Borenstein et al., "The Vector Field Histogram-Fast Obstacle Avoidance for Mobile Robots," *IEEE Journal of Robotics and Automation*, Jul. 1989.

D. Touretzky et al., "What's Hidden in the Hidden Layers?," Byte, pp. 227–233, Aug. 1989.

W. Uttal, "Teleoperators," *Scientific American*, pp. 124–129, Dec. 1989.

D. Rogers et al., Mathematical Elements for Computer Graphics, pp. 144–155, Dec. 8, 1989.

D. Daniel et al., "Kinematics and Open-loop Control of an Ilonator-Based Mobile Platform," pp. 346–351 1985.

B. Krogh et al., "Integrated Path Planning and Dynamic Steering Control for Autonomous Vehicles," 1986.

Y. Goto et al., "The CMU System for Mobile Robot Navigation," The Robotics Institute, Carnegie-Mellon University, pp. 99–105, 1987.

P. Muir, et al. "Kinematic Modeling for Feedback Control of an Omnidirectional Wheeled Mobile Robot," pp. 1772–1778, 1987.

L. Matthies et al., "Integration of Sonar and Stereo Range Data Using a Grid-based Representation," Computer Science Department and Robotics Institute, Carnegie-Mellon Unviersity, pp. 727–733, 1988.

T. Graettinger et al., "Evaluation and Time-Scaling of Trajectories for Wheeled Mobile Robots," *ASME Journal of Dynamic Systems*, Nov. 25, 1987.

H. Yamazaki et al., "Autonomous Land Vehicle Using Millimeter Wave Sensing Systems," *Proceedings of the 5th International Symposium on Robotics in Construction*, Jun. 1988.

Randolph Hartman, "Integrated Laser Inertial/GPS Navigation (GPIRS), "Publication of Honeywell Inc., Feb., 1990, from a presentation of the Royal Institute of Navigation NAV '89" Satellite Navigation Conference, Oct., 1989.

IEEE Plans '86 Position Location and Navigation Symposium. Nov. 1986, S. Bose: "GPS/PLRS aided inertial land navigation system performance", pp. 496–504.

IEEE Proceedings, vol. 77, No. 11, Nov. 11, 1989, L. Schuchman et al.: "Applicability of an augmentated GPS for navigation in the National Airspace system", pp. 1709–1727, 1713, 1717, FIGS. 1–8.

GPS-90 Tutorials, The Institute of Navigation, Sep. 17–18, 1990, pp. 1–28.

Wescon/87 Conference Record, vol. 31, 1987, (Los Angeles, U.S.) M. T. Allison et al "The next generation navigation system", pp. 941–947.

IEEE Communications Magazine, vol. 26, No. 7, Jul. 1988 (New York) P. Enge et al. "Differential operation of global positioning system" pp. 48–59.

Patent Abstract of Japan, vol. 13, No. 306 (p. 897) Jul. 7, 1989 & JPA 1079679 (Toyota) Mar. 24, 1989.

Patent Abstract of Japan, vol. 12, No. 290 (p. 742) Aug. 9, 1988 & JPA 63066479 (Nissan) Mar. 24, 1988.

IEEE Transactions on Pattern Analysis, vol. 10, No. 5 Sep. 1988, IEEE (New York), D. Kuan et al., "Autonomous robotic veh road following" pp. 648–658.

(List continued on next page.)

OTHER PUBLICATIONS

Proceedings 1987 IEEE Conference Mar. 31–Apr. 3, 1987, vol. 2, L. Conway et al.: "Teleautonomous systems:Methods&Architectures for Intermingling autonomous & Telerobotic Technology" pp. 1121–1130.

Proceeding PR '88, The Computer Society Conference on Computer Vision&Pattern Recognition, Jun. 5–9, 1988 (Ann Arobr) S. Dickinson et al., "An expert vision syste for Autonomous Land Vehicle Road Following", pp. 826–831.

IEEE Journal of Robotics & Automation, vol. 4, No. 4, Aug. 1988, IEEE (New York) J. LeM "Domain-dependent reasoning for visual navigation of roadways, pp. 419–427 (Nissan) Mar. 24, 1988.

Proceedings of 1988 IEEE International Conference on Robotics&Automation, vol. 2, Apr. 24–29, 1988, Philadelphia, IEEE Computer Soc. Press (Wash. D.C.), L. E. Banta: "A self tuning navigation algorithm", pp. 1313–1314.

IEEE Journal of Robotics&Automation, vol. 4, No. 3, Jun. 1988, IEEE (New York) C. Isik et al., "Pilot Level of a Hierarchical Controller for an Unmanned Mobile Robot", pp. 241–255.

Proceedings 1987 IEEE International Conference on Robotics&Automation, Mar. 31–Apr. 3, 1987. (Raleigh, N.C.), sponsored by IEEE Council on Robotics&Automation, vol. 3, D. McMenthon, "A zero-bank algorithm for Inverse Perspective of a Road fr Single Image, pp. 1444–1449.

$$(X_0 - U_x)^2 + (Y_0 - U_y)^2 + (Z_0 - U_z)^2 = (R_0 - C_b)^2$$

$$(X_2 - U_x)^2 + (Y_2 - U_y)^2 + (Z_2 - U_z)^2 = (R_2 - C_b)^2$$

$$(X_4 - U_x)^2 + (Y_4 - U_y)^2 + (Z_4 - U_z)^2 = (R_4 - C_b)^2$$

$$(X_6 - U_x)^2 + (Y_6 - U_y)^2 + (Z_6 - U_z)^2 = (R_6 - C_b)^2$$

Vehicle 102 Latitude = $\theta$ = $\cos^{-1} \dfrac{\sqrt{U_x^2 + U_y^2}}{|\bar{u}|}$ Vehicle 102 Longitude = $\beta$ = $\tan^{-1} U_x/U_y$

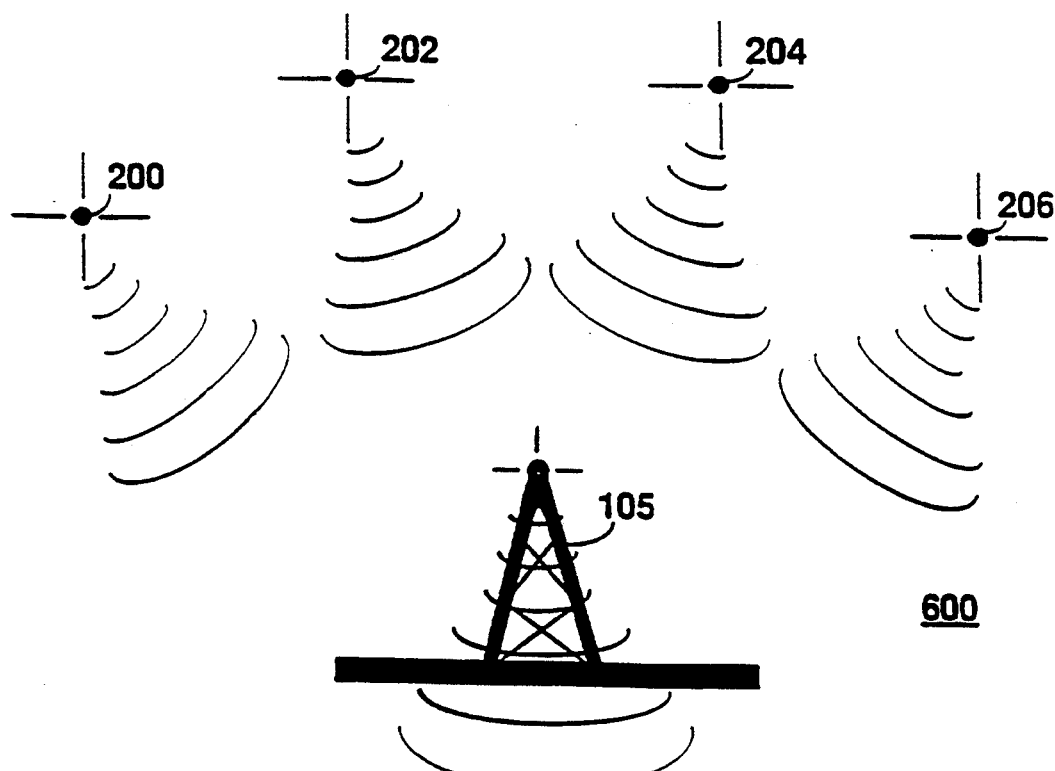
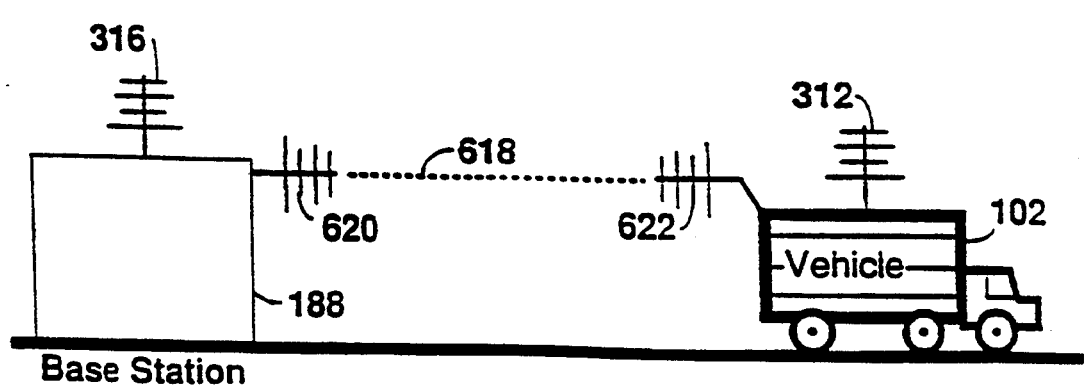
FIG. 6

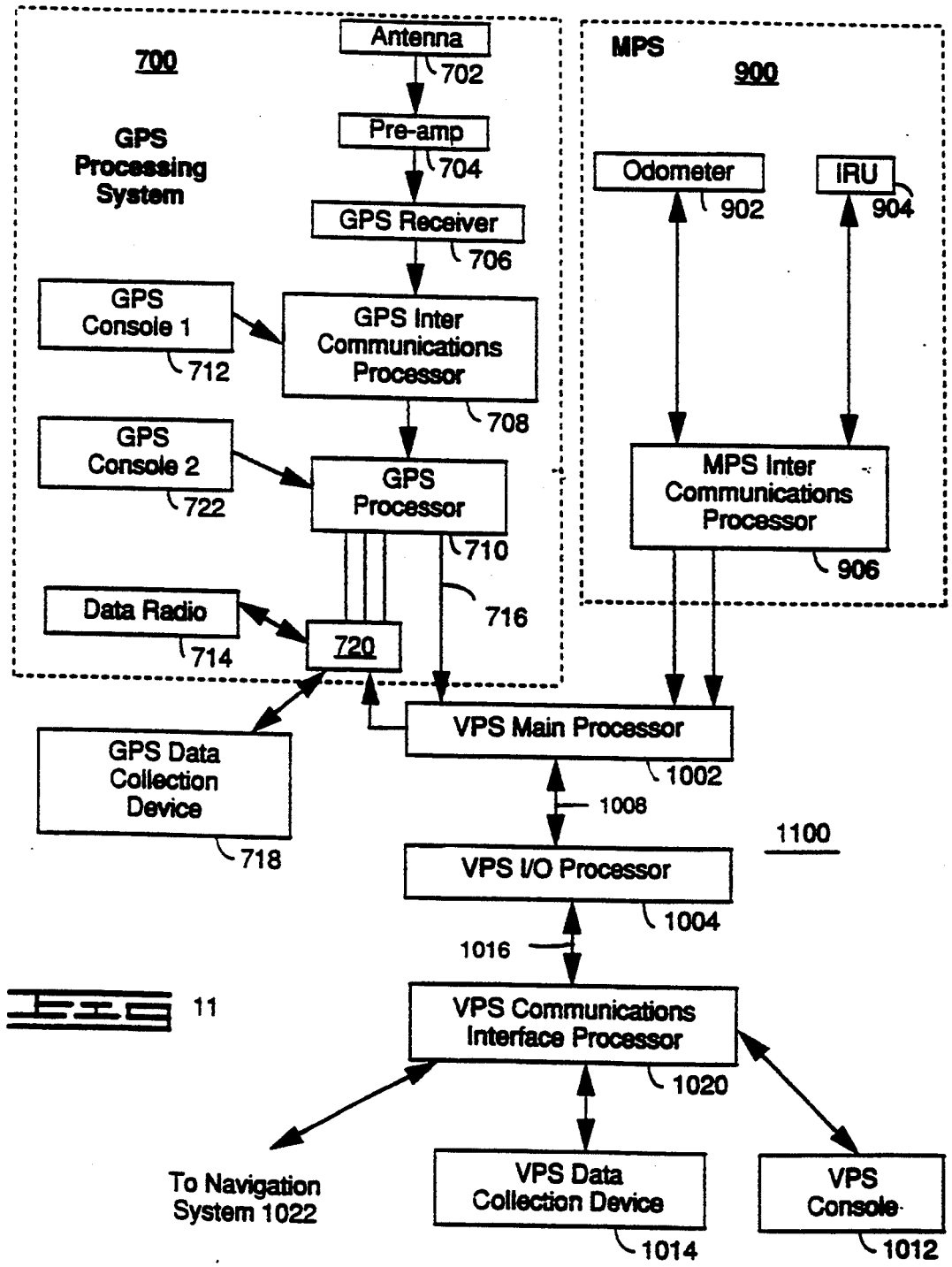

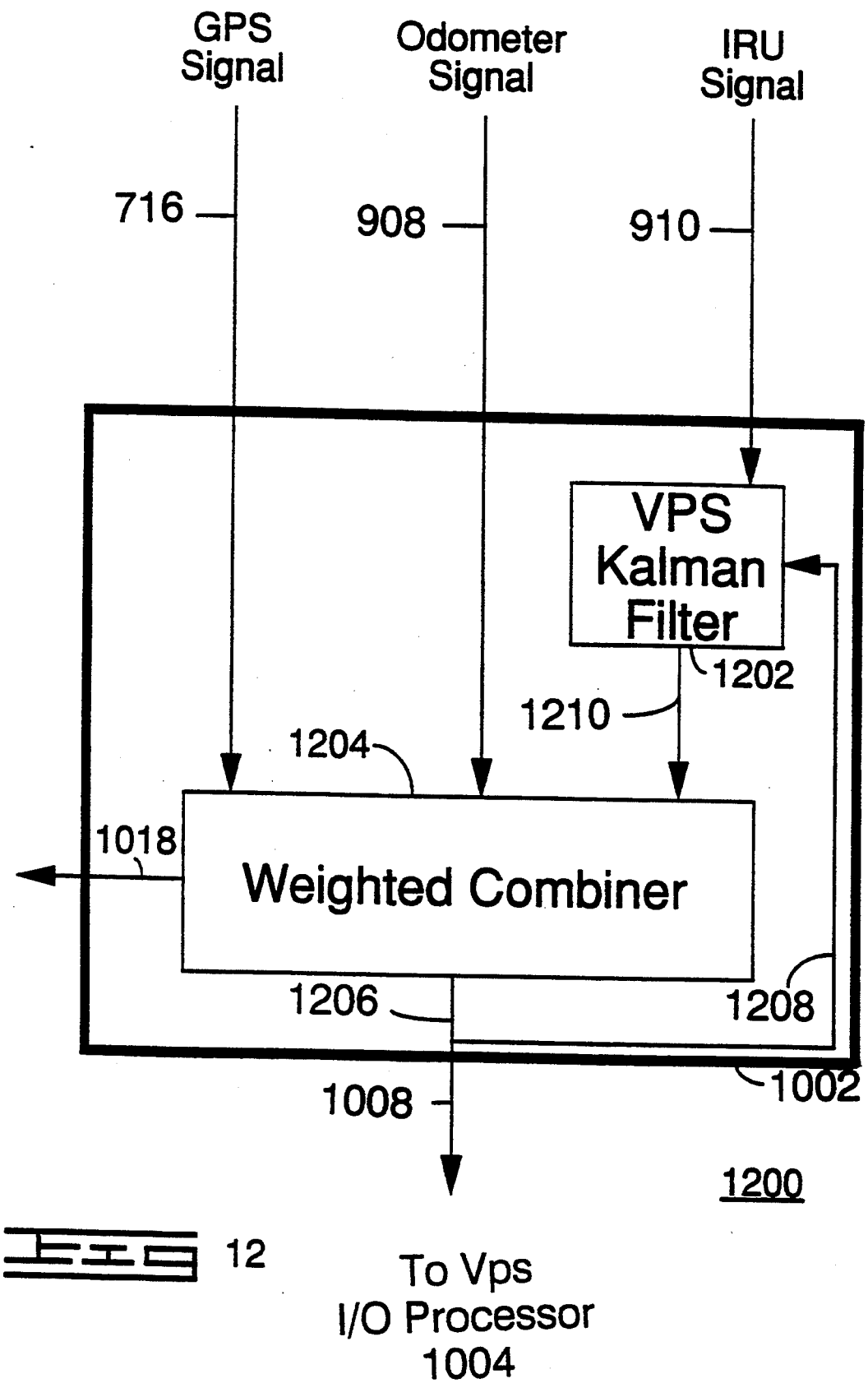

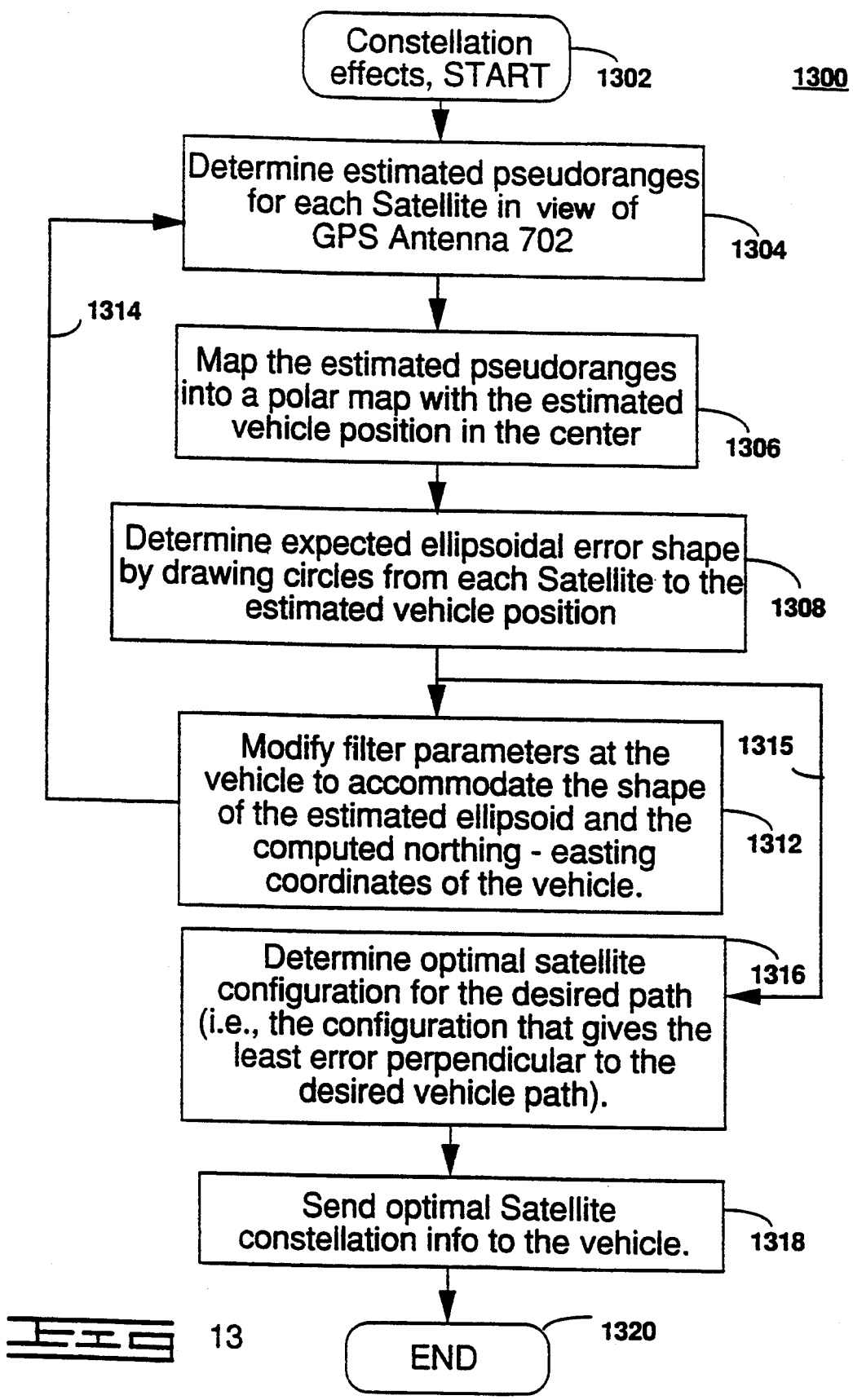

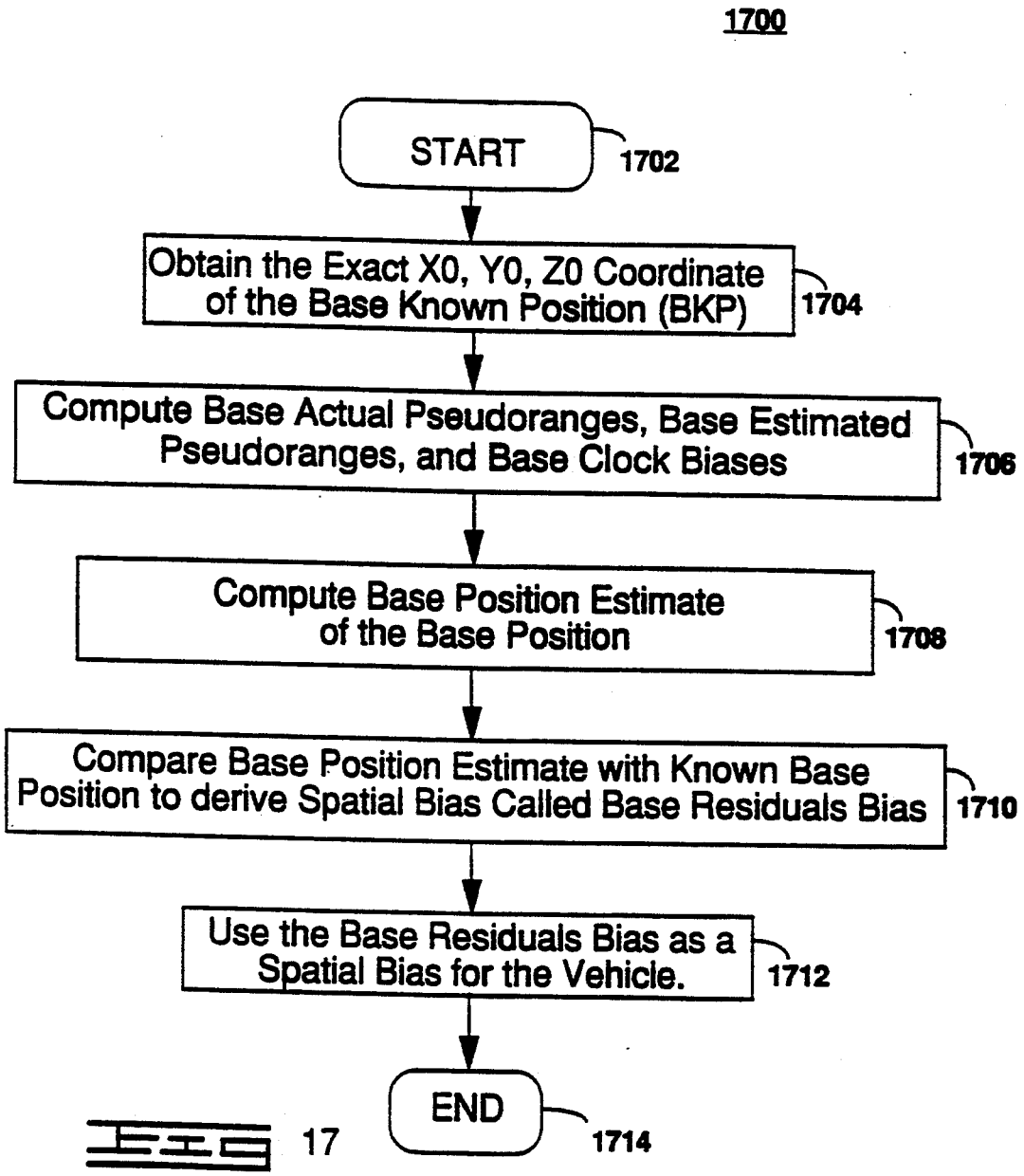

FIG 22 ROUTE DEFINITIONS

2300

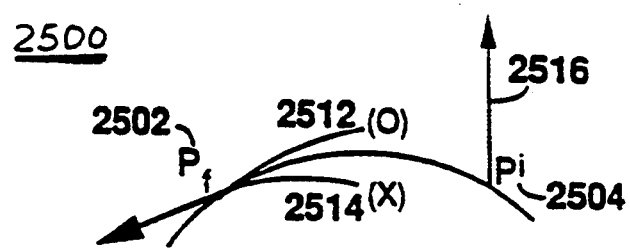
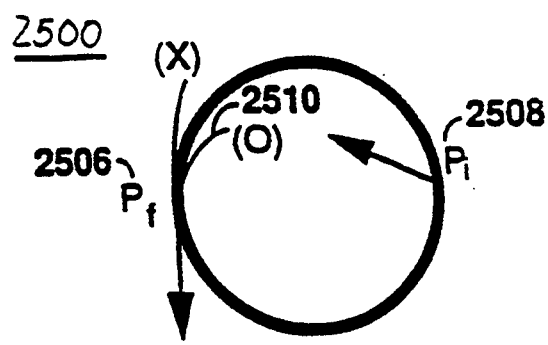

2900    Fig 29

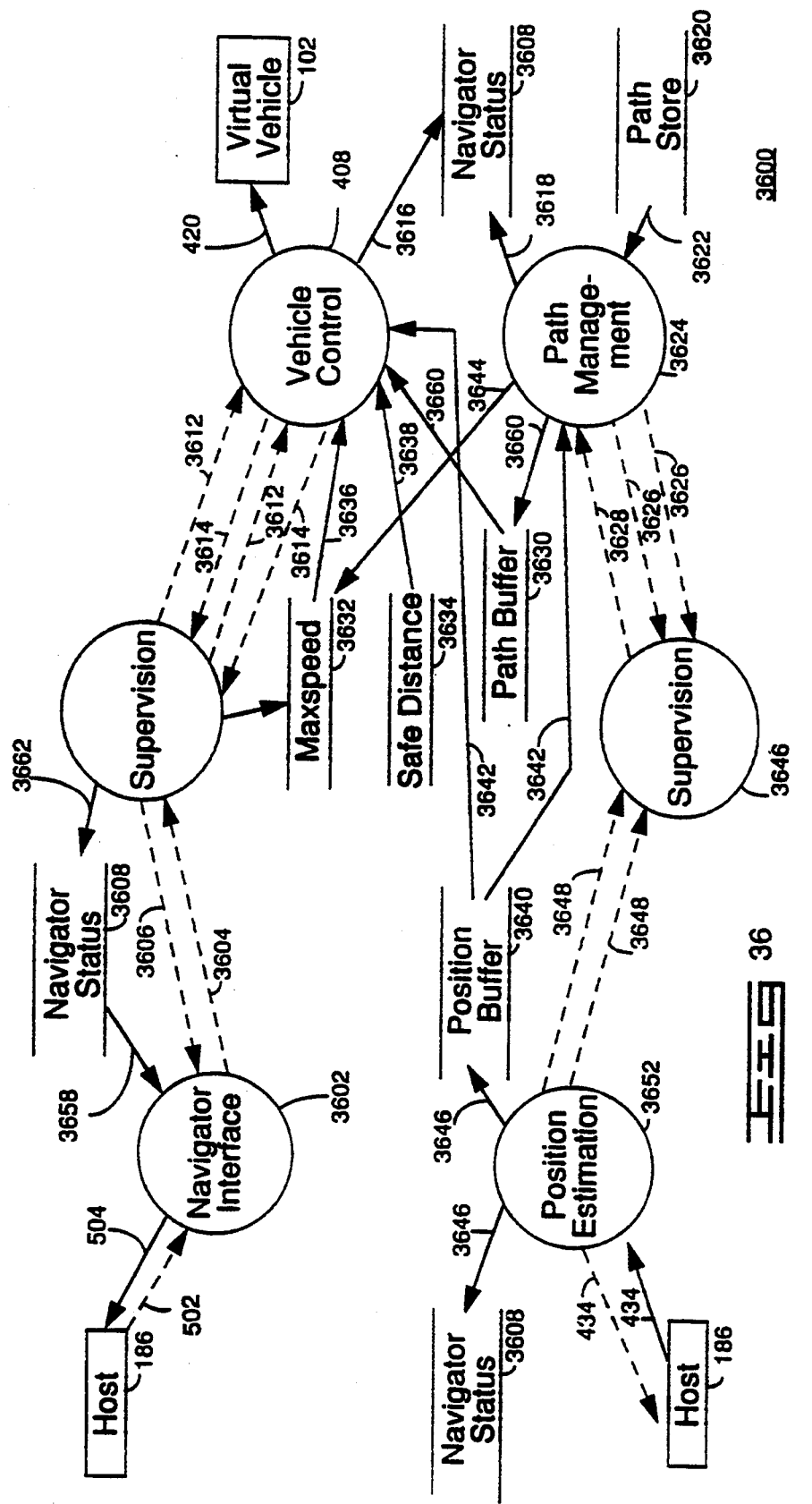

Navigator Data Flow Summary

The purpose of this summary is to list all of the data flows defined in the Navigator Architecture. Where the flow is defined, whether it is control or data, how it is used and what it is made up of is listed in this summary. A list of abreviations used in this list is included at the end of the list.

| Data Flow | Title (DFD diagram) | Ctrl/ Data | Flow Direction |
|---|---|---|---|
| 502 | Host Cmds and Queries (NI(2)) = {follow path n I set scan speed I set speed limit I start tracking I restart tracking I shutdown} | C | Host -> NI |
| 504 | Replies to Host (NI(2)) = {navigator status summary I VPS Packet I Exception Condition n I ACK I Nack I Invalid command/query } | D | NI -> Host |
| 3604 | Supervisor Instr. (NI(2)) = {FOLLOW_PATH n I SPEED_LIMIT I START_TRACKING I RESTART_TRACKING ISHUTDOWN} | C | NI ->TC |
| 3658 | Navigator Status (NI(2)) = {21 + 37 + 69 + 71 + 84} | D | /Nav Status/ -> NI |
| 432 | Position Data (Context (0)) = {VPS packet} | D | VPS -> PE |
| 3702 | CK Status (OD(2)) = {RUNNING I WAINTING I SLOW I STOP} | C | CC ->/NavStatus/ |
| 3704 | Obs. det. Instr. (ALL(1)) = {38 + 39 + 42} | C | SUPER -> OD |
| 416 | Scanner Data (CONTEXT(0)) | D | Scanner -> SIO |
| 3638 | Safe_Dis (OD(2)) | D | CC -> /Safe_Dis/ -> SP |
| 3636 | Min (MaxSpeeds) (VC (2)) = min { 18 & 25 & 29 } (not implemented) | D | /MaxSpeed/ -> SP |
| 3628 | Path Man Inst. (PM (2)) { INIT_TASK I START_TASK I STOP -TASK } | C | TC -> PM |

FIG 37A

| Data Flow | Title (DFD diagram) | Ctrl/ Data | Flow Direction |
|---|---|---|---|
| 3614 | Vehicle Control (VC(2)) <br> = { ACK I NACK } | C | SP -> TC |
| 3612 | Veh. Ctrl. Instr. (VC(2)) <br> = { INIT_TASK I START_TASK I stop _TASK I STOP_VEH } | C | TC -> SP |
| 3650 | Position Est. Instr. (PE(2)) <br> = {INIT-TASK I START_TASK I STOP_TASK } | C | TC -> PE |
| 3660 | Vehicle Path (PM(2)) <br> = { n Path Postures } | D | PM ->/Path Buf/ |
| 3612 | Exception Veh. Cmd (VC(2)) <br> = { STOP_VEH } | C | EC -> SP |
| 3644 | Speed Limit (Path Manager) (PM(2)) | D | PM ->/MaxSpeed/ |
| 432 | VPS Control (PE(2)) <br> (not implemented) | C | PE -> VPS |
| 416 | Scanner Ctrl (OD(2)) <br> = {Scanner Motor Amp Instructions} (not implemented) | C | SC -> Scanner |
| 4102 | Obs det Status (ALL(1)) <br> = {6+85+86} | D | OD ->/NavStatus/ |
| 420 | Vehicle Commands (VC(2)) | C | SP -> Vehicle |
| 3622 | Path Data (PM(2)) <br> = { n Path Postures} | D | /Path Store/ -> PM |
| 3642 | Valid VPS Packet (PE(2)) <br> = {VPS data} | D | PE -> /Pos Buff/ |
| 3654 | Speed Limit (Task Ctrl) (TC(2)) | D | TC -> /MaxSpeed/ |

Fig 37B

| Data Flow | Title (DFD diagram) | Ctrl/ Data | Flow Direction |
|---|---|---|---|
| 3612 | Supervisor Resp. (ALL(1)) <br> = {87 + 61} | C | SUPER -> NI |
| 3626 | Path Manager Resp. (PM(2)) <br> = { ACK I NACK } | C | PM -> TC |
| 4104 | Speed Limit (Obs. Det.) (OD(2)) | D | CC ->/MaxSpeed/ |
| 3648 | PE Response (PE(2)) <br> = { ACK I NACK } | C | PE -> TC |
| 3606 | Obs. Det. Resp. (ALL(1)) <br> = { 40 + 41 + 43 } | C | OD -> SUPER |
| 3706 | Scan Done (OD(2)) <br> = { SDAT_AVAILABLE } | C | SIO-> CC |
| 3616 | Veh. Ctrl. Status (VC(2)) <br> = { WAITING I RUNNING } | D | SP->/NavStatus/ |
| 3616 | Veh. Ctrl. Status (VC(2)) <br> = { WAITING I RUNNING } | D | SP->/NavStatus/ |
| 3708 | Clear Chk Instr. (OD(2)) <br> = { START_TASK I INIT_TASK I STOP_TASK } | C | TC-> CC |
| 3710 | Scan Ctrl Instr. (OD(2)) <br> = { START_TASK I INIT_TASK I STOP_TASK } | C | TC -> SC |
| 3712 | Scan Ctrl Resp. (OD(2)) <br> = { ACK I NACK } (not implemented) | C | SC -> TC |
| 3714 | Clearance Chk. Resp. (OD(2)) | C | CC -> TC |
| 2716 | Scan I/O Instr. (OD(2)) <br> (not implemented yet) | C | TC -> SIO |
| 3718 | Scan I/O Resp. (OD(2)) <br> = { ACK I NACK } | | |
| 3720 | Tagged Scans (OD(2)) <br> = { 8 + Scan Number } | D | SIO -> /Scan Buf/ |

FIG 37C

| Data Flow | Title (DFD diagram) | Ctrl/ Data | Flow Direction |
|---|---|---|---|
| 3614 | Tracking Exception (VC(2)) = {VEH_OFF_PATH I PARAM_OO_BOUNDS I PDAT_NEXIST I SDAT_NEXIST I PBUF_EMPTY I PBUFF_INSUFFICIENT I VEH_TOO_FAST I TRACK_HEAD_ERR I VEH_NOT_CONN I VPS_NOT_READY I VPS_NOT_REC I SKIPPED_SCAN I PBUF_EMPTY} | C | SP -> EC |
| 3722 | Collision Avoid. Except. (OD(2)) = {BAD_ANGLE I PDAT_NEXIST I SDAT_NEXIST I PBUFF_INSUFFICIENT I VEH_OFF_PATH I VEH_TOO_FAST I TRACK_HEAD_ERR} | C | CC -> EC |
| 3724 | Obstacle Det Except (ALL(1)) = {52+56+57} | C | OD -> SUPER |
| 3726 | Scan Ctrl Except (OD(2)) = {LASER_FAULT} (not implemented) | C | SC -> EC |
| 3728 | Scan I/O Exception (OD(2)) = {LASER_FAULT} | C | SIO -> EC |
| 3730 | Exceptions (EC(2)) = {51+52+53+57+127+130} | C | EC -> NI |
| 3732 | PE Status (PE(2)) = {WAITING I RUNNING} | D | PE ->/NavStatus/ |
| 3618 | PM Status (PM(2)) = {WAITING I RUNNING} | D | PM ->/NavStatus/ |
| 3662 | Supervisor Status (TC(2)) = {WAITING I RUNNING} | D | TC ->/NavStatus/ |
| 3734 | Scan I/O Status (OD(2)) = {WAITING I RUNNING} | D | SIO ->/NavStatus/ |
| 3736 | Scan Ctrl Status (OD(2)) = {WAITING I RUNNING} | D | SC ->/NavStatus/ |
| 3732 | Supervisor Status (TC(2)) = {ACK I NACK} | C | TC -> NI |
| 3636 | PM Exception (PM(2)) | C | PM -> EC |

FIG 37D

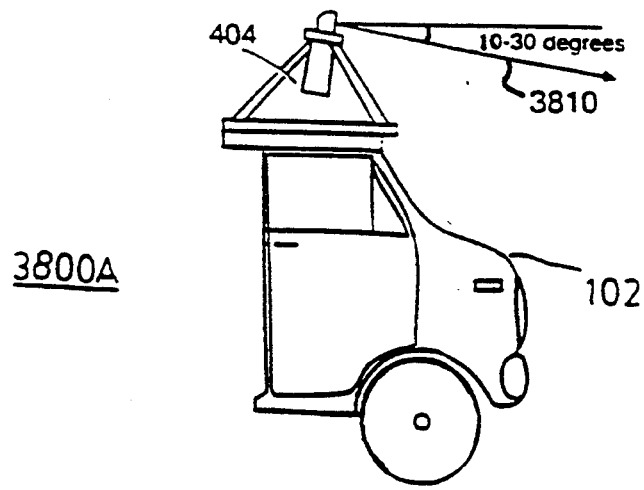
Fig 38A
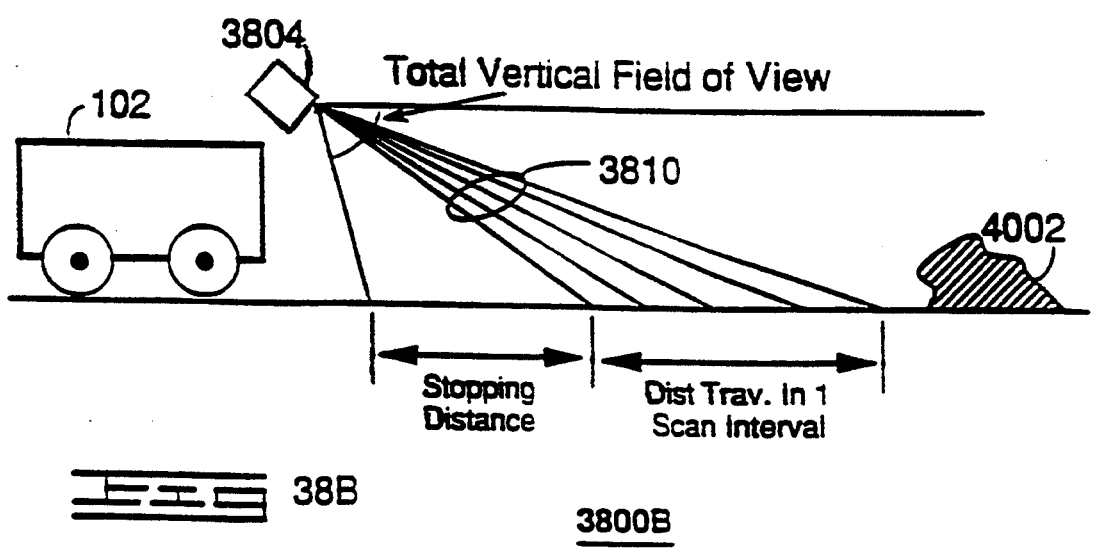
38B

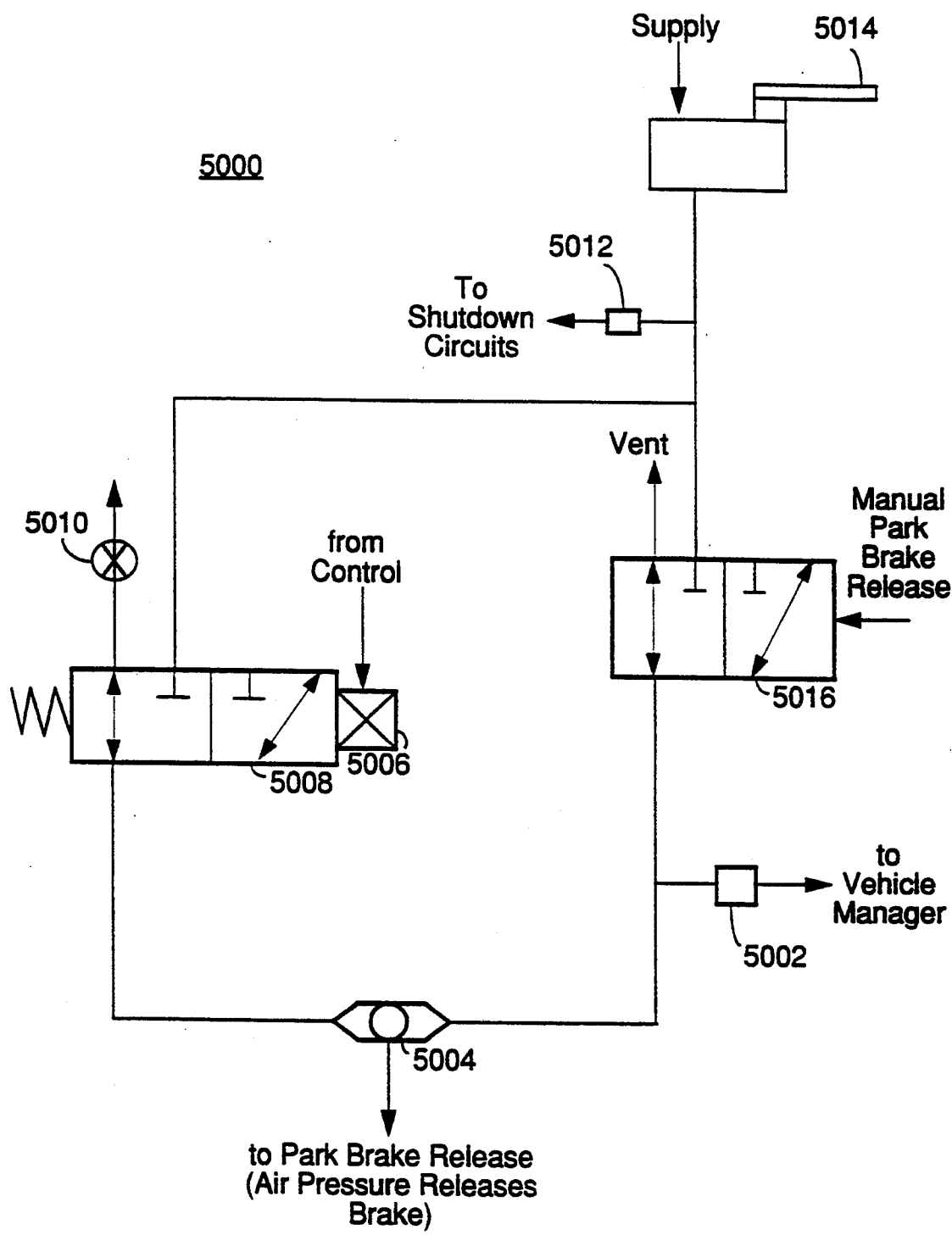

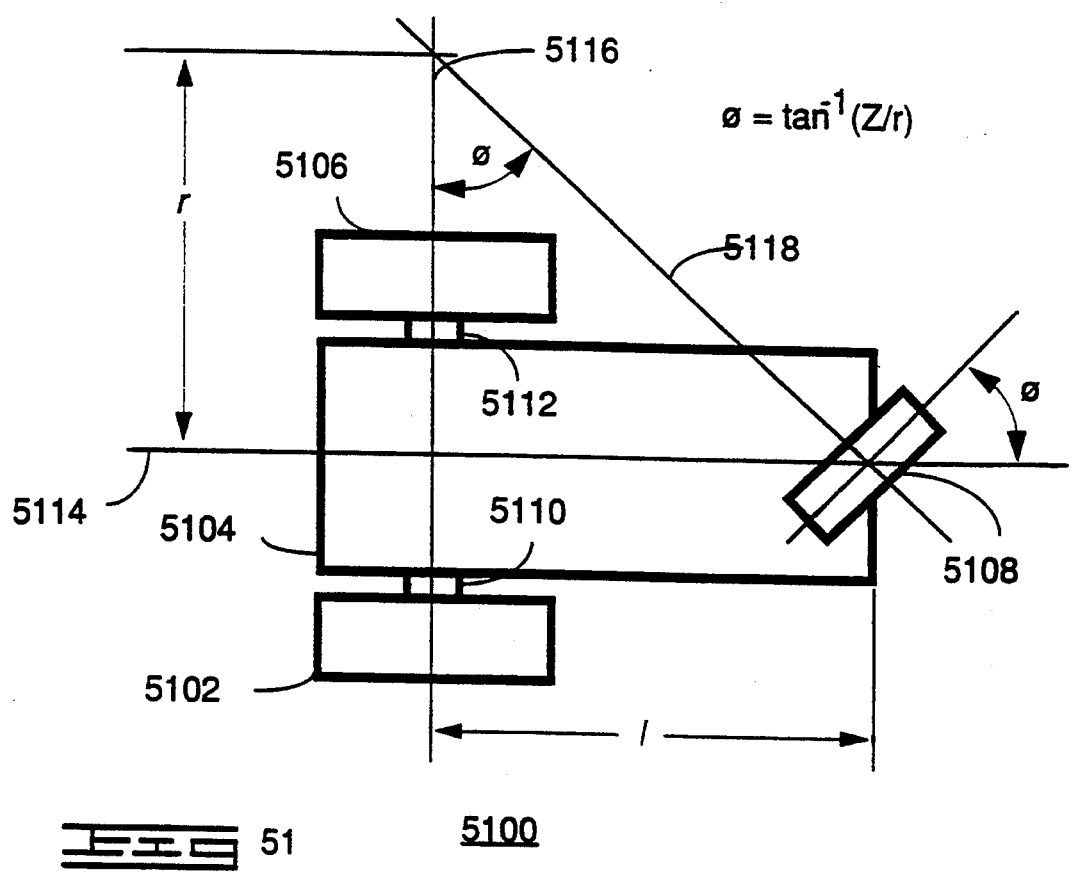

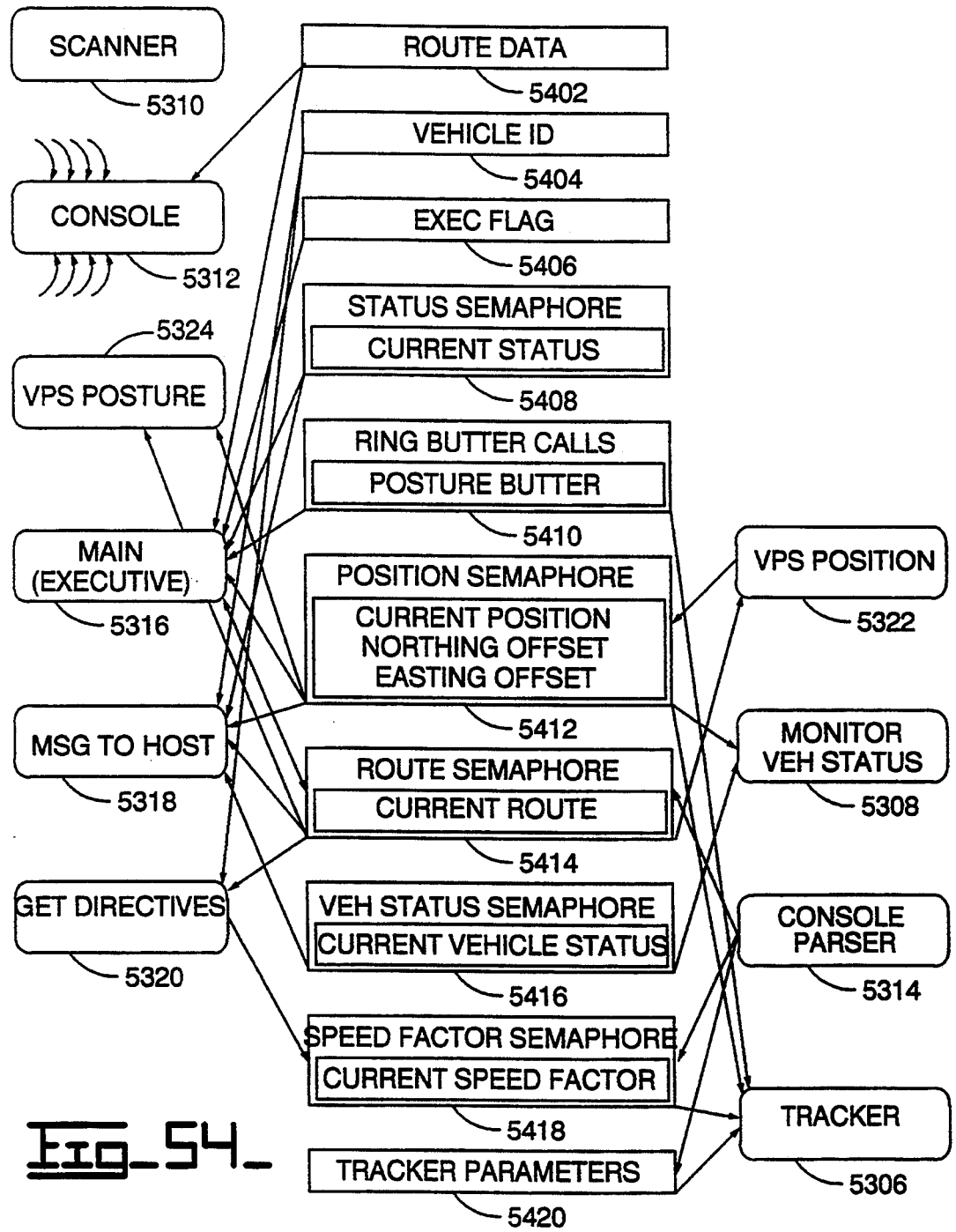
Fig_54_

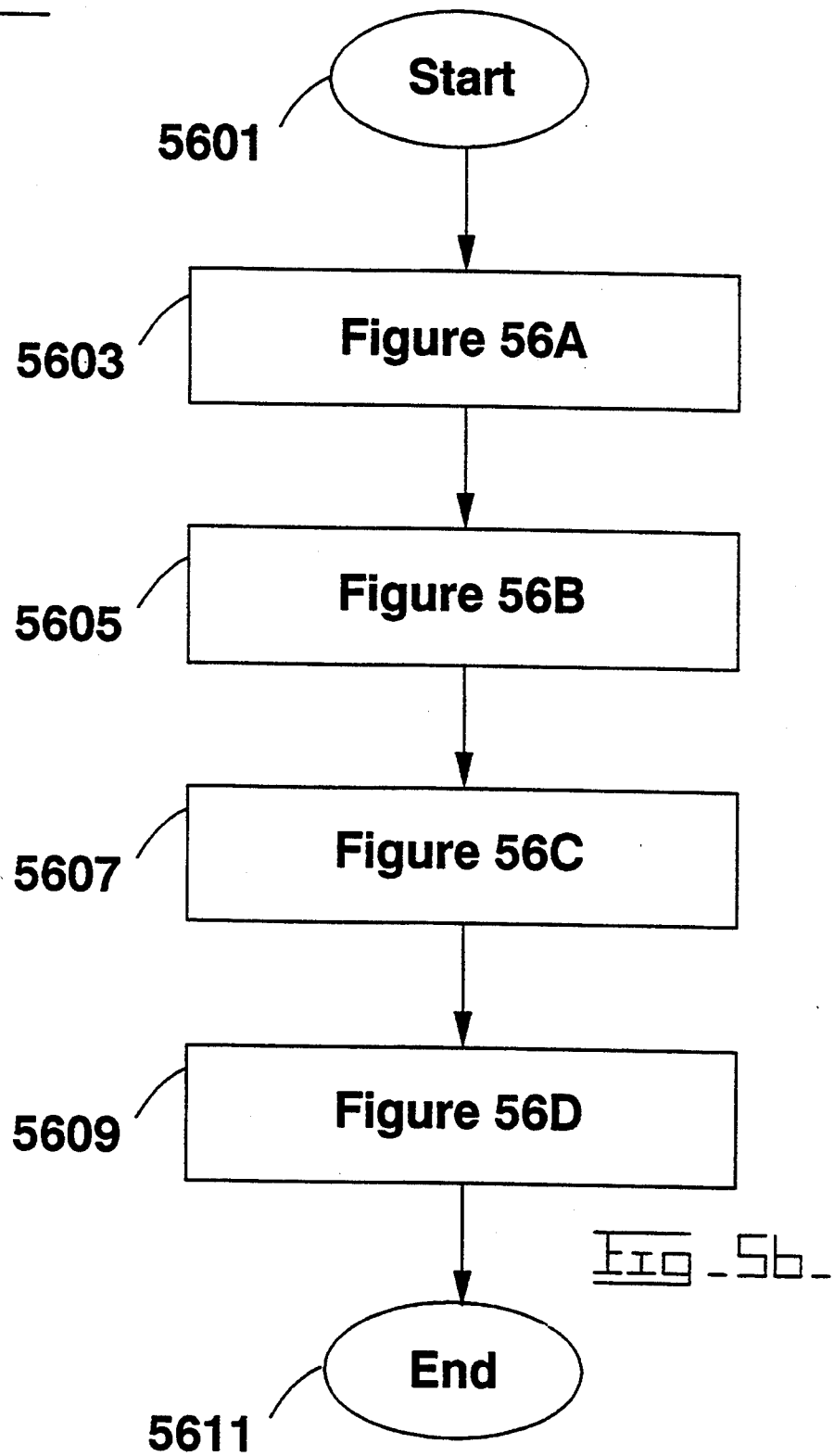
Fig_56_

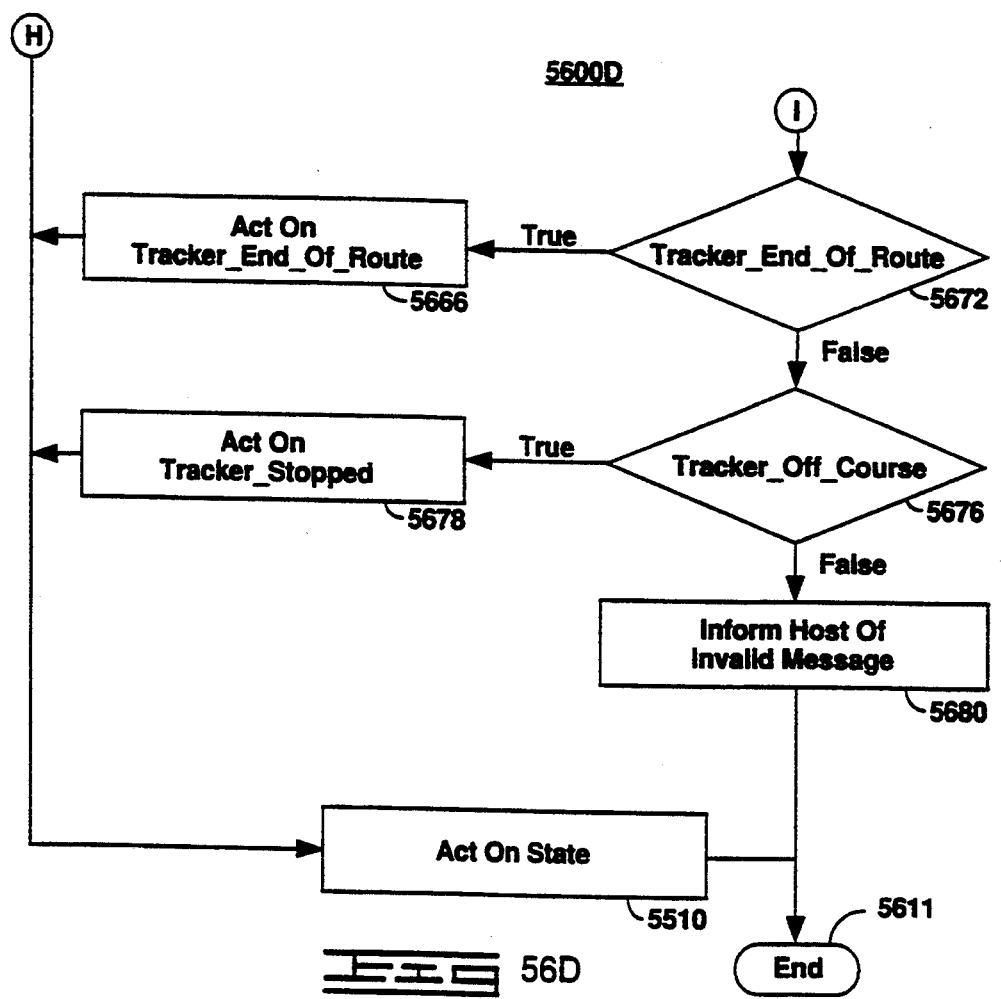

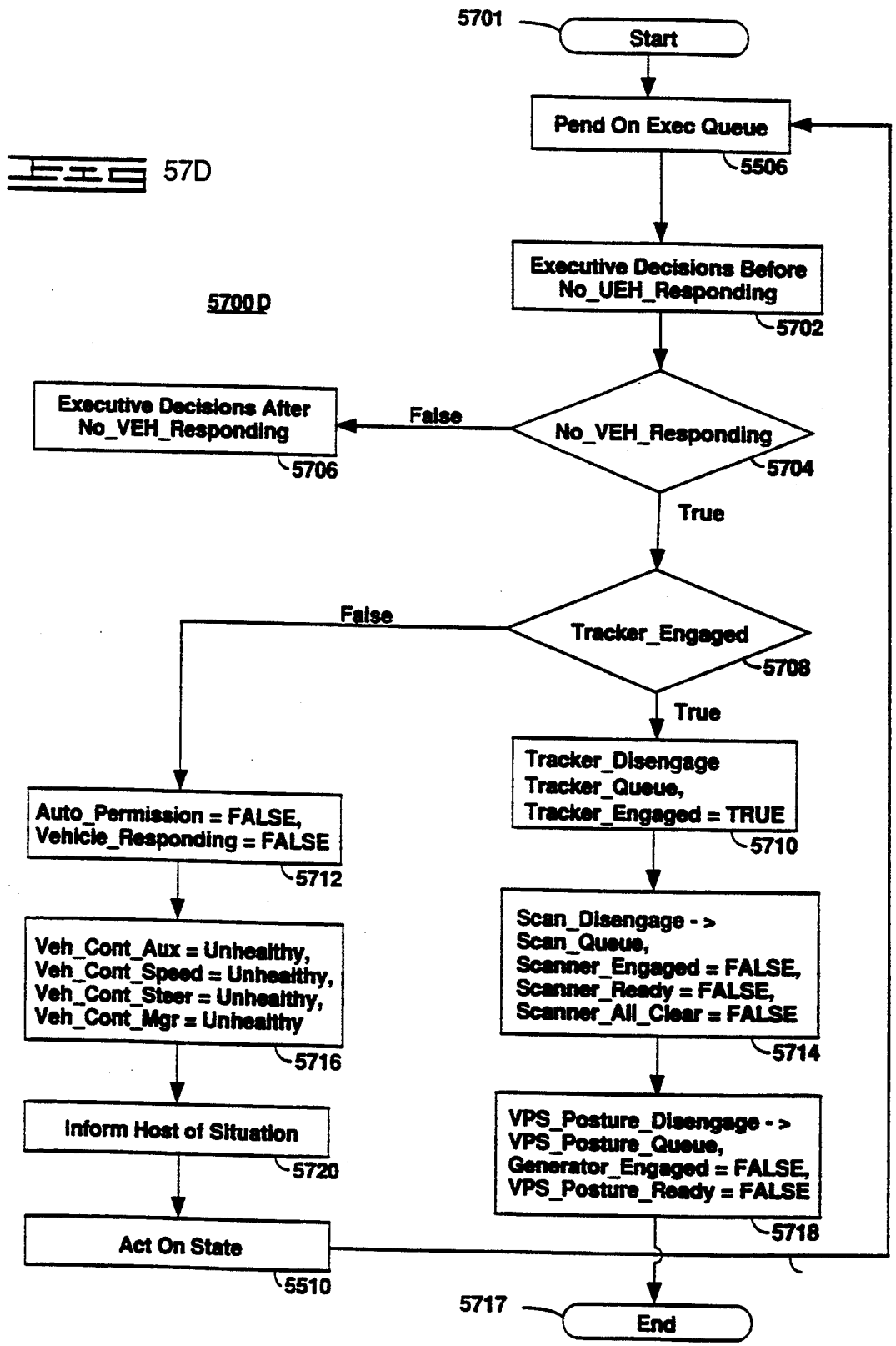

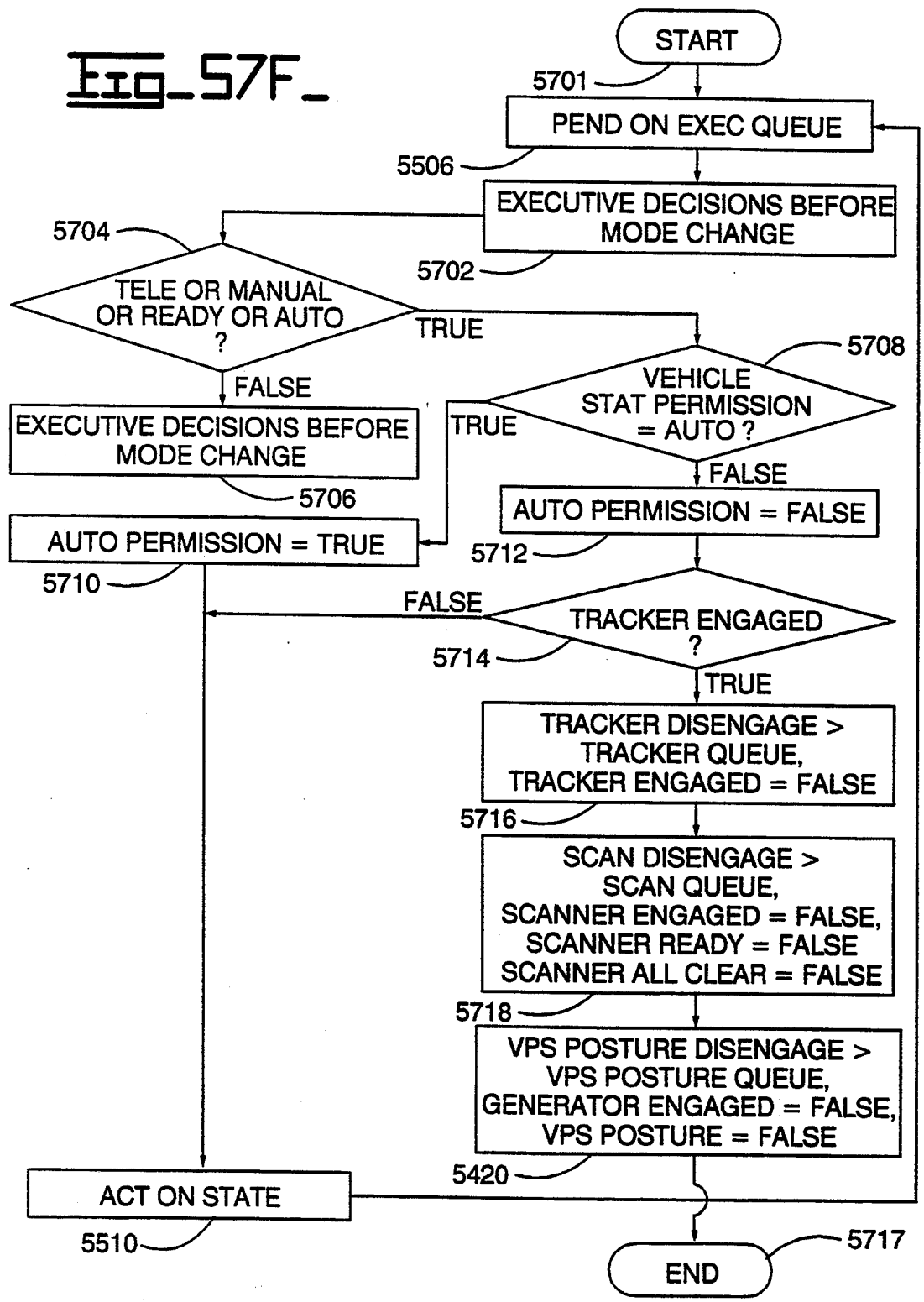
Fig_57F_

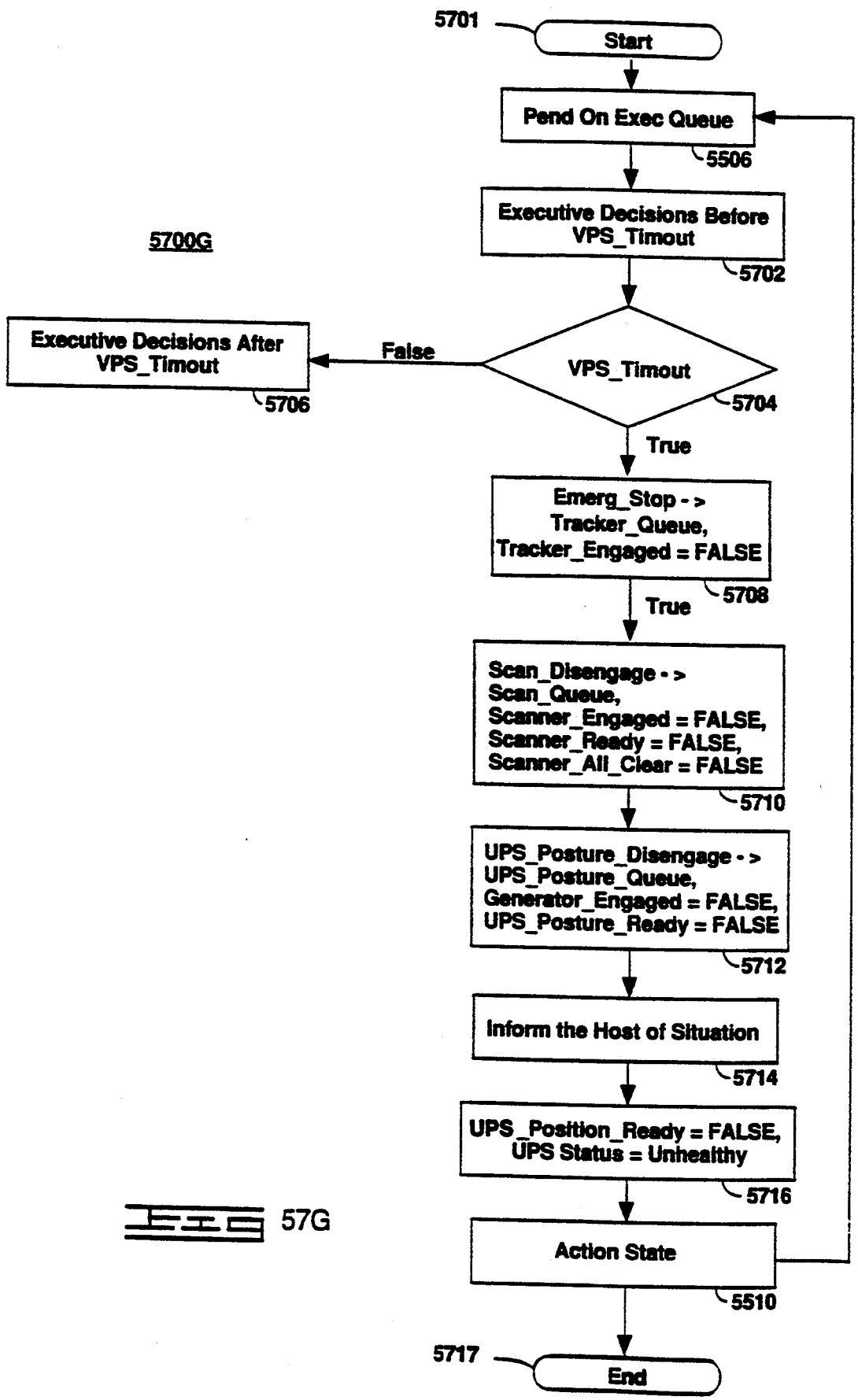

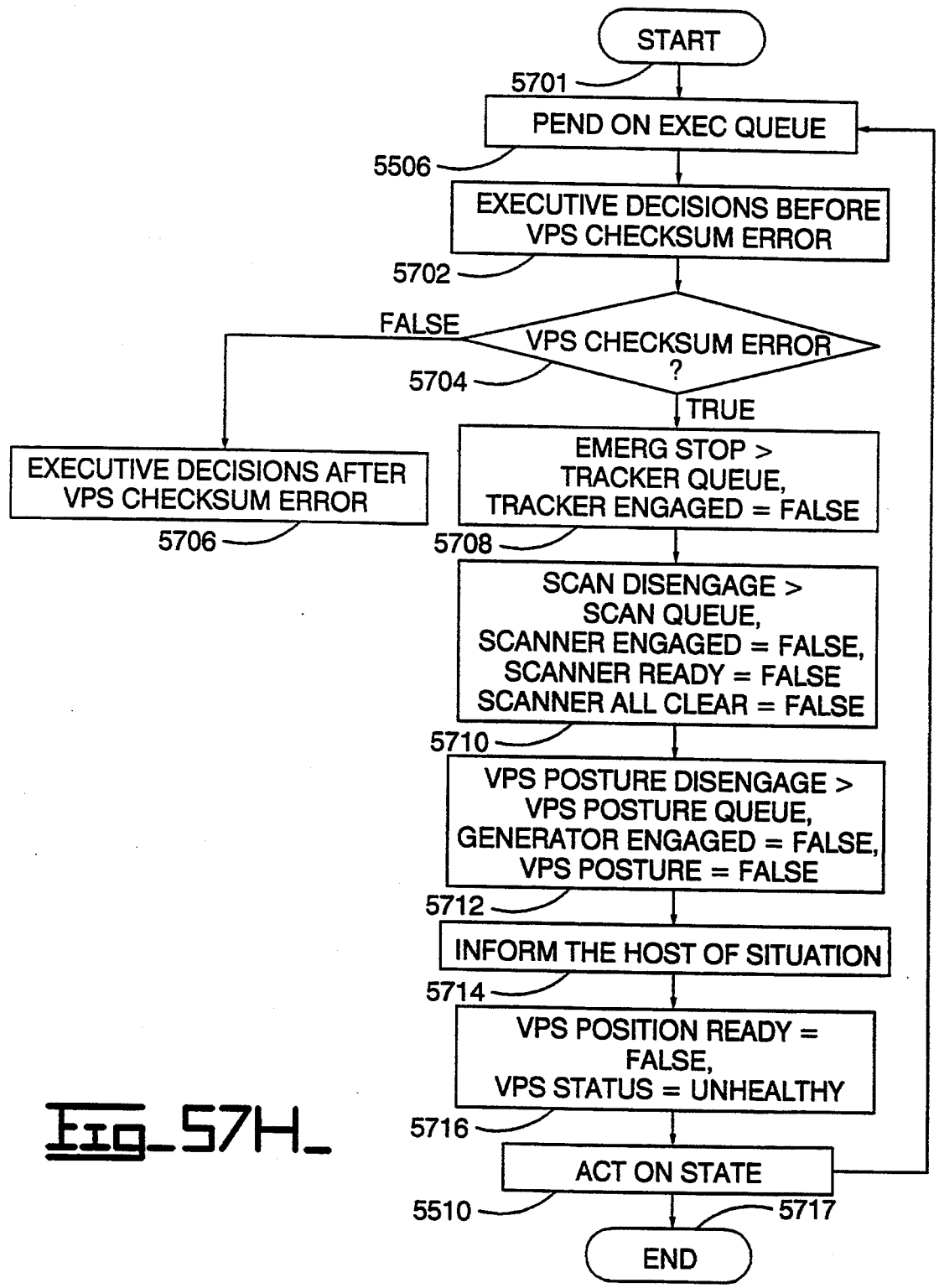
Fig_57H

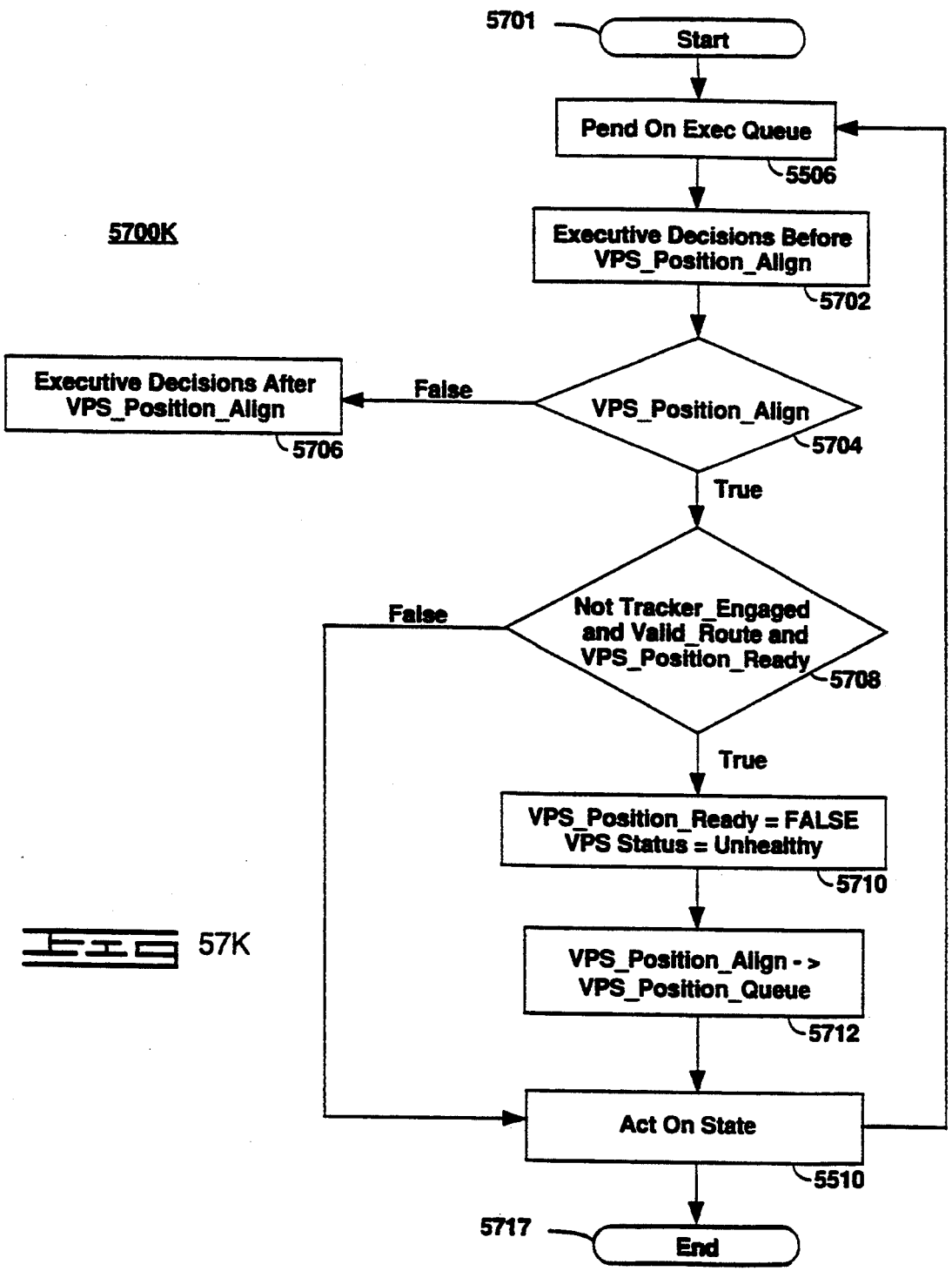

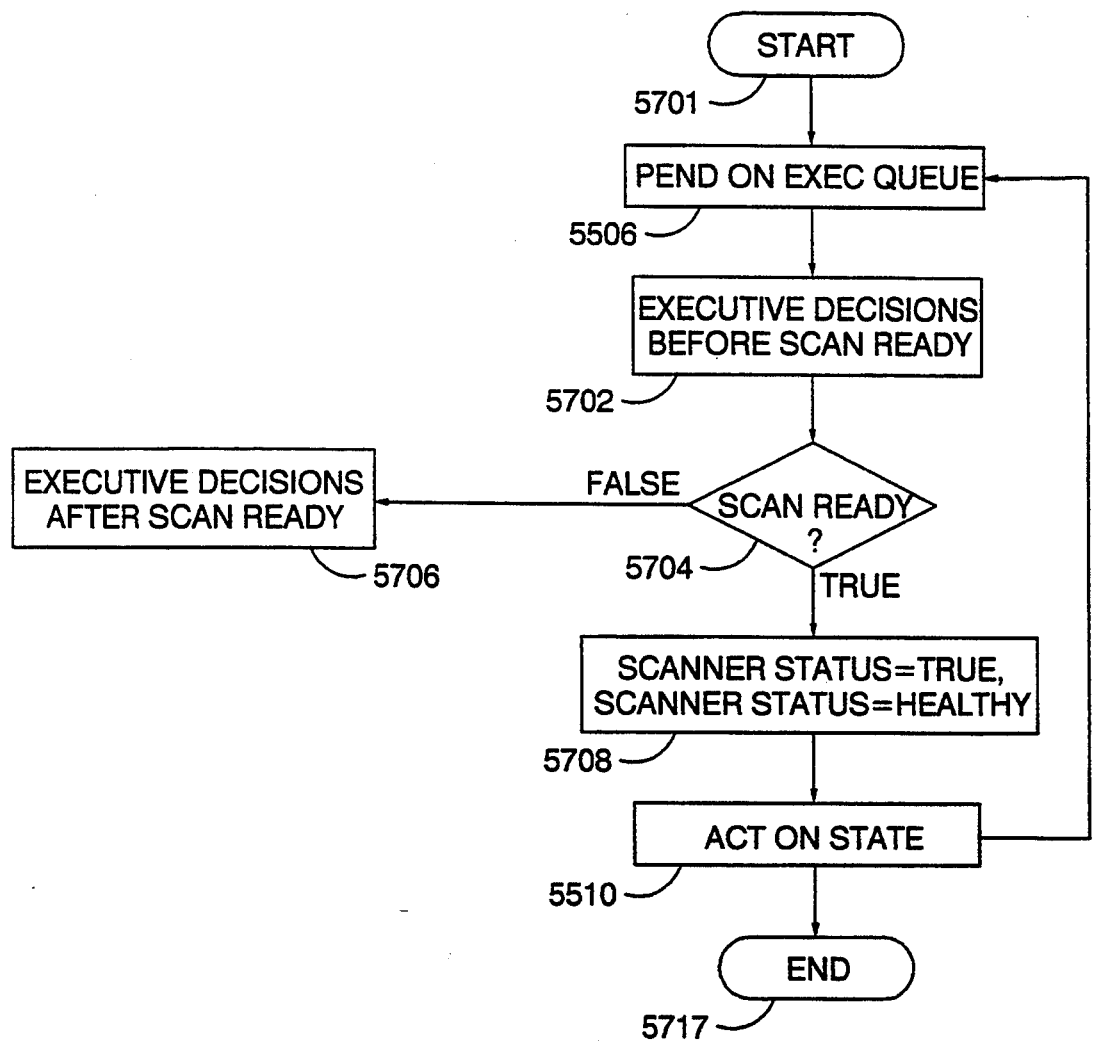
Fig_57M_

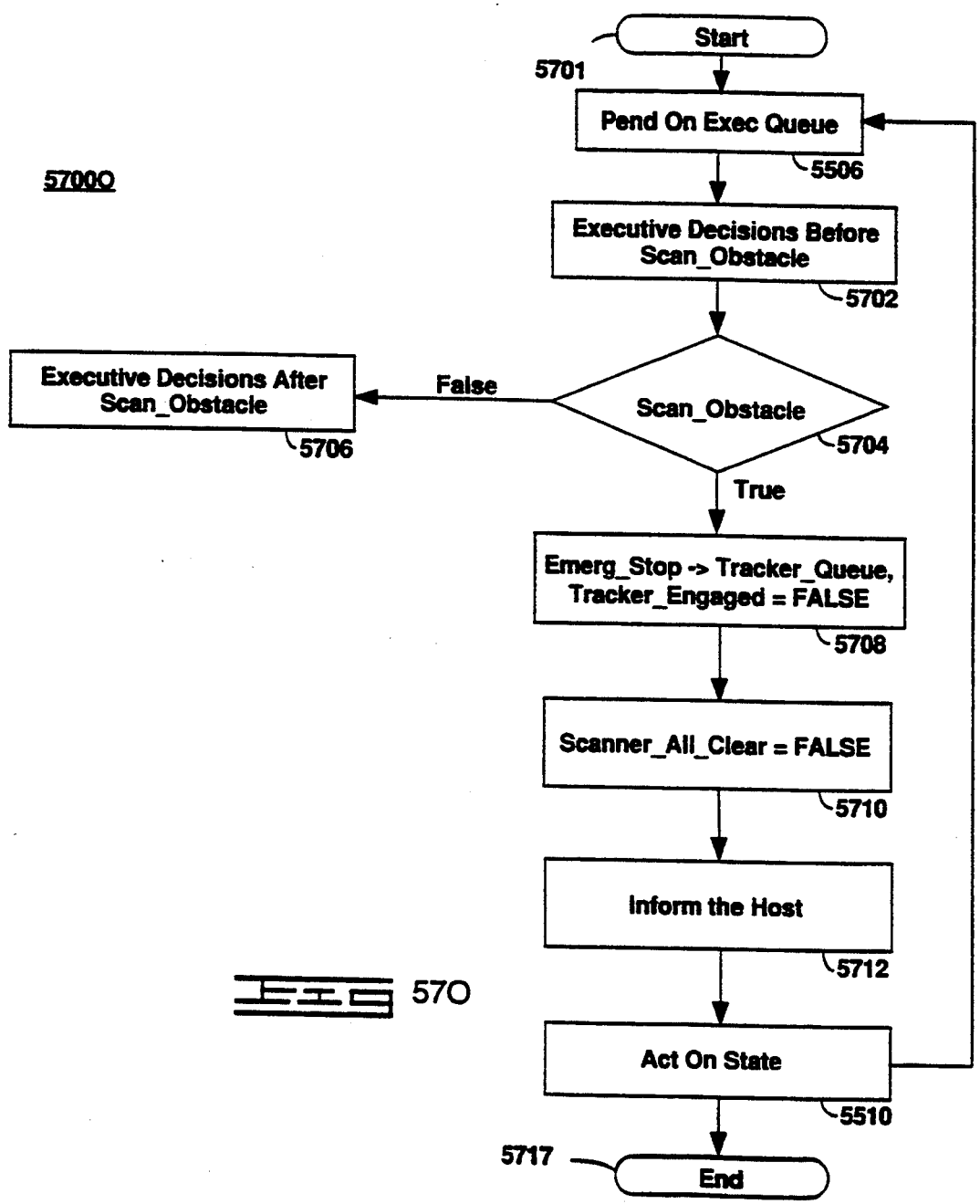

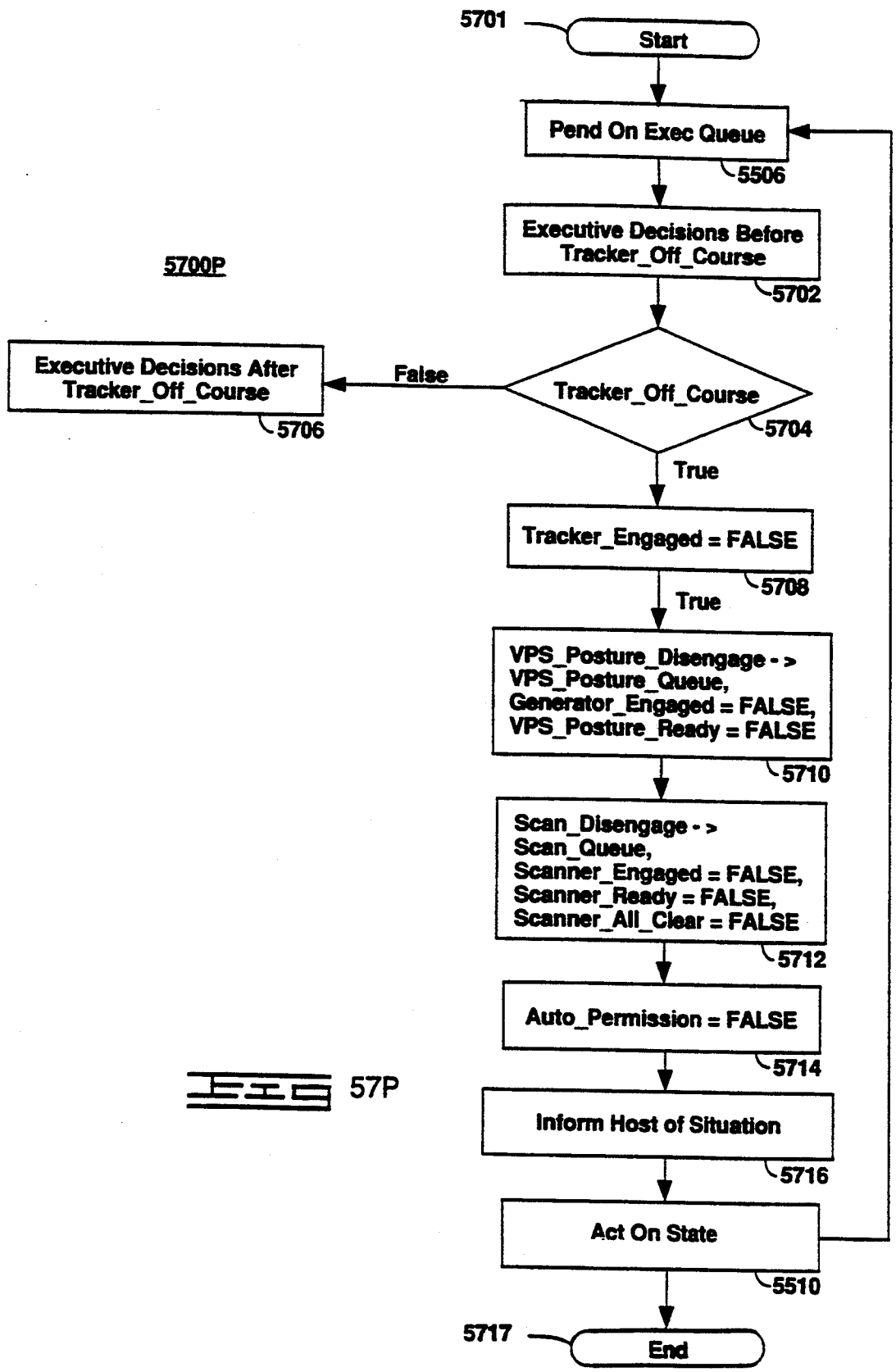

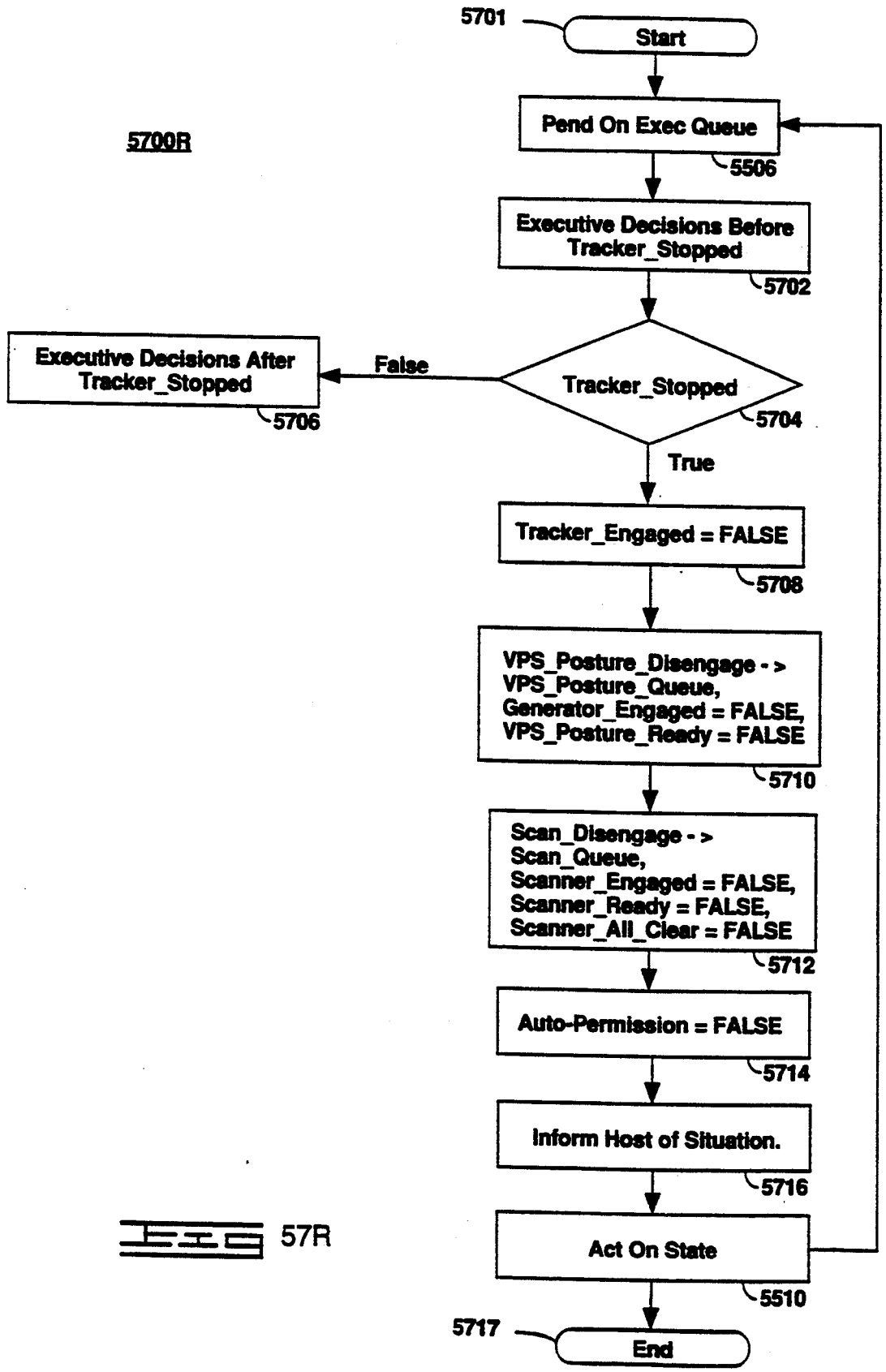

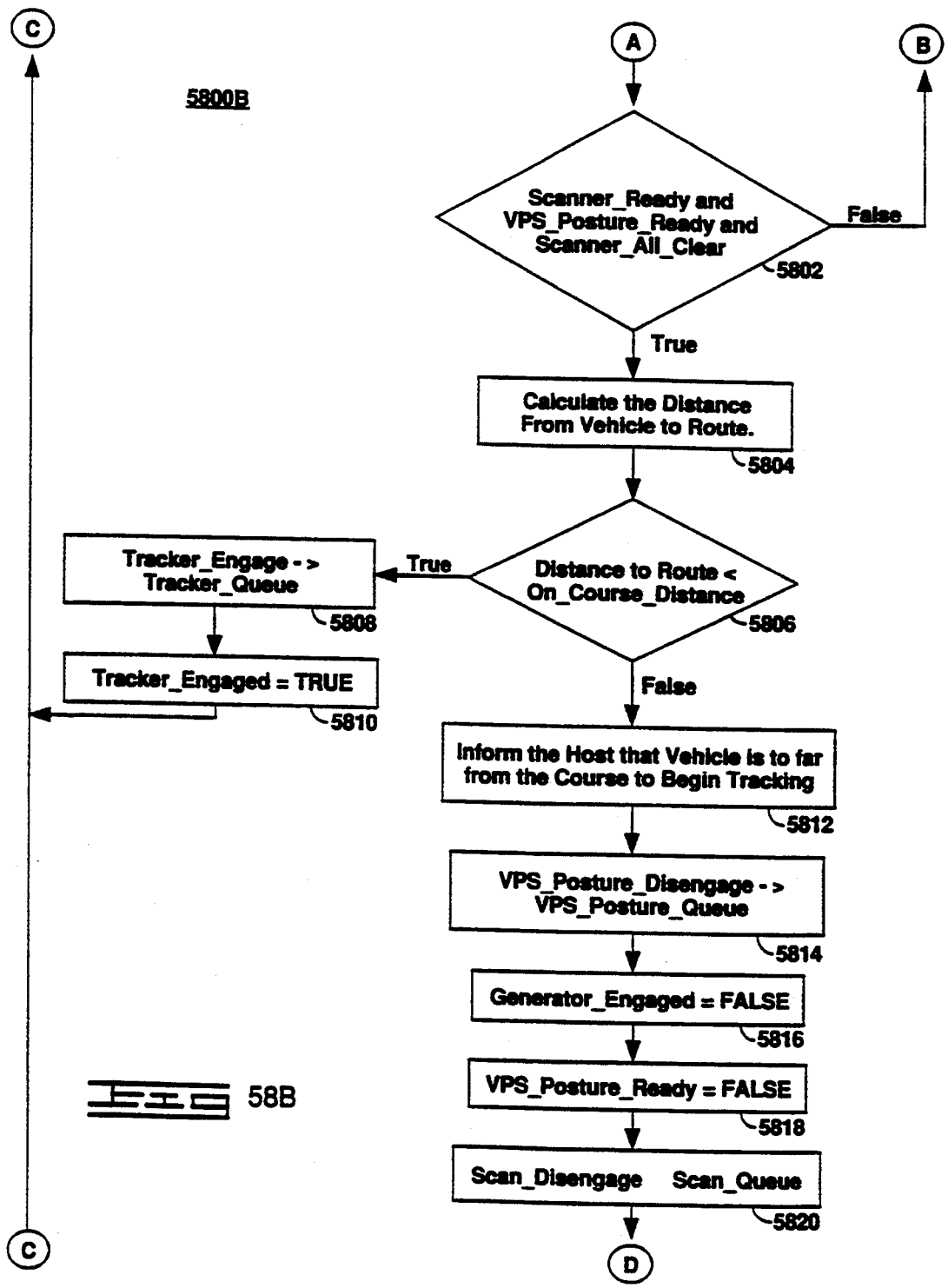

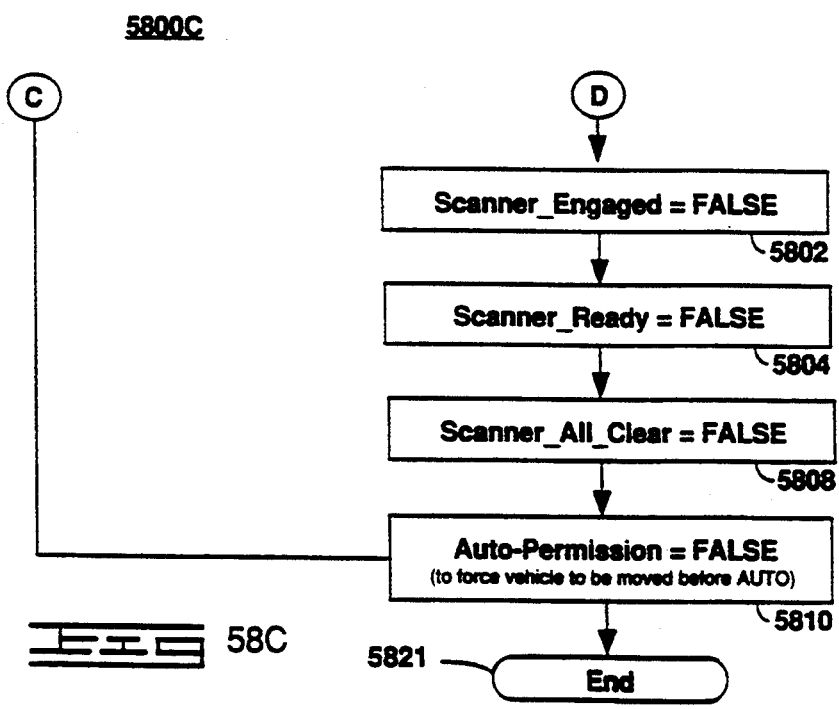

VEHICLE POSITION DETERMINATION SYSTEM AND METHOD

This is a divisional application of application Ser. No. 07/628,560, filed Dec. 3, 1990, now abandoned, which is a continuation-in-part application of application Ser. No. 07/487,980 filed Feb. 5, 1990.

BACKGROUND OF THE INVENTION

1. Field of the Invention

The present invention relates to positioning systems, and more particularly, to a positioning system and method for determining the terrestrial position of an autonomous vehicle on or near the planet Earth's surface.

2. Related Art

Several national governments, including the United States (U.S.) of America, are presently developing a terrestrial position determination system, referred to generically as a global positioning system (GPS). In a GPS, a number of satellites are placed in orbit around the planet Earth. The GPS satellites are designed to transmit electromagnetic signals. From these electromagnetic signals, the absolute, terrestrial position (position with respect to the Earth's center) of any receiver at or near the Earth's surface can ultimately be determined.

The U.S. government has designated its GPS the "NAVSTAR." The NAVSTAR GPS will be declared operational by the U.S. government in 1993. Moreover, the government of the Union of Soviet Socialist Republics (U.S.S.R.) is currently developing a GPS known as "GLONASS," which is substantially similar to the NAVSTAR GPS.

In the NAVSTAR GPS, it is envisioned that four orbiting GPS satellites will exist in each of six separate orbits. A total of 24 GPS satellites will be in orbit at any given time with 21 GPS satellites in operation and 3 GPS satellites serving as spares. The three GPS satellite orbits will have mutually orthogonal planes relative to the Earth. The GPS satellite orbits will be neither polar orbits nor equatorial orbits. Moreover, the GPS satellites will orbit the Earth once every 12 hours.

Using the NAVSTAR GPS, the relative position of orbiting GPS satellites with respect to any Earth receiver can be determined from the electromagnetic signals. The relative position is commonly referred to as a "pseudorange." Moreover, the relative position can be calculated by two methods.

One method is to measure the propagation time delays between transmission and reception of the emanating electromagnetic signals. In the NAVSTAR GPS, the electromagnetic signals are encoded continuously with the time at which the signals are transmitted from the GPS satellites. Needless to say, one can make note of the reception time and subtract the encoded transmission time in order to derive time delays. From the calculated time delays and from knowing the speed at which electromagnetic waves travel through the atmosphere, pseudoranges can be accurately derived. Pseudoranges computed using the foregoing method are referred to in the context of this document as "actual" pseudoranges.

Another method involves satellite position data that is encoded in the electromagnetic signals being transmitted from the orbiting satellites. Almanac data relating to the satellite position data of the NAVSTAR GPS is publicly available. Reference to this almanac data in regard to data encoded in the electromagnetic signals allows for an accurate derivation of pseudoranges. Pseudoranges computed using the foregoing method are referred to in the context of this document as "estimated" pseudoranges.

However, with respect to the previous method of deriving estimated pseudoranges, it should be noted that the satellite position data is updated at the GPS satellite only once an hour on the hour. Consequently, an estimated pseudorange decreases in accuracy over time after each hour until the next hour, when a new estimated pseudorange is computed using updated satellite position data.

Furthermore, by knowing the relative position of at least three of the orbiting GPS satellites, the absolute terrestrial position (that is, longitude, latitude, and altitude with respect to the Earth's center) of any Earth receiver can be computed via simple geometric theory involving triangulation methods. The accuracy of the terrestrial position estimate depends in part on the number of orbiting GPS satellites that are sampled. Using more GPS satellites in the computation can increase the accuracy of the terrestrial position estimate.

Conventionally, four GPS satellites are sampled to determine each terrestrial position estimate because of errors contributed by circuit clock differentials among the Earth receiver and the various GPS satellites. Clock differentials could be several milliseconds. If the Earth receiver's clock were synchronized with that of the GPS satellites, then only three GPS satellites would need to be sampled to pinpoint the location of the Earth receiver.

In the NAVSTAR GPS, electromagnetic signals are continuously transmitted from all of the GPS satellites at a single carrier frequency. However, each of the GPS satellites has a different modulation scheme, thereby allowing for differentiation of the signals. In the NAVSTAR GPS, the carrier frequency is modulated using a pseudorandom signal which is unique to each GPS satellite. Consequently, the orbiting GPS satellites in the NAVSTAR GPS can be identified when the carrier frequencies are demodulated.

Furthermore, the NAVSTAR GPS envisions two modes of modulating the carrier wave using pseudorandom number (PRN) signals. In one mode, referred to as the "coarse/acquisition" (C/A) mode, the PRN signal is a gold code sequence having a chip rate of 1.023 MHz. The gold code sequence is a well-known conventional pseudorandom sequence in the art. A chip is one individual pulse of the pseudorandom code. The chip rate of a pseudorandom code sequence is the rate at which the chips in the sequence are generated. Consequently, the chip rate is equal to the code repetition rate divided by the number of members in the code. Accordingly, with respect to the coarse/acquisition mode of the NAVSTAR GPS, there exists 1,023 chips in each gold code sequence and the sequence is repeated once every millisecond. Use of the 1.023 MHz gold code sequence from four orbiting GPS satellites enables the terrestrial position of an Earth receiver to be determined to an approximate accuracy of within 60 to 300 meters.

The second mode of modulation in the NAVSTAR GPS is commonly referred to as the "precise" or "protected" (P) mode. In the P mode, the pseudorandom code has a chip rate of 10.23 MHz. Moreover, the P mode sequences are extremely long, so that the sequences repeat no more than once every 267 days. As a result, the terrestrial position of any Earth receiver can be determined to within an approximate accuracy of 16 to 30 meters.

However, the P mode sequences are classified and are not made publicly available by the United States government. In other words, the P mode is intended for use only by Earth receivers authorized by the United States government.

In order for the Earth receivers to differentiate the various C/A signals from the different orbiting GPS satellites, the Earth receivers usually include a plurality of different gold code sources for locally generating gold code sequences. Each locally-derived gold code sequence corresponds with each unique gold code sequence from each of the GPS satellites.

The locally-derived gold code sequences and the transmitted gold code sequences are cross correlated with each other over gold code sequence intervals of one millisecond. The phase of the locally-derived gold code sequences vary on a chip-by-chip basis, and then within a chip, until the maximum cross correlation function is obtained. Because the cross correlation for two gold code sequences having a length of 1,023 bits is approximately 16 times as great as the cross correlation function of any of the other combinations of gold code sequences, it is relatively easy to lock the locally derived gold code sequence onto the same gold code sequence that was transmitted by one of the GPS satellites.

The gold code sequences from at least four of the GPS satellites in the field of view of an Earth receiver are separated in this manner by using a single channel that is sequentially responsive to each of the locally-derived gold code sequences, or alternatively, by using parallel channels that are simultaneously responsive to the different gold code sequences. After four locally-derived gold code sequences are locked in phase with the gold code sequences received from four GPS satellites in the field of view of the Earth receiver, the relative position of the Earth receiver can be determined to an accuracy of approximately 60 to 300 meters.

The foregoing approximate accuracy of the NAVSTAR GPS is affected by (1) the number of GPS satellites transmitting signals to which the Earth receiver is effectively responsive, (2) the variable amplitudes of the received signals, and (3) the magnitude of the cross correlation peaks between the received signals from the different GPS satellites.

Because multiple PRN signals are received simultaneously at the Earth receiver, a common time interval exists wherein some of the codes can conflict. In other words, the codes cause a degradation in measurements of the time of arrival of each received PRN because of the cross correlations between conflicting received signals.

The time of arrival measurement for each PRN signal is made by determining the time of a peak amplitude of a cross correlation between the gold code sequence of the received PRN signal and the locally-derived PRN signal. When a locally-derived PRN signal is superimposed over a received PRN signal thereby increasing the averaging time of their cross correlation, the average noise contribution decreases. However, because the cross correlation errors between the received PRN signals are periodic, increasing the averaging time also results in increases to both the error signal and the cross correlation value between the received PRN's alike. Consequently, errors relating to the time of arrival of PRN signals are not reduced by cross correlation.

In addition to the GPS, it is known in the conventional art to use inertial systems in navigation systems to obtain position estimates of vehicles. Such an inertial reference unit (IRU) obtains specific-force measurements from accelerometers in a reference coordinate frame which is stabilized by gyroscopes, or gyros. An IRU can be of several types, including for example, laser, mechanical, or fiber optic. In an unaided navigation system using an IRU, the specific force (corrected for the effects of the Earth's gravity) as measured by an accelerometer is integrated into a navigation mathematical equation to produce the vehicle's position and velocity.

The instrument measurements of the IRU may be specified in a different rectangular coordinate frame than the reference navigation frame, depending on the platform implementation. The most commonly used reference navigation frame for near Earth navigation is the local-level frame (east-north-vertical). Several gimballed platform implementations exist with the forgoing reference navigation frame.

In a gimballed, local level-north seeking IRU, the gyroscopes and accelerometers are mounted on a platform which is torqued to maintain the platform level and azimuth pointing to the north. The platform is the reference plane. In contrast, in a gimballed, local-level azimuth-wander IRU, the platform is maintained level, but is not torqued about the vertical axis.

Furthermore, in a strap-down IRU, the gyroscopes and the accelerometers are directly mounted on the vehicle body. They measure the linear and angular motion of the vehicle relative to inertial space. The motion is expressed in vehicle coordinates. Therefore, in a strap-down IRU, it is necessary to first compute the altitude of the vehicle to the referenced navigation frame. Then, the computed altitude is used to transform the accelerometer measurements into the reference frame. After the accelerometer data of a strap-down IRU has been extrapolated into the reference frame, the solution of the navigation equations mentioned previously is identical in both the gimballed IRU and the strap-down IRU.

In the strap-down IRU, the altitude computations, which are required to resolve accelerometer measurements, are usually carried out at a high rate. The computations suffer from numerical errors because of the limited computer byte size and throughput availability. These computation errors depend on the frequency response of the sensor loop, data rate, and resolution and magnitude of the sensor output at the sampling time.

However, significant benefits arise from using the strap-down IRU, rather than the gimballed IRU. The strap-down IRUs are less costly. Moreover, the strap-down IRUs are generally smaller in physical size. Thus, the potential to realize size and cost savings in IRUs can make strap-down IRUs attractive for both military and commercial applications.

The performance of navigation systems using IRUs is primarily limited by errors contributed by the various constituent sensors within the IRUs. Gyroscopes drift. Accelerometers have inherent biases. Further, errors are contributed from improper scale factors and improper IRU alignment angles. Typically, the preceding errors cause inaccuracies in the estimates of vehicle positions, velocity, and altitude, which accumulate over time as a vehicle mission progresses. To some extent, the errors are dependent on user dynamics.

If a very accurate navigation system is required for a vehicle, high precision gyroscopes and accelerometers can be utilized to satisfy that need. However, such high precision equipment increase the complexity and costs of the vehicle.

Autonomous vehicle navigation is also known in the conventional art. "Autonomous" means unmanned or machine controlled. However, the autonomous systems known in the art are rudimentary at best.

Autonomous systems exist which rely on positioning based on visual sensing. For instance, vision-based positioning is used in the Martin Marietta Autonomous Land Vehicle, as described in "Obstacle Avoidance Perception Processing for the Autonomous Land Vehicle," by R. Terry Dunlay, IEEE, CH2555-1/88/0000/0912$01.00, 1988.

Some of the vision-based positioning systems use fixed guide lines or markings on a factory floor, for example, to navigate from point to point. Other positioning systems involve pattern recognition by complex hardware and software. Still other systems, known as "dead-reckoning" systems, navigate by keeping track of the vehicle's position relative to a known starting point. This tracking is performed by measuring the distance the vehicle has travelled and monitoring the vehicle direction from the starting point. The preceding autonomous navigation systems suffer from numerous drawbacks and limitations. For instance, if a navigation system on a vehicle fails to recognize where the vehicle is located, or looses track of where the vehicle has been, or miscalculates the vehicle's starting point, then the navigation system will be unable to accurately direct the vehicle to reach its ultimate destination.

Moreover, because errors in position estimates of vehicles have a tendency to accumulate over time in the conventional autonomous navigation systems, the navigation systems require frequent and time-consuming initializations. Finally, conventional navigation systems require placement of patterns and markers along vehicle routes. This placement of patterns and markers is also time consuming and costly, as well as limits the applicability of these navigation systems to small, controlled areas.

SUMMARY OF THE INVENTION

The present invention is a vehicle positioning system which, as used throughout, means apparatus, method, or a combination of both apparatus and method. The present invention overcomes many of the limitations of conventional technology in the art of vehicle position determination.

The present invention can be used to aid any navigation system for autonomous vehicles. The autonomous vehicles can be stationary or moving. Moreover, the autonomous vehicles can be at or near the Earth's surface. In other words, the present invention provides for highly accurate and fast tracking of any terrestrial vehicle.

The present invention envisions combining and greatly enhancing the conventional capabilities of an IRU and a GPS in a cost-effective manner to provide extremely accurate position estimates of terrestrial vehicles. In doing so, the present invention uses many novel and inventive systems, including apparatuses and methods, which allow for a superior positioning capability and, consequently, a flexible autonomous navigational capability.

The present invention further envisions a novel and enhanced combination of three independent subsystems to determine position estimates of vehicles on or near the Earth's surface. One subsystem is a first positioning system using a GPS, for example, the NAVSTAR GPS. The first positioning system computes a first position estimate of a vehicle. Another subsystem is a second positioning system using an IRU and a vehicle odometer. The second positioning system computes a second position estimate. The final subsystem is a processing system for computing the more accurate, third position estimate of the vehicle based upon the first and second position estimates from the previous two subsystems.

The present invention envisions a constellation effects method. The constellation effects method provides for selecting the optimal satellite constellation from a larger group of GPS satellites in view of a vehicle to thereby increase the accuracy of first position estimates derived from a GPS.

The present invention increases the accuracy of vehicle position estimates by providing differential correction techniques/methods which compensate for noise and errors in positioning data obtained from a GPS and/or an IRU. In the preferred embodiment, a base station serving as a reference point can perform the differential correction techniques/methods and can then relay the obtained data to a vehicle. The vehicle can then use the data received from the base station to enhance the accuracy of the position estimates of the vehicle.

The present invention envisions a parabolic bias technique for increasing the accuracy of GPS data received from GPS satellites. A parabolic bias is derived for each GPS satellite to enhance actual pseudoranges for that GPS satellite. In the parabolic bias technique, parabolic models are constructed for the actual pseudoranges and the parabolic biases are extrapolated from the parabolic models.

The present invention envisions a base residuals bias technique for increasing the accuracy of GPS data received from GPS satellites. A base residuals bias is derived for modifying first position estimates from the VPS on a vehicle. A base residuals bias is a spatial bias which is the effective difference in the known position of the base station and its estimated position.

The present invention includes a novel satellite position predictor method. This method allows the present invention to predict the future positions of GPS satellites. As a result, the accuracy and performance of the positioning system is further enhanced.

The present invention includes a weighted path history technique for increasing the accuracy of first position estimates ultimately derived from a GPS. The weighted path history technique uses previous first position estimates to derive a vehicle path model for testing the validity of future first position estimates. Use of the weighted path history technique results in a reduction to wandering of first position estimates and in enhanced immunities to spurious position computations.

The present invention further provides for anti-selective availability of data received from GPS satellites of any GPS. An anti-selective availability technique detects and corrects false positioning data received from any GPS. False data could be received from the NAVSTAR GPS or the GLONASS GPS (1) because of intentional tainting by the respective governments of the U.S. and U.S.S.R. or (2) because of technical malfunctions.

Further features and advantages of the present invention will become apparent to one of skill in the art upon examination of the following drawings and detailed description. It is intended that any additional features and advantages be incorporated herein.

BRIEF DESCRIPTION OF THE DRAWINGS

The present invention as defined in the claims can be better understood with reference to the text and to the following drawings.

FIG. 6 is a high level block diagram 600 of the operation of a GPS, possibly the NAVSTAR GPS, which includes a GPS satellite constellation 200, 202, 204, and 206 and which is used in conjunction with a pseudolite 105 and a base station 188 to accurately determine the position of a vehicle 102;

FIG. 11 is a low level block diagram 1100 of the VPS architecture 1000 of FIG. 10;

FIG. 12 is an intermediate level block diagram 1200 of a VPS main (I/O) processor 1002 of FIG. 10 showing a VPS Kalman filter 1202 and a weighted combiner 1200;

FIG. 13 is a flowchart 1300 of the constellation effects method for improving the accuracy of first position estimates in the preferred embodiment of the present invention;

FIG. 17 is a flowchart 1700 of a base residuals bias technique of the preferred embodiment;

FIG. 25 is a diagram 2500 of how the sign of a last clothoid sediment is determined;

FIG. 36 is a context diagram 3600 of a path tracking structure of the present invention;

FIGS. 37A-37D are data flow summaries 3700A-3700D, respectively, of the navigator 406;

FIG. 38A is an illustration 3800B of a vehicle mounted scanner 404;

FIG. 38B is an illustration 3800B of an autonomous vehicle scanning 102 for an obstacle 4002;

FIG. 50 is a high level block diagram 5000 of a park brake control circuit in the speed control 4304 of the present invention;

FIG. 51 is a high level block diagram 5100 of a tricycle steering model used to develop a navigation system of the present invention;

FIG. 54 is an intermediate level communications diagram 5400 showing an embodiment of navigator shared memory of a navigator 406;

FIG. 56 is an intermediate level flowchart 5600 of the relationship/connection of executive flowcharts 5600A-5600D of respective FIGS. 56A-56D;

FIGS. 56A-56D are low level executive flowcharts 5600A-5600D, respectively, of the high level executive flowchart 5500;

FIGS. 58A-58C are respective low level flowcharts 5800A-5800C showing the "act on state" block 5510 in each of the executive flowcharts 5700A-5700Q.

DETAILED DESCRIPTION OF THE PREFERRED EMBODIMENT

Table of Contents

Figure 1:
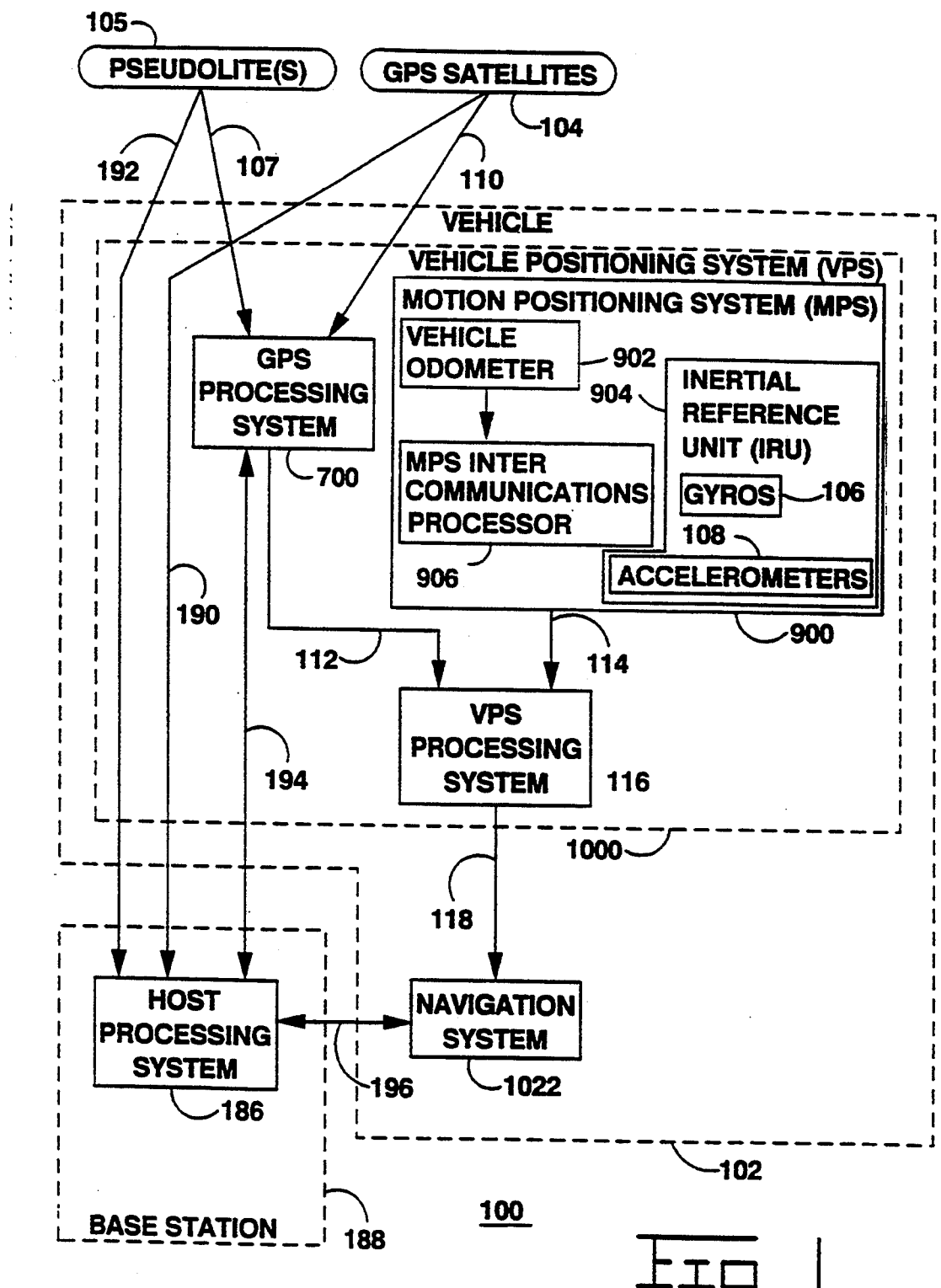
FIG. 1 illustrates a high level block diagram 100 of the preferred embodiment of the present invention.

I. Definitions
II. General Overview
  A. Vehicle Positioning System (VPS)
  B. Navigation System
  C. Base Station
III. Vehicle Positioning System
  A. Overview
  B. GPS Processing System
    1. NAVSTAR GPS
    2. Operation
  C. Motion Positioning System (MPS)
  D. VPS Architecture
  E. Base Station
  F. Satellite Based Accuracy Improvements
    1. Constellation Effects
    2. Differential Correction Techniques
      a. Original Bias Technique
      b. Parabolic Bias Technique
      c. Base Residuals Bias Technique
      d. Base Correlator Bias Technique
  G. Satellite Position Predictor
  H. Weighted Path History
  I. Anti-Selective availability
  J. Surveying
  K. Graphic Representations
IV. Navigation System
  A. Overview
  Route Planning/Path Generation
    1. Introduction
      a. Clothoid Path Segments
      b. Modeling A Vehicle Path
      c. Clothoid Curves
      d. Generation of a
      Posture Continuous Path
        (1) Existing Methods
        (2) Path generation from a sequence of points
        (3) Clothoid Replanning Paths
        (4) Summary
        (5) B-splines
    2. Route Creation and Storage
      a. Introduction
      b. Route Definition
      c. Navigator Route Usage
    3. Posture Generation
  C. Path Tracking
    1. Introduction
    2. Considerations
      a. Global position feed back
      b. Separate steering and driving control
    3. Embodiments
      a. Tracking Control Structure
      b. Quintic Method
      c. Latency and slow systems
      d. Vehicle-Ground Interaction (VGI)
      e. Sensing and Actuation Timing
      f. Look-ahead
      g. Optimal Control Method
      h. Conclusion
  D. Obstacle Handling
    1. Introduction
    2. Detection of Obstacles
      a. Clearance checking
      b. Filtering and edge detection c. Obstacle extraction
   (1) Finding the road
   (2) Modeling road height
   (3) Thresholding
   (4) Blob extraction
   (5) Applications
  3. Avoidance of Obstacles
  4. Return to Path
  5. Scanner System
   a. Introduction
   b. Laser scanner
   c. Scanner system interface
   d. Scanner system buffer circuit
E. Vehicle Controlling Systems
  1. Introduction
  2. Vehicle Manager (modes)
   a. Ready mode
   b. Tele mode
   c. Manual mode
   d. Autonomous mode
  3. Speed Control
  4. Steering Control
   a. Steering Model
   b. Path Representation
   c. Posture Definition
   d. Position Information
   e. VPS Short Definition
   f. Steering Method
  5. Monitor/Auxiliary
  6. Safety System
   a. Introduction
   b. Shutdown Control
  7. Bus Architecture
F. Functional Descriptions/Methods
  1. The NAVIGATOR
   a. MAIN
   b. MONITOR_VEH STATUS
   c. SCANNER
   d. CONSOLE and CONSOLE_PARSER
   e. GET_DIRECTIVES
   f. MSG_TO_HOST
   g. VPS_POSITION
   h. VPS_POSTURE
   i. TRACKER
   j. NAVIGATOR Shared (Global) Memory
   k. Flow Charts I. Definitions The following alphabetical listing of definitions is provided to promote a better understanding of the present invention disclosed herein.

(1) "Absolute position" in the context of this document refers to a position relative to the center of the Earth. Generally, an absolute position will be in reference to a vehicle or the base station, both on or near the Earth's surface. First, second, and third position estimates are all absolute positions in the preferred embodiment of the present invention.

(2) "Actual pseudorange" means an approximation of the distance between (1) a reference point and (2) a source of a terrestrial position determination system. In this document, actual pseudoranges usually refers to an approximation of the distance between (1) an Earth receiver and (2) GPS satellites and/or pseudolites. Actual pseudoranges are approximated by first measuring the propagation time delays between transmission and reception of the electromagnetic signals emanated from the GPS satellites and/or pseudolites. Actual pseudoranges can be readily calculated by multiplying the calculated time delays by the speed of light, or $2.9979245898 * 10^8$ m/s.

(3) "Anti-selective availability" refers to a method/technique/process for detecting and compensating for corrupted GPS data in the coarse/acquisition (C/A) mode of modulation.

(4) "Autonomous" is used in this document in its conventional sense. It indicates operation which is either completely automatic or substantially automatic or without significant human involvement in the operation. Generally, an autonomous vehicle means an unmanned vehicle in operation, or a vehicle in operation without a human pilot or co-pilot. However, an autonomous vehicle may be driven or otherwise operated automatically and also have a human passenger(s) as well.

Figure 17A:
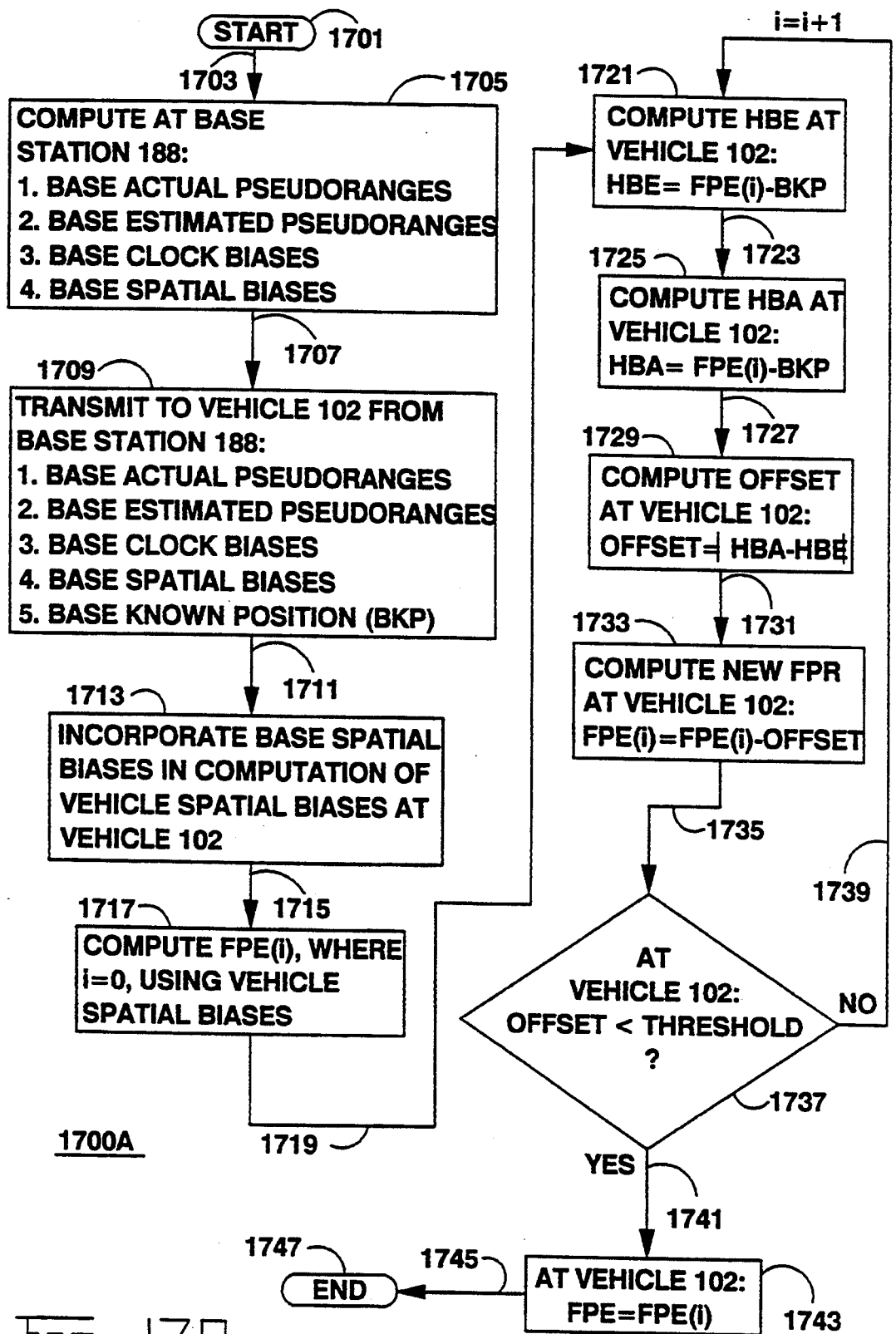
FIG. 17A is a flowchart 1700A of a base correlator bias technique of the preferred embodiment.

(5) "Base correlator bias" means a spatial bias derived in accord with the flowchart 1700A of FIG. 17A.

(6) "Base correlator bias technique" means a method/process for computing base correlator biases.

(7) "Base estimated position" or "BEP" refers to the relative position of the base station with respect to a vehicle. The BEP is used in the base correlator bias technique of Part II.F.2.d. of this document.

(8) "Base known position" or "BKP" is the absolute position of the base station (used as a reference point) which is known. The BKP can be an estimate itself, derived from any accurate positioning system. The BKP is assumed to be a more accurate estimate of the base station's absolute position than any other position estimate.

(9) "Base position estimate" means the absolute position estimate of the base station as derived from the GPS processing system within the host processing system. The base position estimate is substantially similar to the first position estimate derived by the GPS processing system at the vehicle. The base position estimate is computed in the base residuals bias technique at Part II.F.2.c. of this document.

(10) "Base residuals bias" means a spatial bias which is the effective difference in the base known position (BKP) of the base station and the position estimate of the base station which is computed by the host processing system.

(11) "Base residuals bias technique" refers to a method for deriving base residuals biases.

(12) "Bias" refers to a differential between two measurements, usually position estimates (spatial bias) or clock rates (clock bias). Because one measurement is usually known to be more accurate than another, the bias is oftentimes referred to as an "error."

(13) "Clock bias" means the difference in the clock times between (1) the transmission circuitry of GPS satellites and/or pseudolites and (2) the reception circuitry of an Earth receiver. When using a clock bias in the computation of a spatial bias, the clock bias is multiplied by the speed of light, or $2.998 * 10^8$ meters per second. Consequently, the clock bias is transformed into units of length.

(14) "Constellation" refers to a group comprised of GPS satellites and/or pseudolites whose signals are utilized to derive an absolute position estimate of a point on or near the Earth's surface. See "optimal constellation" below.

(15) "Constellation effects method" means a technique or process by which an optimal constellation of GPS satellites is selected from a larger group of GPS satellites in view of a vehicle.

(16) "Data radio" refers to a transmitter, receiver, transceiver, or any combination thereof, for communicating data at radio frequencies (RF).

(17) "Earth receiver" refers to any apparatus or device, or any part thereof, which receives and processes signals from a GPS and/or pseudolites. Earth receivers may be situated on or near the Earth's surface. Moreover, earth receivers may take the form of, for example, a vehicle or a base station.

(18) "Estimated pseudorange" refers to an approximation of the distance between (1) a reference point and (2) a source of a terrestrial position determination system. In this document, actual pseudoranges usually refers to an approximation of the distance between (1) an Earth receiver and (2) GPS satellites and/or pseudolites. Estimated pseudoranges are computed from GPS data encoded on the electromagnetic signals being transmitted from the GPS satellites and/or the pseudolites. Almanac equations for computing estimated pseudoranges from the GPS data of the NAVSTAR GPS are publicly available.

(19) "First position estimate" or "FPE" or "FPE(i)" refers to an estimated absolute position of any vehicle which is outputted, in any form, from the GPS. The first position estimate and a second position estimate are independently derived in the present invention. Subsequently, these estimates are combined and filtered to derive a third position estimate. Consequently, the accuracy of the first position estimate affects the accuracy of the third position estimate.

(20) "GLONASS GPS" refers to the GPS which has been designed and which is currently being deployed by the U.S.S.R.

(21) "Global positioning system" or "GPS" is a type of terrestrial position determination system. In a GPS, a number of satellites are placed in orbit around the planet Earth. The GPS satellites are designed to transmit electromagnetic signals. From these electromagnetic signals, the absolute, terrestrial position (position with respect to the Earth's center) of any receiver at or near the Earth's surface can ultimately be determined. The U.S. government has designated its GPS the "NAVSTAR." The government of the U.S.S.R. has designated its GPS the "GLONASS."

(22) "GPS data" means all data encoded on signals transmitted from GPS satellites of a GPS. GPS data includes, for example, ephemeris data and time data.

(23) "GPS processing system" refers to the system of the present invention for receiving signals from a terrestrial position determination system and for deriving first position estimates of vehicles from the received signals. In the preferred embodiment, the GPS processing system receives electromagnetic signals from GPS satellites of a GPS and/or from pseudolites.

(24) "Host processing system" refers to a computer system which is operating at the base station for performing methods and techniques which increase the accuracy of position estimates of vehicles. Data derived from these methods and techniques is transmitted to vehicles so that the vehicles can use the data when computing first, second, and third position estimates. In the preferred embodiment, the architecture/hardware of the host processing system is substantially similar to the architecture/hardware of the VPS.

(25) "Inertial reference unit" or "IRU" refers to a system, usually on-board a vehicle, for aiding in the derivation of a second position estimate of the vehicle. An IRU obtains specific-force measurements from accelerometers in a reference coordinate frame which is stabilized by gyroscopes, or gyros. An IRU can be of a laser type or a mechanical type. In an unaided navigation system using an IRU, the specific force (corrected for the effects of the Earth's gravity) as measured by an accelerometer is integrated into a navigation mathematical equation to produce the vehicle's position and velocity. In the preferred embodiment, the IRU is part of the MPS.

(26) "Kalman filter" is used in its conventional sense. It refers to a software program for filtering out noise or errors in data. In the preferred embodiment, a GPS Kalman filter is utilized to filter out noise or errors in the GPS processing system in order to enhance the accuracy of first position estimates. Also, a VPS Kalman filter is utilized to filter out noise in the VPS in order to enhance the accuracy of second position estimates.

(27) "Motion positioning system" or "MPS" means a system comprising at least an IRU and a vehicle odometer. In the preferred embodiment, the MPS derives the second position estimate of any vehicle on or near the Earth's surface. Moreover, an MPS need not be present at the base station due to its stationary nature.

(28) "Optimal constellation" means a satellite constellation in which the relative positions of the GPS satellites in space affords superior triangulation capabilities in order to derive the most accurate estimate of a point on or near the Earth's surface.

(29) "Original bias" means a spatial bias calculated by subtracting both estimated pseudoranges and clock biases (in units of length) from actual pseudoranges. Clock biases are transformed into units of length by multiplying them by the speed of light, or $2.9979245898 * 10^8$ meters per second.

(30) "Original bias technique" is a method for computing original biases.

(31) "NAVSTAR GPS" means the GPS which has been designed and which is currently being deployed by the U.S. government.

(32) "Navigation system" refers to any systems and/or methods for guiding any vehicle on or near the Earth's surface. The navigation system can be on-board a vehicle. The VPS of the present invention can supply the navigation system of the vehicle with a very accurate, third position estimate of the vehicle so that the navigation system can thereby precisely guide the vehicle.

(33) "Parabolic bias" is a spatial bias computed by constructing parabolic models for the actual pseudoranges of each observed GPS satellite and extrapolating values from the parabolic models. In the preferred embodiment, the parabolic biases are the actual pseudoranges minus the value extrapolated from the constructed parabolic models and minus the clock biases (in units of length, via multiplying by the speed of light).

(34) "Parabolic bias technique" is a method for computing parabolic biases for each of the GPS satellites that are utilized.

(35) "Preferred embodiment" refers to the best mode of implementing the present invention. The preferred embodiment is merely exemplary. The present invention should not be interpreted as being limited by the preferred embodiment.

(36) "Pseudolite" refers to a radiating system on or near the Earth's surface for emulating a GPS satellite.

In the preferred embodiment, electromagnetic signals, similar to those from GPS satellites, are transmitted from land-based pseudolites. One or more pseudolites can be used to emulate GPS satellites to enhance the computation of first position estimates.

(37) "Pseudolite data" means all data encoded on signals received from pseudolites. Pseudolite data resembles GPS data in many respects and includes similar information.

(38) "Pseudorange" means the distance between a source of a terrestrial position determination system and a point on or near the Earth's surface. In the preferred embodiment, sources can be GPS satellites and/or pseudolites. The terrestrial position determination system can be a GPS used with pseudolites, if any. Further, the point on or near the Earth's surface can be the base station and/or vehicles.

(39) "Satellite position predictor" is a method for determining the future positions of GPS satellites. The method allows for the selection of optimal constellations ahead of time.

(40) "Second position estimate" or "SPE" refers to an estimated absolute position of any vehicle which is outputted, in any form, from the MPS. Second position estimates include at least position information from an IRU. The second position estimate could include position information from a vehicle odometer situated on a vehicle.

(41) "Spatial bias" refers to a bias related to approximations of positions in two-dimensional or three-dimensional space. Spatial biases are used to offset a position estimate to enhance the accuracy of the position estimate. Spatial biases can be computed by a number of different methods of the present invention. Included in these methods are, for example, an original bias technique 1500 (Part II.F.2.a.), a parabolic bias technique 1600 (Part II.F.2.b.), a base residuals bias technique 1700 (Part II.F.2.c.), and a base correlator bias technique 1700A (Part II.F.2.d.).

(42) "System" is used for shorthand purposes to mean apparatus, method, or a combination of both apparatus and method. Moreover, it could include software, hardware, or a combination of hardware and software.

(43) "Position determination system" means any system having sources which emanate signals which can be used by a receiver of the signals to estimate the relative distance between the sources and the receiver. The signals may De in the form of, for example, electromagnetic waves, percussion waves, and/or sound waves.

(44) "Terrestrial position determination system" means any position determination system which can be used to ultimately estimate the terrestrial position of an Earth receiver. The signals may be in the form of, for example, electromagnetic waves, percussion waves, and/or sound waves. In the preferred embodiment, the terrestrial position determination system is the NAVSTAR GPS.

(45) "Third position estimate" or "TPE" refers an estimated absolute position of any vehicle that is outputted, in any form, from the VPS. Third position estimates are more accurate position estimates of vehicle positions than the first and second position estimates. Third position are derived by the VPS processing system from the first and second position estimates.

(46) "Vehicle" means any carrier for the transportation of physical things. Vehicles may take the form of mining trucks, construction trucks, farm tractors, automobiles, ships, boats, trains, balloons, missiles, or aircraft. In the preferred embodiment, a Caterpillar Inc. 785 off-highway truck is utilized.

(47) "Vehicle positioning system" or "VPS" refers to the system of the present invention for deriving position estimates of any vehicle. The position estimates from the VPS are extremely accurate and can be used by a navigation system on any vehicle to accurately guide the vehicle. In the preferred embodiment, position estimates from the VPS are referred to as third position estimates.

Figure 10:
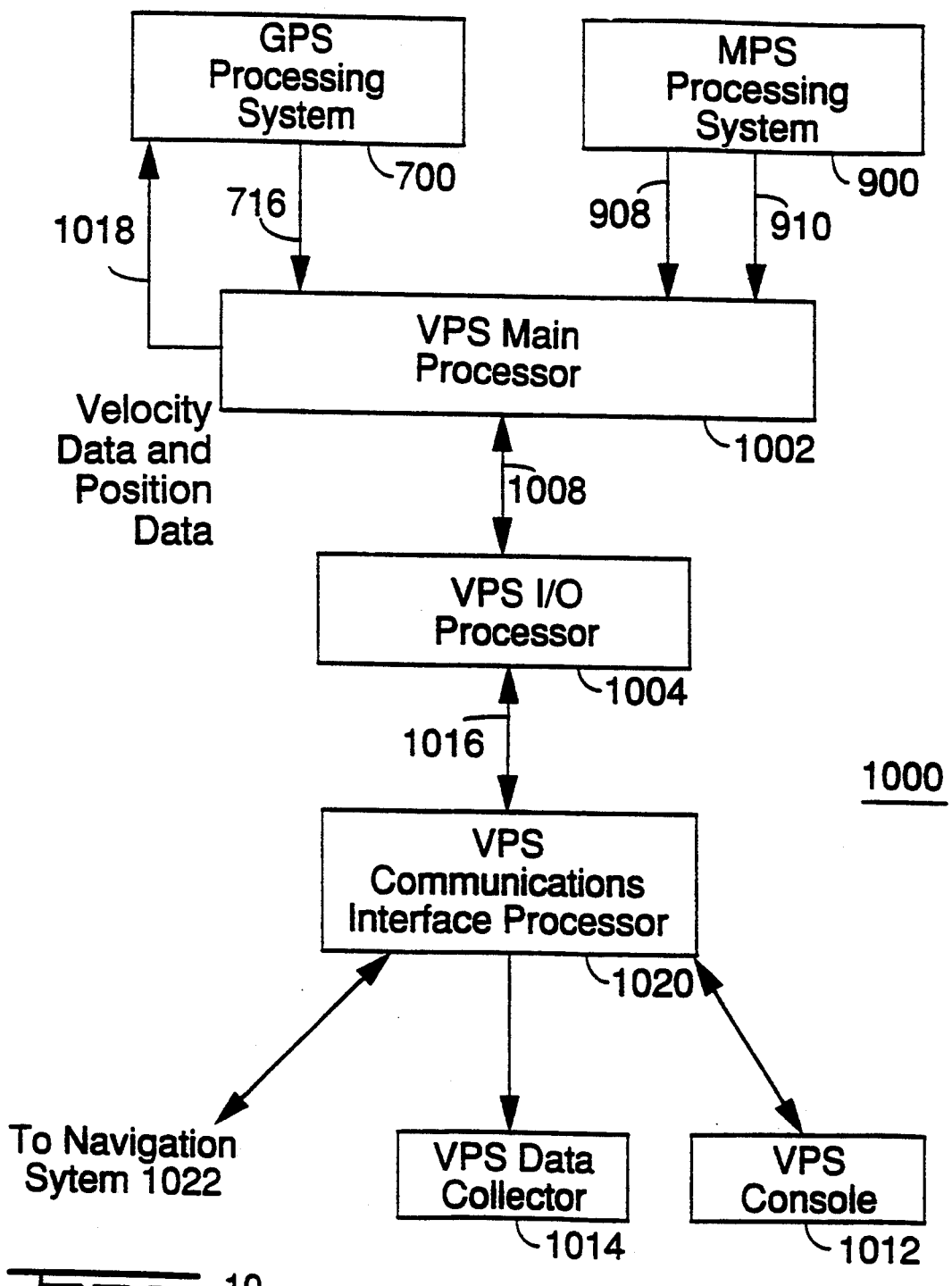
FIG. 10 is an intermediate level block diagram illustrating a VPS architecture/hardware 1000 of a VPS in the preferred embodiment.

(48) "VPS processing system" means the processing system of the VPS. The VPS processing system derives third position estimates from the first and second position estimates. The architecture is depicted in FIGS. 10 and 11.

(49) "Weighted combiner" refers to a particular software program which processes data. Inputted data is assigned a predetermined weighing factor based on the estimated accuracy of the data and the technique used to gather the data. For example, in the preferred embodiment, the first position estimate of the GPS signal 716 is weighted heavier than the second position estimate of the IRU signal 910 because the former is inherently more accurate. Furthermore, the velocity measured by the IRU can be weighted heavier than the velocity measured by the GPS processing system because the former is more accurate. In the preferred embodiment, the velocity measured by the GPS processing system is not used at all, but could be used in other implementations.

(50) "Weighted path history technique" is a method or process for increasing the accuracy of first position estimates outputted from the GPS processing system. The technique uses previous first position estimates to derive a vehicle path model for testing the validity of future first position estimates. Use of the weighted path history technique results in a reduction to wandering of first position estimates and in enhanced immunities to spurious position computations.

II. General Overview

FIG. 1 illustrates a high level block diagram 100 of the preferred embodiment of the present invention. To provide for the accurate autonomous operation of a vehicle 102 on or near the Earth's surface, the present invention includes both a vehicle positioning system (VPS) 1000 and a navigation system 1022. Both of these systems include apparatus, methods, and techniques which, when integrated together, provide for highly accurate control of unmanned vehicles.

A. Vehicle Positioning System (VPS)

The task of guiding the autonomous vehicle 102 along a prescribed path requires, among other things, an accurate estimate of the vehicle's current position relative to some reference point. Once the current position is known, the vehicle 102 can be commanded to proceed to its next destination.

Using the VPS 1000 of the present invention, position estimates of the vehicle 102 can be determined with extreme preciseness. The VPS 1000 receives GPS data from GPS satellites 104 of a GPS, such as the NAVSTAR GPS or the GLONASS GPS.

Figure 1A:
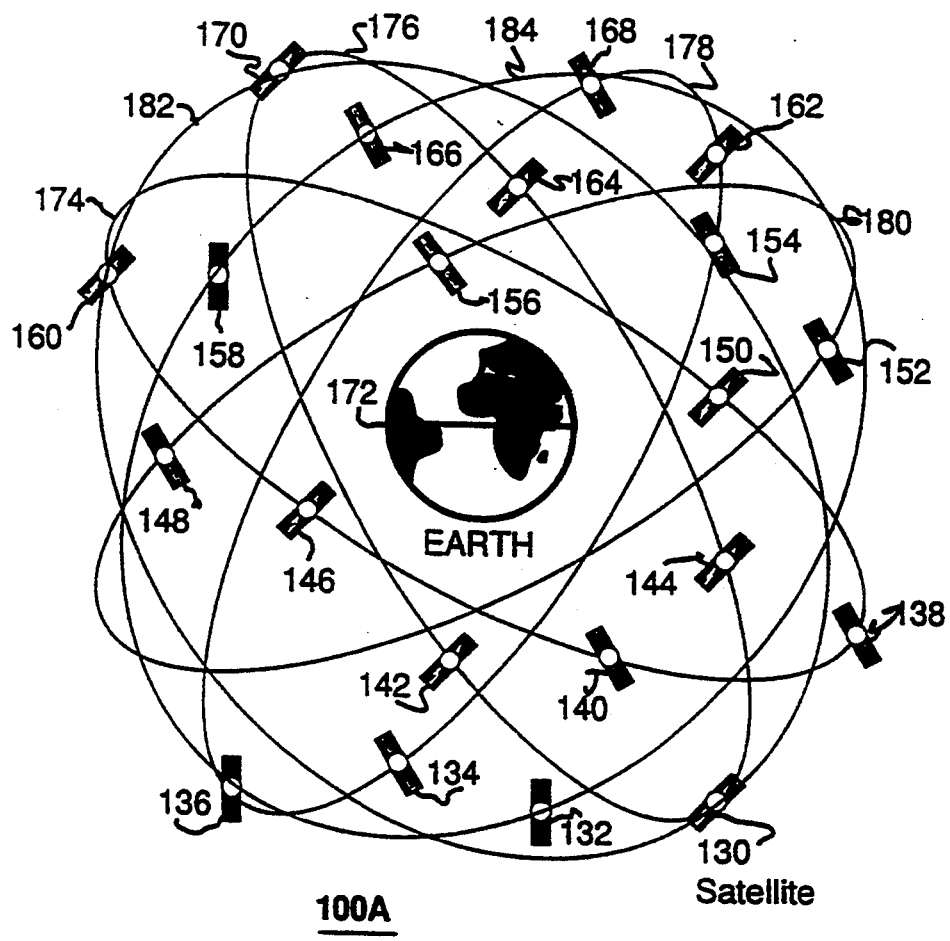
FIG. 1A is a high level block diagram 100A of the operational GPS satellites in the NAVSTAR GPS, which comprises 21 operational GPS satellites 130-170 distributed in 6 orbital planes 174-184 and 3 spare GPS satellites (not shown)

In the preferred embodiment, the NAVSTAR GPS is utilized. FIG. 1A illustrates the NAVSTAR GPS. GPS satellites 130–168 travel around the Earth 172 in six orbits 174–184.

Referring back to FIG. 1, the VPS 1000 also may receive pseudolite data from a pseudolite(s) 105. The term "pseudolite" in the context of this document means a radiating device on or near the Earth's surface for emulating a GPS satellite.

From the GPS data and/or the pseudolite data, the VPS 1000 derives accurate estimates of position of the vehicle 102. The GPS data and/or the pseudolite data is significantly enhanced via numerous inventive techniques and methods of the present invention to enhance the accuracy of vehicle position estimates.

More specifically, the VPS 1000 of the preferred embodiment is a positioning system based on the incorporation of GPS data from the NAVSTAR GPS 104 and from a motion positioning system 900. In the preferred embodiment, the motion positioning system 900 comprises an inertial reference unit (IRU) 904 and/or a vehicle odometer 902. The IRU 904 comprises a laser gyroscope(s) 106 and an accelerometer(s) 108 which can be used to produce position, velocity, roll, pitch and yaw data. The vehicle odometer 902 produces data on the distance travelled by the vehicle 102.

A first position estimate of the vehicle 102 is derived by the GPS processing system 700 from GPS data received from the GPS satellites 104 and from the pseudolite data received from the pseudolite(s) 105. To increase the accuracy of the first position estimate the present invention implements a number of methods discussed in detail below. In addition, a second position estimate is derived by the MPS intercommunications processor 906 of the motion positioning system 900, which comprises the IRU 904 and/or the vehicle odometer 902.

As shown by respective arrows 112 and 114, the first position estimate and the second position estimate are then combined and filtered by a VPS processing system 116. The result as shown by an output arrow 118 is a more accurate, third position estimate.

B. Navigation System

The navigation system 1022 receives the third position estimate from the VPS 1000. The navigation system 1022 uses the precise, third position estimate to accurately navigate the vehicle 102. A primary purpose of the navigation system 1022 is to guide the vehicle 102 between points along pre-established or dynamically-generated paths.

In the preferred embodiment, the navigation system 1022 is situated on the vehicle 102 itself. In other words, it is essentially an "on-board" system. Moreover, the navigation system 1022 may be designed to be retro-fitted into the vehicle 102.

So that the navigation system 1022 can guide the vehicle 102 to follow the pre-established or dynamically-generated paths, various models or conceptual representations are generated and utilized. For example, lines and arcs may be used to establish vehicle paths between objective points. Mathematical B-splines or clothoid curves may be used to model the actual path where the vehicle 102 is to navigate. These mathematical curves will be discussed in detail later in this document.

Using the above modelling or representational techniques provides for enhanced data communications, storage, and handling of the vehicle 102. The techniques further allow for simplification of supervisory tasks by providing a hierarchy of control and communication. The higher that a level of control exists on the hierarchical control scheme, the simpler the task and the more compact the commands.

The navigation system 1022 further provides for controlling the vehicle's mechanical systems, such as brakes, steering, and engine and transmission, to effect the necessary physical acts required to move, stop, and steer the vehicle 102.

The navigation system 1022 also checks the actual position of the vehicle 102 against the desired position to correct vehicle control in accord with the desired position. The navigation system 1022 may run multi-state models to enhance this checking capability. The navigation system 1022 also checks for errors or failures in the system itself and vehicle components. If errors or failures are detected, the navigation system 1022 can provide for fail-safe shutdown by bringing the vehicle 102 to a complete stop.

The navigation system 1022 further provides for different modes of controlling the vehicle 102. These include (1) a fully autonomous mode, where navigation of the vehicle 102 is automatically handled by the navigation system 1022; (2) a tele or remote control mode, where a remote human operator (not shown) may control the direction and motion, and so on, of the vehicle 102; and (3) a manual mode, where a human operator sitting in the vehicle 102 can take control of the vehicle 102 and drive it manually.

In the autonomous mode, obstacle detection is critical because if the vehicle 102 is not under control, then it could cause great damage to property and great injury to life. The navigation system 1022 can efficiently detect obstacles. Boulders, animals, people, trees, or other obstructions may enter the path of the vehicle 102 unexpectedly. The navigation system 102 is capable of detecting these obstacles, either stopping or plotting a path around the obstruction, and returning the vehicle 102 to its original route when the route is deemed safe.

Accurately tracking the desired route is another function of the navigation system 1022. The functioning and architecture of the navigation system 1022 has been designed for real time tracking of vehicle paths at speeds of up to approximately 30 miles per hour (mph).

C. Base Station

The present invention can comprise a host processing system 186 at a base station 188. The host processing system 186 performs functions for both the VPS 1000 and the navigation system 1022.

With respect to the VPS 1000, the host processing system 186 receives GPS data and/or pseudolite data, as shown by respective arrows 190 and 192. In effect, the host processing system 186 as well as the base station 188 can serve as a known reference point to improve the accuracy of vehicle position estimates as discussed in detail below.

The host processing system 186 implements a number of methods for increasing the accuracy of vehicle position estimates. The satellite position predictor method 1800 (Part II.G.) discussed above is also implemented by the host processing system 186. The host processing system 186 will recognize the same satellite constellation that is observed by the vehicle 102.

Calculations are performed on the GPS data and/or pseudolite data to derive biases. The term "bias" in the context of this document refers to a differential between two measurements, usually position estimates (spatial bias) or clock rates (clock bias). Because one measurement is usually known to be more accurate than another, the bias is oftentimes referred to as an "error."

To compute spatial biases, the host processing system 186 implements a number of methods. Included in these methods are, for example, an original bias technique 1500 (Part II.F.2.a.), a parabolic bias technique 1600 (Part II.F.2.b.), a base residuals bias technique 1700 (Part II.F.2.c.), and a base correlator bias technique 1700A (Part II.F.2.d.).

The foregoing differential correction techniques compensate for data errors. In other words, the biases computed at the host processing system 186 are indicative of data errors. As shown by an arrow 194, the biases are transmitted to the GPS processing system 700 of the vehicle 102. The GPS processing system 700 uses these biases to eliminate errors in vehicle position estimates.

The host processing system 186 further provides functions relating to the navigation system 1022 of the present invention. The host processing system 186 serves as the highest level of control of the navigation system 1022, as indicated by an arrow 196. It handles scheduling and dispatching of the vehicle 102 with much the same results as a human dispatcher would achieve. Consequently, the host processing system 186 can thereby determine the work cycle of the vehicle 102.

The host processing system 186 commands the vehicle 102 to proceed from a current position to a future position via a specified route, so that the vehicle 102 may accomplish its work goals. The host processing system 186 can specify the vehicle routes by name, rather than by listing each point along the route, as is the case conventionally. Accordingly, the vehicle's on-board navigation system 1022 looks up the named vehicle route and translates the named vehicle route into sets of nodes and segments along the named vehicle route.

II Vehicle Positioning System

A. Overview

The following discussion relative to the VPS 1000 will make specific reference to FIGS. 7 through 21. FIGS. 10 and 11 show the architecture/hardware of the VPS 1000. The VPS 1000 is a highly accurate position determination system for a moving or stationary vehicle 102 on or near the Earth's surface.

Figure 7:
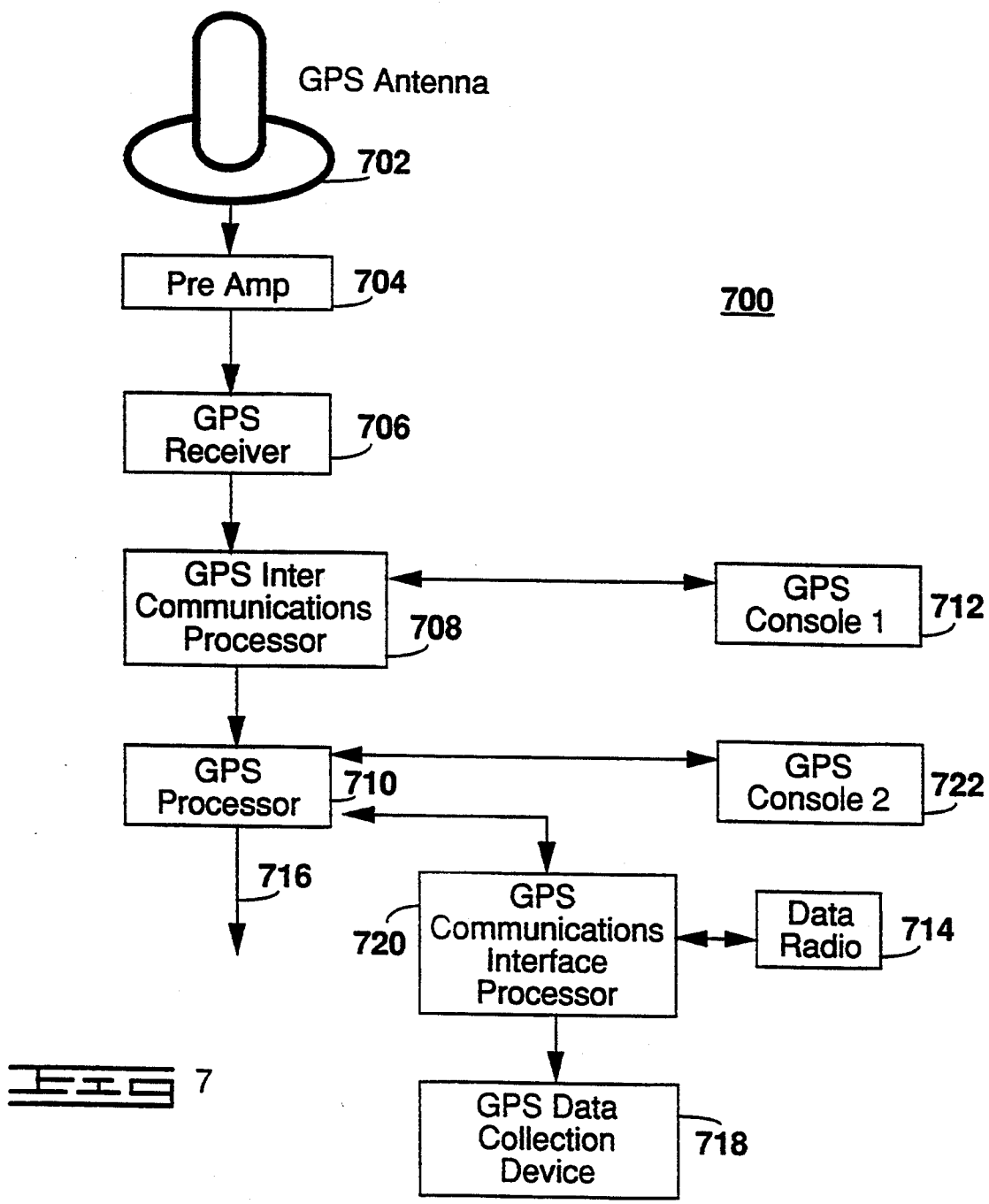
FIG. 7 is a low level block diagram showing the electrical architecture/hardware 700 of a GPS processing system of the preferred embodiment.
Figure 9:
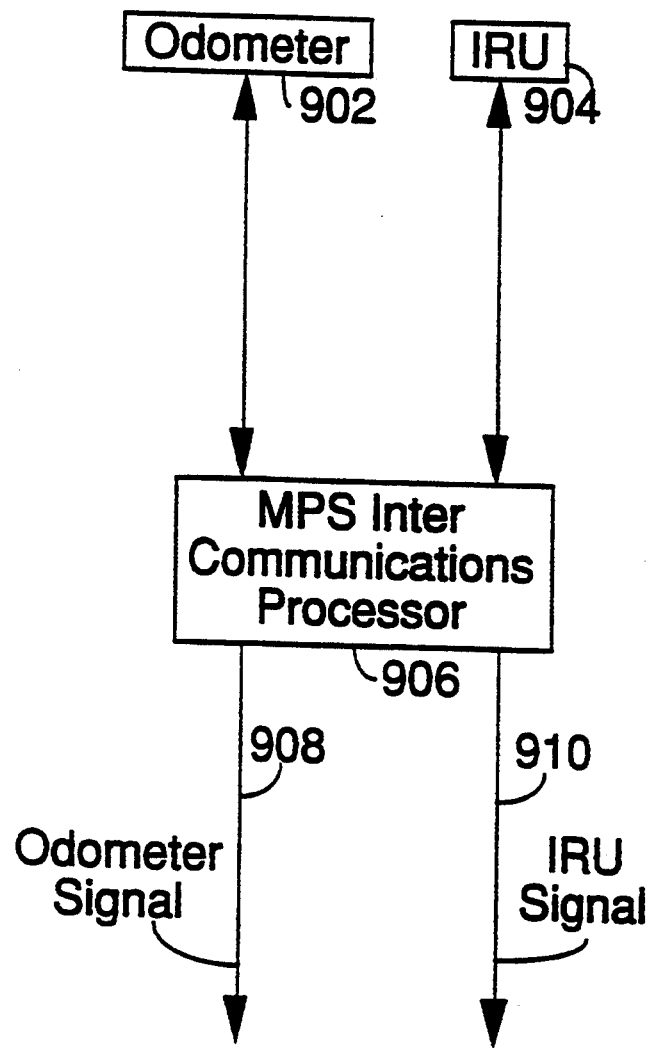
FIG. 9 is an intermediate level block diagram illustrating the architecture/hardware 900 of an MPS, which includes in the preferred embodiment an odometer 902 and an inertial reference unit (IRU) 904.

Recall that the VPS 1000 includes the GPS processing system 700 and the MPS 900, which are shown in respective FIGS. 7 and 9. Further recall that the MPS 900 includes the IRU 904 and the vehicle odometer 902, which are both shown in FIG. 9. In effect, these systems have been enhanced and integrated by the present invention to produce a highly effective position determining system.

Figure 2:
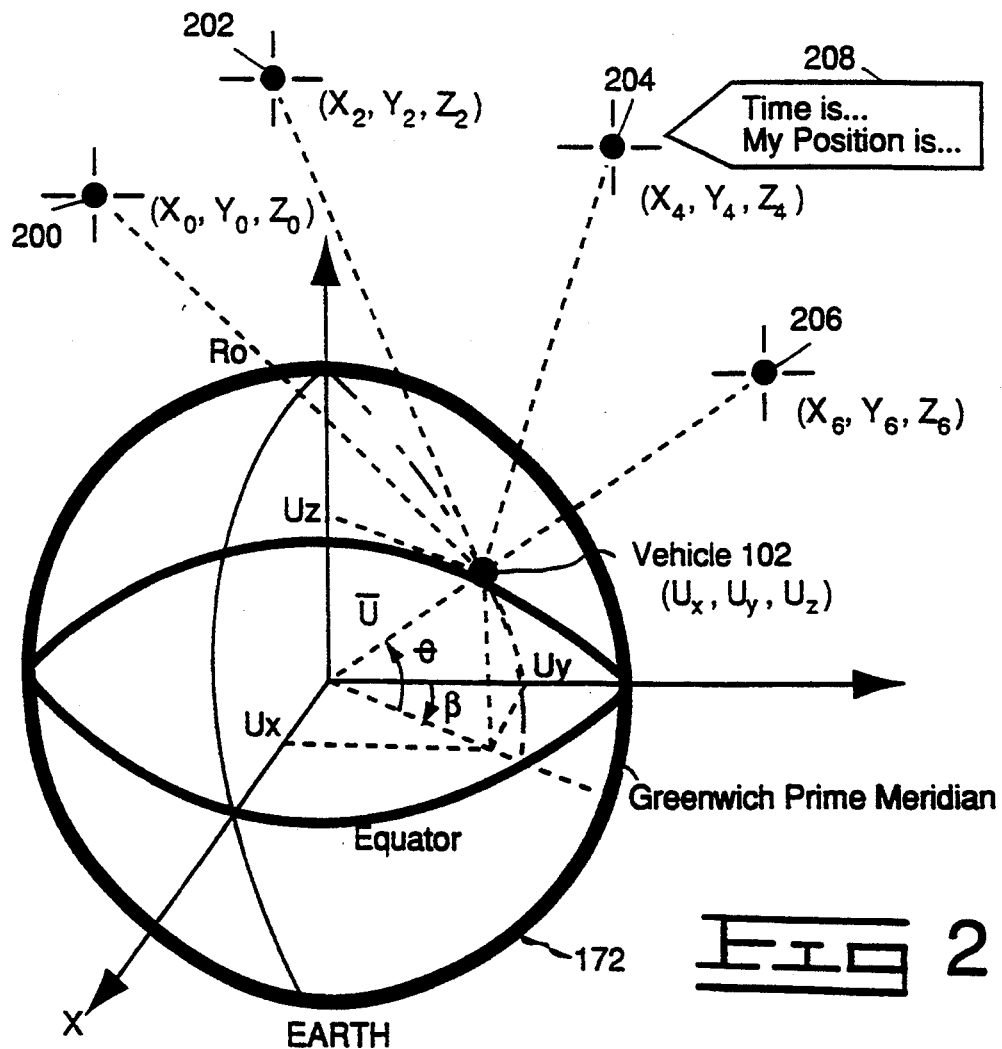
FIG. 2 illustrates four, simultaneous, navigation equations regarding four GPS satellites 200-206 of the NAVSTAR GPS, which equations include the clock bias $C_b$ between the GPS satellites 200-206 and the vehicle 102.
Figure 3:
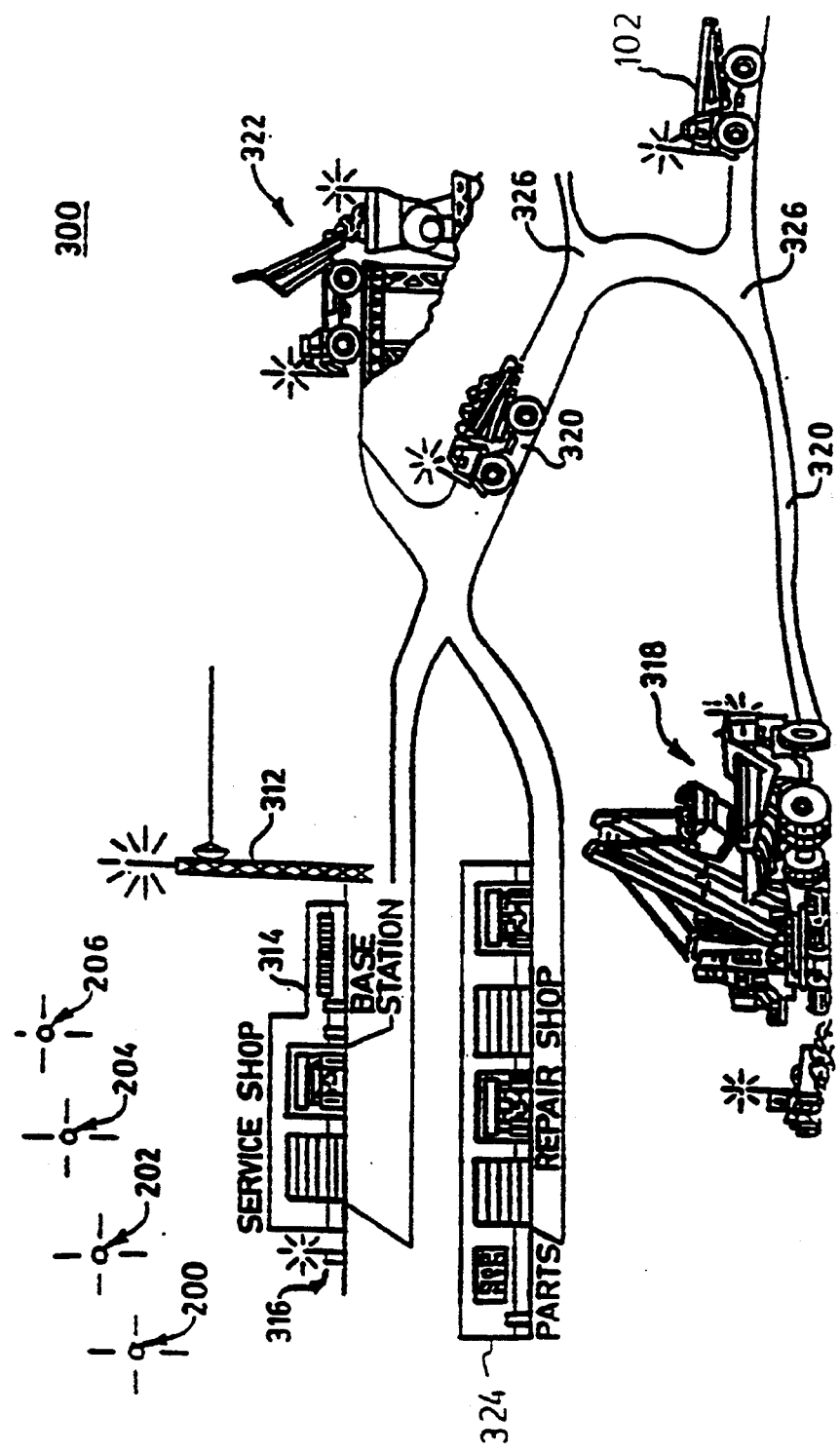
FIG. 3 is a high level block diagram 300 of a typical autonomous work site within which the present invention can be implemented and practiced.

Referring to FIG. 7, the GPS processing system 700 includes an antenna 702 connected to a GPS receiver 706. When the GPS satellites 104 in view of antenna 702 comprise multiple GPS satellites 200-206 as shown in FIGS. 2 and 3, the GPS receiver 706 reads each of their GPS data along with any pseudolite data from any pseudolite(s) 105 in view of antenna 702. In the preferred embodiment, the GPS receiver 706 is responsible for computing the first position estimate of the vehicle 102 from the GPS data and/or the pseudolite data.

To increase the accuracy of the first position method, a satellite position predictor method 1800 (Part II.G.) is implemented by a GPS processor 710 of the GPS processing system 700. The satellite position predictor method 1800 predicts the position of any GPS satellite at the current time or any future time.

Using the satellite position information, the GPS processing system 700 can determine the optimum GPS satellite constellation to recognize by using a constellation effects method 1300 (Part II.F.). The constellation effects method 1300 is also implemented by the GPS processor 710 in the preferred embodiment. Pursuant to the constellation effects method 1300, a best constellation is selected from the data sources comprising the GPS satellites 200-206 and pseudolite(s) 105.

The GPS processor 706 computes a first position estimate of the vehicle 102 based on the best constellation and geometry/triangulation methods. The accuracy of the first position estimate is, in part, dependent on the number of GPS satellites used in the computation. Each additional GPS satellite used can increase the accuracy of the first position estimate. After the computation, the first position estimate of the vehicle 102 is transmitted to a VPS main processor 1002 of FIG. 10.

Referring to FIG. 9, the IRU 904 comprises laser gyroscopes and accelerometers which produce position, velocity, roll, pitch, and yaw data. The IRU 904 combines this information into a second position estimate of the vehicle 102. The odometer 902 can be implemented to measure the distance traveled by the vehicle 102. The data from the IRU 904 and the odometer 902 is also transmitted via the MPS intercommunications processor 906 to the VPS main processor 1002, as shown in FIG. 10.

The VPS main processor 1002 combines the second position estimate from the MPS 900 (the IRU 904 and perhaps the odometer 902) with the first position estimate from the GPS processing system 700 to produce a more accurate third position estimate.

The VPS 1000 further implements a method of eliminating erratic or spurious, third position estimates which can cause vehicle "wandering." This method is called the weighted path history method (Part II.H.). Essentially, the path history of the vehicle 102 is used to statistically determine the accuracy of future estimates of the vehicle 102's position.

Referring now to FIGS. 1 and 3, a base station 188 provides a geographic proximate reference point for the VPS 1000. The base station 188 includes a host processing system 186. In the preferred embodiment, the host processing system 186 comprises similar a similar architecture and performs the same functions as the GPS processing system 700. However, the host processing system 700 performs additional functions for increasing the accuracy of first position estimates.

The satellite position predictor method 1800 (Part II.G.) is implemented by the host processing system 186, in addition to the GPS processing system 700 as discussed above. Accordingly, the host processing system 186 will recognize the same GPS satellite constellation that is observed by the vehicle 102 or include the same GPS satellite in a larger constellation.

Figure 15:
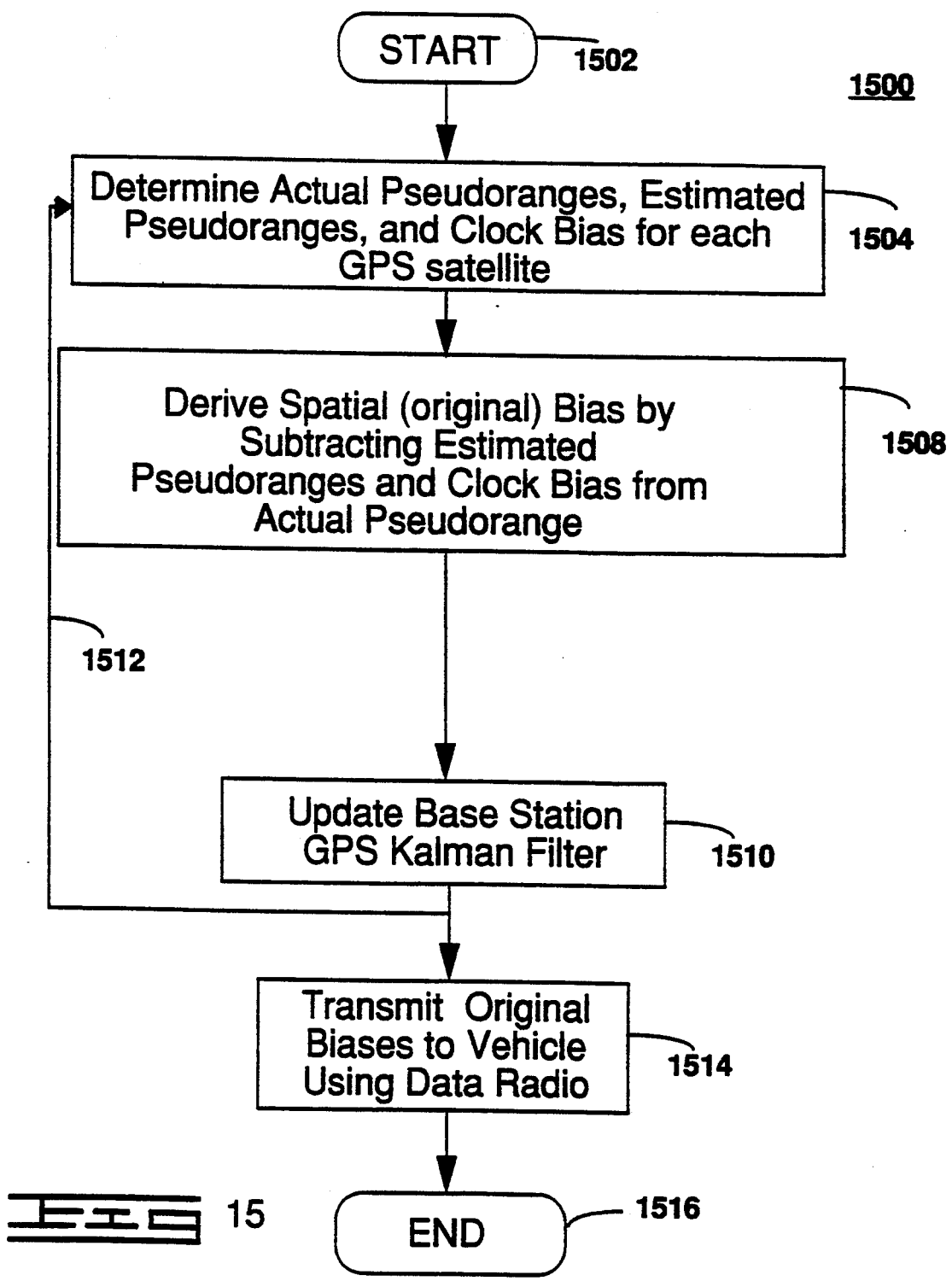
FIG. 15 is a flowchart 1500 of an original bias technique of the preferred embodiment.
Figure 16:
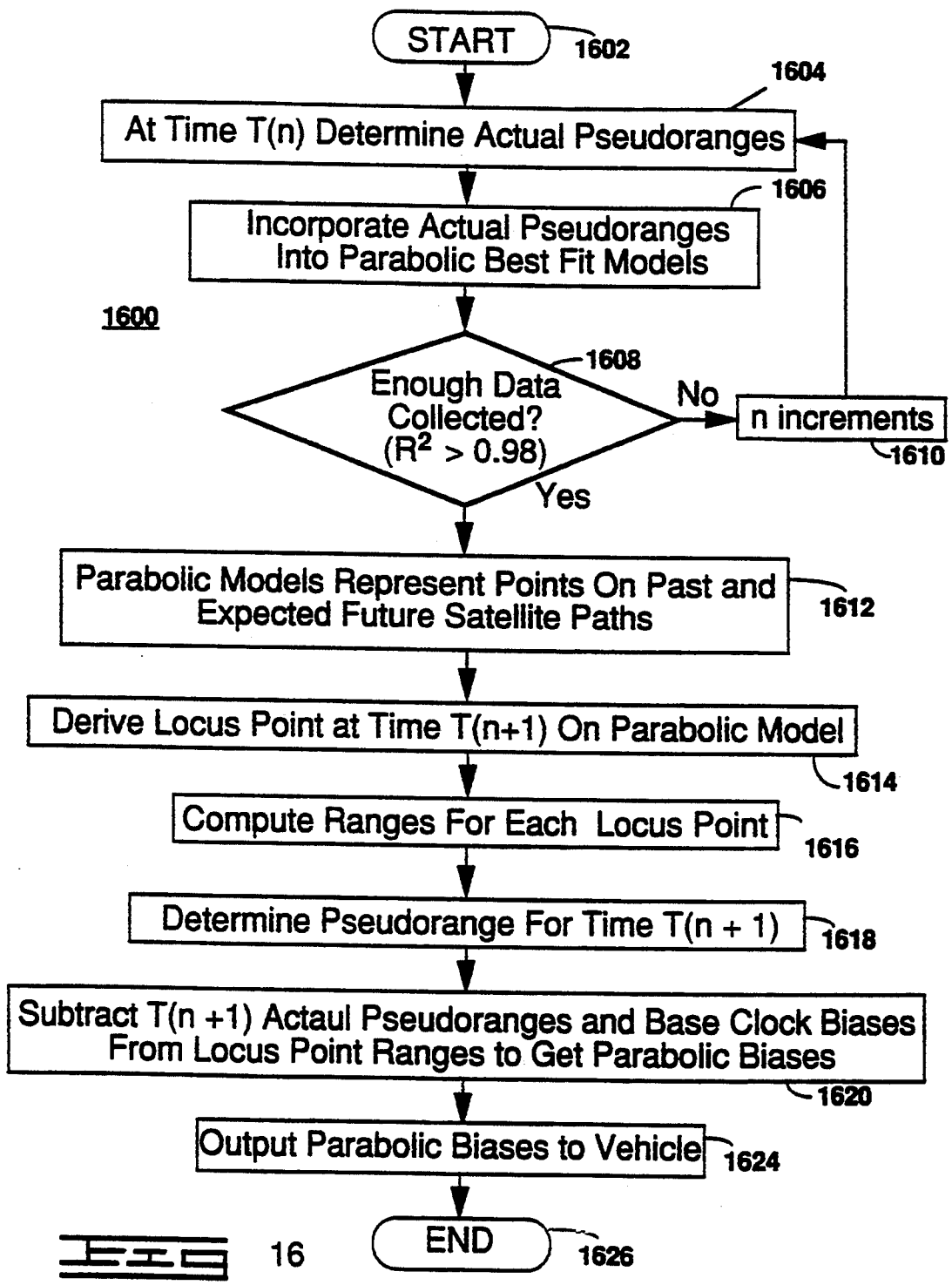
FIG. 16 is a flowchart 1600 of a parabolic bias technique of the preferred embodiment.

Calculations are performed on the GPS data and/or pseudolite data to derive biases, including spatial biases and clock biases. To compute spatial biases, the host processing system 186 implements a number of methods. FIG. 15 discloses an original bias technique 1500 (Part II.F.2.a.). FIG. 16 discloses a parabolic bias technique 1600 (Part II.F.2.b.). FIG. 17 discloses a base residuals bias technique 1700 (Part II.F.2.c.). FIG. 17A discloses a base correlator bias technique 1700A (Part II.F.2.d.).

As shown by an arrow 194, the spatial and clock biases are transmitted to the GPS processing system 700 of the vehicle 102. The GPS processing system 700 uses these biases to eliminate errors in vehicle position estimates.

B. GPS Processing System

The GPS processing system 700 utilizes vehicle position data from a terrestrial position determination system to derive the first position estimate of the vehicle 102. In the preferred embodiment, the terrestrial position determination system comprises the NAVSTAR GPS, which is currently being developed by the U.S. government, and/or Earth-based pseudolites.

1. NAVSTAR GPS

Figure 24A:
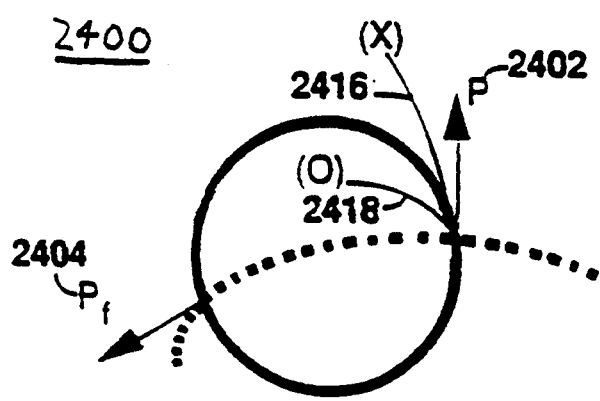
FIG. 24 is a diagram 2400 of how the sign of a first clothoid segment is determined.
Figure 24:
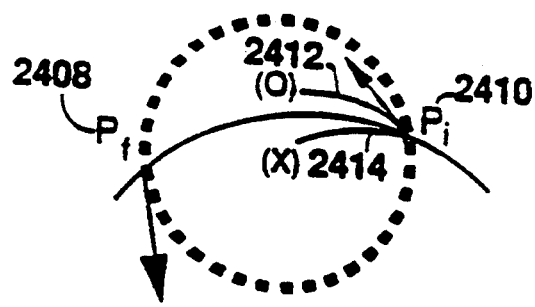

As shown in FIG. 1A, 24 man-made electronic GPS satellites 132-170 in six orbits 174-184 are currently envisioned for the NAVSTAR GPS. They are planned for deployment by 1993. As currently envisioned, the GPS satellites 132-170 will orbit the Earth 172 at an altitude of approximately 14,000 miles and encircle the globe twice a day. Using the C mode of the NAVSTAR GPS, as will be discussed below, it will be possible to determine terrestrial positions within 15 meters in any weather, any time, and most areas of the Earth 172.

As of the date of the filing of this document, there are known to be six experimental and seven operational GPS satellites in orbit around the Earth 172. Further, several manufacturers are known to be designing and building GPS receivers, such as the GPS receiver 706 of FIG. 7. As more and more GPS satellites are deployed and operational, the time periods increase when three or more of the experimental GPS satellites are available each day for position tracking.

Moreover, the location of the experimental GPS satellites (and all others once deployed) is very predictable. The relative position, or "pseudorange," of these GPS satellites with respect to the GPS receiver 706 on the vehicle 102 can be determined from the electromagnetic signals by two methods.

One method is to measure the propagation time delays between transmission and reception of the emanating electromagnetic signals. In the NAVSTAR GPS, the electromagnetic signals are encoded continuously with the time at which the signals are transmitted from the GPS satellites. Needless to say, one can make note of the reception time and subtract the encoded transmission time in order to derive time delays. From the calculated time delays and from knowing the speed at which electromagnetic waves travel through the atmosphere, pseudoranges can be accurately derived. Pseudoranges computed using the foregoing method are referred to in the context of this document as "actual" pseudoranges.

Another method involves satellite position data that is encoded in the electromagnetic signals being transmitted from the orbiting GPS satellites. Almanac data relating to the GPS satellite position data of the NAVSTAR GPS is publicly available. Reference to this almanac data in regard to data encoded in the electromagnetic signals allows for an accurate derivation of pseudoranges if the receiver location is known. Pseudoranges computed using the foregoing method are referred to in the context of this document as "estimated" pseudoranges.

However, with respect to the previous method of deriving estimated pseudoranges, it should be noted that the satellite position data is updated at the GPS satellite only once an hour on the hour. Consequently, an estimated pseudorange decreases in accuracy over time after each hour until the next hour, when a new estimated pseudorange is computed using updated satellite position data.

Reference is again made to FIG. 1A of the drawings wherein the configuration of the fully-operational NAVSTAR GPS is schematically illustrated. Each of the 24 GPS satellites 132-170 transmits electromagnetic signals which can be used to determine the absolute terrestrial position (that is, longitude, latitude, and altitude with respect to the Earth 172's center) of the vehicle 102.

Specifically, by knowing the relative position of at least three of the orbiting GPS satellites 132-170, the absolute terrestrial position of the vehicle 102 can be computed via simple geometric theory involving triangulation methods. The accuracy of the terrestrial position estimate depends in part on the number of orbiting GPS satellites 132-170 that are sampled by the vehicle 102. The sampling of more GPS satellites 132-170 in the computation increases the accuracy of the terrestrial position estimate. Conventionally, four GPS satellites, instead of three, are sampled to determine each terrestrial position estimate because of errors contributed by circuit clock differentials among the circuitry of the vehicle 102 and the various GPS satellites 132-170.

In the NAVSTAR GPS, electromagnetic signals are continuously transmitted from all of the GPS satellites 132-170 at a single carrier frequency. However, each of the GPS satellites 132-170 has a different modulation scheme, thereby allowing for differentiation of the electromagnetic signals. In the NAVSTAR GPS, the carrier frequency is modulated using a pseudorandom binary code signal (data bit stream) which is unique to each GPS satellite. The pseudorandom binary code signal is used to biphase modulate the carrier frequency. Consequently, the orbiting GPS satellites in the NAVSTAR GPS can be identified when the carrier frequencies are demodulated.

Furthermore, the NAVSTAR GPS envisions two modes of modulating the carrier wave using pseudorandom number (PRN) signals. In one mode, referred to as the "coarse/acquisition" (C/A) mode, the PRN signal is a gold code sequence having a chip rate of 1.023 MHz. The gold code sequence is a well-known conventional pseudorandom sequence in the art. A chip is one individual pulse of the pseudorandom code. The chip rate of a pseudorandom code sequence is the rate at which the chips in the sequence are generated. Consequently, the chip rate is equal to the code repetition rate divided by the number of members in the code. Accordingly, with respect to the coarse/acquisition mode of the NAVSTAR GPS, there exists 1,023 chips in each gold code sequence and the sequence is repeated once every millisecond. Use of the 1.023 MHz gold code sequence from four orbiting GPS satellites enables the terrestrial position of the vehicle 102 to be determined to an approximate accuracy of within 60 to 300 meters.

The second mode of modulation in the NAVSTAR GPS is commonly referred to as the "precise" or "protected" (P) mode. In the P mode, the pseudorandom code has a chip rate of 10.23 MHz. Moreover, the P mode sequences that are extremely long, so that the sequences repeat no more than once per 276 days. As a result, the terrestrial position of the vehicle 102 can be determined to within an approximate accuracy of 16 to 30 meters.

However, the P mode sequences are classified and are not made publicly available by the United States government. In other words, the P mode is intended for use only by Earth receivers authorized by the United States government.

In order for the Earth receivers to differentiate the various C/A signals from the different orbiting GPS satellites, Earth receivers usually include a plurality of different gold code sources for locally generating gold code sequences. Each locally-derived gold code sequence corresponds with each unique gold code sequence from each of the GPS satellites.

The locally-derived gold code sequences and the transmitted gold code sequences are cross correlated with each other over gold code sequence intervals of one millisecond. The phase of the locally-derived gold code sequences vary on a chip-by-chip basis, and then within a chip, until the maximum cross correlation function is obtained. Because the cross correlation for two gold code sequences having a length of 1,023 bits is approximately 16 times as great as the cross correlation function of any of the other combinations of gold code sequences, it is relatively easy to lock the locally derived gold code sequence onto the same gold code sequence that was transmitted by one of the GPS satellites.

The gold code sequences from at least four of the GPS satellites in the field of view of an Earth receiver are separated in this manner by using a single channel that is sequentially responsive to each of the locally-derived gold code sequences, or alternatively, by using parallel channels that are simultaneously responsive to the different gold code sequences. After four locally-derived gold code sequences are locked in phase with the gold code sequences received from four GPS satellites in the field of view of the Earth receiver, the relative position of the Earth receiver can be determined to an accuracy of approximately 60 to 300 meters.

The foregoing approximate accuracy of the NAVSTAR GPS is affected by (1) the number of GPS satellites transmitting signals to which the Earth receiver is effectively responsive, (2) the variable amplitudes of the received signals, and (3) the magnitude of the cross correlation peaks between the received signals from the different GPS satellites.

With reference to FIG. 7, the GPS processing system 700 processes the GPS data from the GPS satellites 132–170 and the pseudolite data from any pseudolite(s) 105. Furthermore, the GPS receiver 706 decodes the C/A signals from the various GPS satellites 132–170.

FIG. 2 illustrates navigation equations 212 regarding four GPS satellites 200–206 of the NAVSTAR GPS. The four GPS satellites 200, 202, 204, and 206 have respective pseudoranges R0, R2, R4, and R6 and comprise the current constellation of GPS satellites 132–170 recognized by the vehicle 102.

The navigation equations 212 include the clock bias $c_b$ between the GPS satellites 200–206 and the vehicle 102. The navigation equations 212 are used to compute the longitude and latitude of the vehicle 102 using the pseudoranges R0, R2, R4, and R6.

As is shown in the description block 208, each of the GPS satellites 200, 202, 204, and 206 transmits GPS data that includes timing data (GPS time) and ephemeris data. Using the navigation equations 212, which are well-known in the conventional art and the foregoing timing data, the pseudoranges R0, R2, R4, and R6 can be estimated (called actual pseudoranges) by the GPS processing system 700. Furthermore, using the foregoing ephemeris data and almanac data on the Earth 172, the pseudoranges R0, R2, R4, and R6 can be estimated (called estimated pseudoranges) by the GPS processing system.

2. Operation

Turning now to FIG. 6, a representative GPS constellation is shown in operation. Four GPS satellites 200, 202, 204 and 206 are transmitting GPS data. Both the vehicle 102 and the base station 188 are receiving these signals from each of these GPS satellites 200, 202, 204, and 206 on their respective GPS antennas 312 and 316. In the preferred embodiment, both the C/A code and the carrier frequency are received at GPS antennas 312 and 316 for processing.

In addition to the four GPS satellites shown in the FIG. 6 is the pseudolite 105. The pseudolite(s) 105 can be strategically placed around the perimeter of any mine pit and can emulate the GPS satellites 200, 202, 204, and 206 as shown in FIG. 6. This arrangement can be extremely useful in situations such as a mine pit, cavity, or the like, in which mining vehicles may be out of view of one or more of the GPS satellites 200, 202, 204, and 206, because of topographic features such as high mine pit walls. The ground-based pseudolite(s) 105 provides additional ranging signals and can thus improve availability and accuracy of the positioning capability in the present invention.

The pseudolite(s) 105 is synchronized with the GPS satellites 200, 202, 204, and 206 and has a signal structure that, while different, is compatible with the GPS satellites 200, 202, 204, and 206. Moreover, the distance (range) between the vehicle 102 and the pseudolite(s) 105 is calculated similarly as the distance between the vehicle 102 and one of GPS satellites 200, 202, 204, and 206. With pseudolite(s) 105, the ranging error does not include selective availability nor ionospheric errors. However, other errors must be accounted for such as tropospheric, pseudolite clock error and multipath errors.

In a deep pit surface mining operation, the view of the sky from a vehicle 102 in the mine can be limited by the walls of the mine. Consequently, an adequate number of GPS satellites may not be in view for the GPS processing system 700 to properly derive a first position estimate. In such a case in the present invention, one or more pseudolites 105 can serve as secondary sources. The pseudolite(s) can be placed on the rim of the mine or elsewhere. The pseudolite(s) 105 can be used by the vehicle 102 in conjunction with any visible GPS satellites to obtain accurate first position estimates.

It is also envisioned that other forms of secondary sources could be implemented to aid GPS satellites or to completely eliminate the need to receive GPS data from the GPS satellites. Moreover, a laser scanning technique may utilized to give localized ranging data to the vehicle 102 from a secondary reference source.

Communication channel 618 represents the communications link between the base station 188 and the vehicle 102. In the preferred embodiment, the communication channel 618 comprises an electromagnetic link established by data-radios 620 and 622 which are transceivers. The communication channel 618 is used to transfer data between the base station 188 and the vehicle 102. It is envisioned that other forms of communication media may be utilized. For example, a laser scanning technique may utilized to convey information from the base station 108 to the vehicle 102.

The data radios 620 and 622 are located at the base station 188 and vehicle 102 respectively. The radios 620 and 622 are responsible for exchanging data between the base station 188 and the vehicle 102. The type of data exchanged will be discussed further below.

A radio transceiver which functions appropriately in the preferred embodiment as the data radios 620 and 622 is commercially available from Dataradio Ltd. of Montreal, Canada, Model Number DR-4800BZ.

Turning now to FIG. 7, the preferred embodiment of a GPS processing system 700 is shown. The GPS processing system 700 on the vehicle 102 includes a GPS antenna 702. In the preferred embodiment, the GPS antenna 702 is receptive to the radio spectrum of electromagnetic radiation. However, the present invention contemplates reception of any signal by which GPS satellites 132-170 might encode data. In the preferred embodiment, the GPS antenna 702 is the commercially available antenna having Model No. CA3224 from Chu Associates Inc. of Littleton, Mass.

The GPS antenna 702 is coupled to a preamplifier 704 so that the signals received at the GPS antenna 702 can be transmitted to the preamplifier 704. The term "couple" in the context of this document means any system and method for establishing communication. Coupling systems and methods may include, for example, electronics, optics, and/or sound techniques as well as any others not expressly described herein. In the preferred embodiment, coupling is commonly electronic and adheres to any one of numerous industry standard electronic interfaces.

The preamplifier 704 amplifies and down converts the GPS data received from the GPS antenna 702 so that the GPS data can be processed, or decoded. The present invention contemplates any method by which the received signals can be amplified. In the preferred embodiment, the preamplifier 704 is the commercially available preamplifier having Model No. 5300, Series GPS RF/IF from Stanford Telecommunications Inc. (STel) of Santa Clara, Calif. The preamplifier 704 is coupled to a GPS receiver 706. The GPS receiver 706 processes the GPS data sent from the GPS satellites 200, 202, 204, and 206 in view of the GPS antenna 702. The GPS receiver 706 computes actual pseudoranges for each of the GPS satellites 200, 202, 204, and 206. Actual pseudoranges are defined in this document as an estimate of the pseudoranges R0, R2, R4, and R6 which is derived from the time delay between the transmission of electromagnetic signals from the GPS satellites and the reception of the electromagnetic signals by the GPS processing system 700. Moreover, in the preferred embodiment, the GPS receiver 706 can process in parallel all of the actual pseudoranges for the GPS satellites 200, 202, 204, and 206.

In the preferred embodiment of the present invention, the GPS receiver 706 produces this data when four or more GPS satellites are visible. Using the differential correction techniques described in Part II.F.2. of this document, the GPS processing system 700 can compute (at GPS processor 710) the first position estimate with an accuracy of approximately 25 meters when an optimal constellation of four GPS satellites 200, 202, 204, and 206 is in view. When an optimal constellation of five GPS satellites (not shown) is in view, the GPS processing system 700 of the preferred embodiment can compute the first position estimate with an accuracy of approximately 15 meters. An "optimal" constellation is one in which the relative positions of the GPS satellites in space affords superior triangulation capability, triangulation technology being well known in the art.

In the preferred embodiment, the GPS receiver 706 outputs actual pseudoranges and the number of GPS satellites 132-170 currently being sampled. In cases in which the number of GPS satellites 132-170 viewed for a series of first position estimates is less than four, the VPS weighted combiner 1204 (see FIG. 12 and discussion) in the preferred embodiment does not use the first position estimates received from the GPS processing system 700 (specifically, the GPS processor 710) in the computation of the third position estimate.

In the preferred embodiment, the GPS receiver 706 comprises a Model Number 5305-NSI receiver, which is commercially available from Stanford Telecommunications Inc. However, any receiver which is capable of providing actual pseudoranges and the number of sampled GPS satellites may be utilized.

Because of the type of receiver used in the preferred embodiment, the GPS receiver 706 is coupled to a GPS intercommunication processor 708. In the preferred embodiment, the intercommunication processor 708 is the commercially available 68000 microprocessor from Motorola Inc., of Schaumburg, Ill., U.S.A. Any processor alone or in combination with the GPS receiver 706 for accomplishing the same purpose as described below may be utilized.

The GPS intercommunication processor 708 is further coupled to a GPS processor 710 and a GPS Console 1 712. The GPS intercommunication processor 708 coordinates data exchange between these three devices. Specifically, the GPS intercommunication processor 708 receives pseudorange data from the GPS receiver 706 which it passes on to the GPS processor 710. The pseudorange data includes, for example, the actual pseudoranges computed by the GPS receiver 706, the number of GPS satellites 200, 202. 204, and 206 currently being viewed by the GPS receiver 706, and other GPS data needed by the GPS processor 710 to compute the estimated pseudoranges for each of the GPS satellites 200, 202, 204, and 206. The GPS intercommunication processor 708 also relays status information regarding the GPS receiver 706 and the GPS processor 710 to the GPS Console 1 712.

Figure 8:
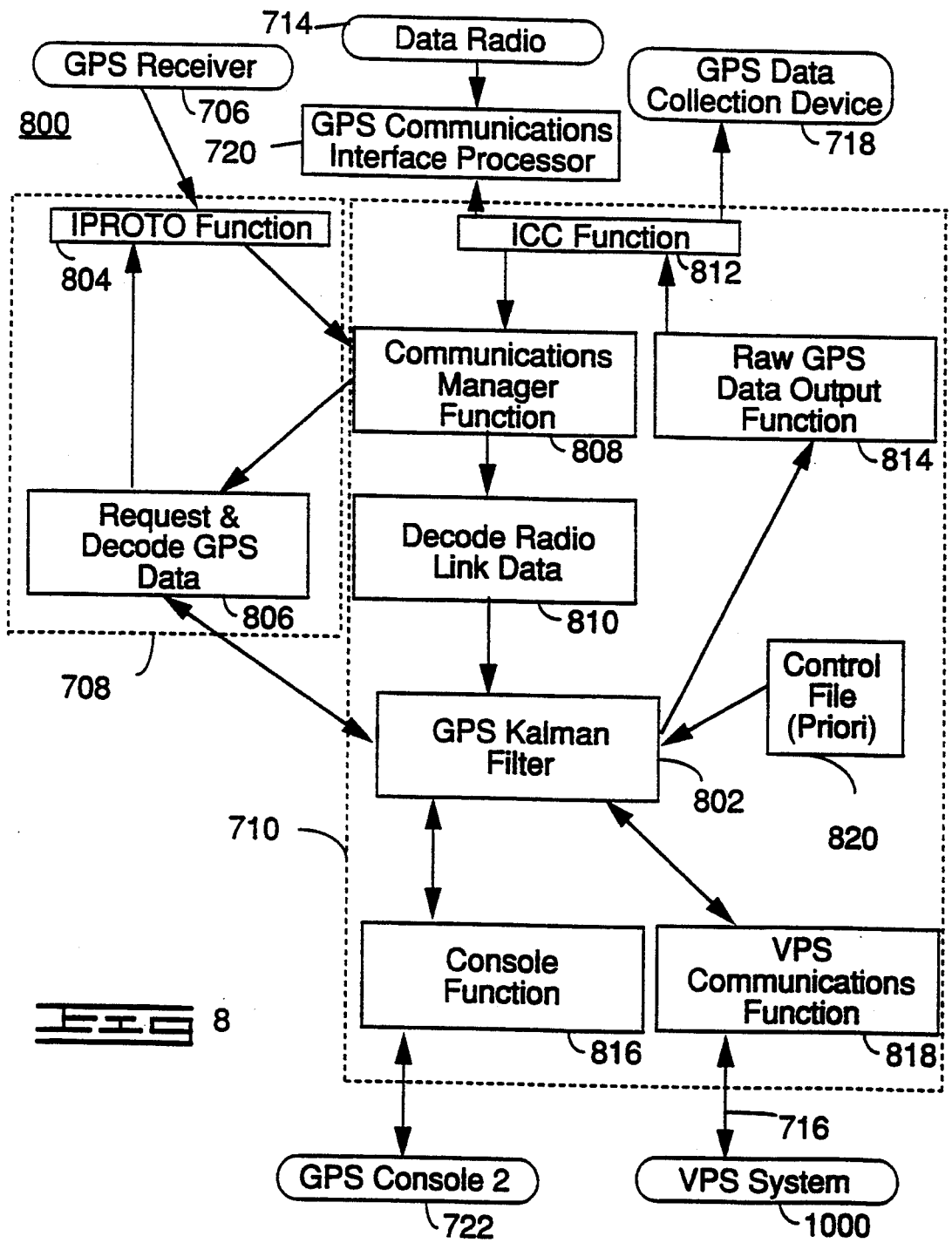
FIG. 8 is a low level flow diagram 800 illustrating the functioning of software in the GPS processing system 700, as shown in FIG. 7, of the preferred embodiment.

The GPS intercommunication processor 708 transmits the above information to the GPS processor 710. In the preferred embodiment, the GPS processor 710 comprises the 68020 microprocessor, which is commercially available from Motorola Inc. FIG. 8 is a low level flow diagram 800 illustrating the functioning of the software in the GPS processor 710.

The GPS processor 710 uses a number of algorithms and methods to process the data it receives including, for example, a GPS Kalman filter 802, which is shown in FIG. 8. The Kalman filter 802 is well known in the conventional art. In the preferred embodiment, the GPS Kalman filter 802 is a module in the software of the GPS processor 710.

In part, the function of the Kalman filter 802 is to filter out noise associated with the pseudorange data. The noise may include, for example, ionospheric, clock, and/or receiver noise. The GPS Kalman filter 802 of the host processing system 186 at the base station 188 computes spatial and clock biases which are both transmitted to the vehicle 102 for increasing the accuracy of first position estimates (as discussed in Part II.F.2. of this document). In contrast, the GPS Kalman filter 802 in the vehicle 102 takes into consideration the spatial and clock biases which are received from the base station 188.

The GPS Kalman filter 802 functions in a semi-adaptive manner. In other words, the GPS Kalman filter 802 automatically modifies its threshold of acceptable data perturbations, depending on the velocity of the vehicle 102. The term "perturbation" in the context of this document refers to a deviation from a regular course. The semi-adaptive functioning of the GPS Kalman filter 802 optimizes the response and the accuracy of the present invention.

Generally, when the vehicle 102 increases its velocity by a specified amount, the GPS Kalman filter 802 will raise its acceptable noise threshold. Similarly, when the vehicle 102 decreases its velocity by a specified amount the GPS Kalman filter 802 will lower its acceptable noise threshold. This automatic optimization technique of the present invention provides the highest degree of accuracy under both moving and stationery conditions.

In the best mode of the present invention, the threshold of the GPS Kalman filter 802 does not vary continuously or in very minute discreet intervals. Rather, the intervals are larger discreet intervals and, therefore, less accurate than a continuously varying filter. However, the Kalman filter 802 of the present invention is easy to implement, less costly, and requires less computation time than with a continuously varying filter. However, it should be noted that using a continuously varying filter is possible and is intended to be included herein.

For operation, the GPS Kalman filter 802 must be given an initial value at system start-up. From the initial value and GPS data collected by the GPS receiver 706, the GPS Kalman filter 802 extrapolates a current state (which includes the first position estimate and the vehicle velocity for northing, easting and altitude). The GPS Kalman filter 802 operates in a cyclical manner. In other words, the extrapolated current state is assumed to be the initial value for the next iteration. It is combined/filtered with new GPS data (an update) to derive a new current state.

The way that the GPS data is utilized is dependent on a priori saved file called a control file 820. The control file 820 will determine the following: (1) the noise threshold, (2) the speed of response, (3) the initial states of vehicle position and velocity, (4) the extent of deviation before a reset of the GPS Kalman filter 802 occurs, (5) the number of bad measurements allowed, and/or (6) the time allotted between measurements.

The GPS processor 710 then computes the estimated pseudoranges, the first position estimate, and the vehicle velocity (from Doppler shift) using the above current state and any biases, including the clock biases and the spatial biases. However, the GPS processor 710 discards the computed velocity data when the C/A code, rather than the carrier frequency, is utilized by the GPS receiver 706 to derive the vehicle velocity. The rationale for discarding the vehicle velocity is that experimentation has shown that it is not adequately accurate when derived from the C/A code.

Vehicle velocities derived from the carrier frequency (Doppler shift) are much more accurate than the velocities derived from the C/A code. In the preferred embodiment, the first estimated position (and vehicle velocity if derived from the carrier frequency) are encoded on GPS Signal 716 and sent on to the VPS main processor 1002 shown on FIG. 10.

As previously discussed, the GPS processor 710 analyzes both the carrier frequency and the C/A code. Unlike data demodulated from the C/A code, data may be retrieved from the carrier frequency by the GPS receiver 706 at approximately 50 Hz (not approximately 2 Hz, as is the case for demodulating C/A code). This increased speed allows the present invention to produce more precise position and velocity determinations with less error.

FIG. 8 illustrates other functions of the GPS processor 710 in the preferred embodiment. However, the present invention contemplates any method by which GPS data can be processed to determine pseudoranges. As shown at a flowchart block 816, a console function controls the operation of the GPS console 2. This console function regulates the operation of the GPS Kalman filter 802 by providing a user interface into the filter.

The VPS communications function 818 controls the outputs of the GPS Kalman filter 802 which are directed to the VPS 1000. At a flowchart block 806, it is shown that the GPS Kalman filter 802 requests and decodes data from the GPS receiver 706, which data is routed through an IPROTO function 804 shown at a flowchart block 804.

As shown, the IPROTO function 804 resides in the GPS intercommunications processor 708 and executes tasks associated with the GPS intercommunications processor 708. In the preferred embodiment, the IPROTO function 804 is the model number XVME-081, which is commercially available from Xycom Inc:

As shown at a flowchart block 810 the data transmitted over the communication channel 618 enters the IPROTO function 804. Much of this data is ultimately destined for the GPS Kalman filter 802. The communications manager function shown at a flowchart block 808, coordinates the incoming data from the IPROTO function. The communications manager function 808 also coordinates data received from an ICC function which is shown in a flowchart block 812. The ICC function 812 exchanges data with the data-radio 714 (via GPS intercommunications processors 720) and the GPS data collection device 718 as shown.

The GPS console 712 is well known in the art. Many types of devices are commercially available which provide the desired function. One such device is commercially available from Digital Equipment Corporation of Maynard, Mass. Model Number VT220. The GPS console 712 displays processor activity data regarding the GPS intercommunications processor 708 and the GPS processor 710.

The GPS processor 710 is coupled to a GPS console 722 and a GPS communications interface processor 720. The GPS console 722 is well known in the art. Many types of devices are commercially available which provide the desired console function. One such device is commercially available from Digital Equipment Corporation of Maynard, Mass. Model Number VT220. The GPS console 722 provides the user interface from which the GPS processor 710 can be activated and monitored.

The GPS communications interface processor 720 is essentially an I/O board. It is coupled to a data-radio 714 and a GPS data collection device 718. The GPS communications interface processor 720 coordinates data exchange between the GPS processor 710 and both the data-radio 714 and the GPS data collection device 718. The communications interface processor 720 in the preferred embodiment is the model no. MVME331, which is commercially available from Motorola Inc., U.S.A.

The data-radio 714 establishes a communication link between the GPS processor 710 (through the GPS communications interface processor 720) at the vehicle 102 to a similar data-radio 714 located at the base station 188 (see FIG. 6). In the preferred embodiment, the data-radio 714 communicates synchronously at 9600 baud using RF frequencies. The data-radio 714 at the base station 188 provides periodic updates on the amount of spatial bias and clock bias for each satellite to the data-radio 714 at the vehicle 102 at a rate of 2 Hz (twice per second). Spatial and clock biases computed by the base station 188 will be discussed further below.

The GPS data collection device 718 can be any of numerous common electronic processing and storage devices such as a desktop computer. Any personal computer (PC) manufactured by the International Business Machines Corporation (IBM) of Boca Raton, Fla., U.S.A., can be implemented.

C. Motion Positioning System (MPS)

The MPS 900 of the preferred embodiment is illustrated in FIG. 9. The MPS 900 derives the second position estimate of the vehicle 102. Usually, this second position estimate is combined and filtered with the first position estimate to thereby derive a more accurate third position estimate. However, it is envisioned that in some instances the second position estimate may be utilized exclusively as the third position estimate, when the first position estimate is deemed to be drastically inaccurate.

For the MPS 900, the preferred embodiment envisions the combination of the odometer 902 and the IRU 904. However, the IRU 904 could be utilized without the odometer 902. The odometer and the IRU 904 are coupled to an MPS intercommunications processor 906 to thereby comprise the MPS 900. IRUs and odometers are well known in the art and are commercially available, respectively, from Honeywell Inc. of Minneapolis, Minn., Model Number HG1050-SR01 and from Caterpillar Inc. of Peoria, Ill., Part Number 7T6337.

The IRU 904 comprises ring-laser gyroscopes and accelerometers of known design. The IRU 904 used in the preferred embodiment is a replica of the system used by Boeing 767 aircrafts to determine aircraft position, except that the IRU 904 has been modified to account for the lesser dynamics (for example, velocity) that the vehicle 102 exhibits relative to that of a 767 aircraft.

The IRU 904 can output vehicle position at 5 Hz, velocity at 10 Hz, roll at 50 Hz, pitch at 50 Hz, and yaw data at 50 Hz. Furthermore, in the preferred embodiment, the vehicle odometer 902 can output the distance traveled by the vehicle 102 at 20 Hz.

The laser gyroscopes of the IRU 904, in order to function properly, must at first be given an estimate of the vehicle 102's latitude, longitude and altitude. Using this data as a baseline position estimate, the gyroscopes then use a predefined calibration in conjunction with forces associated with the rotation of the Earth 172 to determine an estimate of the vehicle 102's current position.

This information is then combined by the IRU 904 with data acquired by the IRU 904 accelerometers to produce a more accurate, second position estimate of the vehicle's current position. The second position estimate from the IRU 904 and the data from the vehicle odometer 902 are transmitted to the MPS intercommunications processor 906 as shown by respective arrows 910 and 908 of FIG. 9. Arrow 114 of FIG. 1 includes arrows 908 and 910.

Upon experimentation, it has been determined that the IRU 904 may provide erroneous second position estimates of the vehicle 102 due to imprecise constituent parts. More specifically, in the preferred embodiment, it has been observed that the directional output of the IRU 904 has drifted counterclockwise from the direction north during operation. The drift is dependent upon the direction in which the vehicle 102, and consequently the IRU 904, is travelling.

Moreover, the drift can be defined by an IRU drift equation. The IRU drift equation can be derived similar to the construction of path equations described in regard to the weighted path history technique (Part II.H.) or similar to the construction of parabolic equations described in regard to the parabolic bias technique (Part II.F.2.b.). After derived, the IRU drift equation can be utilized to extrapolate more accurate second position estimates.

In the preferred embodiment, the intercommunications processor 1002 comprises the commercially available 68000 microprocessor from Motorola Inc. The intercommunications processor 1002 coordinates exchange of data between the MPS 900 and the VPS 1000. Any processor with similar function as described herein may be utilized.

D. Vehicle Positioning System (VPS)

Turning now to FIG. 10, the preferred embodiment of the architecture of the VPS 1000 is depicted. FIG. 11 shows in detail a diagram of the VPS 1000 connected to the GPS processing system 700 and MPS 900.

GPS processing system 700 and MPS 900 are independently coupled to the VPS main processor 1002. The independent coupling is an important novel feature of the present invention. Because they are independent, the failure of one of the systems will not cause the other to become inoperative. Thus, if the GPS processing system 700 is not operative, data can still be collected and processed by the MPS 900 and, consequently, the VPS 1000. The GPS processing system 700 and the MPS 900 transmit signals 716, 908, 910 to the VPS main processor 1002, as shown. These signals contain position, velocity, time, pitch, roll, yaw, and distance data (see FIGS. 7 and 9 and associated discussions).

The VPS main processor 1002 is coupled to the VPS I/O processor 1004. The VPS main processor 1002 transmits a signal 1008 to a VPS I/O processor 1004, as shown. The signal 1008 comprises the third position estimate. The third position estimate is derived from the GPS, IRU, and odometer data noted above, and more specifically, the first and second position estimates of the vehicle 102.

The present invention contemplates any system and method by which the signals indicated by arrows 716, 908 and 910 can be received by the VPS main processor 1002 from the GPS processing system 700 and MPS system 900 and forwarded to the VPS main processor 1002. The VPS main processor 1002 is the 68020 microprocessor, which is commercially available from Motorola Inc., U.S.A.

FIG. 12 is an intermediate level block diagram 1200 of a VPS main processor 1002 of FIG. 10 showing a VPS Kalman filter 1202 and a weighted combiner 1200. As shown, the GPS signal 716 and the odometer signal 908 are transmitted directly to a weighted combiner 1204. The IRU signal 910 is transmitted into a VPS Kalman filter 1202. In the preferred embodiment, the GPS signal 716 is transmitted at a rate of 2 Hz. The odometer signal 908 is transmitted at a rate of 20 Hz. Moreover, the IRU signal 910, which includes the second position estimate, is transmitted at a rate of 50 Hz.

The VPS Kalman filter 1202 processes the IRU signal 910, filters extraneous noise from the data, and outputs the processed data to the weighted combiner 1204. Further, the VPS Kalman filter 1202 receives a signal from the weighted combiner 1204, as shown by an arrow 1208, which is used to reset the VPS Kalman filter 1202 with new position information.

The weighted combiner 1204 processes the signals and gives a predetermined weighing factor to each data based on the estimated accuracy of data gathering technique used. Thus, in the preferred embodiment, the first position estimate of the GPS signal 716 is weighted heavier than the second position estimate of the IRU signal 910. The reason for this weighing scheme is that the first position estimate is inherently more accurate than the second position estimate from the IRU 904.

However, velocity can be more accurately determined by the IRU. Therefore, the velocity component of the IRU signal 910 can be weighted heavier than the velocity component of the GPS signal 716. In the preferred embodiment of the present invention, the velocity component of the IRU signal 910 is used exclusive of the velocity component of the GPS signal 716.

The weighted combiner 1204 produces an output 1206 at 20 Hz. The output 1206 contains all computed data and is sent to two locations: the VPS Kalman filter 1202, as shown by an arrow 1208 and the VPS I/O processor 1004, as shown by an arrow 1008. The output 1206 contains time information relative to the GPS satellites. The output 1206 further contains information relative to vehicle position, velocity, yaw, pitch, and roll. Finally, note that the VPS output 1206 comprises the third position estimate of the vehicle 102.

Another output shown at an arrow 1018 from the weighted combiner 1204 contains only velocity data pertaining to the vehicle 102. Velocity data is sent to the GPS processing system 700 from the VPS main processor 1002. The velocity data is used to increase the accuracy of first position estimates as is discussed hereinafter.

The present invention contemplates any system and method by which the signals 716, 908, and 910 can be processed at the VPS main processor 1002 in accordance with the above noted process steps. In the preferred embodiment, the VPS main processor 1002 is the 68020 microprocessor, which is commercially available from Motorola Inc., U.S.A.

Figure 12A:
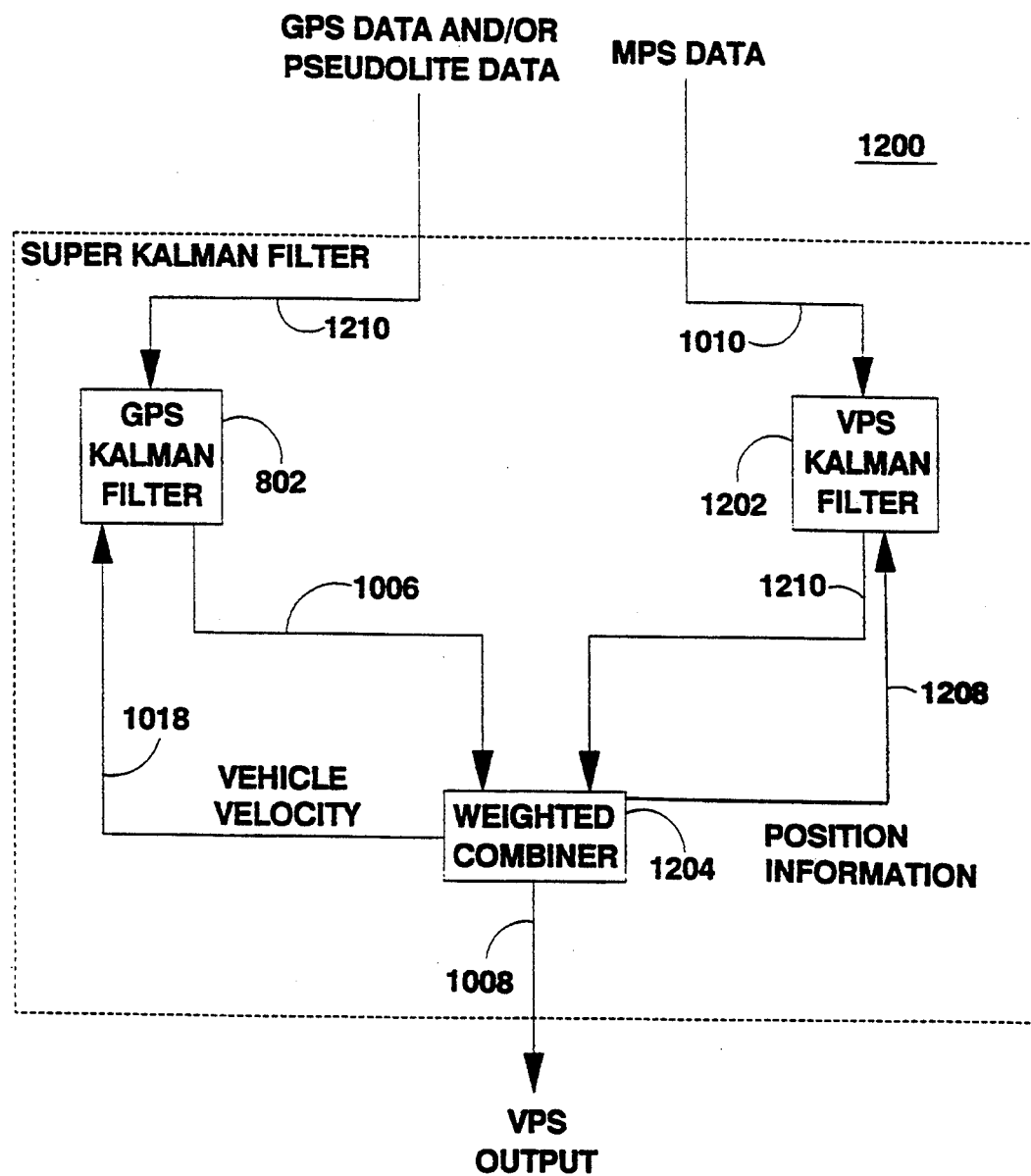
FIG. 12A is a high level block diagram of a super Kalman filter 1200A of the preferred embodiment.

FIG. 12A illustrates a super Kalman filter 1200A of the present invention. The super Kalman filter 1200A is a system and method for processing data to increase the accuracy of position estimates of the vehicle 102. Specifically, the super Kalman filter directly increases the accuracy of the first position estimate. Accordingly, the accuracy of the third position estimate is indirectly enhanced. In the preferred embodiment, the super Kalman filter 1200A comprises software within the architectures of the GPS processing system 700 at FIG. 7 and the VPS 1000 at FIG. 10. It is envisioned that the super Kalman filter 1200A could be constructed in hardware, for example, as in an integrated circuit, an optical filter, or the like.

As shown by the arrow an 1210, the GPS Kalman filter 802 receives first data from a terrestrial position determination system, which could include, for example, GPS data and/or pseudolite data. The GPS Kalman filter 802 operates on the data and outputs the first position estimate (FPE), as indicated by the arrow 716.

As shown by the arrow 910, the VPS Kalman filter 1202 receives MPS data from the MPS 900. The VPS Kalman filter operates on the MPS data and outputs the second position estimate (SPE).

The weighted combiner 1204 receives the FPE and the SPE as indicated by respective arrows 716 and 1210. The weighted combiner 1204 outputs the velocity 1018 of the vehicle 102 to the GPS Kalman filter 802. The GPS Kalman filter 802 adapts pursuant to the vehicle velocity 1018 of the vehicle to increase the accuracy of the FPE at arrow 716.

The GPS Kalman filter 802 can be designed to adapt in discreet time intervals or to adapt continuously. In the preferred embodiment, the GPS Kalman filter 802 adapts in discreet time intervals due to a balance between cost and performance.

It is envisioned that only one Kalman filter (not shown) could be implemented to provide for an accurate terrestrial position determination system. More specifically, it is possible to have the GPS processing system 700 and the MPS 900 (having an odometer 902 and/or an IRU 904) connected to only one Kalman filter which derives the third position estimate. However, such a configuration would not possess all of the favorable attributes as the preferred embodiment.

The super Kalman filter of FIG. 12 and 12A has the beneficial attributes of both a single Kalman filter and of separate Kalman filters. As configured, the GPS Kalman filter 710 and the VPS Kalman filter 1202 can continuously exchange data to thereby increase the accuracy of first and second position estimates. Consequently, third position estimates are enhanced. In a sense, a single Kalman filtering system resides between the ultimate output of the third position estimate and the position data being inputted.

In a different sense, the GPS Kalman filter 710 and the VPS Kalman filter 1202 act entirely as separate, independent filters. If, for example, either GPS data or MPS data is tainted, then the tainted data can be totally or partially disregarded via the weighted combiner 1204 without affecting the accuracy of the non-tainted data. In a system utilizing a single Kalman filter, the ultimate output, or third position estimate, will be substantially inaccurate if either the GPS data or the MPS data is substantially tainted.

Referring now back to FIG. 10, the VPS I/O processor 1004 is coupled to a VPS communications interface processor 1020. The communications interface processor 1020 is the MVME331 processor, which is commercially available from Motorola Inc., U.S.A. Any processor accomplishing the same purpose as described below may be utilized.

In the preferred embodiment, the VPS communications interface processor 1020 is coupled to three different devices: (1) a VPS console 1012, (2) a data collection device 1014, and (3) the navigation system 1022. The VPS communications interface processor 1020 routes the data, including the third position estimate, contained in output 1016 to the above three devices at a rate of 20 Hz.

The VPS console 1012 is well known in the art, and is commercially available from Digital Equipment Corporation, of Minneapolis, Minn., Model Number VT220. This VPS console 1012 is used to display the current status of the VPS I/O processor 1004.

The VPS data collection device 1014 can be any of numerous commercially available electronic processing and storage devices, for example, a desktop PC. Any Macintosh PC available from Apple Computer of Cupertino, Calif., can be used successfully to achieve this purpose.

The navigation system 1022 comprises the features associated with the navigation of the vehicle 102. The VPS 1000 transmits the third position estimate to the navigation system 1022, so that the navigation system 1022 can accurately and safely guide the autonomous vehicle 102.

E. Base Station

With reference to FIG. 7, the host processing system 186 at the base station 188 comprises the GPS processing system 700 of FIG. 7. The purposes of the host processing system 186 at the base station 188 are to (1) monitor the operation of the vehicle 102, (2) provide a known terrestrial reference point from which spatial biases (see differential bias techniques, Part II.F.2.) can be produced, and (3) provide any other information to the vehicle 102 when necessary over the high-speed data communication channel 618.

In the preferred embodiment, the base station 188 will be located close to the vehicle 102, preferably within 20 miles. The close geographical relationship will provide for effective radio communication between the base station 188 and the vehicle 102 over the communication channel 618. It will also provide an accurate reference point for comparing satellite transmissions received by the vehicle 102 with those received by the base station 188.

A geographically proximate reference point is needed in order to compute accurate spatial biases. Spatial and clock biases are, in effect, the common mode noise that exists inherently in the NAVSTAR GPS and the GPS processing system 700. Once computed at the base station 188, the spatial and clock biases are then sent to the vehicle 102 using the data-radio 714, as shown in FIG. 7. The spatial biases are computed using various methods which are discussed further below.

In the preferred embodiment of the present invention, the host processing system 186 at the base station 188 further coordinates the autonomous activities of the vehicle 102 and interfaces the VPS 1000 with human supervisors.

F. Satellite Based Accuracy Improvements

The present invention improves the accuracy of the position estimates of the vehicle 102 via a number of differential correction techniques. These differential bias techniques are used to enhance the first, second, and third position estimates.

Several of these differential correction techniques are designed to directly remove errors (noise or interference) in the calculation of pseudoranges R0, R2, R4, and R6 (both actual and estimated pseudoranges). The removal of these errors results in a more precise first position estimate, which is outputted by the GPS processing system 700 to the VPS 1000, and ultimately, in a more precise third position estimate, which is outputted by the VPS 1000 to the navigation system 1022.

In the preferred embodiment, the host processing system 186 at the base station 188 is responsible for executing these differential techniques and for forwarding the results to the vehicle 102. Recall that the host processing system 186 comprises the GPS processing system 700, just as the vehicle 102. The term "differential" is used because the base station 188 and the vehicle 102 use independent but virtually an identical GPS processing system 700. Furthermore, because the base station 188 is stationary and its absolute position is known, it serves as a reference point from which to measure electronic errors (noise or interference) and other phenomena inducing errors.

1. Constellation Effects

FIG. 13 is a flowchart 1300 of the constellation effects method for improving the accuracy of first position estimates in the preferred embodiment of the present invention. The method may be implemented in the GPS processing system 700 at the vehicle 102. Alternatively, the method may be implemented in the host processing system 186 at the base station 188. In the latter case, the information determined by the method would subsequently be communicated to the vehicle 102 for appropriate enhancement of first position estimates.

The flowchart 1300 shows a method for selecting the best satellite constellation in view of the GPS antenna 702. For the vehicle 102, many of the GPS satellites 132–170 may be in view of the GPS antenna 702. Only a subset of these satellites are selected to form a particular constellation of any number of satellites (at least four in the preferred embodiment).

Essentially, the "best" or "optimal" constellation is selected based upon geometrical considerations. The location in space of the GPS satellites 132–170 in view of the GPS antenna and the intended path of the vehicle 102 are taken into account as will be discussed in detail below.

The flowchart 1300 begins at a flowchart block 1302. At flowchart 1304, the estimated pseudoranges of each GPS satellite in view of and relative to the GPS antenna 702 are computed. Estimated pseudoranges are defined in the context of this document as estimated pseudoranges derived from almanac data and the ephemeris from GPS satellites. Almanac data refers to previously recorded data which stores the location in space of the GPS satellites 132–170 at specific times during the day.

For the NAVSTAR GPS, the almanac data is in the form of an equations with variables. These almanac equations are publicly available from the U.S. government. Some of the variables identify the GPS satellites 132–170. Further requisite inputs include the time at which an estimated pseudorange is to be determined and the known location of the relevant point on the Earth.

To determine the estimated pseudoranges pertaining to each GPS satellite, the following information is inserted into these almanac equations: (1) the parameters identifying the GPS satellites, which are encoded in the GPS data from the GPS satellites, (2) the current time, and (3) the known location of the base station 188.

Figure 14:
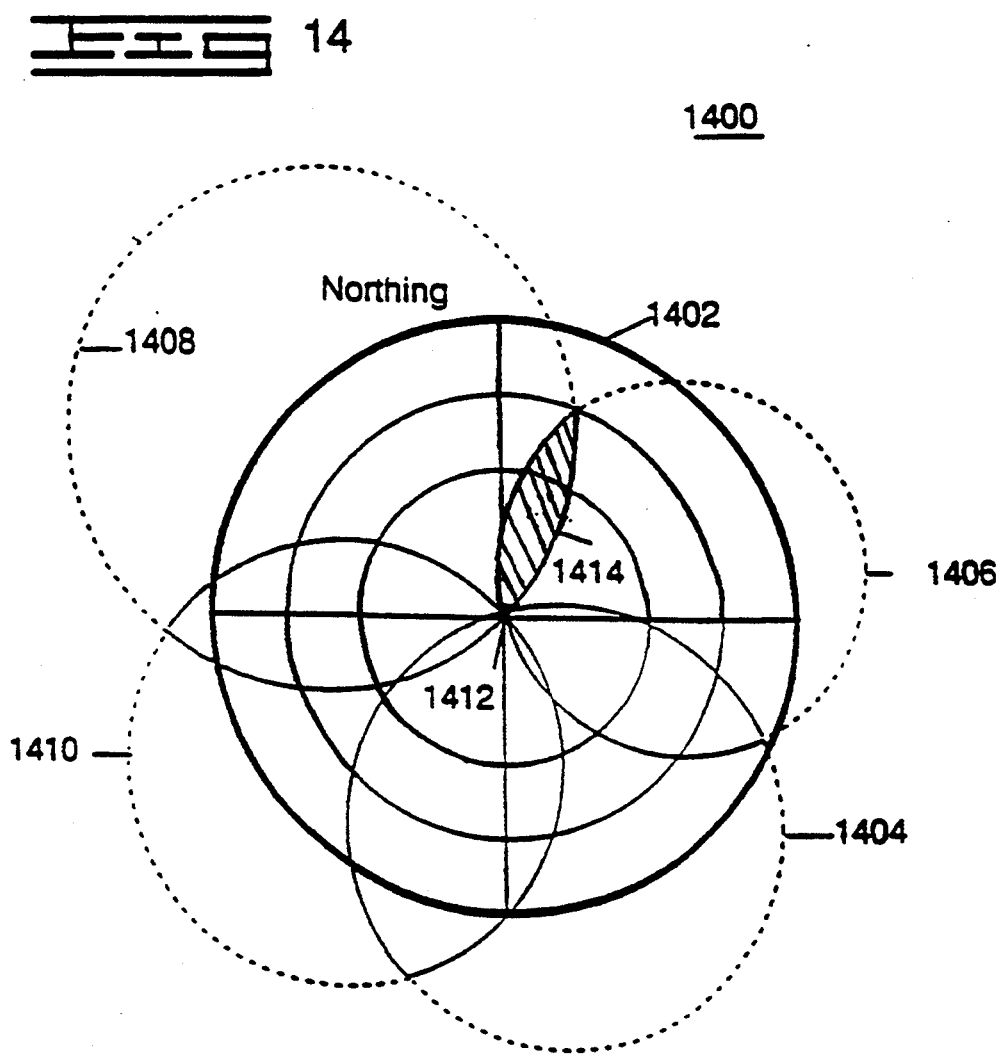
FIG. 14 is a polar plot 1400 on a coordinate system 1402 illustrating a set of computed estimated pseudoranges 1404, 1406, 1408, and 1410 pertaining to a GPS satellite constellation of four GPS satellites (not shown), wherein a shaded region 1412 shows the possible position estimate of a vehicle when the GPS satellites (not shown) giving rise to pseudoranges 1406 and 1408 are consulted.

Next, at flowchart block 1306, the estimated pseudoranges are plotted using polar coordinates. FIG. 14 is a polar plot 1400 on a coordinate system 1402 illustrating a set of estimated pseudoranges circles 1404, 1406, 1408, and 1410 pertaining to a GPS satellite constellation of four GPS satellites (not shown). The estimated pseudorange circles 1404, 1406, 1408, and 1410 are drawn so that an intersection exists at the center 1412 of the polar map 1400. The coordinate system 1402 reflects azimuth from the direction north as indicated.

The relative distances between the GPS satellites and the GPS antenna are also represented in the polar map 1400 by the size of the estimated pseudorange circles 1404, 1406, 1408, and 1410. Specifically, for example, the GPS satellite represented by the estimated pseudorange circle 1406 is further away than the GPS satellite represented by the estimated pseudorange circle 1408.

With reference to FIG. 14, a shaded ellipsoid region 1412 shows the possible position of the vehicle 102 when the GPS satellites (not shown) giving rise to the estimated pseudorange circles 1406 and 1408 are considered. An important parameter in the ellipsoid representation is the ratio between the semi-major and semi-minor access of the ellipsoid, called the geometric ratio of access factor (GRAF). It is envisioned that the GRAF can be computed at a next flowchart block 1308.

With reference to the flowchart block 1308, the GRAF is used along with the angle of the major access to compute a weighing factor, which will ultimately assist the GPS processing system 700 to compute a more accurate first position estimate as described below.

As shown in flowchart block 1312, the GPS Kalman filter 802 in the GPS processing system 700 at the vehicle 102 is modified to accommodate for the shape of the estimated ellipsoid and for the computed northing-easting coordinates of the vehicle 102, as illustrated in FIG. 14. Moreover, as indicated by an arrow 1314, the foregoing procedure is repeated continuously so as to continuously enhance the estimated position of the center 1412. At a flowchart block 1316, the optimal satellite constellation for the desired vehicle path is determined. The optimal constellation will be one that gives the least error perpendicular to the desired vehicle path.

As shown at a flowchart block 1318, the optimal satellite constellation is transmitted to the vehicle 102 over the data radio 714. The vehicle 102 uses the optimal satellite constellation to compute first position estimates.

2. Differential Correction Techniques a. Original Bias Technique

Referring now to FIG. 15, a flowchart 1500 illustrates the original bias technique, which is known in the conventional art. The original bias technique is a method for computing spatial biases to increase the accuracy of first position estimates, which ultimately participate in defining third position estimates. The original bias technique, described in detail below, uses a known position of the base station 188 as a reference point for determining spatial biases (original biases).

The original bias technique may be implemented in the GPS processing system 700 at the vehicle 102. Furthermore, the original bias technique may be implemented in the host processing system 186 at the base station 188. In the latter approach, the information determined by the method would subsequently be communicated to the vehicle 102 for appropriate enhancement of first position estimates. Furthermore, the preferred embodiment adopts the latter approach and implements the original bias technique in the host processing system 186 at the base station 188.

The original bias technique as shown in FIG. 15 begins at flowchart block 1502. As shown at a flowchart block 1504, the actual pseudorange (base actual pseudorange) and the estimated pseudorange (base estimate pseudorange) for each GPS satellite in view of the GPS antenna 702 are computed in the host processing system 186 at the base station 188. The base actual pseudorange is computed independently of the base estimated pseudorange. The base actual pseudorange is computed by the GPS receiver 706 in the host processing system 186. Moreover, the base estimated pseudorange is computed by the GPS processor 710.

Base actual pseudoranges are calculated by measuring the propagation time lapse between transmission of electromagnetic signals from a GPS satellite (or pseudolite) and reception of the signals at the host processing system 186 at the base station 188. The electromagnetic signals encode the time of transmission. Further, the GPS receiver 706 records the time of reception. By assuming that these electromagnetic signals travel at the speed of light, or $2.9979245898*10^8$ meters per second, the actual pseudorange for each satellite can be determined by multiplying the propagation time lapse by the speed of light (in the appropriate units).

Base estimated pseudoranges are computed from (1) almanac data (in NAVSTAR GPS, an almanac equation), (2) the time of transmission of the electromagnetic signals from the GPS satellites, and (3) the known position (base known position) of the base station 188. The transmission time and the base known position (BKP) is inserted into the almanac equation to derive an estimated pseudorange for a satellite.

Clock biases (base clock bias) between the circuitry clocks of the host processing system 186 and the recognized GPS satellites are also computed, as shown at the flowchart block 1604. In the preferred embodiment, one base clock bias is calculated for all of the satellites. The base clock bias is computed by counting clock pulses of a satellite and the host processing system 188 over a preselected time period. The pulses are then compared to derive a difference. The difference is then multiplied by the speed of light, or $2.998*10^8$ meters per second, so as to convert the clock bias into units of length. However, it should be noted that any method of computing and expressing a base clock bias can be incorporated into the present invention.

As shown in flowchart block 1508, a spatial bias (original bias) is calculated by subtracting both the base estimated pseudorange and the base clock bias (in units of length) from base actual pseudorange. The original bias is caused by many different effects, such as atmospheric conditions, receiver error, etc. It should be noted that the calculation of the original bias cannot be performed by using the vehicle 102 as a reference point, because the actual position of the vehicle 102 is not known. However, the computation of the original biases could be performed at the vehicle 102.

As shown at a flowchart block 1510, the GPS Kalman filter 802 in the host processing system 188 is updated with the original bias. Further, as shown by an arrow 1512, the process of computing original biases is performed continuously and the derived original biases are used to iteratively update the GPS Kalman filter 802.

Because the vehicle 102 is in close proximity to the base station 188, the error in the pseudorange computations is assumed to be identical. Therefore, the original bias which has been determined as shown in the flowchart block 1508 is also used to modify the actual pseudoranges produced by the GPS processing system 700 of the vehicle 102. Accordingly, as shown at a flowchart block 1514, the original biases are transmitted from the base station 188 to the vehicle 102 using the data radios 620 and 622.

The original biases are used to update the GPS Kalman filter 802 in the vehicle 102. The updating of the GPS Kalman filter 802 results in more accurate first position estimates.

b. Parabolic Bias Technique

As the GPS satellites 132–170 rise and fall in the sky, the path formed by each GPS satellite 132–170 follows a parabola with respect to tracking pseudoranges on or near the Earth's surface. Therefore, a parabolic function can be derived which represents the path of each GPS satellite in the sky. The foregoing describes the essence of the parabolic bias technique, which is performed in the host processing system 186 at the base station 188 in the preferred embodiment. It should be noted, however, that the parabolic bias technique may be performed at the vehicle 102.

Turning now to FIG. 16, a flowchart 1600 illustrates the parabolic bias technique. A parabolic function (model) is computed for each GPS satellite in the view of the GPS antenna 702 at the base station 188.

The flowchart 1600 begins at a flowchart block 1602. As shown at a flowchart block 1604, at a time t(n), actual pseudoranges are determined for each GPS satellite in view of the GPS antenna 702 at the base station 188, using the GPS receiver 706, as described above. As shown at a flowchart block 1606, the actual pseudoranges (for each GPS satellite) are incorporated into parabolic best fit models for each GPS satellite. Thus, at the flowchart block 1606 one point is added on the parabolic model for each GPS satellite.

As shown at a flowchart block 1608, a test is made as to whether enough points on the parabolic models have been determined to estimate a parabolic function for each GPS satellite. The number of points that have been collected will determine a particular statistical $R^2$ value. In the preferred embodiment, the $R^2$ value is computed as follows:

$$R^2 = \frac{SUM^2(\text{est. pseudorange}(t) - \text{mean of est. pseudoranges})}{SUM^2(\text{act. psuedorange}(t) - \text{mean of act. psuedoranges})}$$

The above standard statistical equation is well known in the conventional art. For a further discussion on this equation, refer to Draper, *Applied Regression Analysis*, 1966 edition. By defining N as the number of calculated pseudoranges, both estimated and actual, and by mathematically expanding the equation, the following more usable form of the equation can easily be derived:

$$R^2 = \frac{N * SUM(\text{square of all est. pseudoranges}) - 2 * SUM(\text{est. pseudoranges}) * SUM(\text{actual pseudoranges}) + SUM(\text{actual psuedoranges})^2}{N * SUM(\text{square of all actual pseudoranges}) - SUM(\text{actual pseudoranges})}$$

As shown at the flowchart block 1608, if this $R^2$ value is greater than 0.98 in the preferred embodiment, then the parabolic model is deemed to be accurate enough to estimate the future path of the GPS satellite. If the $R^2$ value is less than or equal to 0.98, then more points on the parabolic model must be computed. These points are computed by incorporating the pseudorange data which is continually being computed by the GPS receiver 706.

As shown at a flowchart block 1610, the N value increments to show that the time at which the pseudorange is computed, as shown in the flowchart block 1604, has increased. Because the GPS receiver 706 outputs actual pseudoranges for each GPS satellite at 2 Hz (twice a second), each N increment should represent approximately one half second.

If enough data points have been collected such that the $R^2$ value is greater than 0.98, then as shown in a flowchart block 1612, the parabolic models are deemed accurate enough to represent each satellite's orbital path. As shown in the flowchart block 1612, the parabolic models represent points on the past and future satellite paths. Now that the parabolic models are complete, future points on the models can be extrapolated, as shown at a flowchart block 1614.

As shown at the flowchart block 1614, for the time T(n+1) the locus point on each of the parabolic models is computed. The locus points are the expected actual pseudoranges of the GPS satellites at time T(n+1). Once this locus point is computed, the range for the locus point (distance between the GPS antenna 702 and the GPS satellite) is computed, as shown at a flowchart block 1616.

At a flowchart block 1618, the actual pseudoranges are computed for time T(n+1), which is the current time in the preferred embodiment. The actual pseudoranges are computed by the GPS receiver 706 as described above. These actual pseudoranges at T(n+1) are incorporated into the parabolic best fit models during the next iteration of the flowchart 1600.

As shown at a flowchart block 1620, the actual pseudorange computed at time T(n+1) and the base clock bias (in units of length) for each satellite are subtracted from the locus point range to generate the parabolic bias for each satellite.

As indicated in flowchart block 1624, the parabolic biases are then transmitted to the GPS processing system 700 of the vehicle 102 via the data radio 714. The GPS processing system 700 at the vehicle 102 utilizes the parabolic biases to increase the accuracy of its actual pseudorange (vehicle actual pseudoranges) calculations to thereby increase the accuracy of first position estimates.

c. Base Residiuals Bias Technique

FIG. 17 illustrates a flowchart 1700 for implementing the base residuals bias technique. In the preferred embodiment, the base residuals bias technique is performed in the host processing system 186 at the base station 188. After the base residuals bias has been computed at the base station 188, it is transmitted to the GPS processing system 700 of the vehicle 102. The GPS processing system 700 at the vehicle 102 uses the base residuals bias to enhance the accuracy of first position estimates.

A base residual bias in the context of this document is a difference in the base known position of the base station 188 and the position estimate (first position estimate, if calculated by the vehicle 102) of the base station 188 which is computed by the host processing system 186 at the base station 188. To illustrate how this functions, assume the base station 188 is at the corner of Elm and Maple streets. Also assume the GPS processing system 700 at the base station 188 estimates the position of the base station 188 to be four miles due south of the base known position (the corner of Elm and Maple). It is obvious that the base residuals bias is a distance equal to four miles in a due south direction.

Because the GPS processing system 700 on the vehicle 102 is identical to the GPS processing system 700 at the base station 188, the four mile error in computation can be deemed to be occurring at the vehicle 102 as well as the base station 188. The vehicle 102 can then use this information in its GPS processor 710. In effect, the GPS processor on the vehicle 102 will modify its first position estimates to account for a four mile due south error in the data.

The methodology of the base residuals bias technique will now be discussed in detail with reference to FIG. 17. At a flowchart block 1704, the exact polar coordinates x0, y0, z0 of the base station 188 is obtained from the base known position.

At a flowchart block 1706, base actual pseudoranges, base estimated pseudoranges, and base clock biases are computed by the host processing system 186 at the base station 188. If the GPS receiver 706 on the vehicle 102 is configured to read data from a particular constellation of GPS satellites (not shown), then the GPS receiver 706 at the base station 188 will use the same satellite constellation.

As indicated in flowchart block 1708, a position estimate (base position estimate) of the base station 188 is computed. In the preferred embodiment, the base position estimate is computed in the same way as the first position estimate at the vehicle 102.

Next, at a flowchart block 1710, the base position estimate is compared to the base known position. The difference (such as the four miles in the above example), if any, between the base position estimate and the base known position is referred to in this document as the base residuals bias.

The base residuals bias is transmitted to the vehicle 102 via the data radio 714, as indicated in flowchart block 1712. The base residuals bias is processed at the GPS processor 710 of the vehicle 102 to enhance the accuracy of the first position estimate.

d. Base Correlator Bias Technique

FIG. 17A illustrates a high level flowchart 1700A of a base correlator technique utilized in the present invention to improve the accuracy of the first position estimates of the vehicle 102. Generally, the technique involves using the known position of a reference point as a way of increasing accuracy. In the preferred embodiment, the base station 188 serves as the reference point. The methodology of flowchart 1700A will be discussed in detail below with specific reference to FIG. 6.

In the base correlator technique, spatial biases (base spatial biases) and clock biases (base clock biases) are initially computed by the host processing system 186 at the base station 188 of FIG. 6, as indicated in flowchart block 1705. The base spatial biases can be any spatial error computation including, but not limited to, the original and parabolic biases discussed previously in this document.

Specifically, recall that the original bias is calculated by subtracting both estimated pseudoranges (base estimated pseudorange) and base clock biases from actual pseudoranges (base actual pseudoranges). The base estimated pseudoranges are determined from (1) almanac data, (2) the time of transmission of the satellite signals, and (3) the known position (base known position) of the base station 188. The base clock biases are the differences in the clock times between the transmission circuitry of GPS satellites and/or pseudolites and the reception circuitry of the base station 188. The base clock biases are expressed in terms of units of length by multiplying them by the speed of light. The base actual pseudoranges are determined from the propagation time delays between transmission and reception of the electromagnetic signals sent from GPS satellites and/or pseudolites to the base station 188.

Moreover, the parabolic bias is computed by constructing parabolic models for the base actual pseudoranges of each observed GPS satellite and extrapolating values from the parabolic models. In the preferred embodiment, the parabolic biases are the base actual pseudoranges minus the value extrapolated from the constructed parabolic models and minus the base clock biases (in units of length).

As shown in flowchart block 1709, the base station 188 transmits to the vehicle 102 along communication channel 618 its base actual pseudoranges, base estimated pseudoranges, base spatial biases, base clock biases, and the base known position of the base station 188. Intended to be a very accurate estimate itself, the base known position can be determined by any appropriate means, including but not limited to, the novel systems and methods of the present invention or any other conventional systems and methods. After the vehicle 102 receives the foregoing information from the base station 188, the GPS processor 710 of the vehicle 102 uses this information in the calculation of its own spatial biases (vehicle spatial biases).

Before the vehicle 102 performs computations to derive the vehicle spatial biases at flowchart block 1713, its GPS receiver 706 computes its own actual pseudoranges (vehicle actual pseudoranges), its own estimated pseudoranges (vehicle estimated pseudoranges), and its own clock biases (vehicle clock biases). From the vehicle actual pseudoranges, its GPS processor 710 subtracts the vehicle estimated pseudoranges, the vehicle clock biases, and the base spatial biases which were sent from the base station 188 in flowchart block 1709. The result is a more accurate calculation of the vehicle spatial bias at the vehicle 102.

The vehicle spatial bias is then utilized to more accurately modify the first position estimate (FPE) of the vehicle 102, as shown in flowchart block 1717. It should be noted that the FPE is an estimate of the absolute position (with respect to the Earth 172's center) of the vehicle 102.

Beginning with a flowchart block 1721, an iterative method is instituted for improving the FPE of the vehicle 102. The method envisions using the base station 314 as a sort of correlator. In the preferred embodiment, the method is implemented by the GPS Kalman filter 802.

At the flowchart block 1721, an estimated relative position (HBE) of the base station 188 with respect to the vehicle 102 is determined. The initial state of the FPE is assumed to be the current value of FPE(i), where i is the positive integer value corresponding to the iteration. Consequently, when the method progresses from flowchart block 1717 to block 1721, the current value of FPE(i) will be FPE(0).

Still at flowchart block 1721, the vehicle 102 next calculates an estimated position (base estimated position; BEP) of the base station 188 using the base actual pseudoranges, base estimated pseudoranges, base spatial biases, and base clock biases, which all were transferred to the vehicle 102 from the base station 188. It should be noted that the BEP is an absolute position (relative to the Earth 172's surface). By subtracting the BEP from the FPE, an estimated relative position (HBE) of the base station 188 with respect to the vehicle 102 is determined.

As indicated at flowchart block 1725, an HBA is determined. HBA is another estimated relative position of the base station 188 with respect to the vehicle 102. However, unlike the HBE, the HBA is computed by subtracting the base known position (BKP) from the FPE. Thus, HBE and HBA differ in that the former is calculated using GPS data and/or pseudolite data whereas the latter is calculated using the known data.

Next at a flowchart block 1729, an offset is computed by subtracting HBE and HBA. In the preferred embodiment, the offset is a vector in a two-dimensional, orthogonal coordinate system. It is envisioned that a three-dimensional vector may be implemented to consider elevational differences between the vehicle 102 and the base station 188.

At a flowchart block 1733, a new FPE(i) is computed by subtracting the offset from the old FPE. In other words, the offset is used as a bias and is subtracted from the FPE(i) in order to increase the FPE(i)'s accuracy.

At flowchart block 1737, the offset is compared to a preselected threshold. In the preferred embodiment, each vector component has a corresponding threshold. If all the vector components are not less than their corresponding preselected thresholds, then the flowchart 1700A starts again at flowchart block 1721, as indicated by a feedback arrow 1739. In this case, the positive integer i is increased by one to indicate another iteration and a different FPE(i). The present invention will operate in a cyclical, or loop-like, manner until the preselected threshold is achieved or surpassed.

When the offset finally achieves the preselected threshold, then the FPE is assumed to be the current state of FPE(i), as shown in flowchart block 1743. Hence, the base correlator bias technique provides for greater accuracy of the FPE.

G. Satellite Position Predictor

The present invention includes a method by which the future positions of the GPS satellites 132-170 can be predicted with respect to a known absolute position of the base station 188 and/or the vehicle 102. The future positions are based upon estimated pseudoranges calculated by the GPS processor 710 at the host processing system 188 and/ or the VPS 1000. Moreover, the computations can be performed at the base station 188 and/or the vehicle 102 and transferred anywhere, if necessary.

By predicting the future positions of the GPS satellites 132-170, optimum satellite constellations for the vehicle 102 can be determined well in advance. Thus, the present invention can provide for the prediction of satellite availability and unavailability in a systematic manner. It further allows for future planning related to the operation, service, and maintenance of the vehicle 102.

Figure 18:
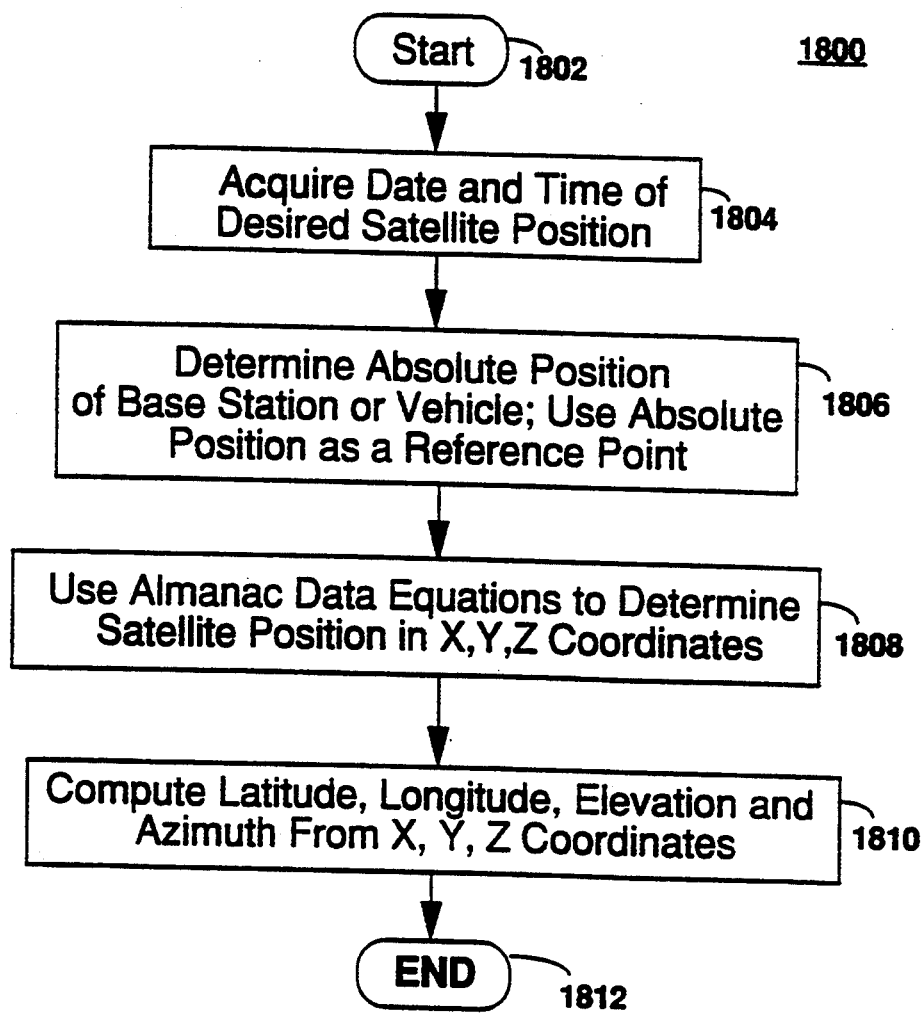
FIG. 18 is a flowchart 1800 of a method in the preferred embodiment for the prediction of future satellite positions.

With reference to FIG. 18, a flowchart 1800 illustrates the satellite position predictor method of the present invention. At a flowchart block 1804, for a particular GPS satellite, a future date and time is obtained or selected for any of a number of reasons eluded to above.

After a future date and time is acquired, the position of the base station 188 and/or the vehicle 102 is determined, as shown at a flowchart block 1806. In the preferred embodiment, the base station 188 is used as the reference point. The position of the base station 188 could be the base known position or the base position estimate (both discussed in relation to the base residuals technique). In the preferred embodiment, the base known position is utilized and will be referred to hereinafter.

As shown at a flowchart block 1808, the almanac data is then consulted. As discussed previously in this document, the almanac data for the NAVSTAR GPS is in the form of almanac equations. By inputting into the almanac equations a satellite's identity, the future date and time, and the base known position, the future position of any satellite can be determined.

When the future position of a satellite relative to the base station 188 is determined using the almanac equations, the future position is in orthogonal XYZ coordinates, as shown at a flowchart block 1808. Finally, in the preferred embodiment at a flowchart block 1810, the latitude, longitude, elevation and azimuth of the satellite are computed from the XYZ coordinates and the position of the base station 188.

From the computation of the future positions of satellites, optimal satellite constellations can be determined. Optimal satellite constellations determined using the base station 188 as the reference point can be imputed to the vehicle 102 if close to the base station 188.

H. Weighted Path History

The weighted path history technique of the present invention improves the accuracy of first position estimates of the vehicle 102 which are derived from the GPS processing system 700. It should be noted that the weighted path history technique could be implemented in an identical fashion as is described below to improve the accuracy of third position estimates derived by the VPS 1000. The weighted path history technique is depicted in FIGS. 19 and 20.

Essentially, the weighted path history technique uses previous first position estimates to derive a vehicle path model for testing the validity of future first position estimates. Use of the weighted path history technique results in a reduction to wandering of first position estimates and in enhanced immunities to spurious position computations. The term "wandering" in the context of this document means the tendency of the GPS processing system 700 to estimate erroneous vehicle positions that deviate from the actual path of the vehicle 102.

Figure 19:
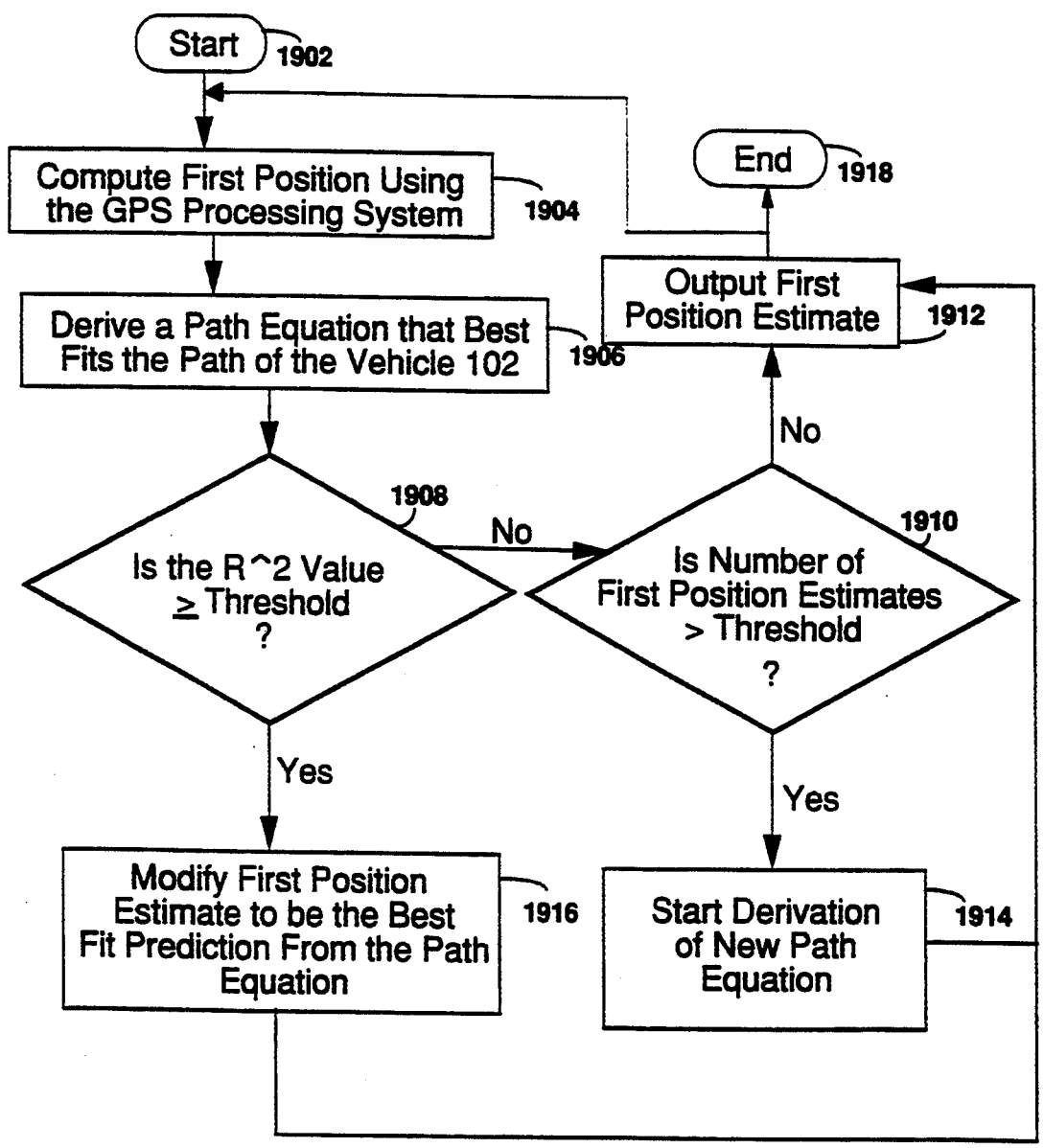
FIG. 19 is a flowchart 1900 of a weighted path history technique of the present invention.
Figure 20:
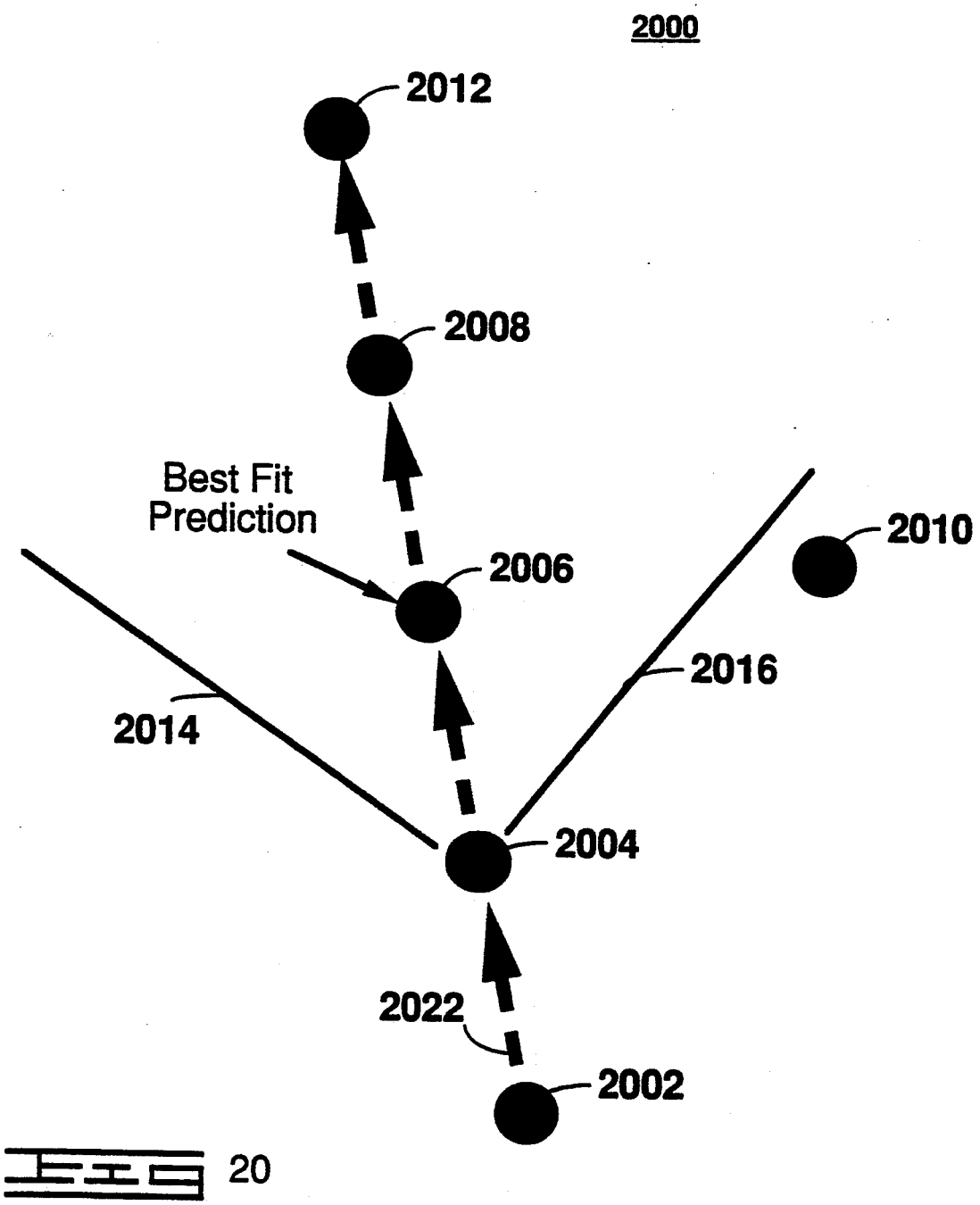
FIG. 20 is a high level graphical representation 2000 of first position estimates of the vehicle 102 wherein the weighted path history method illustrated in FIG. 19 would eliminate a first position estimate 2010 because of its extreme inconsistency with the vehicle path.

With reference to FIG. 19, the weighted path history flowchart begins at flowchart block 1902. A first position estimate of the vehicle 102 is computed and recorded by the GPS processing system 700, as indicated in a flowchart block 1904. First position estimates are recorded over time. As is shown in FIG. 20, first position estimates 2002, 2004, 2006, 2008, 2010, and 2012 of vehicle 102 are plotted on a diagram 2000 to ultimately derive a vehicle path 2022.

At a flowchart block 1906, the first position estimate is used to manipulate/derive a path equation that best fits the path of the vehicle 102. In other words, first position estimates are accumulated over time to derive an accurate "path equation." In the preferred embodiment, the path equation is a second degree (parabolic) equation. However, it should be noted that a third degree equation (having a mathematical inflection) is envisioned for winding vehicle paths and vehicle turns.

Furthermore, an embodiment of the present invention could utilize combinations of any types of equations to map an infinite number of different vehicle paths.

At a flowchart block 1908, the statistical $R^2$ value in relation to the path equation and the first position estimate is computed and compared to a threshold numerical value. In the preferred embodiment, the threshold has been set to 0.98. The statistical $R^2$ value was discussed in detail previously in this document. In the context of the weighted path history technique of FIG. 19, the $R^2$ value reflects the number of first position estimates that have been taken thus far, and therefore, it reflects the statistical accuracy of a future prediction from the path equation.

If the $R^2$ value is not greater than or equal to 0.98, then a test is performed at a flowchart block 1910 to determine whether a new path equation should be derived. In other words, a determination is made as to whether the currently collected first position estimates as well as the path equation are inaccurate, and therefore, should not be relied upon.

In the preferred embodiment, the number of first position estimates is counted and compared to a threshold of 20. Any threshold number could be preselected. If more than 20 first position estimates have been computed, then the flowchart moves to block 1914. Flowchart block 1914 indicates that a new path equation will be started during the next iteration of the flowchart 1900 at flowchart block 1906.

If less than or equal to 20 first position estimates have been calculated and collected, then the present path equation of flowchart block 1906 is still utilized and will be considered again during the next iteration of flowchart 1900. Moreover, the first position estimate is outputted from the GPS processing system 700, as shown at a flowchart block 1912.

Referring back to the flowchart block 1908, if the $R^2$ value of the path equation is greater than or equal to 0.98, then as shown in a flowchart block 1916, the first position estimate is modified to be the best fit prediction from the present path equation. Finally, the first position estimate is outputted by the GPS processing system 700, as shown by flowchart block 1912.

FIG. 20 illustrates graphically the scenario at issue. The first position estimate 2010 of the vehicle 102 is radically different from the best fit prediction 2006 of the path equation. Therefore, the first position estimate 2010 is replaced by best fit prediction 2006, so long as the $R^2$ value of the path equation is greater than or equal to preselected threshold and so long as enough position estimates have been sampled.

Lines 2014 and 2016 illustrate the scope of acceptability with respect to the first position estimates. These lines 2014 and 2016 represent the physical manifestation of the $R^2$ value. Thus, the best fit prediction 2006 is outputted from the GPS processing system 700 to the navigation system 1022, instead of the first position estimate 2010 which is outside the span of line 2016.

Figure 20A:
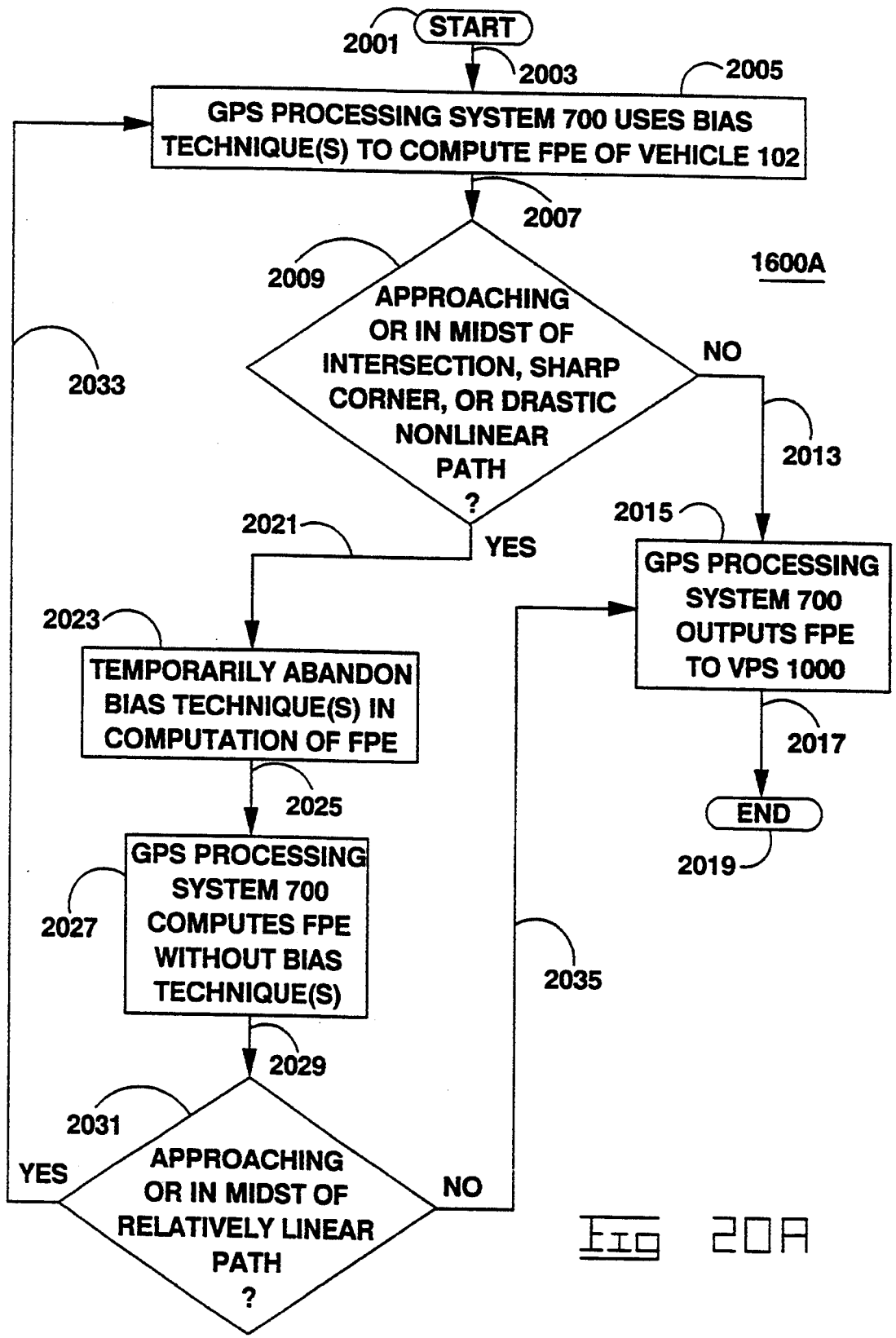
FIG. 20A illustrates a high level flowchart 2000A of a method for implementing the weighted path history technique as disclosed in FIGS. 19 and 20.

FIG. 20A shows a high level flowchart 2000A of a method for implementing the weighted path history technique as disclosed in FIGS. 19 and 20. The method as shown accommodates for a vehicle travel path having sharp corners, intersections, and/or any drastic nonlinear path. The method increases the accuracy of the first position estimate (FPE) of the vehicle 102 outputted by the GPS processing system 700.

The preferred embodiment implements the novel methodology of FIG. 20A via software. The software can be situated in the GPS processor 710 of the GPS processing system 700 at the vehicle 102 and/or at the base station 188.

The flowchart 2000A begins at flowchart block 2001 and ends at flowchart block 2019. As shown in flowchart block 2005, the GPS processing system 700 as disclosed in FIGS. 7 and 8 computes the first position estimate using any of the bias techniques discussed previously in this document. In the preferred embodiment, the bias techniques subject to the method of FIG. 20A include, for example, the original bias technique of FIG. 15 and the parabolic bias technique of FIG. 16.

At flowchart block 2009, a decision is made as to whether the vehicle 102 is approaching or is in the midst of a sharp corner, intersection, or other irregular path. The information needed to answer this question can be supplied to the GPS processor 710 from the navigator 406 of FIG. 4. If the answer to this question is in the negative, then the flowchart 2000A proceeds as indicated by an arrow 2013. In the alternative, that is, if the answer to this question is in the affirmative, then the flowchart 2000A proceeds as indicated by an arrow 2021. Both of these alternative avenues are discussed in detail below.

When the vehicle 102 is not approaching or is not in the midst of a drastic nonlinear path, then the flowchart 2000A commences with flowchart block 2015. At flowchart block 2015, the GPS processor 710 outputs the first position estimate to the VPS 1000, which first position estimate was derived using one or more bias techniques. Recall that the VPS 1000, which is disclosed in FIGS. 10 and 11, calculates the third position estimate of the vehicle 102 using, in part, the first position estimate sent to it from the GPS processing system 700.

When the vehicle 102 is approaching a drastic nonlinear path, then the flowchart 2000A commences with flowchart block 2023. At flowchart block 2023, the bias techniques are temporarily abandoned, until a more linear path ultimately ensues. The GPS processor 710 computes the first position estimate of the vehicle 102 without regard to the bias techniques, as indicated in flowchart block 2027.

The flowchart next proceeds to flowchart block 2031. A determination is made as to whether the vehicle 102 is approaching or is in the midst of a relatively linear path. If so, then the flowchart 2000A returns to flowchart block 2005, as shown by a feedback arrow 2033. At the flowchart block 2005, any previously-terminated bias techniques are again instituted.

In the case of the parabolic bias technique of FIG. 16, new best-fit parabolic models are constructed for each of the observed GPS satellites. Recall that actual pseudoranges are determined for each of the observed GPS satellites over a period of time to construct a parabolic model for each GPS satellite. The parabolic models are not utilized until the accuracy of the models is greater than a certain threshold. In the present invention, the parabolic models are not utilized until a statistical $R^2$ value is greater than 0.99.

Alternatively, if the vehicle 102 is not approaching or is not in the midst of a relatively linear path, then the flowchart 2000A moves to flowchart block 2015 discussed previously. However, it should be noted that the first position estimate transmitted to the VPS 1000 at this point was derived without regard to any bias techniques.

I. Anti-Selective Availability

It is believed that the U.S. government (the operator of the NAVSTAR GPS) may at certain times introduce errors into the GPS data being transmitted from the GPS satellites 132-170 by changing clock and/or ephemeris parameters. In other words, the U.S. government can selectively modify the availability of the GPS data. For example, such an action might take place during a national emergency. The U.S. government would still be able to use the NAVSTAR GPS because the U.S. government uses the other distinct type of pseudorandom code modulation, called the P-mode. Thus, the U.S. government could debilitate the C/A mode. Such debilitation could cause the GPS receiver 706 to compute incorrect actual and estimated pseudoranges, and thus, incorrect first position estimates. The anti-selective availability technique of the present invention is a way to detect and compensate for any misleading GPS data.

Figure 21:
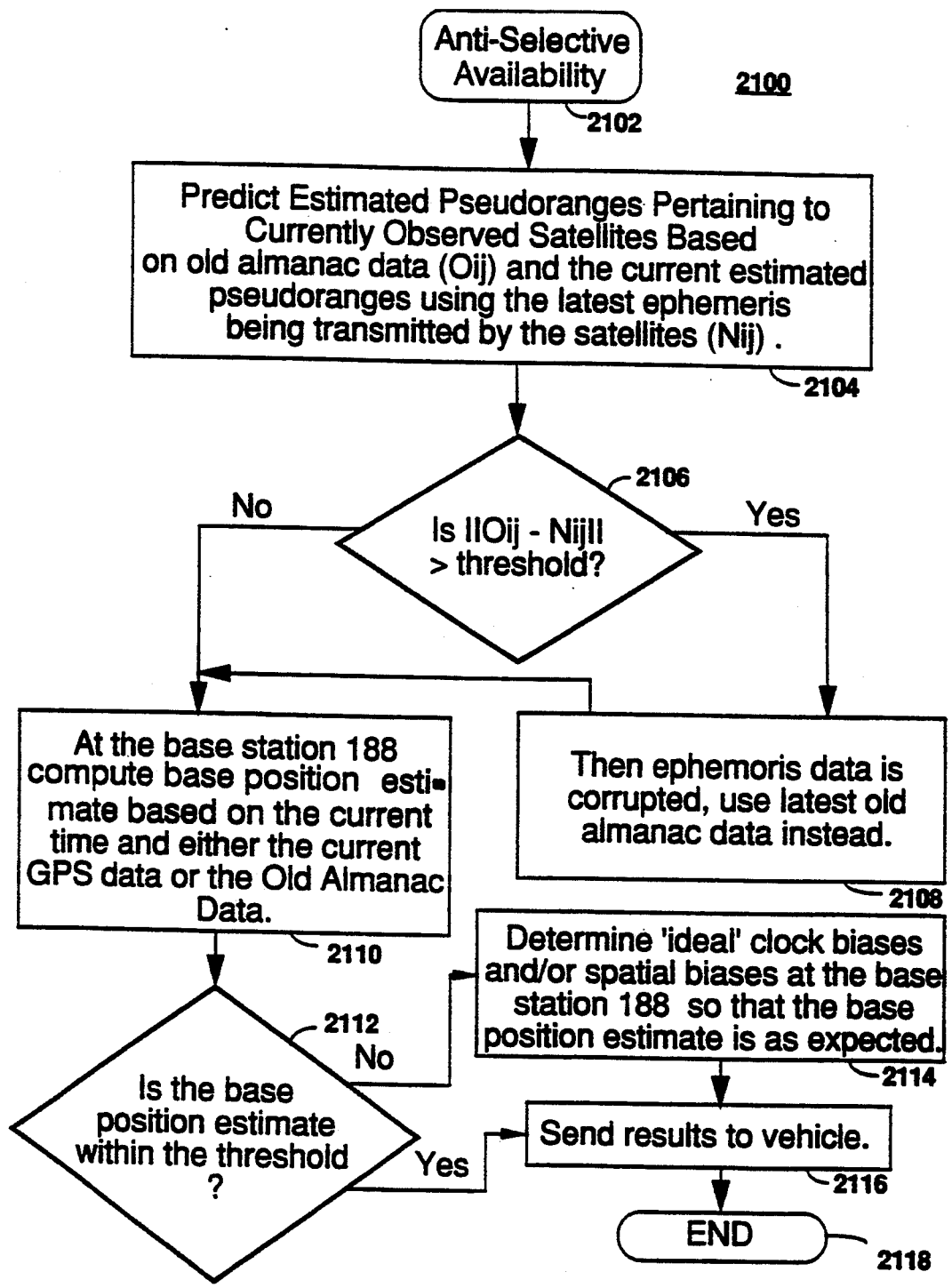
FIG. 21 is a flowchart 2100 of an anti-selective availability technique of the present invention.

Turning now to FIG. 21, a flowchart 2100 of the anti-selective availability technique is depicted. In the preferred embodiment, the anti-selective availability technique is performed in the GPS processor 710 of the host processing system 186. However, the technique could be implemented in the GPS processor 710 at the vehicle 102. The flowchart 2100 begins at a flowchart block 2102 and ends at flowchart block 2118.

At a flowchart block 2104, estimated pseudoranges (predicted estimated pseudoranges; "Oij") of GPS satellites in view of the GPS antenna 702 are predicted by using old almanac data. Old almanac data is GPS data, or any part thereof, which has been previously recorded by the GPS receiver 706 and which enables the GPS processor 710 to compute predicted estimated pseudoranges without regard to the currently-received GPS data. In a sense, the old almanac data is used to check the integrity of currently-received GPS data. In the preferred embodiment, the old almanac data is the previous ephemeris which was received by the GPS receiver 706.

With further reference to the flowchart block 2104, current estimated pseudoranges ("Nij") of the GPS satellites are computed in the usual fashion using the current ephemeris data (subset of GPS data) being transmitted by the GPS satellites and the base known position of the base station 188.

At a flowchart block 2106, the predicted estimated pseudoranges (using the almanac) and the current estimated pseudoranges (using the latest ephemeris data) are compared. As is shown in the flowchart block 2106, the euclidian norm of the predicted estimated pseudoranges and the current estimated pseudoranges are computed and tested against a preselected threshold.

If the euclidian norm is larger than the preselected threshold, then the ephemeris data is deemed to be corrupted, as shown at a flowchart block 2108. Consequently, the latest valid almanac data is used instead to compute position estimates of the base station 188, as shown at a flowchart block 2108. The flowchart 2100 then continues to flowchart block 2110.

If the euclidian norm is less than or equal to the preselected threshold, then the ephemeris data is deemed to be proper and the flowchart 2100 continues to flowchart block 2110.

Next, as shown at a flowchart block 2110, the base position estimate of the base station 188 is computed using the current time and either the currently received GPS data or the old almanac data (decided in flowchart block 2106).

At a flowchart block 2112, the base position estimate is tested against expected values. In other words, because the location (base known position) of the base station 188 is known, the accuracy of the base position estimate using the anti-selective availability technique can be readily tested against a preselected threshold.

If the accuracy is within the preselected threshold, then the an indication is sent to the vehicle 102 that the GPS data is proper, as shown at a flowchart block 2116. As a result, the base station 188 forwards any information needed by the vehicle 102 in order to compute first position estimates. The information forwarded could include, for example, base clock biases, spatial biases (original biases, parabolic biases, base residuals biases), base estimated pseudoranges, and/or base actual pseudoranges.

If the computed base station 188 is not within preselected threshold, then base clock biases and/or base spatial biases are manipulated so that the estimated base position is within the preselected threshold, as shown at a flowchart block 2114. The base clock biases needed to bring the base estimated position within the threshold of acceptability are then sent to the vehicle 102, as indicated at the flowchart block 2116.

J. Surveying

In addition to the determination of position estimates and navigation of the vehicle 102, the present invention can be used in a separate embodiment to accomplish surveying of the Earth 172's surface in real time. Thus, the position of any point on the Earth 172 can be computed using the techniques and methods of the present invention.

K. Graphic Representations

The present invention provides for the production of graphic images on the user interface (not shown) of the host processing system 188. The graphic images allow human users at the base station 188 to view the paths of the vehicle 102 as well as any other vehicles which are being navigated with the present invention. In the preferred embodiment, the graphic images are displayed on commercially available video displays and, if desired, the screens can be printed by conventional printers.

IV. Navigation System

A. Overview

In considering implementation of an autonomous navigation system, there are some basic questions which any autonomous system must be able to answer in order to successfully navigate from point A to point B. The first question is "where are we (the vehicle) now?" This first question is answered by the positioning system portion of the present invention, as discussed above in section II.

The next or second question is "where do we go and how do we get there?" This second question falls within the domain of the navigation system portion of the present invention, discussed in this section (III).

A further (third) question, really a refinement of the second one, is "how do we actually physically move the vehicle, for example, what actuators are involved (steering, speed, braking, and so on), to get there?" This is in the domain of the vehicle controls subsystem of the navigation system, also discussed below.

As has been discussed implicitly above, autonomous navigation, of a mining vehicle as an example, may provide certain significant advantages over conventional navigation. Among them is an increased productivity from round the clock, 24 hr. operation of the vehicles. The problems presented by dangerous work environments, or work environments where visibility is low, are particularly well suited to solution by an autonomous system.

There are, for instance, some mining sites where visibility is so poor that work is not possible 200 days of the year. There are other areas which may be hazardous to human life because of being contaminated by industrial or nuclear pollution. An area may be so remote or desolate that requiring humans to work there may pose severe hardships or be impractical. The application of the present invention could foreseeably include extraterrestrial operations, for example, mining on the Moon, provided that the necessary GPS satellites were put in Moon orbit.

In a typical application of the present invention, as shown in FIG. 3, with regard to the navigation of a mining vehicle at a mining site, there are three basic work areas: the load site, the haul segment, and the dump site. At the load site, a hauling vehicle may be loaded with ore in any number of ways, by human operated shovels for instance, controlled either directly or by remote control, or by autonomous shovels. The hauling vehicle then must traverse an area called the haul segment which may be only a few hundred meters or may be several km's. At the end of the haul segment is the dump site, where the ore is dumped out of the hauling vehicle to be crushed, or otherwise refined, for instance. In the present invention, autonomous positioning and navigation may be used to control the hauling vehicle along the haul segment. Autonomously navigated refueling and maintenance vehicles are also envisioned.

Figure 4:
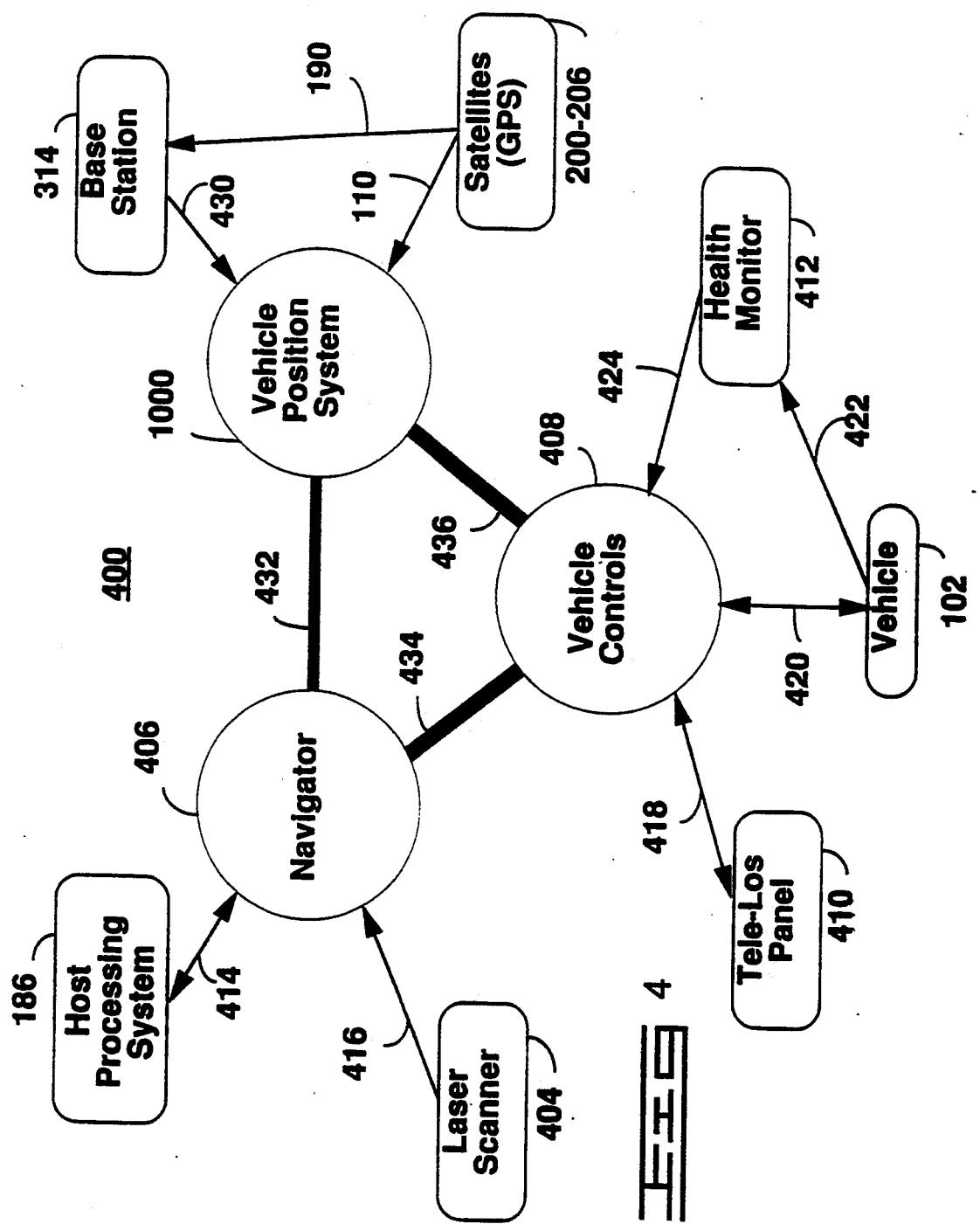
FIG. 4 is a high level block diagram 400 of the interrelationships between a navigator 406, a vehicle VPS architecture 1000, and vehicle controls 408 of the present invention.
Figure 5:
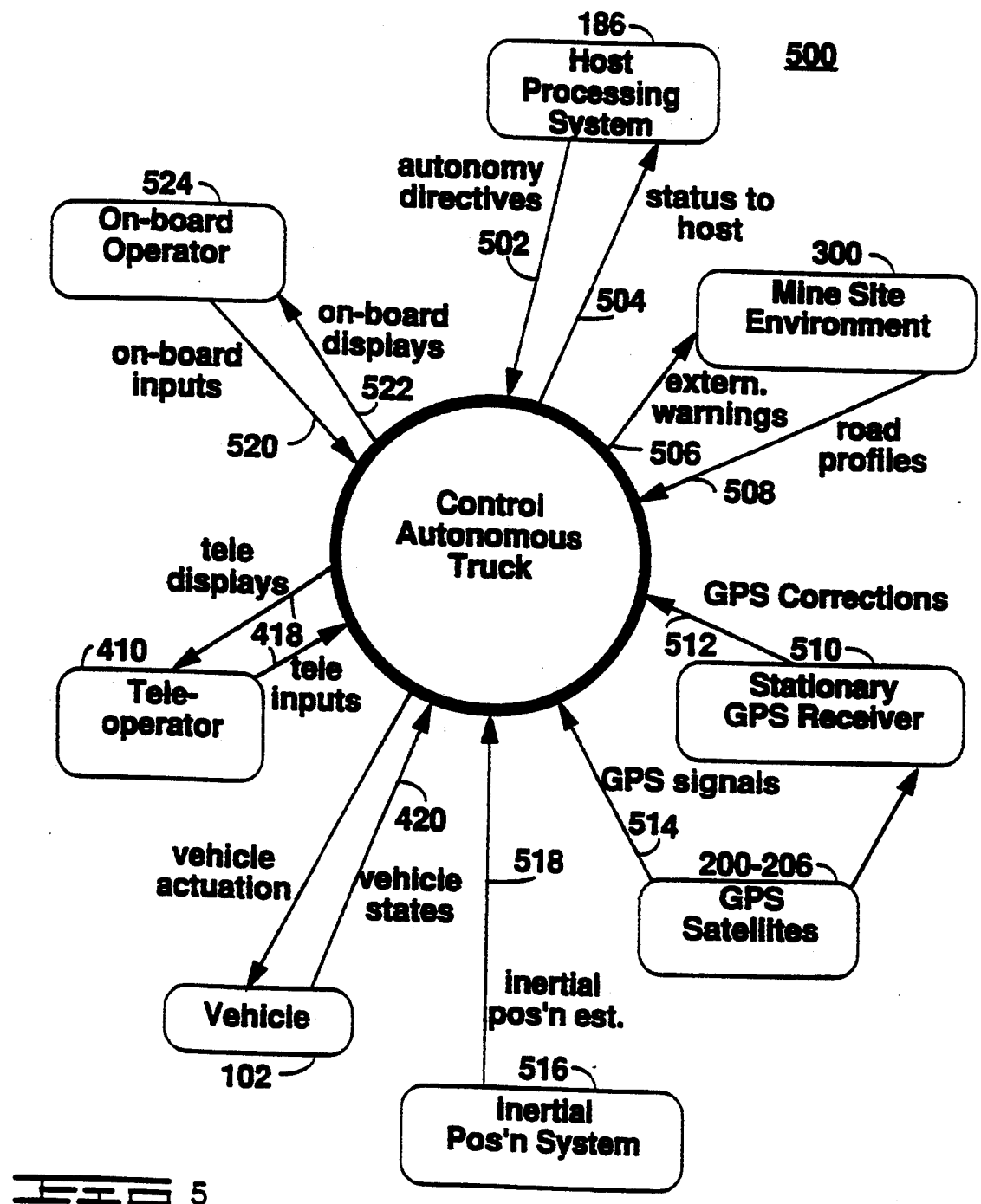
FIG. 5 is a high level block diagram 500 illustrating the context of various elements and their interrelationship in an autonomous control system according to the present invention.

Referring now to FIGS. 4 and 5, navigation of the AMT (Autonomous Mining Truck) encompasses several systems, apparatus and/or functions. The VPS 1000 subsystem of the overall AMT system as described above, outputs position data that indicates where the vehicle is located, including, for example, a North and an East position.

Referring now to FIGS. 4 and 5, position data output from the VPS is received by a navigator 406. The navigator determines where the vehicle wants to go (from route data) and how to get there, and in turn outputs data composed of steer and speed commands to a vehicle controls functional block 408 to move the vehicle.

The vehicle controls block then outputs low level commands to the various vehicle 102 systems, such as the governor, brakes and transmission. As the vehicle is moving towards its destination, the vehicle controls block and the VPS receive feed-back information from the vehicle indicative of, for example, any fault conditions in the vehicle's systems, current speed, and so on.

Navigation also must include an obstacle handling (detection and avoidance) capability to deal with the unexpected. A scanning system 404 detects obstacles in the vehicle's projected trajectory, as well as obstacles which may be approaching from the sides and informs the navigator of these.

The navigator may be required to then decide if action is required to avoid the obstacle. If action is required, the navigator decides how to avoid the obstacle. And after avoiding the obstacle, the navigator decides how to get the vehicle back onto a path towards its destination.

Figure 35:
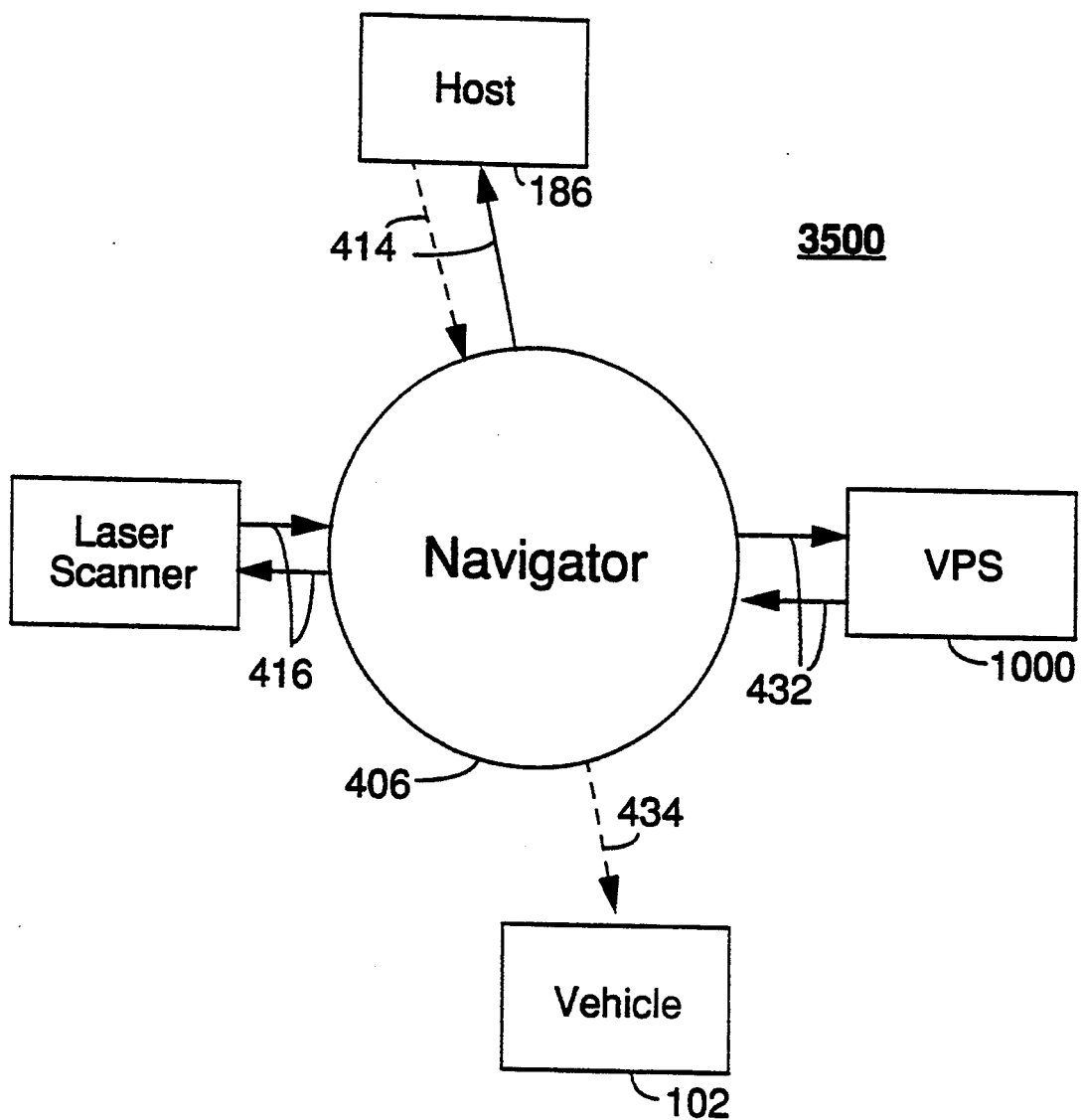
FIG. 35 is a context diagram 3500 of the navigator 406 of the present invention.

Referring now to FIG. 35, titled the context diagram, and FIG. 37A–37D definitions of the communications, which are shown as circles with numbers in them, are provided below:

502. Host commands & queries:

Commands given by the host to the vehicle manager. These commands could be of several types:

initiate/terminate;
supply parameters;
emergency actions; and
directives.

Queries inquire about the status of various parts of the navigator.

504. replies to host:

These are responses to the queries made by the host.

432. position data:

This is streamed information provided by the VPS.

416. Range data:

This is range data from the line laser scanner.

432. VPS control:

These are commands given to the VPS to bring it up, shut it down and switch between modes.

416. scanner control:

These are commands sent to the laser scanner to initiate motion and set follow velocity profile.

420. steering & speed commands

These are commands given to the vehicle to control steering and speed. These commands are issued at the rate of 2–5 Hz.

Referring to FIG. 5, in the preferred embodiment of the present invention, as described above, both the VPS and the navigator are located on the vehicle and communicate with the base station 188 to receive high level GPS position information and directives from a host processing system 186, discussed below. The system gathers GPS position information from the GPS satellites 200–206 at the base station and on-board the vehicle so that common-mode error can be removed and positioning accuracy enhanced.

In an alternate embodiment of the present invention, portions of the VPS and navigator may be located at the base station.

The host at the base station may tell the navigator to go from point A to point B, for instance, and may indicate one of a set of fixed routes to use. The host also handles other typical dispatching and scheduling activities, such as coordinating vehicles and equipment to maximize efficiency, avoid collisions, schedule maintenance, detect error conditions, and the like. The host also has an operations interface for a human manager.

It was found to be desirable to locate the host at the base station and the navigator on the vehicle to avoid a communications bottleneck, and a resultant degradation in performance and responsiveness. Since the host sends relatively high-level commands and simplified data to the navigator, it requires relatively little communication bandwidth. However, in situations where broad-band communication is available to the present invention, this may not be a factor.

Another factor in determining the particular location of elements of the system of the present invention, is the time-criticality of autonomous navigation. The navigation system must continually check its absolute and relative locations to avoid unacceptable inaccuracies in following a route. The required frequency of checking location increases with the speed of the vehicle, and communication speed may become a limiting factor even at a relatively moderate vehicle speed.

However, in applications where maximum vehicle speed is not a primary consideration and/or a high degree of route following accuracy is not critical, this communication factor may not be important. For example, in rapidly crossing large expanses of open, flat land, in a relatively straight path, it may not be necessary to check position as often in the journey as it would be in navigating a journey along a curvaceous mountain road.

Conceptually, the navigation aspects of the present invention can be arbitrarily divided into the following major functions:
route planning/path generation;
path tracking; and
obstacle handling.

The function of the present invention are discussed below.

B. Route Planning/Path Generation

1. Introduction

Autonomous vehicle navigation in accordance with the present invention, conceptually consists of two sub problems, path generation and path tracking, which are solved separately.

Path generation uses intermediate goals from a high level planner to generate a detailed path for the vehicle 102 to follow. There is a distinct trade-off between simplicity of representation of such plans and the ease with which they can be executed. For example, a simple scheme is to decompose a path into straight lines and circular curves. However, such paths cannot be tracked precisely simply because of discontinuities in curvature at transition points of segments that require instantaneous accelerations.

Following path generation, path tracking takes, as input, the detailed path generated and controls the vehicle 102 to follow the path as precisely as possible. It is not enough to simply follow a pre-made list of steering commands because failure to achieve the required steering motions exactly, results in steady state offset errors. The errors accumulate in the long run. Global position feedback 432 may be used to compensate for less than ideal actuators. Methods have been developed for the present invention which deviate from traditional vehicle control schemes in which a time history of position (a trajectory) is implicit in the plan specified to the vehicle 102.

These methods are appropriately labeled "path" tracking in that the steering motion is time decoupled; that is, steering motions are directly related to the geometric nature of the specified path, making speed of the vehicle 102 an independent parameter.

Referring now to FIG. 3, an autonomous vehicle 102 may be required to traverse a haul segment 320 to a dump site 322, and after dumping its load, traverse another haul segment to a service shop 324, under the direction of the host processing system 186. The host processing system 186 determines the vehicle 102's destinations, which is called "cycle planning." The determination of which routes to take to get to a desired destination must be accomplished by "route planning."

"Route planning" is the determination of which path segments to take to get to a desired destination. In general, a route can be thought of as a high-level abstraction or representation of a set of points between two defined locations. Just as one can say to a human driver "take route 95 south from Lobster, Me. to Miami, Fla.," and the driver will translate the instruction into a series of operations (which may include starting the vehicle 102, releasing the brake 4406, engaging the transmission 4610, accelerating to the posted speed limit, turning the steering wheel 4910, avoiding obstacles 4002, and so on), the autonomous navigation system of the present invention performs similarly. As used in the system of the present invention, a "route" is a sequence of contiguous "segments" between the start and end of a trip.

An autonomous vehicle 102 may begin at any position in the sequence and traverse the route in either direction. A "segment" is the "path" between "nodes." A "node" is a "posture" on a path which requires a decision. Examples of nodes are load sites 3318, dump sites 322, and intersections 326.

There are various types of segments. For instance, there are linear and circular segments. Linear segments (lines) are defined by two nodes. Circular segments (arcs) are defined by three nodes.

"Postures" are used to model parts of a route, paths and nodes for instance. Postures may consist of position, heading, curvature, maximum velocity, and other information for a given point on the path.

A "path" is a sequence of contiguous postures.

A segment is, therefore, a sequence of contiguous postures between nodes. All segments have a speed associated with them, which specifies the maximum speed with which the vehicle 102 is to traverse that segment. The navigator 406 can command slower speeds, if necessary, to meet other requirements.

Determining which postures are required to define a path segment by analytical, experimental or a combination of both, is called "path planning" in accordance with the present invention. To bring the discussion full circle, a sequence of contiguous routes, as mentioned above, is referred to as a "cycle," and a vehicle 102's work goals determine its "cycle."

Therefore, to define a route one must first define the nodes and segments. Next, the nodes and segments must be ordered. Finally the routes must be defined by specifying where in the ordered set a route is to begin, and in which direction the ordered set is to be traversed (See FIG. 22 which illustrates these concepts of the present invention).

The aforementioned method of defining routes was developed for memory efficiency in the present invention. It is also a convenient way to define many routes on a specific set of nodes and segments.

In a real world example of the present invention, picture a site where there are many intersecting roads 326. A route programmer would define nodes at the intersections, and segments to define the roads between the intersections. Routes would therefore be determined by the roads and intersections. There will however, be many ways to get from point A to point B (many routes) with a fixed set of intersections and roads.

The path-tracking method of the present invention (discussed below) uses route curvature to steer the vehicle. Methods of route definition using lines and arcs do not provide for continuous curvature. Clothoid curves are another way to define routes.

Another method of defining routes developed by the inventors, fits B-splines to the driven data. B-splines provide continuous curvature and therefore enhance tracking performances. In addition, since B-splines are free form curves, a route may be defined by a single B-spline curve. By using free form curves, a more robust method (semi-automatic) for fitting routes to data collected by driving the vehicle over the routes is produced by the present invention.

Figure 22:
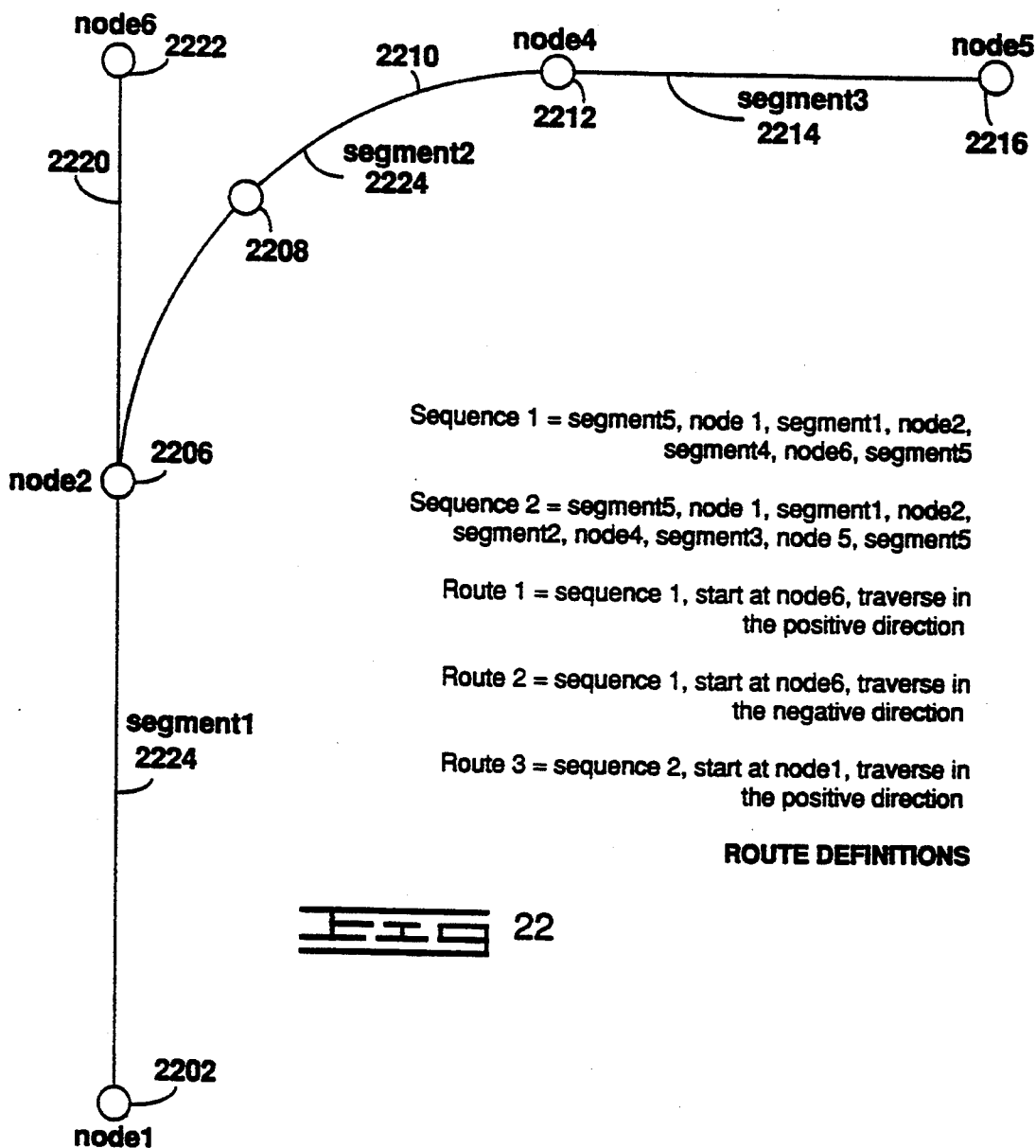
FIG. 22 is a diagram 2200 of vehicle route definitions using nodes and segments according to the present invention.

Referring to FIGS. 4 and 22, in operation, the host processing system 186 from the base station 188 commands an identified vehicle 102 to take route N from its present location. The navigator 406 functions to generate a path by translating "route 1" into a series of segments, each of which may have a "posted" or associated maximum speed limit, which together form a generated path for the vehicle to attempt to follow. By specifying routes and commanding the autonomous vehicle 102 with high-level commands this way, enormous data requirements and inefficiencies are in the present invention avoided in giving directions.

The navigator 406 stores the routes as a linked-list of path segments, rather than the set or series of sets of individual points. These segments are also abstractions of the set of points between defined locations or nodes.

A LINKER then takes given path segments and generates a linked-list of control points, allowing for flexibility and efficiency. Path segments are shared by different routes, as is shown in FIG. 22.

The path segments are stored in a memory called the TARGA 5302 as a set of arcs, lines, and postures. For instance, in one embodiment of the present invention, an analytical generator function generates paths using these arcs, lines and postures. In another embodiment of the present invention, B-splines are used as a mathematical representation of a route, as mentioned above.

In another embodiment or the present invention, "clothoid" curves are used in generating path segments. These are discussed below.

a. Clothoid Path Segments

As discussed above, part of the navigation problem addressed and solved by the present invention is really two sub-problems: path planning and path generation. These are solved separately by the present invention.

Path planning proceeds from a set of sub-goals using some path optimization function and generates an ordered sequence of "objective" points that the vehicle 102 must attain.

The challenge of path generation is to produce from the objective points (of path planning), a continuous, collision-free path 3312, smooth enough to be followed easily by the autonomous vehicle 102. For example, a simple scheme is to decompose a path 3312 into straight lines and circular curves. The path 3312 is then converted into a sequence of explicit directives provided to the vehicle 102 actuators to keep the vehicle on the desired path 3312. It should be noted that there is a distinct trade-off between simplicity of representation of such plans and the ease with which they can be executed.

The ability of an autonomous vehicle 102 to track a specified path 3312 is dependant on the characteristics of the path. Continuity of curvature and the rate of change of curvature (sharpness) of the generated path 3312 are of particular importance since these parameters dictate steering motions required of a vehicle 102 for it to stay on the desired path 3312. Discontinuities in curvature are impossible to follow since they require an infinite acceleration. For some autonomous vehicle configurations, the extent to which the sharpness of a path is linear is the extent to which steering motions are likely to keep the vehicle on the desired path 3312, since linear sharpness of a path equates to approximately constant velocity of steering.

One method used by the present invention, is to compose paths as a sequence of straight lines and circular arcs. This method suffers from discontinuities in curvature where arcs meet. Another method of the present invention, is to use polynomial splines to fit paths between objective points. Splines assure continuity in curvature, but do not make any guarantees of linearity in sharpness.

Inability to track the requisite curvature results in steady state offset errors from the desired path 3312. These errors can be compensated for by closing a feedback loop on position 3314. This is sufficient in those scenarios where the response of the actuators is fast enough to guarantee negligible tracking errors and position sensing is accurate, such as on a factory floor. However, path tracking is simpler if the path is intrinsically easier to track.

The method of the present invention generates explicit paths that pass through a sequence of objective points. A derivative method of the present invention replans parts of the path dynamically in case the tracking error becomes large or the desired path is changed.

Modeling A Vehicle Path

Any path can be parameterized as a function of path length (s) by position coordinates (x(s), y(s)) 3304. That is, position coordinates x and y can be written as explicit functions of the path length s. Heading (O(s)) 3318 and curvature (c(s)) 3316 can be derived:

$$O(s) = \frac{dy(s)}{dx(s)} \tag{EQ. 1}$$

$$c(s) = \frac{dO(s)}{ds} \tag{EQ. 2}$$

The quadruple of these parameters, p=(x,y,O,c), is a posture 3314 that describes the state of an autonomous vehicle 102 at any point in time.

c. Clothoid Curves

Figure 26:
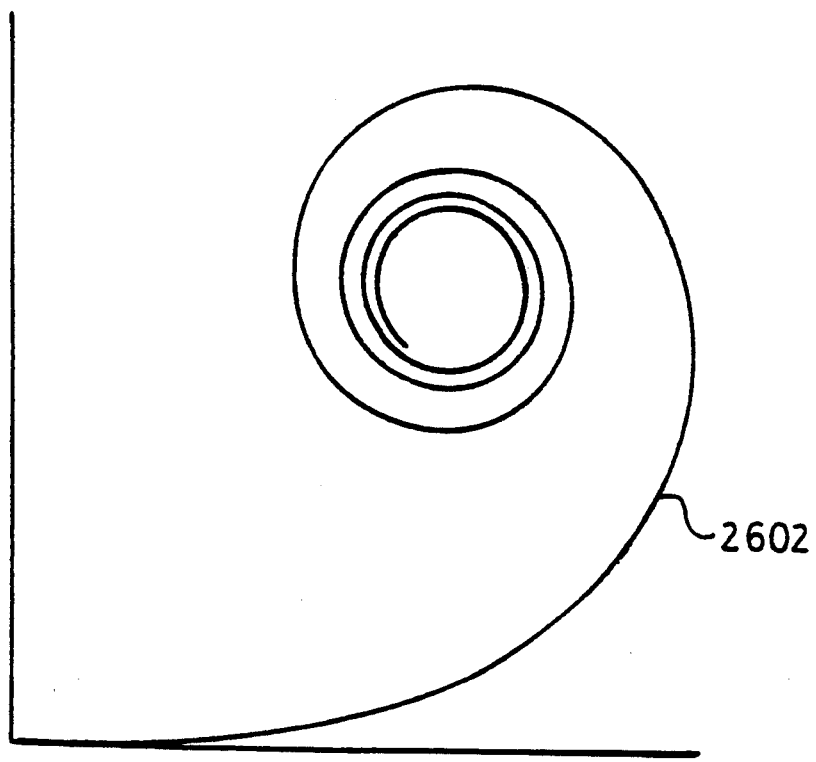
FIG. 26 is a graphical illustration 2600 of a clothoid curve.

Clothoid curves are used in an embodiment of the present invention. They are a family of curves that are posture-continuous, and are distinct in that their curvature varies linearly with the length of the curve:

$$c(s) = ks + C_i \tag{EQ 3}$$

where k is the rate of change of curvature (sharpness) of the curve and subscript i denotes the initial state. A clothoid curve segment 2002 is shown in FIG. 26.

Given an initial posture, sharpness of the clothoid segment and the distance along that segment, position, orientation and curvature at any point are calculated as follows:

$$\Theta(s) = \Theta_i + \int_0^s c(\xi)d\xi = \frac{k}{2}s^2 + c_i s + \Theta_i \tag{EQ. 4}$$

$$x(s) = x_i + \int_0^s \cos\Theta(\xi)d\xi = \tag{EQ. 5}$$

$$\int_0^s \cos\left(\frac{k}{2}\xi^2 + c_i\xi + \Theta_i\right)d\xi + x_i$$

-continued $$y(s) = y_i + \int_o^s \sin\Theta(\xi)d\xi = \quad \text{(EQ. 6)}$$

$$\int_o^s \cos\left\{\frac{k}{2}\xi^2 + c_i\xi + \Theta_i\right\}d\xi + y_i$$

d. Generation of a Posture-Continuous Path

Practical navigation problems require composite paths whose range and complexity cannot be satisfied by a single clothoid segment. Most paths require multiple segments that pass through a sequence of objective points.

(1) Existing Methods

An article by Hongo et al. entitled, "An Automatic Guidance System of a Self-Controlled Vehicle— The Command System and Control Algorithm", *Proceedings IECON.* 1985, MIT Press, 1985, proposed a method to generate continuous paths composed of connected straight lines and circular arcs from a sequence of objective points. While paths comprised solely of arcs and straight lines are easy to compute, such a scheme leaves discontinuities at the transitions of the segments as discussed above.

An article by Kanayama et al. entitled, "Trajectory Generation for Mobile Robots", *Robotics Research: The Third International Symposium, ISIR,* Gouvieux, France, 1986, makes use of paired clothoid curves with straight line transitions between postures. The constraint of straight line transitions is due to the integrals in Eqs. (7) and (8) which do not have closed form solutions. Kanayama simplified this problem by requiring $c_i=0$. Also, by rotating the reference frame by the amount of the initial orientation, $0_i=0$; only a straight forward approximation of $$\int_s^o \sin(k\xi^2)d\xi$$

is left.

Kanayama's method leads to paths that are sharper at some points and less compact than necessary, with adverse consequences to control. In addition, the requirement for straight-line transitions precludes the local replanning of paths because there are no guarantees that a segment to be replanned will include an uncurved section.

2. Path Generation From a Sequence of Points

A two-step method of the present invention, to generate a unique posture-continuous path from a sequence of points is now described.

Figure 23:
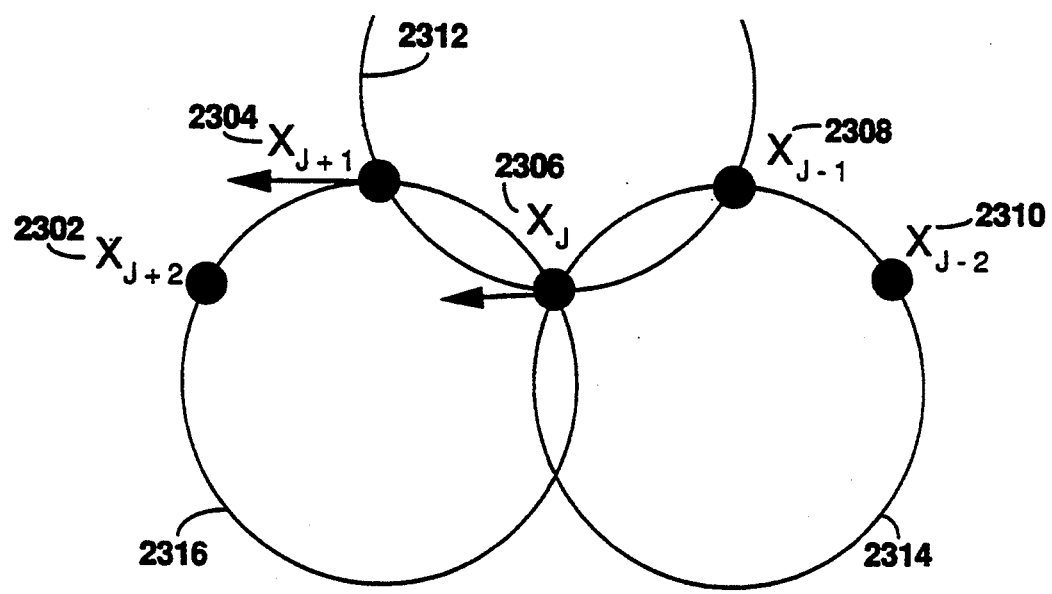
FIG. 23 is a diagrammatical representation of how postures and associated circles are obtained from objective points.

Referring now to FIGS. 23, 24 and 25), the first step is to derive a sequence of unique postures 2302, 2304, 2306, 2308, 2310 from the objective points. The second step is to interpolate between those postures with clothoid segments. Heading and curvature at the starting and ending positions 2402, 2404 are presumed. Let $P_i$, $P_f$ be the starting and ending postures 2402, 2404, respectively.

It is not always possible to connect two postures with one clothoid curve segment because four equations EQ.2, EQ.4, EQ.5, and EQ.6 cannot be satisfied simultaneously with only two parameters (sharpness k and length s) of a clothoid curve.

In order to satisfy the four equations EQ.2, EQ.4, EQ.5, and EQ.6, one needs at least two clothoid curve segments. However, the general problem cannot be solved with two clothoid segments because if $k_i$ and $k_f$ have the same sign, in most cases a third segment is required in between. One adequate set of the clothoids connecting a pair of neighboring associated postures is the set of three clothoid segments $(k,s_1), (-k,s_2), (k,s_3)$. The subscripts denote the order of the clothoid segments from $P_i$. This combination is plausible for the following reasons:

1. The signs of k for the first and the last clothoid segments are the same.
2. k for the second clothoid segment is equal in magnitude and opposite in sign to that of the first and last segments. This enables the curve of three clothoid segments to satisfy the curvature variation between the starting and the ending curvatures by varying $s_1, s_2, s_3$, even though the sign of the first and the last clothoid segments satisfies the curve location requirement.
3. There are four variables in the combination: k, $s_1$, $s_2$, $s_3$. It is possible to find a unique solution satisfying the following four equations which describe the mathematical relationship between the starting and the ending postures.

$$c_f = c_i + k(s_1 - s_2 + s_3) \quad \text{(EQ. 7)}$$

$$\Theta_f = \Theta_i + c_i(s_1 + s_2 + s_3) + k(s_1s_2 - s_2s_3 + s_3s_1) + \quad \text{(EQ. 8)}$$
$$\frac{k}{2}(s_1^2 - s_2^2 + s_3^2)$$

$$x_f = x_i + \int_o^s \cos\Theta_1(\xi)d\xi + \int_o^s \cos\Theta_2(\xi)d\xi + \quad \text{(EQ. 9)}$$
$$\int_o^s \cos\Theta_3(\xi)d\xi$$

$$y_f = y_i + \int_o^s \sin\Theta_1(\xi)d\xi + \int_o^s \sin\Theta_2(\xi)d\xi + \quad \text{(EQ. 10)}$$
$$\int_o^s \sin\Theta_3(\xi)d\xi$$

where $$\Theta_1(\xi) = \Theta_i + c_i\xi + \frac{k}{2}\xi_1^2$$

$$\Theta_2(\xi) = \Theta_i + c_is_1 + \frac{k}{2}s_1^2 + (c_i + ks_i)\xi - \frac{k}{2}\xi^2$$

$$\Theta_3(\xi) = \Theta_i + c_i(s_1 + s_2) + k(s_1s_2) + \frac{k}{2}(s_1^2 - s_2^2) +$$
$$\{c_i + k(s_1 - s_2)\}\xi + \frac{k}{2}\xi^2$$

Figure 27:
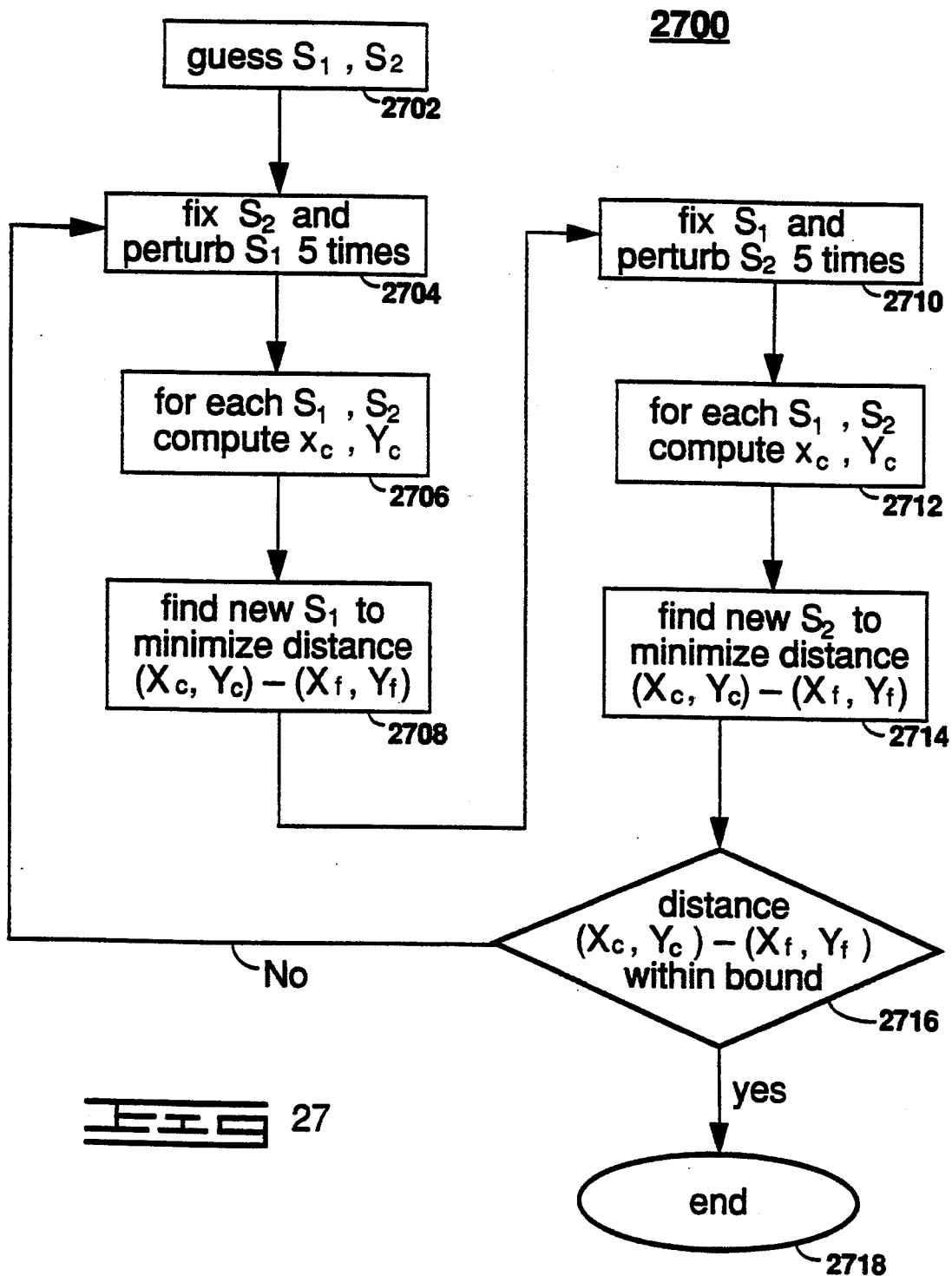
FIG. 27 is a flowchart 2700 of a numerical method for calculating approximate Fresnel integrals.

Referring now to the method shown in FIG. 27. Since equations 9 and 10 above contain Fresnel integrals, for which there is no closed form solution, the values of k,s1,s2,and s3 are computed.

Paths resulting from the method have the following advantages over other methods:

The method proceeds from an arbitrary sequence of points. Generation of postures is essential to exploratory planning where goals are commonly posed as an evolving string of points. Paths generated by the method pass through all the objective points whereas paths from Kanayama's method and the arc method are only proximate to many of the points because these methods start from a sequence of postures.

The method guarantees continuity of position, heading and curvature along the path. Further, sharpness is piecewise constant.

Paths generated by the method always sweep outside the acute angles formed by straight line connection of the way points. The resulting paths are especially useful for interpolating around obstacles that are commonly on the inside of angles. In contrast, Kanayama's paths are always inside the angles.

3. Clothoid Replanning Paths

Clothoid replanning is done either to acquire the path initially, or to guide the vehicle 102 back to the desired path 3312 through normal navigation according to the present invention.

To avoid abrupt accelerations in an attempt to make gross corrections in tracking a pre-specified path, a path replanner is used by the present invention to generate a new path which converges smoothly to the desired path 3312 from the current position. Replanning decomposes to two sub problems:

1. Determining the point of convergence to the intended path 3308.
2. Planning a path from the current position 3302 to the convergent point 3308.

Figure 28:
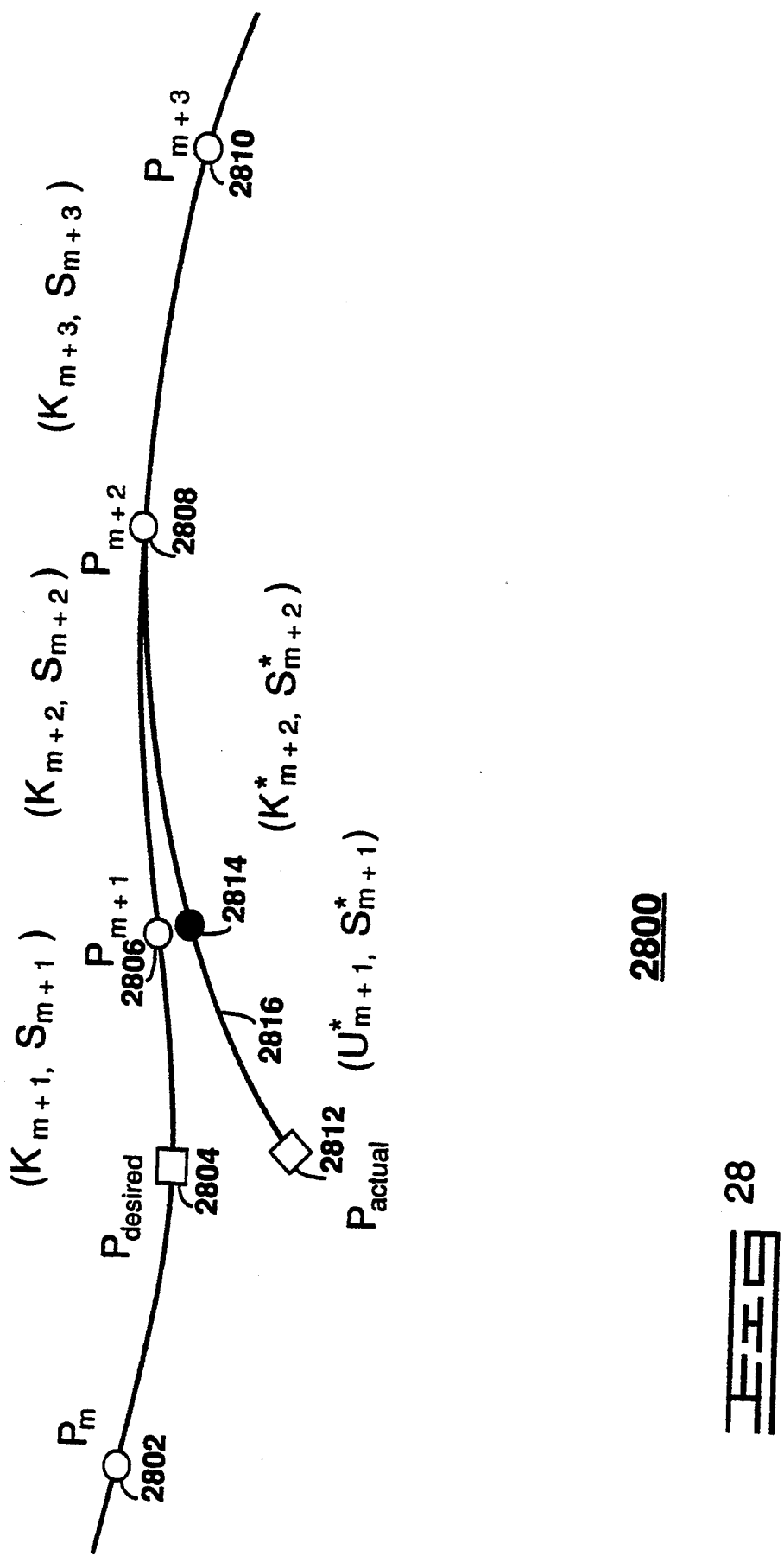
FIG. 28 is a diagram 2800 showing the replanning of a path.

Reference is made to FIG. 28, which graphically illustrates replanning a path in accordance with the present invention. A pre-specified path consists of interpolations 2804 between postures $(k,s)_m$ (m=1, ..., n) 2804–2810 and the postures $P_m$ (located at the end of segment $(k,s)_m$). Assuming that the vehicle 102 deviates from the path between $P_m$ and $P_{m+1}$, then $P_{m+2}$ is chosen as the posture 334 to which the replanned path 2816 converges. The distance to $P_{m+2}$ is variable.

A curve composed of two curve segments is fitted to the postures (the current posture and the one chosen as a convergence posture) to obtain a replanned path 2816, satisfying four governing posture equations EQ.7, EQ.8, EQ.9, EQ.10. If we assume that the threshold that determines whether a path is to be replanned or not is much smaller than the length of each clothoid curve segment $(k,s)_m$, we can find a new posture-continuous path $((k^*_k+1, s_k+1), (K^*_k+2, s^*_k+2))$ using a small perturbation from known $((k_k+1, s_k+1), (k_k+2, s_k+2))$. Since the replanned path 2816 is not likely to be very far from the original path 3312, two clothoid segments can be used.

4. Summary

In accordance with the present invention, generation of continuous paths for autonomous vehicle 102 can use clothoid segments to generate paths not only because the resulting path is posture continuous but also because linear curvature along the curve leads to steering angles that vary approximately linearly along the path, facilitating path tracking.

The approach of the present invention is as follows: first, a sequence of the postures is obtained using the objective points. Then, each of the adjacent postures is connected with three clothoid curve segments.

The present method accrues additional advantages in that preprocessing of the objective points is not necessary as with arcs and zero curvature clothoids. Further, the geometry of the paths generated always sweeps outside the acute angles formed by straight line connection of the way points. These are especially useful for interpolating around obstacles that are commonly on the inside of angles.

From the set of stored arcs, lines and postures, clothoid curves, B-splines, and so on, points along a path are generated with the VPS posture block.

Advantages of the present invention's handling routes in this way, besides reducing the bandwidth requirements between the host and the vehicle, effects data compression reducing data storage requirements, and functions to smooth-out paths.

5. B-splines

B-splines are well known by mathematicians and those familiar with computer graphics (see "Mathematical Elements for Computer Graphics," by David F. Rogers and J. Alan Adams, McGraw-Hill Book Company, New York, N.Y., pages 144 to 155) as a means of describing the shape of a series of points by specifying the coefficients of a polynomial equation. This curve fit function is an Nth order polynomial, where N is user specified and depends on the desired shape of the curve. The B-spline curve can be of any order and are continuous to the order of the curve fit function minus one.

B-splines are used in an embodiment of the present invention. B-splines lend themselves well to path generation in the present invention because an arbitrarily long path can be described by a low number of coefficients, thus reducing the amount of data storage. Provided that the order of the curve fit function is high enough (three or larger), then the generated path will be smooth in curvature, resulting in a path which is inherently easy to track with the aforementioned embodiments of the present invention.

Figure 29:
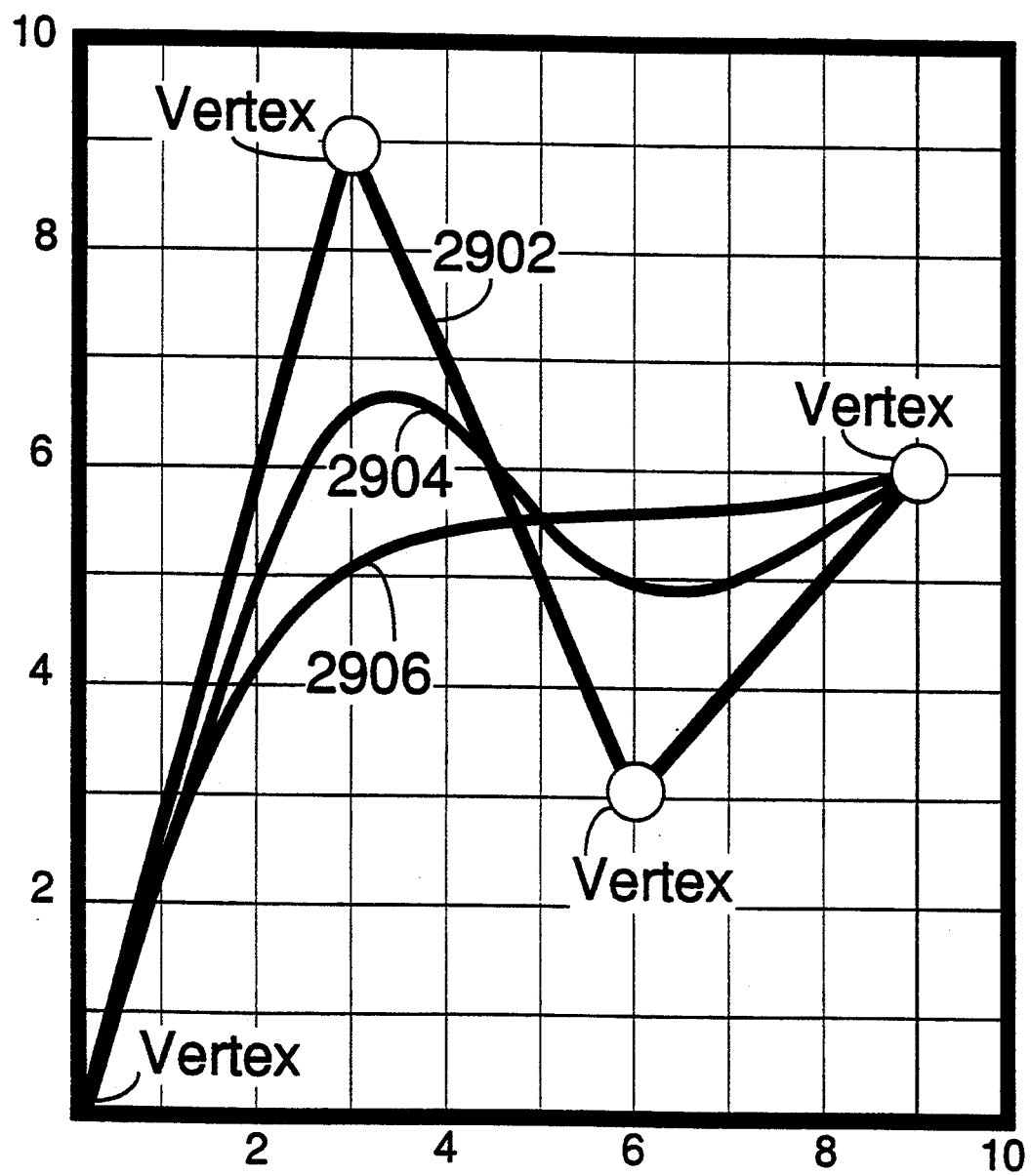
FIG. 29 is a graph 2900 of B-spline curves of second, third, and fourth order.

FIGS. 29 shows an example of B-spline curves.

2. Route Creation and Storage a. Introduction

In one embodiment of the present invention, in order to create routes for a site 300, data is first collected from the VPS 1000 and stored while a human drives the vehicle 102 over the road system of the work site 300. Nodes and segments are then fitted to the stored driven data, and organized into routes per the aforementioned procedure.

An application on an APOLLO Computer (now HEWLETT-PACKARD of Palo Alto, Calif.) work station (a graphics display system, not shown) was developed to graphically fit route data to the stored driven data and to further define routes (that is, speeds, sequences, starting point, traversal direction). Any graphics work stations equivalent to the APOLLO could be used.

Once the routes for a site are defined, the route data is written to a permanent storage device. In one embodiment of the present invention, the storage device used is a bubble memory cartridge 5302 with an associated reader/writer. The bubble memory device 5302 is durable and retains the data when power is disconnected. The APOLLO application is capable of writing data to a cartridge 5302 and reading data from a cartridge 5302.

As implied above, routes in the present invention may be predefined, or they may be generated dynamically.

In mining applications, generally a site 300 is surveyed and roads are pre-planned, carefully laid out and built. The routes used by the navigation system may then either be obtained from a manually created computer data base (created specifically to be used by the navigation system), or alternately, a vehicle may be physically driven over the actual routes on site to learn the routes as described above. In the learning method, several trips over a given route may be made. Then the variations in the data (due for instance to driver weaving) are averaged, and a smoothed-out best fit developed.

b. Route Definition

In one embodiment of the present invention, the following method is used for route definition.

Define the nodes and segments upon which the routes will be built. Place the node and segment data into an array called the "routeData" array. Each record in the array contains the following information:

1. Type of item (that is, node, linear segment, circular segment, end of route marker)
2. If node item, define the north and east coordinates of the node.
   else if linear segment item, define the speed along the segment.
   else if circular segment item, define the north and east coordinates of the center, the radius, the direction the circle is traversed (that is, clockwise, or counterclockwise), and the speed along the segment.
   else if end of route marker, there is no other information.
3. Link the node and segment data together into sequences. The sequences are simply an array of indexes into the routeData array. Each sequence must begin with an end of route marker, followed by a node, then the remainder of the sequence alternate between segments and nodes until the sequence is terminated by another end of route marker. An example sequence would be,
   1, 6, 3, 4, 7, 9, 10, 23, 78, 1
   where the integers are indexes into the routeData array.
4. Finally define a route by specifying an index into the sequence array and whether to index through the sequence in the positive or negative direction. Place the index and index direction into an array called the "routeSpec" array. An item in the route spec array may look like the following:
   6, 1: This specification defines a route which begins at node 6 and is indexed in the positive direction.
   78, −1: This specification defines a route which begins at node 78 and is indexed in the negative direction.

A user simply tells the vehicle which item in the routeSpec array to use as a route.

4. The aforementioned data is stored onto the storage device in the order which it was defined in steps 1-3.

c. Navigator Route Usage

The following describes how the navigator 406 uses the defined routes from the above method of the present invention.

When the navigator 406 is powered on it reads the route information from the storage device 5302 and stores it in RAM in the syntax already presented.

Next the operator specifies a route for the vehicle 102 to follow. Again, the route is simply an index into the routeSpec array.

When the navigator 406 decides that all systems are ready for auto-operation, it sends a message to the vps_posture task 5324 telling it to engage.

The vps_posture task 5324 then determines the position, along the route which is closest to the vehicle 102's present position 2812. The search for the closest position 284 on the route proceeds as follows:

1. A pointer is set to the first segment in the route.
2. The perpendicular distance from the vehicle position to the segment is determined.
3. The pointer is moved to the next segment in the route.
4. The perpendicular distance from the vehicle position to the next segment is determined.
5. Repeat steps 3 and 4 until the end of route marker 2218 is reached.
6. Determine the distance from the vehicle position to the end points 2218 of the route.
7. Set a pointer to the route segment which had the closest distance and store the coordinates of the closest distance.

The vps_posture task 5324 then uses the description of the route (lines, arcs and speeds) to generate posture at one meter intervals. The task 5324 generates a predefined distance of postures plus a safety margin and puts the postures into a buffer 3000. To generate a posture which is one meter from a given posture the vps_posture task 5324 uses the following procedure:

1. Determine the type of segment from which the given posture was generated.
2. Use the proper formula for the type of segment to determine the change in north and east per meter of segment length.
3. Add the change in north and east per meter to the last given posture.
4. If the generated posture is beyond the end of the current segment, set a pointer to the next segment and repeat steps 2 and 3.
   else, return the generated posture.

The vps-posture task 5324 then informs the executive 5316 that it is ready for tracking.

Figure 30:
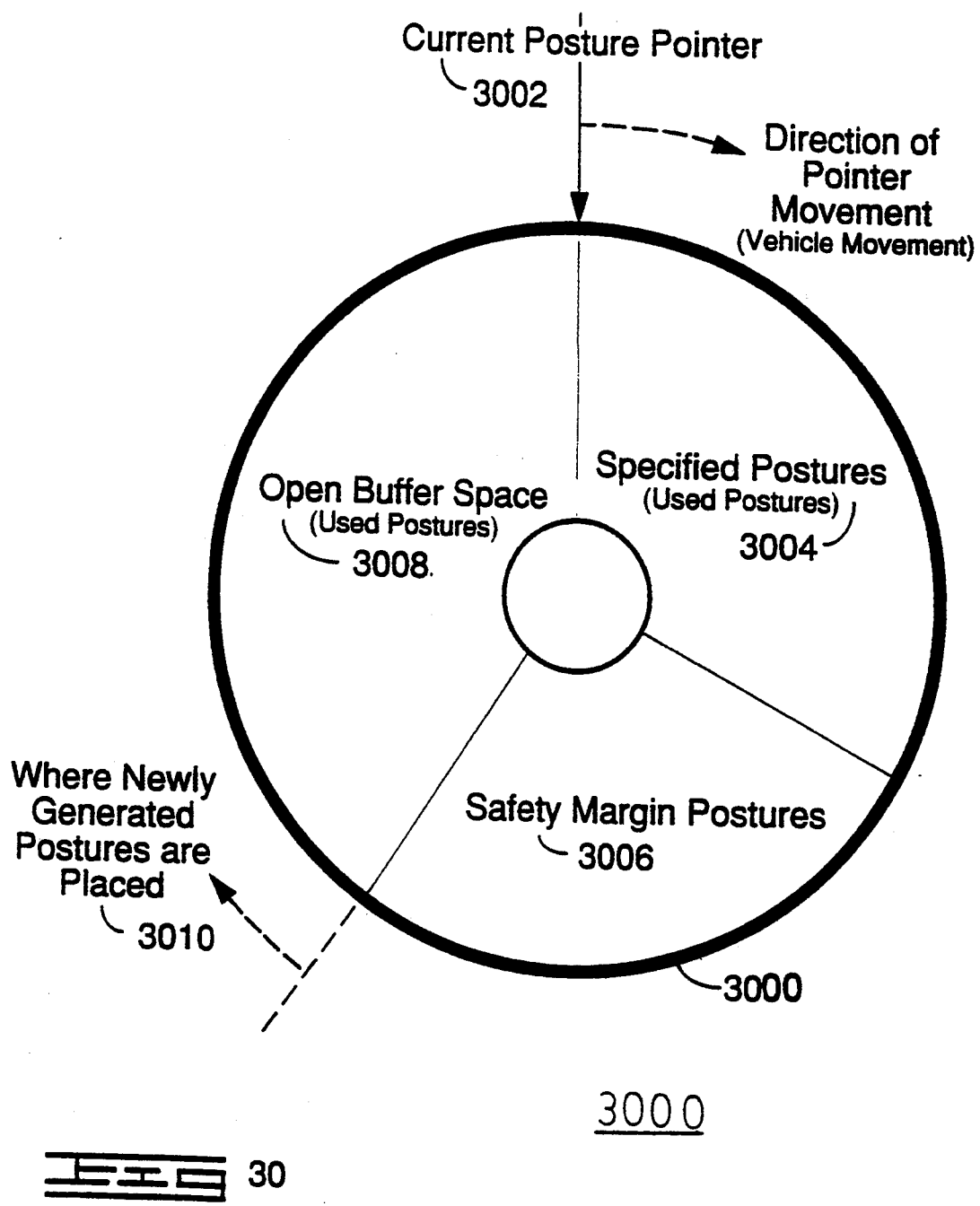
FIG. 30 is a diagram 3000 of an embodiment of the posture ring buffer of the present invention.

As the autonomous vehicle 102 moves along the posture in the buffer 3000, the safety margin 3006 is depleted. When the safety margin is below a specified amount, the vps_posture task 5324 generates another safety margin 3006 of postures and appends them to the current buffer 3000. The vps_posture task 5324 depletes the posture buffer 3000 by monitoring the current position 2812 of the vehicle 102 and moving a pointer 3002 in the buffer 3000 to the nearest posture. The posture buffer 3000 is constructed as a ring which is traversed in the clockwise direction (see FIG. 30, Posture Ring Buffer). That is, postures are placed in the ring such that the direction of vehicle travel corresponds to a clockwise traversal of the posture ring buffer 3000. Therefore, as the vehicle 102 moves the pointer 3002 to the nearest posture in the buffer 3000 will be moved in the clockwise direction. When the pointer 3002 will be moved in the clockwise direction, memory in the ring behind posture (counterclockwise of the pointer) is free to be over written.

Step 7 (in the search routine above) is registered until the end of route marker 2218 is reset at which time the vps_posture task 5324 ceases to generate posture and informs the executive 5316 that it has reached the end of the route.

As mentioned above, a path is as a series or sequence of contiguous "postures." A posture includes the speed and steering angle required to be on track. A posture may include latitude, longitude, heading, curvature (1/turning radius), maximum velocity and distance to next posture information.

3. Posture Generation

The tracking method of the present invention, requires certain information about the route it is tracking. The information is contained in a packet called a "posture" 3314. A single posture 3314 may contain position (that is, north and east coordinates), heading, and curvature data, for a specified location on the route. Therefore, a way of producing posture data from the route specification is required in accordance with the present invention.

Among the navigator tasks, (discussed below) is a task which reads the route information and produces postures at intervals (one meter for instance) along the route which are used by the tracking method. In one embodiment of the present invention, each posture requires 36 bytes of memory which translates to about 36 k of memory for each kilometer of route. To reduce the memory requirements, the navigator buffers posture data.

The task which produces the postures reads the current position of the vehicle 102, finds the nearest point on the route to the current position, then generates a specified number of postures ahead of the vehicle 102. The number of postures generated is dependent on the maximum stopping distance of the vehicle 102. That is, there should always be enough postures in the buffer 3000 to guide the vehicle 102 to a stopping point.

In the B-spline approach to route definition according to the present invention however, the need for a posture buffer is eliminated, since the tracking method is able to directly produce posture information from the B-spline curve.

C. Path Tracking

1. Introduction

Path tracking or following is a critical aspect of vehicle navigation according to the present invention. The technique of the present invention uses position based navigation (rather than vision based navigation used in conventional navigation systems) to ensure that the correct autonomous vehicle path 3312 is followed. The present invention is also innovative in that it provides for separate control of steering angle 3116 and vehicle speed 3118. FIG. 36 graphically illustrates the path tracking system 3102 of the present invention.

For an autonomous vehicle 102 according to the present invention to track specified paths, it is necessary to generate referenced inputs for the vehicle servo-controllers. Thus, path tracking can be considered as a problem of obtaining a referenced steering angle and a reference speed for the next time interval in order to get back to the referenced path ahead from the current deviated position.

In general terms, path tracking is determining the autonomous vehicle con, hands (speed, steer angle) required to follow a given path. Given a pre-specified steering angle, driven wheel velocity values and error components, the command steering and driving inputs are computed in the present invention.

2. Considerations a. Global Position Feedback

The path to be tracked is specified in Cartesian coordinates. If the control scheme consists of only a servo-control to reference steering commands, vehicle position and heading errors accumulate. Position and heading result from integrating the whole history of steering and driving. Thus, it is necessary to feedback vehicle position 3304 and heading 3318 in Cartesian space.

Consequently, referenced inputs to the servo-controllers are generated in real time, based on positioned feedback 3114 (as shown in FIG. 36).

b. Separate Steering and Driving Control

Steering and driving reference inputs are computed in the present invention, from the given path and vehicle speed, respectively. This enables easy integration of path tracking with other modules of the present invention, such as collision avoidance.

3. Embodiments a. Tracking Control Structure (FIG. 31)

One of the challenges of vehicle autonomy is to determine the steering inputs required to track a specified path. For conventionally steered vehicles, in the present invention the desired path and the desired speed along the path can be tracked separately, reducing the problem to one of controlling the steering. (A path, for this discussion, being a geometric curve independent of time in contrast to a trajectory, which is a time history of positions.)

Steering angles are planned from the desired path 3312 and sensed vehicle positions. These angles are commanded to the vehicle via a steering controller 3104.

Figure 31:
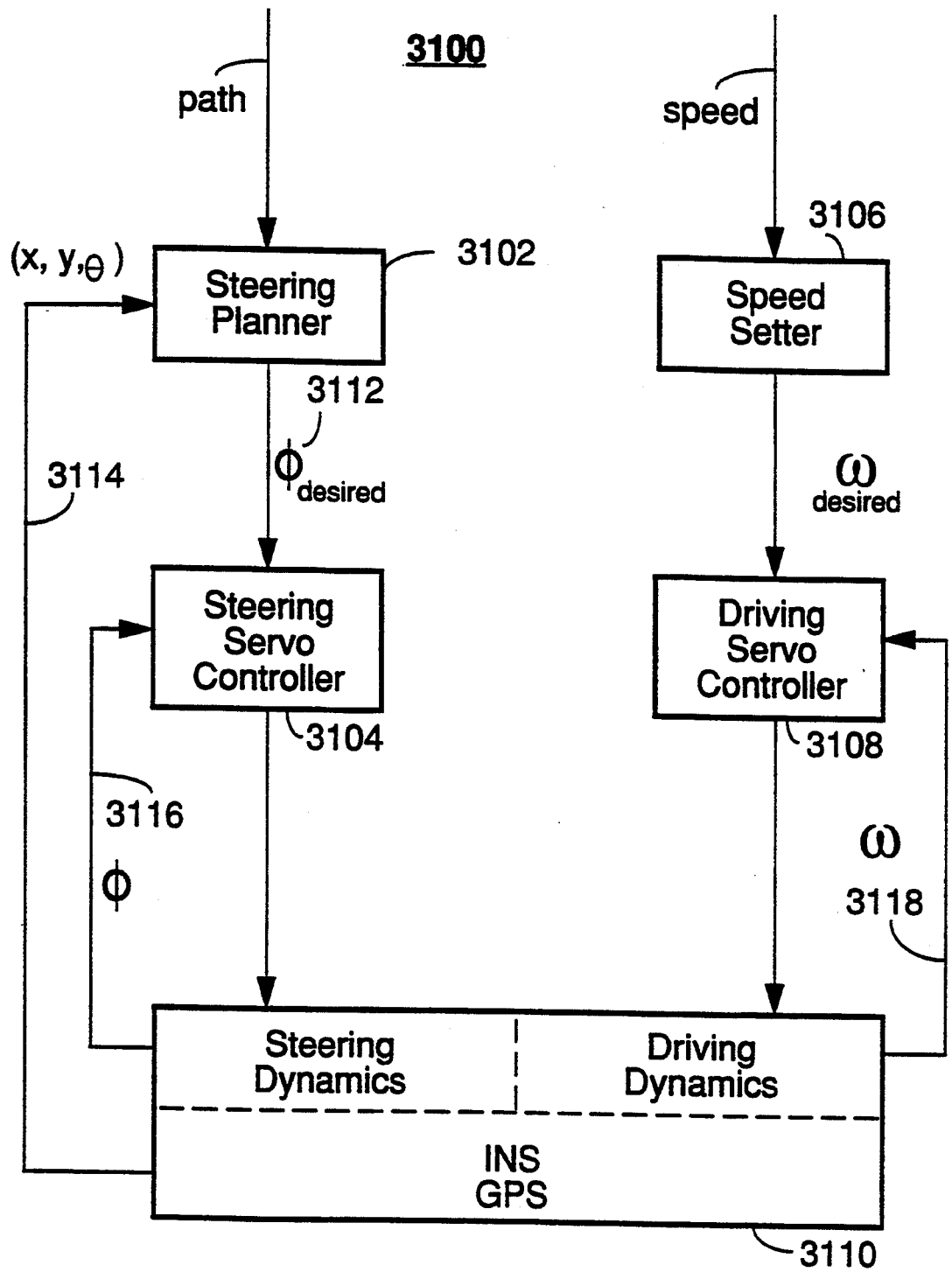
FIG. 31 is a high level block diagram 3100 of a path tracking control architecture/hardware of the preferred embodiment the present invention.
Figure 32:
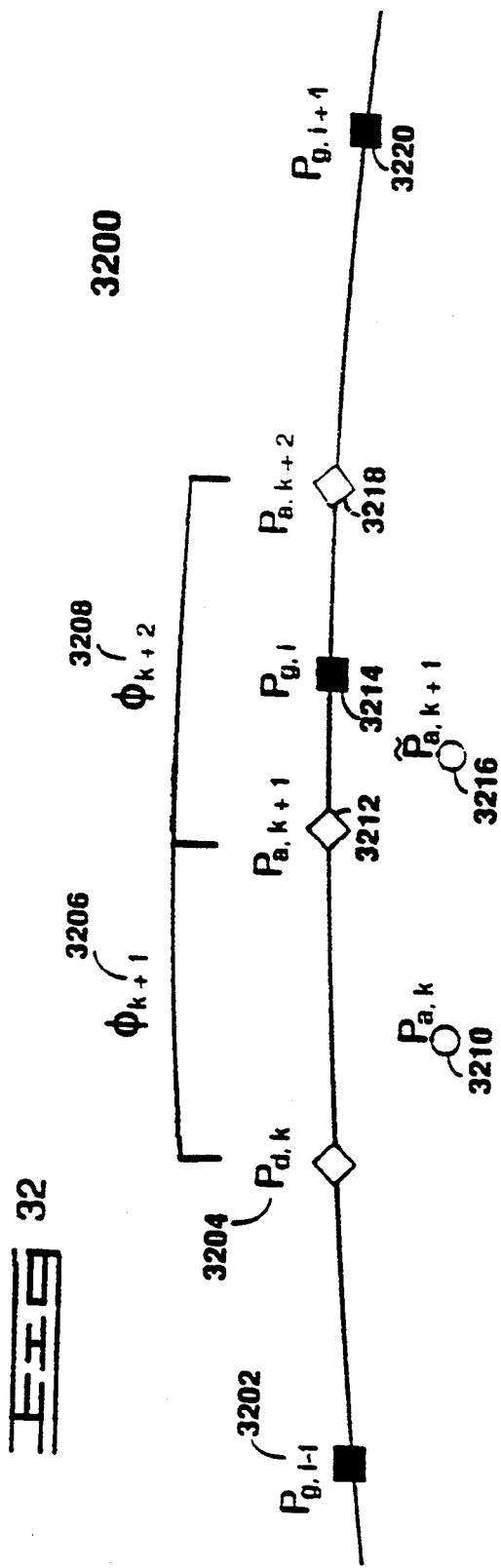
FIG. 32 is a diagram 3200 showing relevant postures in steering planning cycle.

The functional block diagram in FIG. 31, shows a tracking control structure according to the present invention.

In kinematic steering schemes, errors in position, heading and curvature are reduced based on the geometry of the errors without consideration of actuator saturation, compliance, any friction or mass terms. Tuning values, such as look-ahead distance and selection of curvature on the path, are selected through empirical trials and simulations in order to get good performance.

In a manually driven vehicle, the look-ahead distance is the distance 3310 in front of a vehicle that a driver looks during driving. The look-ahead distance in the present invention, is the distance by which the errors in position, heading and curvature are planned to be reduced to zero. It varies with the speed of the conventional or autonomous vehicle.

Varying the look-ahead distance varies the degree to which steering adjustments must be made to effect a change of course. Look-ahead distance is discussed in more detail in a following section.

However, real vehicles depart from kinematic idealization, and their control response departs accordingly. As vehicle speed, mass and path conditions change, actual vehicle response departs even further from kinematic idealization. Hence, kinematic idealization is generally valid only at low speeds with constant conditions.

An embodiment of the present invention uses a model which includes considerations of cornering stiffness, mass and slip angle. The control problem is formulated as a linear quadratic optimal tracking problem where the errors in position, heading and curvature are minimized based on the vehicle control model.

The optimal path and controls are computed from the desired path 3312 and the currently sensed vehicle position using the current errors as initial conditions to the optimal control problem. A few computed steering angles along the initial part of the optimal path are used as references to the low level steering controller for the next sensing time interval.

This preview optimal steering planning has the advantage of guaranteeing stability and optimality with respect to the given performance index. The optimal preview control method of the present invention is central to the steering planning of an autonomous vehicle.

Turning again to FIG. 31, the inner loop 3116 of steering control 3104 is executed on the order of 10 milliseconds, while the outer loop 3114 is closed at the rate of 0.25–0.5 second.

The following procedure is used to close the loop on position. After sensing the current position $(P_{a,k})$ 3210, the posture at the end of the current time interval $(P_{a,k+1})$ 3216 is expected.

Then, the desired posture at the end of the next time interval $(P_{d,k+2})$ 3218 is computed in a referenced steering angle between $(P_{a,k+1})$ 3216 and $(P_{d,k+2})$ 3218 are determined.

Significantly, as mentioned above, these vehicle and path techniques of the present invention, decouple steering control from velocity control at the vehicle.

b. Quintic Method

Shown in the navigator task diagram, FIG. 53, which is discussed in more detail below, is a functional block called the tracker 5306. The tracker 5306 operates to construct a smooth path back to the desired or correct path. In one embodiment of the present invention, as mentioned above, a quintic method is used. This involves a fifth order curve in error space for steering commands.

The quintic polynomial method of the present invention replans a simple, continuous path that converges to a desired path in some look-ahead distance 3310 and computes a steering angle corresponding to the part of the replanned path 2816 to be followed for the next time interval.

If the desired path is considered as a continuous function of position and the vehicle is currently at Pa 3320, an error vector can be calculated (FIG. 33) that represents error in the distance transverse to the path (e0) 3322 relative to Po 3304, in heading (Bo) 3322, and in curvature (yo) 3404. If the vehicle is to be brought back onto the specified path within distance L 3310 (measured along the reference path), six boundary conditions can be stated corresponding to the initial errors and to zero errors at PL.

$$\epsilon(P_o) = \epsilon_o;$$
$$\epsilon(P_L) = 0$$
$$\beta(P_o) = \beta_o;$$
$$\beta(P_L) = 0$$
$$\gamma(P_o) = \gamma_o;$$
$$\gamma(P_L) = 0$$
(EQ. 11)

A quintic polynomial can be constructed to describe the replanned path (in error space) as follows:

$$\epsilon(s) = a_0 + a_1 s + a_2 s^2 + a_3 s^3 + a_4 s^4 + a_5 s^5 \quad \text{(EQ. 12)}$$

where s is in the set of [0,L]

The expression for e(s) gives the error along the replanned path 2816 from Po 3304 to PL 3308. The second derivative describes path curvature, which can in turn, be used to calculate a steering command to guide the vehicle back to the desired path 3312. Variation in the steering angle 3116 from the replanned path 2816 (or in error space) is computed from the second derivative of error function e(s). Then, curvature along the new path can be computed as:

$$c_{new}(s) = c_{old}(s) + \frac{d^2\epsilon(s)}{ds^2} \quad \text{(EQ. 13)}$$

The reference steering angle 3112 along the new path can be converted from curvature. Since this procedure is executed at every planning interval, the entire new path back to the reference path 3312 is not required. Only the steering angle 3112 for the next time interval is computed from the curvature at the point on the new path that can be achieved in the next time interval.

The look-ahead distance, L 3310, is a parameter that can be used to adjust how rapidly the vehicle steers to converge to the desired path. Additionally, better performance is obtained if L 3310 is chosen proportional to the vehicle speed because for small values of L 3310, the vehicle oscillates around the path 3312, while for large values of L 3310 the variation introduced by the quintic polynomial is small enough that the tracking performance is poor.

Since there are six boundary conditions used: $e_{p0}$—error in position at the current position (distance) and $e_{pl}$ (look-ahead), $e_{h0}$—error in heading and $e_{hl}$ (look-ahead), and $e_{c0}$—error in curvature and $e_{cl}$(look-ahead), a fifth order curve is required. This is used to generate a steering angle 3112.

Recall that path tracking schemes in general, perform better when the path specified is intrinsically easier to track. This is especially the case when the steering actuators are slow compared to the speed of the vehicle.

Other vehicle characteristics, like steering response, steering backlash, vehicle speed, sampling, and planning time intervals significantly affect vehicle performance. As expected, at higher vehicle speeds, faster and more accurate actuators are necessary, if sensing and planning time intervals are kept constant.

An advantage of the quintic polynomial method in general, is that it is simple, and reference steering angles can be computed very easily. However, since there is no consideration of vehicle characteristics (mass, inertia, time delays, vehicle ground interaction, and so on) in the control scheme, stability and convergence are not guaranteed.

The parameter L 3310 (look-ahead distance) can be adjusted to modify response to the vehicle, and the value of L 3310 can be chosen based on trial and error. This scheme has provided good results at speeds up to approximately 28 Km per hour at the time this application disclosure was prepared.

The method used by the tracker of the present invention is:

(1) estimate the next position by either averaging or evaluating the states of position;
(2) compensate for delays using either of the estimating methods
(3) dynamic look-ahead changes at different speeds—the coefficients of the quintic: look-ahead distance.

c. Latency and Slow System Response

An additional path tracking embodiment of the present invention uses various compensation techniques to improve vehicle response characteristics. This is used in conjunction with the quintic polynomial method to realize improved tracking performance.

Some vehicle response characteristics include latency of vehicle control commands, slow system response, and vehicle dynamic characteristics including vehicle-ground interaction (VGI), (slip angle and under/over steer).

The latency of vehicle commands was compensated in one embodiment of the present invention, by modifying the vehicle control hardware to reduce time delays, and by utilizing a method which sets control commands far enough in advance to compensate for the existing delays.

Decreasing the time lag between when the vehicle position is sensed and when the command is issued reduces prediction errors, which reduction is required to plan steering angles, and results in better tracking performance.

A varying look-ahead distance with speed also improves the tracking performance in comparison to the constant look-ahead distance.

A tracking method outputs steering and speed commands over a serial link to a vehicle control system. The vehicle control system is a multiprocessor, multi-tasking system, relying on a mailbox queue for communication between tasks.

This mailbox queue is composed of two types of queues, a high performance queue and an overflow queue. During high data flow rates from the tracking task, the high performance queues spill into the overflow queue, degrading the performance of intertask communication. This can result in total latency times between the tracking task and actual steering actuator commands which are on the order of seconds.

The steering dynamics may be modeled as a first order lag system. It takes a period equivalent to one time constant for a first order lag response to reach approximately 63% of the desired final value. As can be appreciated, for slow systems with large time constants, the response time can be significant.

To resolve the latency and response problems, hardware may be adjusted to be used in close conjunction with the tracking method to control vehicle steering, and a new control scheme devised to compensate for pure time delay and poor response.

The hardware may be adjusted, for example, to reside on the same back plane as the processor which executes the tracking method and controls the vehicle steering system directly. This serves to eliminate delays due to the serial link and queuing.

To compensate for the remaining delays (delays due to processing time of the tracking method and inter-task communication within the tracking system), a method which sends speed and steering commands in advance to counteract any delays is used in accordance with the present invention. The method may be executed as follows:

sense the current position $P_{actual}$ (Initialization: $P_{actual} = P[O] = P[1] = \ldots = P[d\_index+1]$) compute error between predicted and sensed position:
$P_e = P_{actual} - P[O]$ for $i=O$, $d\_index$ $P[i] = P[i+1] + P_e$
compute the position on the path corresponding to the position of the beginning of the time interval:
get $P_{on}$ ($P[d\_index]$, $P_{on}$)
get initial condition:errors(O) = $P[d\_index] - P_{on}$
compute a quintic polynomial curve in error space [1]
predict a position at the end of the planning time interval;
get despos($P_{on}$,$d_s$,$P+d\_index+1$)
$P[d+index+1]+ = errors(ds)$ For example, to compensate a system which has time delays on the order of two planning intervals (on the order of 250 mSec), the variable $d\_index$ is set to 2.0.

Tracking performance improves as the compensation index ($d\_index$) is increased to match the delays inherent to the system.

d. Vehicle-Ground Interaction (VGI)

Reference commands for steering angle and vehicle speed result in varying angular velocities and accelerations of the vehicle wheels.

VGI describes how the vehicle moves, given steered wheel angles and wheel angular velocities. The principal VGI phenomena are slip angle and under/oversteer characteristics which are based on the tire/road contact region geometry, and are affected by tire elastic deformation. These phenomena require a larger steering angle as compared to a kinematically computed one.

e. Sensing and Actuation Timing

Since actual path tracking is controlled by digital processors in the present invention, a discrete time interval is used. It is governed by the position sensing time interval (which may be on the order of 0.25 Sec) which is much longer than the computing time required for steering planning (which may be on the order of 16 mSec).

At times, especially when the discrete time interval is large, poor predictions of the vehicle position may be made which degrade performance of the tracking method.

A compensation method of the present invention, serves to reduce the error in predicting the next vehicle position by decreasing the discrete time interval. In this method, the vehicle position is predicted for the end of the computing interval (16 mSec) rather than at the end of the planning interval (250 mSec). The method is executed as follows:

sense the current position $P_{actual}$ (Initialization: $P_{actual} = P[O] = P[1] = \ldots = P[d\_index+1] = P_{actual,k+1}$
compute error between predicted and sensed position:
$Pe = P_{actual}P_{actual, k+1}$
for $i=O$, $d\_index$
$P[i] = P[i+1] + P_e$
compute the position on the path corresponding to the position of the beginning of the time interval:
get $P_{on}$($P[d\_index]$, $P_{on}$)
get initial condition: errors(O) = $P[d\_index] - P_{on}$
compute a quintic polynomial curve in error space compute a quintic polynomial curve in error space[1]
predict a position at the end of the planning time interval:
get despos($P_{on}$, $d_s$, P+d_index+1)
P[d+index+1]+=errors(ds)
predict a position at the next sensing time:
$P_{actual}$, K+1=P[O]+(P[1]−P[O])*(dt plan−dt comput)/dt plan f. Look Ahead

Human operators use different look-ahead distances 3310 when driving. At slow speeds, a driver generally looks at a point on the road relatively close to the vehicle, while at higher speeds, this point is generally farther ahead of the vehicle. The higher the speed, the farther ahead the reference point is, resulting in smaller steering corrections.

Thus, in an autonomous application, a look-ahead distance which varies with speed, logically helps to improve tracking performance.

A desired steering angle may consist of a steering angle from the reference path 3312 and a steering angle 3112 which is computed with a quintic method to correct for tracking errors. These steering angles are summed to give the vehicle steering command as shown in equation (1) below:

$$\Phi = \Phi_{ref} + \Phi_{error}$$

Note that look-ahead in the autonomous scheme affects only $\Phi_{error}$, even though look-ahead in manual driving affects both the reference and error compensating steering angles. Shorter look-ahead values result in large steering corrections; the look-ahead distance can therefore be interpreted as a gain in an error feedback system.

An arbitrary model for varying look-ahead distance (L) with speed (V) is expressed with three parameters, $V_{ref}$, $L_{ref}$, and slope, as shown in equation (2) below:

$$L = \text{slope}*(V - V_{ref}) + L_{ref}$$

where V is the speed of a vehicle and L should be between $L_m\text{in}=10$ and $L_m\text{ax}=30$. Tracking performance is improved with the varying look-ahead distance 3310 of the present invention.

g. Optimal Control Method

As mentioned above, an embodiment of the present invention uses a model which includes considerations of cornering stiffness, mass and slip angle.

The control problem is formulated as a linear quadratic optimal tracking problem where the errors in position, heading and curvature are minimized based on the vehicle control model. The optimal path and controls are computed from the desired path 3312 and the currently sensed vehicle position 3304 using the current errors as initial conditions to the optimal control problem.

A few computed steering angles along the initial part of the optimal path are used as references to the low level steering controller for the next sensing time interval. This preview optimal steering control has the advantage of guaranteeing stability and optimality with respect to the given performance index. The optimal preview control method according to the present invention, is applicable to the steering planning of an autonomous vehicle 102.

The model is derived from a standard telescoped, or bicycle model (not shown) or approximation of the vehicle. The equations describing the vehicle motion include terms which represent the VGI described earlier. These equations use the state variables:

$$X = [x, y, \Theta, \dot{\Theta}]$$

where x and y represent the global position of the vehicle; O is the heading 3318 of the vehicle, and O is the rate of change of heading.

Using these variables, the equations are:

$$\dot{x}_1 = -x_3\sin(x_4) + V_n\cos(x_4)$$
$$\dot{x}_2 = x_3\cos(x_4) + V_n\sin(x_4)$$

$$\dot{x}_3 = -\frac{(C_{\alpha F} + C_{\alpha R})}{mV_n}x_3 + \left\{\frac{(bC_{\alpha R} - aC_{\alpha F})}{v_n} - V_n\right\}x_5$$

$$\dot{x}_4 = x_5$$

$$\dot{x}_5 = -\frac{(bC_{\alpha R} - aC_{\alpha F})}{IV_n}x_3 -$$

$$\frac{(a^2 C_{\alpha F} + b^2 C_{\alpha R})}{IV_n}x_5 + \frac{aC_{\alpha F}}{I}u_1$$

$$u_1 = \delta$$

$$c = \left[\frac{mL}{t}\right]$$

where:
- $V_\xi$: lateral velocity
- $v_n$: constant forward velocity
- $\delta$: steering angle
- $\alpha_F$: slip angle
- $v_F$: speed of the front wheel
- $F_F$: lateral force between front wheel and ground
- $F_R$: lateral force between rear wheel and ground
- m: vehicle mass
- I: vehicle moment of inertia
- $\Theta$: vehicle heading
- $C_{\alpha F}$, $C_{\alpha R}$: Front and rear tire cornering stiffness It is well known in the art of optimal control theory, that a cost function must be selected which is used to minimize selected parameters in the system. The cost function used in this problem was selected as:

$$J(t) = \frac{qf}{2}[\{x_1(t_f) - x_d(t_f)\}^2 + \quad \text{(EQ. 15)}$$

$$\{x_2(t_f) - y_d(t_f)\}^2] +$$

$$\frac{1}{2}\int_{t_o}^{t_f}[R_1\{u_1(t)\}^2 + \{x_1(t) - x_d(t)\}^2 +$$

$$\{x_2(t) - y_d(t)\}^2]dt$$

There are several problems to solve the optimal control problem with the state equations (14) and the cost function (15);

1. The system is nonlinear. Usually, a two point boundary value problem which results from a nonlinear system does not have an analytic solution. Numerical solutions, on the other hand, take a long time to compute.

2. The resulting optimal control problem is a free final time problem. Generally fixed final time problems are simpler to solve than those with free final time.

3. The first term inside the integration (within the above cost function) is the time derivative of the control input, which is not usual in a quadratic cost function of an optimal control problem. However, the time rate change of steering is very important for smooth path following, because it is directly related to the time rate of change of centrifugal force (due to lateral accelerations of the vehicle).

Note that the steering angle is dependent on the curvature of the path as in FIG. 51.

The following approaches are applied in order to overcome the above three problems and to make the resulting optimal control problem tractable:

1. Since the sinusoidal functions in the first and the second equations of (14) make the system nonlinear, a new coordinate system, an axis of which is parallel to the tangent direction of the corresponding point of the path to the current vehicle position, is used. The deviations only in the lateral direction are considered in the cost function. These two approximations not only eliminate the nonlinearity in the system equation but also reduce the number of equations to deal with; the first equation of (14) is not required now. (Refer to "Coordinate Systems.")

2. This problem with free final time, $t_f$, can be converted to the one with a fixed final value of the independent variable by writing the differentials in the equation of motion with respect to the forward distance. To this end, a non-dimensional independent variable, s, is defined as:

$$s = \frac{s}{s_f} \quad \frac{ds}{dt} = \frac{s}{s} = \frac{V_n^2 \, V_\xi^2}{s_f} \quad s_f = \text{accel}$$

3. To solve the third problem pointed out above, a new state vector and a control input are defined as:

$$X_{new} = [X_{old}, \ U_{old}]^T, \ U_{new} = U_{old}$$

where Xnew satisfies:

$$A_{new} = \left[ \begin{array}{c|c} A_{old} & B_{old} \\ \hline 0 & 0 \end{array} \right]$$

$$B_{new} = \left[ \begin{array}{c} 0 \\ 1 \end{array} \right]$$

y=Ax+B where $A_{old}$ and $B_{old}$ denote the old system matrix and the old input matrix.

Then, the state variables and the control input are defined as:

$$Z = [\xi, \ v_\xi, \ \Theta, \ \Theta, \ \delta]^T, \ u = \dot{\delta} \quad \text{(EQ. 16)}$$

which satisfies the system equations as the following:

$$\frac{d\xi}{ds} = Z_1' = (Z_2 + v_n Z_3)\sigma \quad \text{(EQ. 17)}$$

-continued $$\frac{dV_\xi}{ds} = Z_2' = \left[ -\frac{C_{\alpha F} + C_{\alpha R}}{mV_n} Z_2 + \right.$$

$$\left( \frac{(bC_{\alpha R} - aC_{\alpha F})}{V_n} - V_n \right) Z_4 +$$

$$\left. \frac{C_{\alpha F}}{m} Z_5 \right] \sigma$$

$$\frac{d\Theta}{ds} = Z_3' = Z_4 \sigma$$

$$\frac{d\Theta}{ds} = Z_4' = \left[ \frac{(bc_\alpha R - aC_{\alpha F})}{IV_n} Z_2 - \right.$$

$$\frac{(a^2 C_{\alpha F} + b^2 C_{\alpha R})}{IV_n} Z_4 + \frac{aC_{\alpha F}}{I} Z_5 \right] \sigma$$

$$\frac{d\delta}{ds} = Z_5' = u\sigma$$

The new cost function becomes:

$$L(Z,s) = \frac{q_f}{2} [Z(1) - \xi_d(1)]^2 + \quad \text{(EQ. 18)}$$

$$\frac{1}{2} \int_0^1 [R_1 u^2(s) + \{Z_1(s) - \xi_d(s)\}^2] ds$$

The steering planning with resulting system equation (17) and the cost function (18) above, can be solved as a linear quadratic tracking problem as the following. Suppose the system equation and the cost function are described as $$X = AX + BU, \ t > t_o \quad \text{(EQ. 19)}$$

$$L = \frac{1}{2} [X(t_f) - X_d(t_f)]^T Q_f [X(t_f) - X_d(t_f)] + \quad \text{(EQ. 20)}$$

$$\frac{1}{2} \int_{t_o}^{t_f} \{[X(t) - X_d(t)]^T Q(t)[X(t) - X_d(t)] +$$

$$U^T(t) R(t) U(t)\} dt$$

and $Q_f \geq$, o, $Q \geq$, o, $R \geq$ o
are chosen all symmetric. Then the resulting equations are:

$$-\dot{P} = A^T P + PA - PBR^{-1}B^T P + Q, \ P(t_f) = Q_f \quad \text{(EQ. 21)}$$

$$k(t) = R^{-1} B^T P(t) \quad \text{(EQ. 22)}$$

$$-\dot{v} = (A - BK)^T v + QX_d, \ V(t_f) = X_d(t_f) \quad \text{(EQ. 23)}$$

$$U = -KX + R^{-1} B^T v \quad \text{(EQ. 24)}$$

Thus, the riccati equation (21) must be solved first and the gains are computed from the result of the riccati equation and then the forcing function driven by the desired path are computed by solving equation (23). Then, the control and states are obtained by solving equation (19) and (24).

The MacFarlane-Potter integration method was tried to solve the riccati equation. This method is known to be very effective for the steady-state solution of the time-invariant problem. Since the previewed distance is quite long and the initial parts of the solution are used, this method seems good to reduce the computation time.

Hence, equation (23) is changed as the following equation (25) and solved, because the previewed distance is long and only the inertial part of the solution is used.

$$(A-BK)^T v + QX_d = 0 \quad (EQ. 25)$$

h. Conclusion

Tracking performance has been improved according to the present invention, by investigating and understanding vehicle and control system dynamics and by designing compensation methods given this understanding.

A degraded performance of a tracking method is attributable to latency of vehicle control commands, slow system response, and vehicle dynamic characteristics. It is possible to counteract each of these effects.

Latency of Vehicle commands, a dominant effect, can be successfully compensated by modifying the vehicle control hardware and by utilizing a method which set control commands far enough in advance to compensate the delays. Decreasing the time lag between when the vehicle position is sensed and when the command is issued reduces prediction errors. This is required to plan steering angles, and results in better tracking performance.

Varying look-ahead distance with speed also improves tracking performance in comparison to using a constant look-ahead distance.

In general terms then, path tracking is the function of staying on course. In path tracking in the present invention, as discussed, some of the considerations are errors in distance, heading and curvature, delays in the system including processing delays and delays in vehicle response to actuators, and so on, dynamic look ahead distance, weighted path history, and extrapolation.

D. Obstacle Handling

1. Introduction

Obstacle handling involves at least three major functions: detection of obstacles 4002, avoidance of obstacles 4002, and returning to path 3312. The returning to path function is similar to path generation and tracking, as described above.

In addition to path tracking (following), successful navigation of vehicle 102 requires that vehicle 102 be able to detect obstacles 4002 in its path, thus allowing the vehicle to stop or otherwise avoid such an obstacle before a collision occurs.

In one embodiment of the present invention, a single line infra-red laser scanner 404 (See FIG. 38) is used in a configuration where the scan is horizontal (not shown). The scan line 3810 does not contact the ground, so any discontinuities in the range data can be attributed to objects 4002 in the environment.

Since a reference path 3312 is available and the vehicle position is known relative to the reference path, only the range data and a region bounding the reference path 3312 is processed for threatening objects 4002. Objects outside of this region, or boundary zone, are ignored. The width of the boundary zone (not shown) is equal to the vehicle width plus some selected safety buffer to allow for tracking and positioning errors. This method is limited in its usefulness and is referred to as "clearance checking."

2. Detection of Obstacles a. Clearance Checking

In the simplest case of the present invention, the laser 404 may be used in a single line scan mode with successive range measurements being made at regular angular intervals as the laser scans over the field of view. Again for simplicity, these scans can commence at regular time intervals. The term "clearance checking" has been used to describe this method. In this version of the present invention, the method has been limited to processing only two dimensional data.

This type of obstacle method is limited to checking to see if the path 3312 is clear using a single line scan mode with successive range measurements being made at regular angular intervals as the scanner 404 scans over the field of view. It does not include any methods to establish the existence of any obstacle 4002 or to create a path around it if the path is not clear. This type of method is not deemed to be a particularly useful obstacle detection method, except in very rigidly controlled environments, such as on a factory floor.

b. Filtering and Edge Detection Scheme

A second obstacle detection embodiment of the present invention uses a multiple-line scanner 3804 (See FIG. 38), whose scan 3810 contacts the ground at some distance in front of the vehicle 102. Since the scan line contacts the ground, discontinuities in range data can no longer be attributed to threatening objects 4002. For example, profiles from natural objects such as hills and banked or crowned roads can cause discontinuities in range data. This technique of the present invention can discern discontinuities in range data between threatening objects 4002 and natural objects (not shown).

Figure 39:
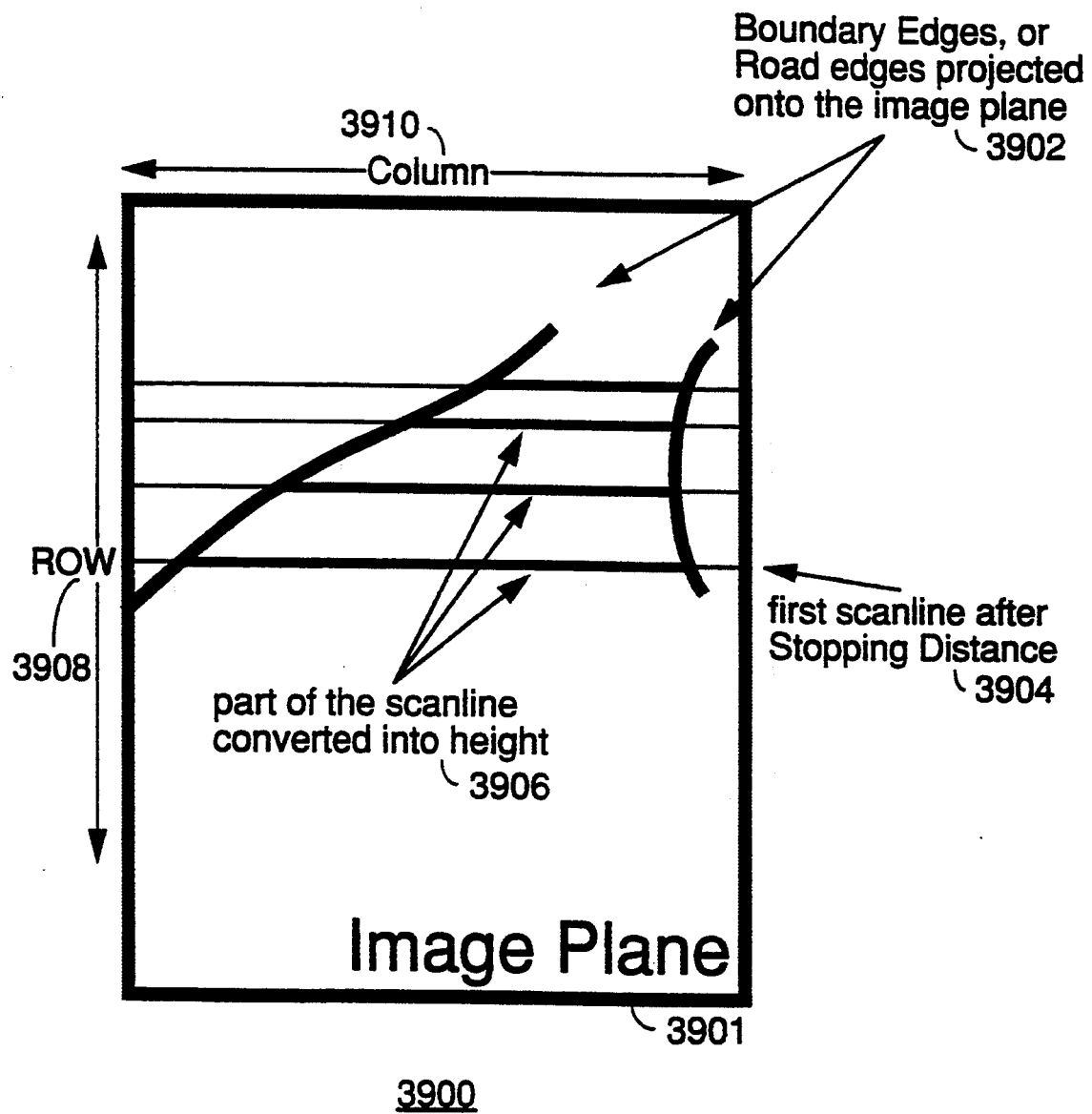
FIG. 39 is a diagram 3900 of selected scan lines 3904 and 3906 in a laser scanner system of the present invention.

In this embodiment of the present invention, a filtering scheme is used to decrease the amount of data processed and is independent of the scanner configuration used. The edges of the boundary zone are found by transferring the range data to an image plane representation 3900 (See FIG. 39), where each range value is located by a row number 3908 and a column number 3910 (a matrix representation).

Processing load is minimized by selecting a relatively small number of the scan lines available in a range image representation 3900. The scan lines are selected by vehicle speed, and are concentrated at, and beyond, the vehicle stopping distance. The selected scan lines from successive frames of data can overlap.

In this method, if the vehicle 102 is moving fast, the selected scan lines 3906 are far in front of the vehicle (near the top of the range image representation 3900). In contrast, when the vehicle is traveling slowly, the selective scan lines 3906 are closer to the vehicle (near the bottom of the range image representation 3900).

Each scan line is made up of many pixels of data. Each pixel has two parameters associated with it. First, the actual value of the pixel is the range value returned by the scanner 3804. Second, the location of the pixel on the scan line gives an indication of the angle, relative to the vehicle centerline, at which the range value was recorded. This corresponds to a cylindrical coordinate frame (R,THETA,Z) description.

Given the cylindrical description and the known scanner location with respect to the vehicle 102, the range values can be converted to a Cartesian coordinate (X,Y,Z) system. The result is a road profile description which can be used by a novel filtering scheme to determine if threatening objects 4002 are present in the vehicle path 3812, while ignoring effects due to natural hills and valleys in a typical roadway.

After the scanner data is converted to Cartesian coordinates, the data is processed to determine which part of the scan is actually on the road 3312 and which part of the scan line is outside of the vehicle path and therefore safely ignored. Given the vehicle position and the width of a boundary (which is equal to the vehicle width plus some safety margin), the coordinates of the boundary on either side of the vehicle path can be determined. The coordinates of the boundary can be compared to the coordinates of each pixel on the current scan line. The pixels which have coordinates outside of the boundary are ignored.

The filtering scheme builds an expectation of the road profile from previously sensed road profiles. This expectation is based on three parameters which were found to adequately describe typical paved roads. These three parameters are:

road crown: the curvature of the road cross section (perpendicular to the road centerline).
road bank: the 'tilt' of the road profile (perpendicular to the centerline).
road height: the height of the road centerline above a reference plane described by the location of the four tires of the vehicle 102.

Expected values of the road crown and the road bank are determined by performing a standard, least-squares Kalman filtering technique on previously sensed scanner data. The Kalman filter basically keeps a type of running average of the two parameters based on the values determined from the previous data.

In accordance with the present invention, the expected road height for a particular scan can be determined through one of two similar methods.

One is to average the road height at each pixel within the current scan line to determine a characteristic height of the scan line in question.

The second method is to filter the road height using the standard Kalman filter similar to that used when determining crown and bank expectations.

These three parameters can be used to determine a second order equation which describes the expected road profile. This expected profile is compared to the actual road profile. Any deviations between the two which exceed a preset threshold value are assumed to be threatening objects.

This scheme of the present invention is viable given the assumption that any detected objects 4002 are small in comparison to the width of the road. Then, when these averaging or least squares methods are used, the effects due to objects are negligible in comparison to natural road data.

This filtering scheme also includes a very simple edge detection method which convolves the selected range data with a simple seven point weighing function.

c. Obstacle Extraction

An additional technique of the present invention processes an entire range image representation 3900 from a multi-line scanner 3804 for objects. This method of the present invention accomplishes three goals:

1. Do not detect obstacles 4002 when none exists,
2. Detect obstacles 4002 when obstacles do exist, and
3. Detect the correct obstacles 4002 when obstacles exist.

Obstacle extraction is obstacle detection through the use of blob extraction. Blob extraction is well known in the art of computer graphics. Obstacles are found by clustering similar pixels into groups, called blobs. The goal of obstacle extraction is to store and process obstacles as units rather than as individual pixels.

The obstacle extraction of the present invention may be done by preforming the following steps in the image plane 3901:

1. Project the vehicle path into the image plane 3901,
2. Transform range data into height data,
3. Fit a curve to the height at the center of the road (this represents the expected road height at each row),
4. Threshold the actual road height against the height expectation, and
5. Extract the obstacles (indicated by differences in actual and expected road heights which exceed the threshold).

(1) Finding the Road

In order to process all the available data, the images must be processed at the frame rate of the scanner 3804. For this reason, most of the computations in the obstacle extraction method are done in the image plane 3901. By projecting the path into the image, a large portion of the image can be ignored, and many needless computations avoided.

Assuming that the vehicle path 3812 is specified at regular intervals, the current vehicle position can be used to locate the path segment line 3902 in front of the scanner. This path 3812 is transformed from world coordinates into image coordinates by projecting the points corresponding to the road or boundary edges 3902 into the image plane 3901 (see FIG. 39).

A cubic spline is used to interpolate between the gaps. Thus, the center and edges of the row 3902 are found for each row 3908 in the image plane 3901. The pixels isolated between the road edges 3902 are converted (cylindrical to Cartesian coordinates) from range to height data. The outlying pixels are discarded and not processed any further.

(2) Modeling Road Height

Once the center of the road is known for every row 3908 in the image plane 3901, the height for each of these points can be determined. A third order least squares curve is fit to these data.

This has the effect of modeling the general trend of the road (up and down hills) as well as filtering out the effects of noise and small objects lying in the center of the road.

(3) Thresholding

Obstacles may be located by using a height threshold. A straight height threshold would be meaningless since the surrounding terrain is not necessarily flat. Hence, the threshold is referenced against the expected height, as predicted by the third order fit, at the row number 3908 of the given pixel.

In this manner, a hill is not considered an obstacle since the height expectation and the actual height should match very closely. On the other hand, a real obstacle 4002 would barely reflect the expected road height (due to the least squares fit), and therefore is readily found by thresholding. The result of this thresholding is a binary image (not shown) suitable for a "blob extraction." The binary image only indicates where an object is or is not present in the image.

(4) Blob Extraction

Blob extraction works by clustering adjacent set pixels (indicating an obstacle 4002 is present) together and treating them as a unit. Two pixels are adjacent if they are either:

1. In the same column 3910 and have consecutive row numbers 3908, or
2. In the same row 3908 and have consecutive column numbers 3910.

By grouping pixels together into blobs, the obstacles 4002 can be treated as a whole unit and are suitable for further processing.

(5) Applications

One way to use extracted blobs is to pipe them as input into another program. For example, the objects 4002 can be parsed into coordinates and used to accumulate a global object map 4004 (See FIG. 40). This map 4002 is then passed into another program, and used to do collision avoidance or path planning.

3. Avoidance of Obstacles

Once the present invention detects an obstacle 4002 in the path of the vehicle 102 (See FIG. 40), it must then avoid a collision with the object. Certain assumptions are made concerning the obstacle avoidance problem:

1. The obstacle environment is populated with obstacles 4002 that can be represented by convex-polygons or convex lines;
2. The navigation methods only have access to the local environment information in the form of a local map representing all of the visible faces of the obstacle from the position of the vehicle 102, which can be obtained from unprocessed laser range data or from data processed through blob-extraction;
3. The vehicle 102 is a conventionally steered type which has constraints on its speed and acceleration and constraints on its steering angle and the rate of change in the steering angle.

To deal with the obstacle avoidance problem, the present invention divides it into two sub-problems.

First, to decide if any obstacles are in the way, and if so, which side should the vehicle pass on. Then select a sub-goal 4006, which will lead the vehicle 102 around the obstacle 4002, leading towards a higher level goal 4008, which is to get back on the desired path.

Second, once a sub-goal 4006 is selected, make a steering decision which drives the vehicle 102 towards the sub-goal 4006, while steering clear of the obstacle 4002. A sub-goal selection method and a steering decision method of the present invention solve these two sub-problems.

The above enumerated assumptions are managed in the following process:

The obstacle locations are obtained from the laser range scanner 3804 or 404. The range data generated by the scanner 3804 or 404 are processed to produce a list of polygonal faces, modeling the visible portions of the obstacle 4002 from the vehicle position. Each time new range data become available, a sub-goal selection method is executed to generate a sub-goal 4006 and determine regions of safe navigation (free-space 4010) for the steering decision method. The frequency at which the sub-goal selection method can be executed depends on the rate at which the scanner 3804 or 404 can collect data. The achievable vehicle speed, in turn, depends on this frequency of execution.

For the steering decision method, a higher sampling rate is desirable in order to produce a smooth path. Therefore, the steering decision method is executed more frequently than the sub-goal method.

The basic flow of the sub-goal method is the following:

1 save last initial-subgoal, subgoal, and free-space, set goal_blocked flag to true
2 if final goal is visible
   generate direct goal
   if direct goal is visible
      set goal_blocked flag to false
3 otherwise
   generate an initial subgoal
   set subgoal to initial subgoal
   recursively generate subgoals until the latest one is visible. if subgoal not feasible, abort
4 if goal_blocked flag is true
   restore old initial-subgoal, subgoal, and free_space
5 otherwise
   generate free-space
   if free-space is not safe
      restore old initial-subgoal, subgoal, and free_space.

Sub-goal Method: First (step 1 above), the initial-subgoal, subgoal, and free-space generated from the previous iteration is saved. This assures that when the newly generated subgoal is not safe, the old subgoal can continue to be pursued.

Next (step 2 above), when the final goal is visible, attempt to generate a direct goal which is not associated with any obstacles 4002. Although the final goal is visible in the local map, it does not necessarily mean that no obstacle is blocking the final goal because obstacles outside the scanner range (both distance and angular wise) will not be represented in the local map. Therefore, when generating a direct goal, ensure that the goal is located in the cone area which is covered by the scanner 3804 or 404 to avoid placing a subgoal on or behind an obstacle 4002 that is not in the local map.

The next step (step 3 above) handles the situation where the final goal is blocked by an obstacle 4002 in the local map. In this case, the obstacle 4002 that blocks the line of sight to the final goal is first determined.

Given a flowchart blocking obstacle, there are two possible ways of going around it. If both edges of the obstacle are in the range of the scanner 3804 or 404, we may choose to go around the edge which gives the minimum sum of the distances from the vehicle 102 to edge and from the edge to the final distance. If only one edge of the obstacle 4002 is in the range, choose that edge to go around. If none of the edges is visible, always arbitrarily choose the left edged to go around. Once the edge to go around is determined, place the initial subgoal away from the edge at a distance that is proportional to the vehicle size.

Because of this displacement, the resulting subgoal may be blocked by other obstacles 4002. This calls for the recursive generation of subgoal on the obstacle, which blocks the line of sight to the subgoals just generated. This recursive process continues until a subgoal visible to the vehicle 102 is generated. Each subgoal so generated is checked for viability. By viability it is meant that the subgoal does not lead the vehicle 102 towards a gap between two obstacles 4002 which is too small for the vehicle to pass through. When such a condition is detected, the vehicle 102 will stop.

The direct subgoal generated in the second step (step 2 above) could possibly be obscured from the vehicle 102. If such is indeed the case, the old subgoals from the previous iteration is restored and used next (step 4 above).

In the final step (step 5 above), generate the freespace 4010 for the visible subgoal, which is a triangular region that contains no obstacles. Once the free-space 4010 is generated, the safeness of the subgoal and free-space 4010 can be determined. When the new subgoal and free-space 4010 is not safe, the old subgoal and free-space is again retained. Otherwise, the new subgoal and free-space is used.

The steering decision method of the present invention is composed of two major components: transferring state constraints to control constraints; and determination of the desired control vector.

Once the control constraints and the desired control vector are computed, the control vectors can be determined using optimization techniques well known in the art.

4. Return to Path

Figure 40:
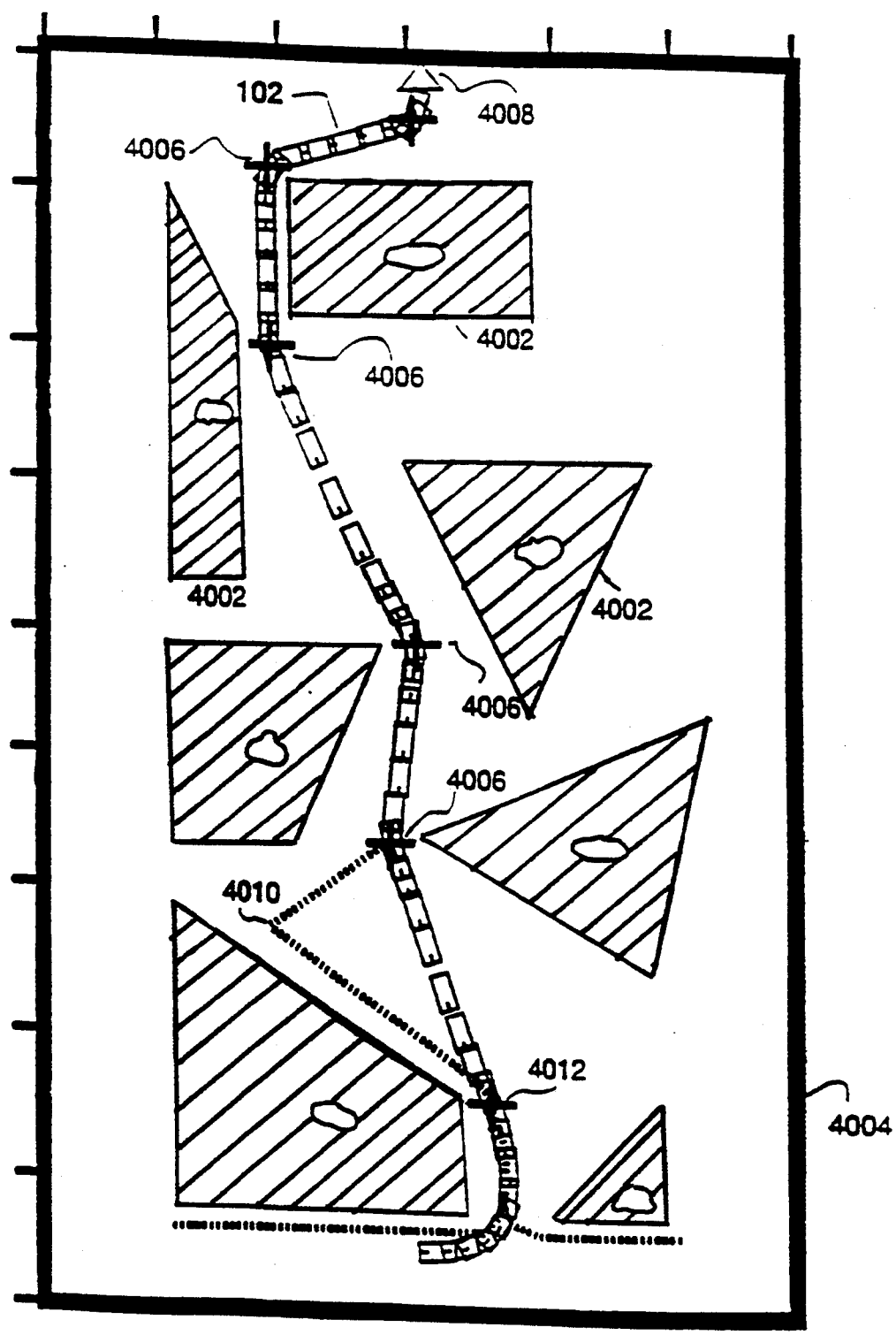
FIG. 40 is a diagram 4000 of an autonomous vehicle 102 avoiding obstacles 4002.
Figure 41:
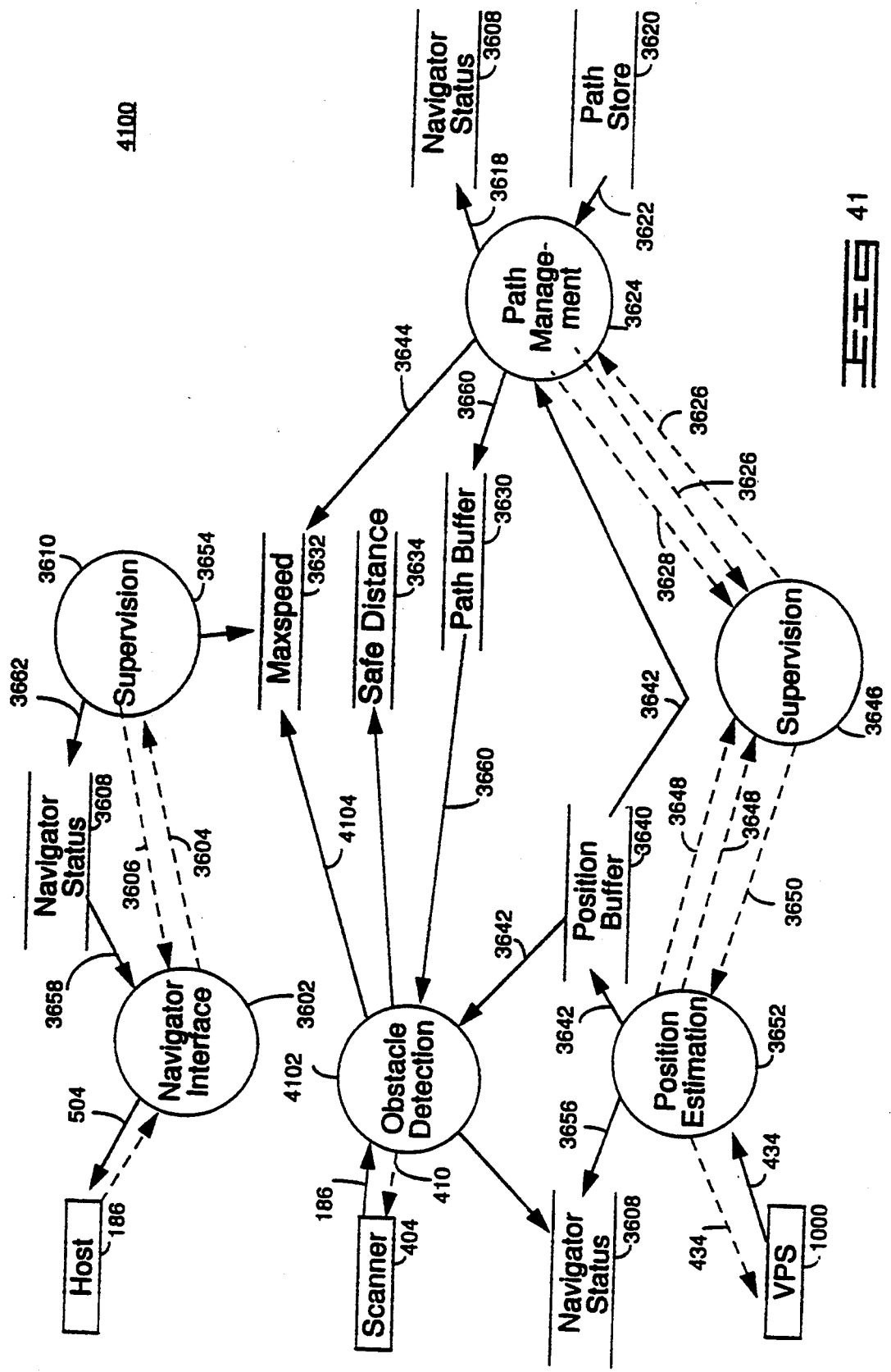
FIG. 41 is a diagram 4100 of obstacle handling according to the preferred embodiment of the present invention.

The present invention includes a method, as shown diagrammatically in FIG. 40, whereby a safe path around a detected object 4002 will be plotted and navigated so that the vehicle 102 will reacquire the reference path after avoiding the object 4002.

5. Scanner System a. Introduction

Figure 42:
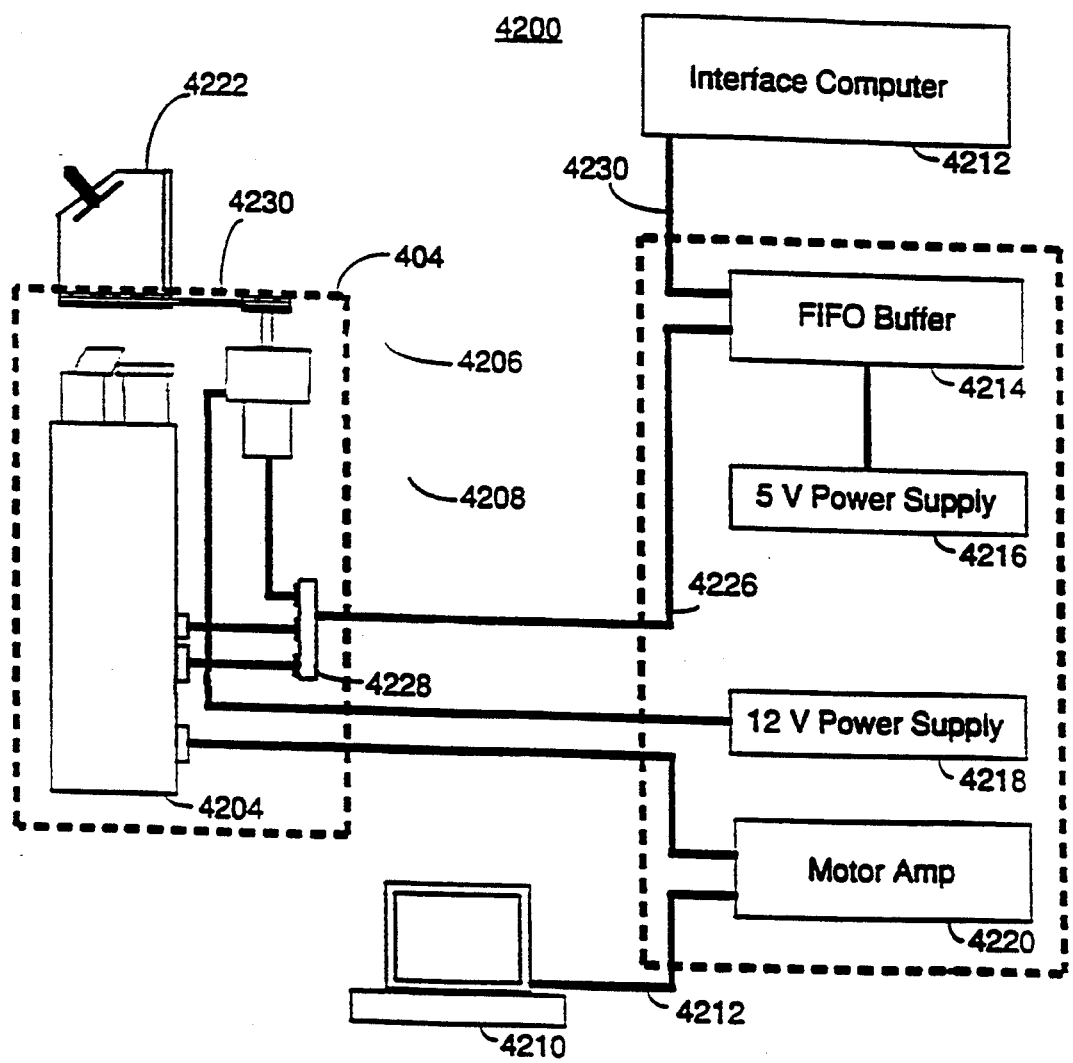
FIG. 42 is an intermediate level block diagram 4200 of a laser scanner system used for obstacle detection in the preferred embodiment of the present invention.

Referring to FIGS. 38 and 42, the present invention also includes a laser scanner system 404. The scanner 404 is used to find obstructions 4002 (See FIG. 40) that randomly crop up in the vehicle 102 path, as previously discussed.

Sources of such obstructions 4002 may be varied and numerous depending on the particular work site. They may include fallen trees and branches, boulders, moving and parked vehicles, and people.

The scanner 404 gives the autonomous vehicle 102 the ability to detect and deal with the external world as conditions require.

b. Laser Scanner

The major components of the laser scanner system 404 are depicted in FIG. 42.

A laser range finder 3804 uses an infra-red beam 3810 to measure distances between the range finder unit 3804 and the nearest object 4002. A brief pulse is transmitted by the unit 3804 and the time for the beam 3810 to reflect off an object 4002 and return gives the distance.

The beam 3810 from the range finder 404 is reflected by a rotating mirror 4222 giving the range finder 404 a 360° view of the world. Mirror rotation is accomplished through a motor 4206. The motor speed is controlled via a terminal 4210, which communicates with a motor amplifier/controller 4220 through a standard RS232C serial link 4224. Synchronization between laser firings and mirror angular position is done with an encoder.

Distance data on a line 4226 from the laser range finder 404 is taken by an interface circuit 4228, which transmits the data differentially to a buffer circuit 4214.

Individual pieces of data are collected by the buffer circuit 4214 until the mirror 4222 makes one full revolution. This set of data comprises one scan. When a scan is complete, the buffer circuit 4214 signals a processor 4212, whereupon data for the entire scan is transferred to the processor 4212 for processing.

c. Scanner System Interface

The interface circuit 4228 has three functions.

First, it acts as a safety monitor. A situation could occur where the mirror 4222 would stop rotating, as in the case of the drive belt 4230 between the motor 4206 and mirror 4222 breaking. Under this condition, the laser 4204 would continue to fire, and since the mirror 4222 is stationary, it would fire at a single point (dangerous for anyone looking directly into the laser beam). The interface circuit 4228, however, senses when the angular velocity of the mirror 4222 falls below half a revolution per second, and disables the laser 4204 if such a condition occurs.

The second function is to disable the laser 4204 from firing for part of the 360 degrees scan area. Typically, the laser scanner unit 404 will be mounted in front of a vehicle 102, and the field of interest is in the 180 degree area in front of the vehicle. The vehicle itself will block the back portion of the 360 degree scan area. In this case, the circuitry 4228 will prevent the laser 4204 from firing into the vehicle, extending the life of the laser diode while receiving range data for the area in front of the vehicle. The enabling and disabling of the laser range-finder 4204 is done through two sensors (not shown) mounted near the mirror housing 4222. For testing purposes, or for applications where a 360 degree scan is desirable, the disable feature can be turned off through a DIP switch.

The third function of the circuit 4228 is to convert signals between single ended and differential form. TTL signals from the laser unit 4204 are differentially transmitted to the buffer circuit 4214, and differentially transmitted signals from the buffer circuit 4214 are converted to TTL levels. This prevents noise contamination along the cable 4226 connecting the two circuits.

d. Scanner System Buffer Circuit

The function of the buffer circuit 4214 is to synchronize laser 404 firings with the angular position of the mirror 4222, to collect data for one complete scan, and to transmit the scan to computer 4214 for processing.

The angular position of the mirror 4222 can be determined through signals sent by the encoder 4208. The buffer circuit 4214 uses two signals from the encoder 4208: the Z and A channels.

The Z channel is the encoder index; it gets asserted once per revolution of the encoder 4208, and is used to signal the beginning of the scan area.

The A channel is one line of the two line quadrature output of the encoder 4208, and pulses 1000 times per revolution of the encoder. This channel is used to trigger laser firings.

One additional signal is needed to fully synchronize the scan field with the encoder signals. There is a gearing ratio of 2:1 between the encoder/motor 4206 and the mirror 4222. Two revolutions of the encoder 4208 rotates the mirror 4222 once. This translates to 2 Z channel pluses and 2000 A channel pulses per revolution of the mirror 4222, and the inability to differentiate the beginning of the first half of the scan with the beginning of the second half.

To fully synchronize the scan field, the DB (dead band) signal generated by the interface circuit 4222 is used. The DB signal, used to disable the laser 4204 from firing in the back half of the scan, allows the differentiation of the front and back halves of the scan. The Z and DB signal together signal the beginning of the scan area.

The second task of the buffer circuit 4214, to collect data for one complete scan, is accomplished through the A channel of the encoder 4208. The 2000 pulses of the channel are divided by either 2, 4, 8, or 16, selected through DIP switches (not shown) on the circuit board 4228. This allows the number of data points per scan to be varied between 1000, 500, 250, and 125. The divided signal is used to trigger the laser range-finder 4204 at appropriate angular intervals, and to store the resulting range data in memory 4214.

The sequence of events is as follows. W (write) is asserted one clock cycle upon a rising edge on the divided A signal. At this point, data from a previous T (laser trigger) is available and is stored in memory 4214. T is asserted the following clock cycle, triggering the laser and putting the resulting range data onto the memory input bus 4226. This data is written on the next W pulse, repeating the cycle.

The final task of the buffer circuit 4214 is to transmit the scan data to a computer 4212 for processing. Completed scans are signaled by the Z and the DB signals (the beginning of a scan is also the end of a previous one). Upon a completed scan, an interrupt request line is asserted, and remains asserted until either the mirror 4222 has made half a revolution, or the processor 4212 acknowledges the interrupt. In the first case, the half revolution of the mirror 4222 is signaled by a subsequent Z pulse and indicates a timeout condition; the processor 4212 has failed to respond and the data is lost.

In the normal case, the interrupt is acknowledged. Upon receipt of the acknowledgement, STR (data strobe) is asserted and held until IBF (input buffer full) is received. During this time, data is put on the data bus 4230 and may be ready by the computer 4212. Data is valid on the bus 4230 until IBF is asserted, at which time STR is de-asserted and the data removed from the bus 4230. Once the processor 4212 detects the de-assertion of STR, it de-asserts IBF. This causes STR to be asserted for the next piece of data, repeating the cycle.

Scan data is collected and stored in two memory banks 4214. This avoids shared memory and synchronization problems between scan storage and scan transmission. Data for a new scan is stored in one bank, while the previous scan is being transmitted from the other bank.

The buffer circuit 4214 removes from the processor 4212 the responsibility of synchronizing laser findings with mirror position and collecting individual pieces of data. It allows more efficient use of CPU time, as data is received in scan sized chunks. The processor 4212 spends its time processing the data, not in collecting it.

E. Vehicle Controlling Systems

1. Introudction

Figure 43:
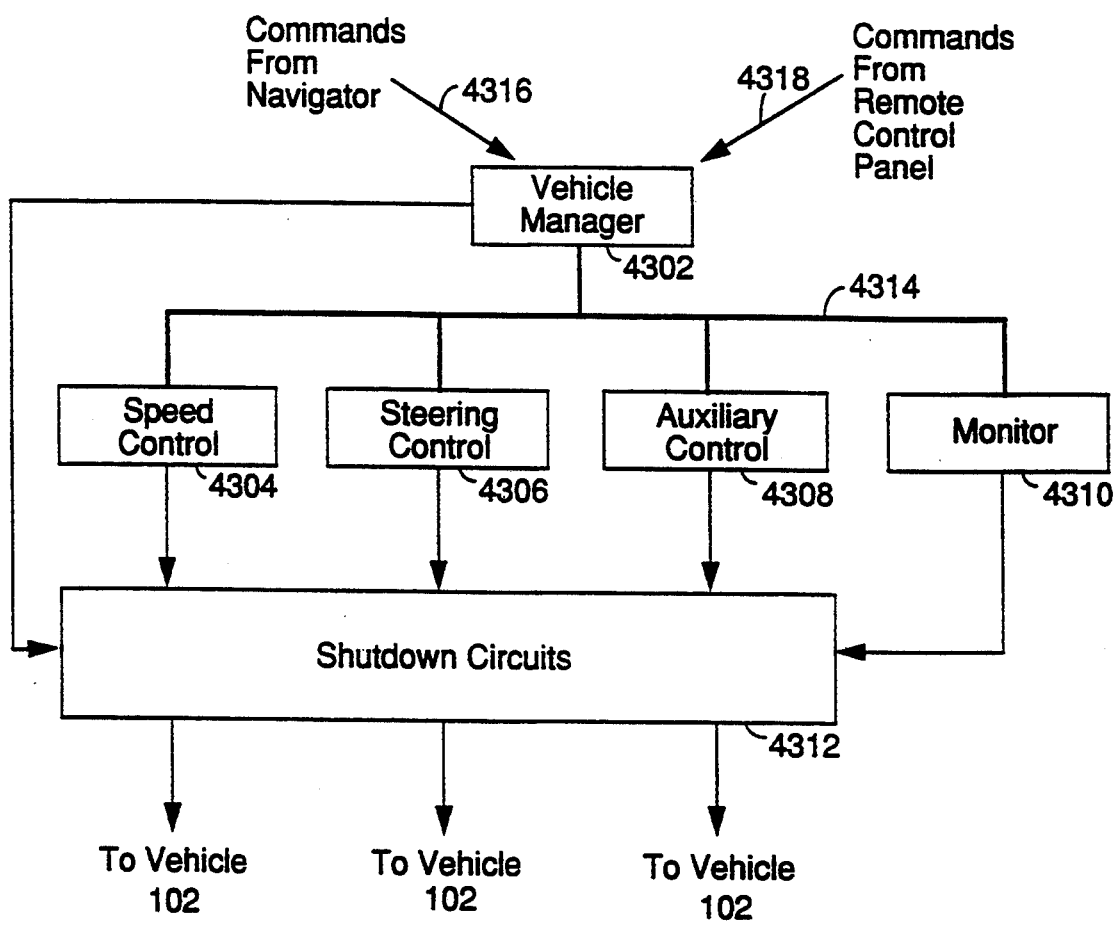
FIG. 43 is a an intermediate level block diagram 4300 of a control system for an autonomous mining vehicle of the present invention.

Referring now to FIG. 43, the vehicle controls are comprised of four, low-level functional blocks.

One is called a "vehicle manager" (4302). A second is called a "speed control" (4304). The third is called a "steering control" (4306). The fourth is called a "monitor/auxiliary control" (depicted as two separate blocks 4310 and 4308. These are described in turn below.

They are all tied together with a high-speed serial data bus 4314. The bus 4314 is a data collision detection, packet passing system.

Each of these functional blocks have separate microprocessors, for instance of the Motorola 68000 16 bit series. Each of these microprocessors talks to and listens to the others over the bus 4314.

While each functional block has a more or less specific function, the vehicle manager 4302 functions as a communications hub. It sends to and receives messages from the navigator 406 via an RS-422, 9600 Baud serial link 4316. It is also listening to and sending to the remote control or "tele" panel 410 via an FM radio communications link 4318.

2. Vehicle Manager (modes)

As mentioned above, the vehicle manager 4302 receives commands from a remote control panel 410 and the navigator 406. It then decides which mode "A, M, T, or R" (for Autonomous, Manual, Tele, or Ready) the vehicle 102 should be in.

a. Ready Mode

Figure 44:
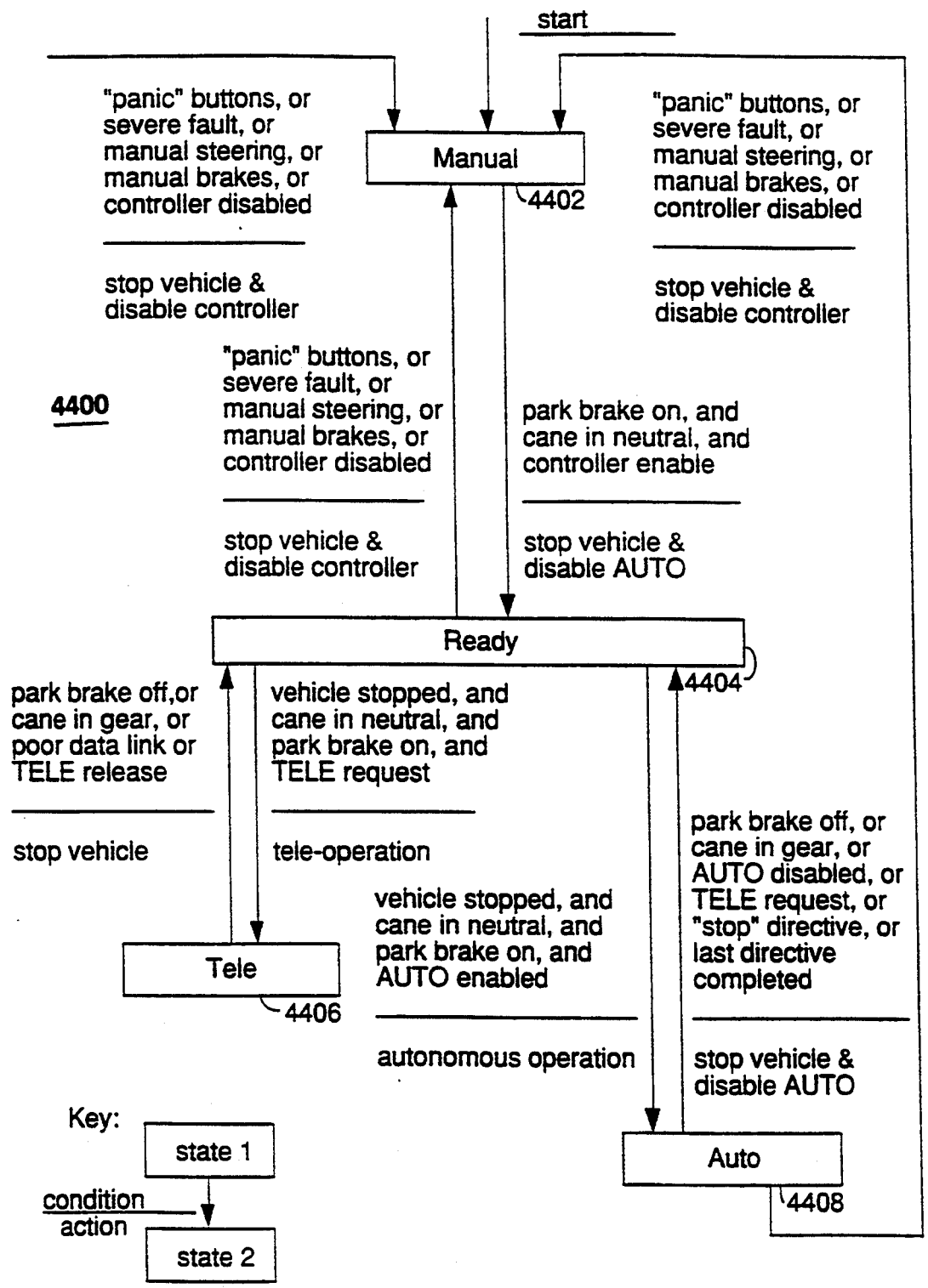
FIG. 44 is a state diagram 4400 showing the transitions between modes of operation of the control system of FIG. 43.
Figure 45:
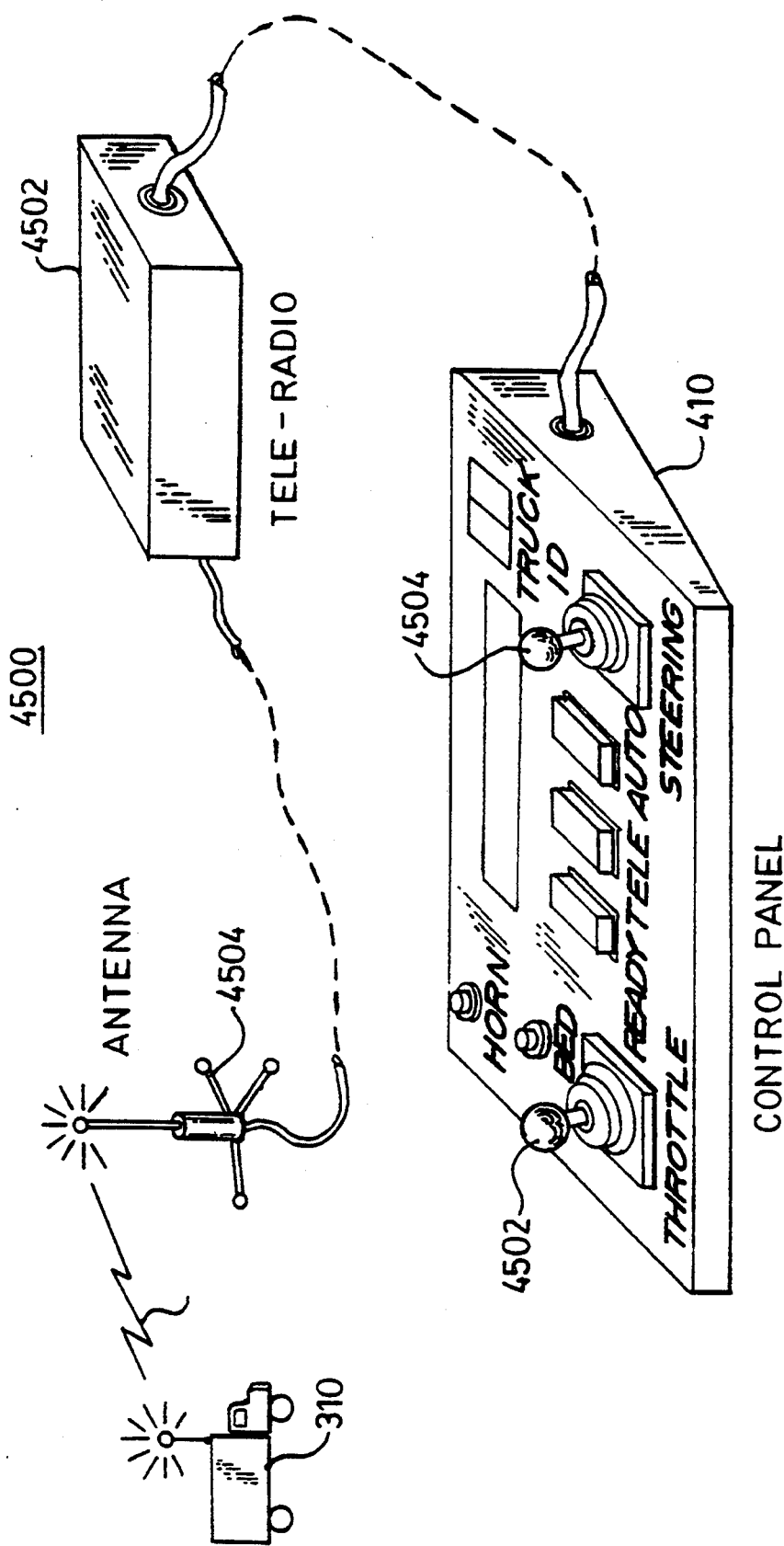
FIG. 45 is a high level block diagram 4500 of a tele-line of sight remote control system of the preferred embodiment.

Reference is now made to FIG. 44, which shows the states (modes) and how the vehicle 102 changes between states. The navigator 406 cannot set the mode itself. Notice that the vehicle 102 cannot change from tele to auto, for instance, directly. It must pass through the ready mode 4404 first in that case.

The ready mode 4404 brings the vehicle 102 to a stop in a known state. This is because it would be difficult to make a smooth transition, from, for instance, auto mode 4408 to tele mode 4406 while the vehicle 102 was moving. The tele control panel joystick 4502, 4504 would have to be in just the right position when control was switched.

Going from tele 4406 to auto 4408 mode, there is the consideration that the navigator 406 must initialize. For example, it must determine where it is with respect to a route before taking control, which takes some finite time, during which the vehicle 102 might otherwise drive off uncontrolled.

b. Tele Mode

Tele control mode 4406, also referred to as tele-operation, remote control or radio control mode, provides a way of controlling the vehicle 102 from a remote location while the vehicle 102 is kept in view.

Shop personnel would use the tele-operation mode 4406 to move the vehicle 102 in the yard, for example. Advantageously, this mode would also be used by a shovel or loader operator to maneuver the vehicle into position for loading or unloading, and moving the vehicle into a location where autonomous mode 4408 would resume control.

In tele-operation mode 4406, each vehicle at an autonomous work site 300 would have its own unique identification code that would be selected on a radio control panel 410 to ensure communication with and control of the correct vehicle only. The vehicle would only respond to tele-operation commands 4318 when its unique identification code is transmitted. Any conflict between modes, such as between manual and tele 4406, would be resolved in favor of manual mode 4402, for obvious safety reasons.

The navigator 406 keeps track of where the vehicle 102 is while being operated in the tele mode 4406, even though, in tele mode, the vehicle can be maneuvered far off of a known route.

c. Manual Mode

Manual control mode 4402 may be required when the vehicle 102 is being maneuvered in very close quarters, for example, at a repair shop, equipment yard, and so on, or when a control subsystem needs to be removed for repair or maintenance.

This control mode may be implemented to be invoked whenever a human operator activates any of the manual controls. The simple action of stepping on the brakes 4708, moving the shift lever from some predetermined, autonomous mode position, or grasping the steering wheel 4910, for example, would immediately signal the control system that manual control mode 4402 is desired and the system would immediately go to the manual mode.

While in manual mode, the autonomous system would continuously monitor vehicle motion and maintain an updated record of the vehicle position so that when and if autonomous mode 4408 was desired, a quicker and more efficient transition could be made.

When autonomous mode 4408 is again desired, the human operator would then affirmatively act to engage autonomous mode 4408, by physically moving a switch or lever, for instance, to the autonomous control mode. A time delay would preferably be built in so that the human operator would have the opportunity to leave the vehicle 102 if desired. At the end of the time delay, the system would then give several levels of warning, such as lights, horn, or the like, indicating autonomous takeover of the vehicle 102 was imminent.

d. Autonomous Mode

The autonomous mode 4408 is entered into from ready mode 4404. In the autonomous mode 4408, the vehicle 102 is under the control of the autonomous navigation system.

In this mode, the vehicle control system receives messages from the navigator 406 as discussed above, through the vehicle manager 4302. The vehicle manager 4302 is, as discussed, basically the communications and command hub for the rest of the controllers.

The vehicle manager 4302, and the other functional control blocks, all communicate with the shutdown circuits 4312 as well. The shutdown circuits 4312 are discussed in more detail below.

3. Speed Control

The speed control subsystem 4302 may be organized to contain a speed command analyzer, closed loop controls 4800 for the engine 4614, transmission and brakes 4700, 5000, a real time simulation model of the speed control system, and a monitor 4310 that is tied to an independent vehicle shutdown system 4312. It is designed to be placed in parallel to the production system on the vehicle 102.

The speed control functional block 4304 takes care of three basic functions. It controls the governor on the engine 4614. It controls the brake system 4606. And it controls the transmission 4610 via the production transmission control block 4616.

Figure 48:
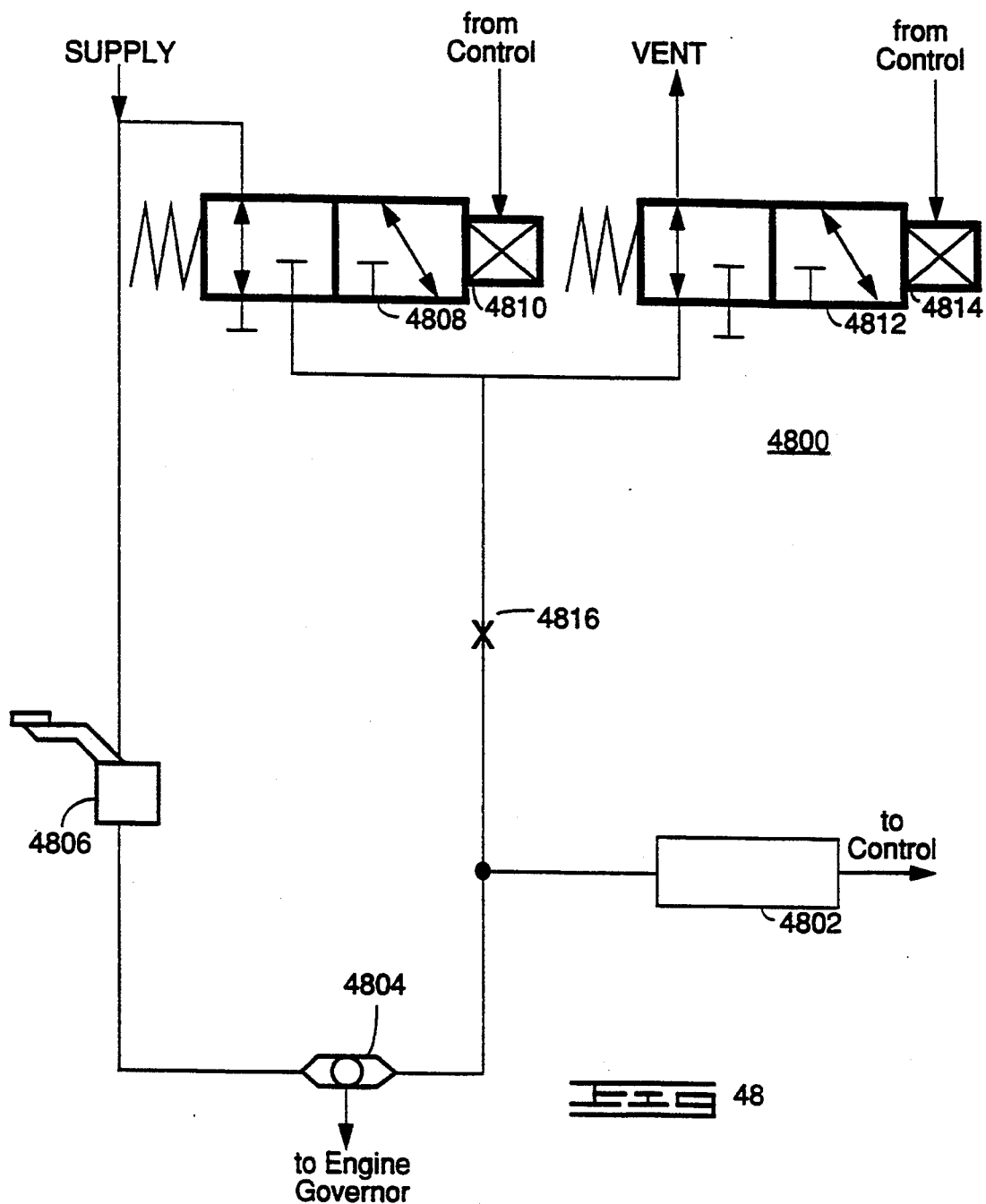
FIG. 48 is a high level block diagram 4800 of a governor control circuit of the speed control 4304 of the preferred embodiment.

The production transmission control block 4616 is interfaced with the speed control block 4304 in a parallel retro-fit of the autonomous system onto the production system as shown in FIG. 48. The production transmission control block 4616 is a microprocessor based system which primarily monitors speed and shifts gears accordingly.

The autonomous system speed control block 4304 feeds the transmission control block 4616 the maximum gear desired. For instance, if the vehicle 102 is to go 15 mph, the maximum gear might be third gear. The production transmission control block 4616 will control all the shifting necessary to get to that gear appropriately.

The governor 4626 (FIG. 46) controls the amount of fuel delivered to the engine 4616. Thus, it controls engine speed. The autonomous system is capable of being retro-fitted in parallel with the production governor control system, in a similar fashion as described with respect to the transmission system.

Figure 47:
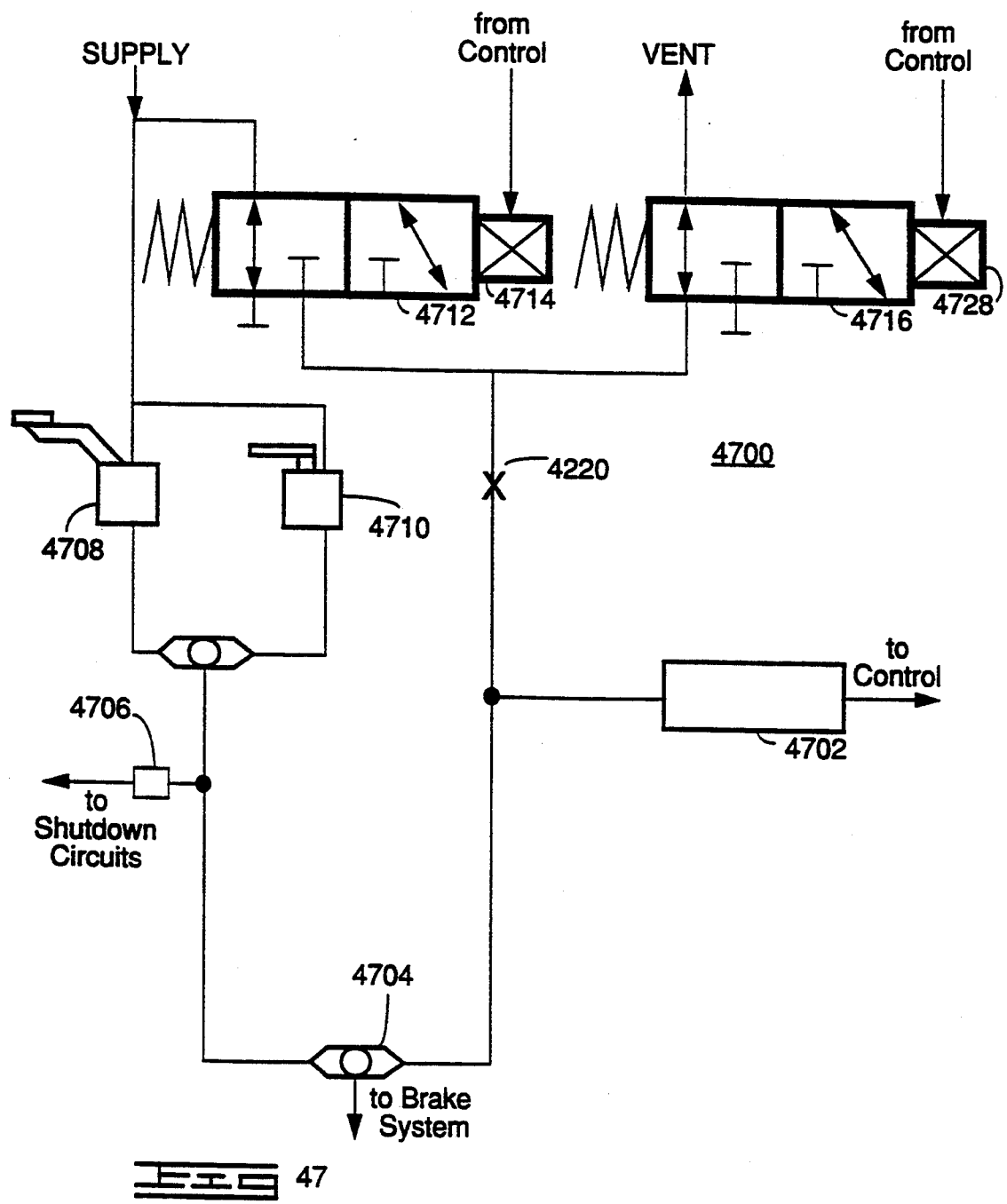
FIG. 47 is a high level block diagram 4700 of a service brakes control circuit of the speed control 4304 of the preferred embodiment.

The brake system is shown in FIGS. 47 and 50. The autonomous system here is also capable of being retro-fitted to the production brake system.

The following discusses vehicle systems shown in FIGS. 46, 48, 47, 50 and 49. These systems relate to the vehicle drive train 4600 and steering 4900 systems.

Figure 46:
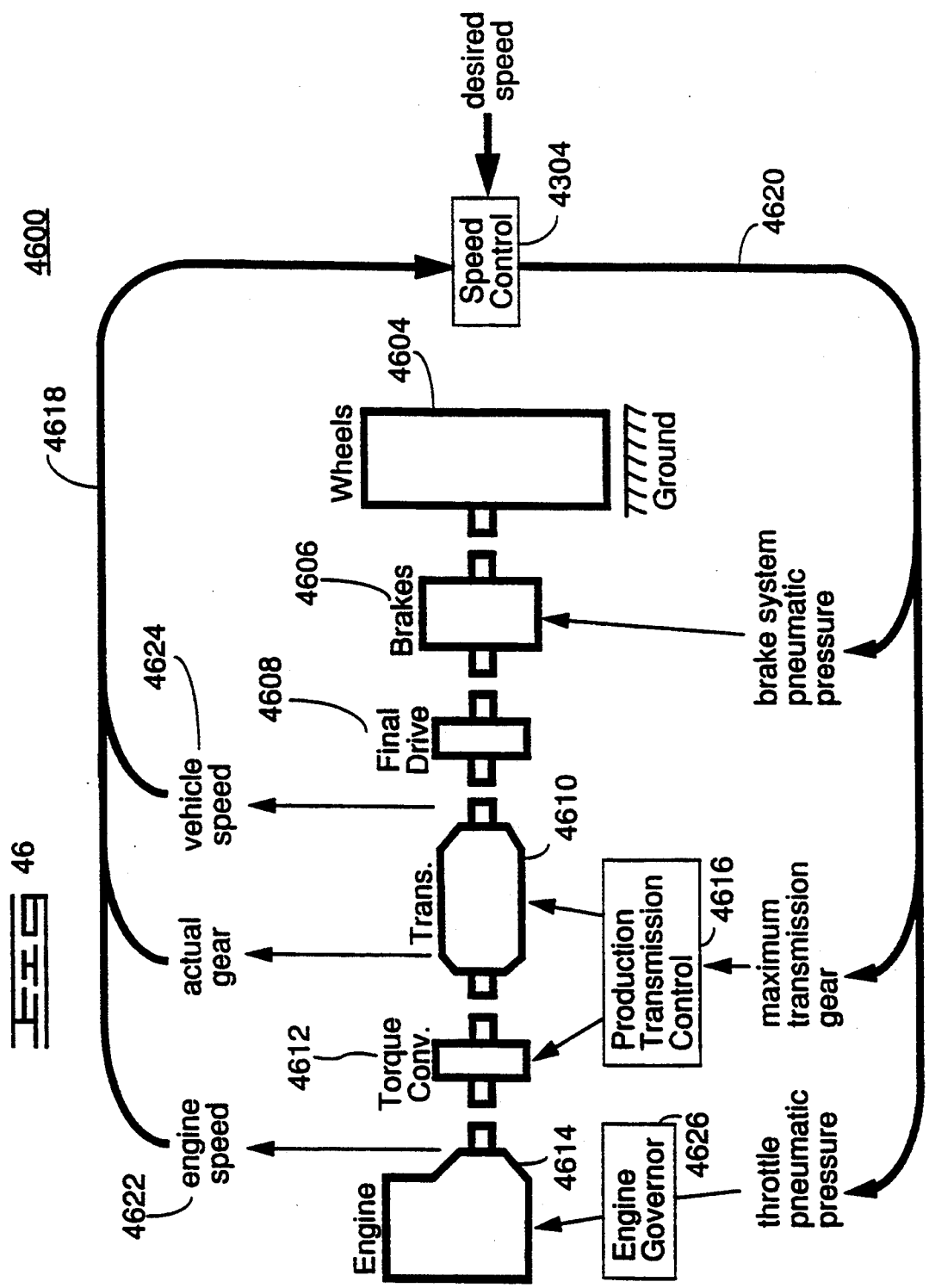
FIG. 46 is a high level block diagram 4600 of a speed control 4304 of the preferred embodiment.

Referring to FIG. 46 a governor 4626 controls engine speed 4222, which in turn controls vehicle speed 4624. The engine power is transferred to the drive wheels through the drive train 4600 which is comprised of:
torque converter 4612
transmission 4610
final drive 4608
brake system 4606
wheels 4604

The function of these systems is well known in the art.

Several key systems were modified in accordance with the present invention to effect autonomous control. The primary systems were the speed control (engine speed, transmission, vehicle speed, and brakes) and steering systems. Each key system is design with manual override capability as a safety measure. In all cases, manual control has priority so that if the vehicle is operating autonomously, and an operator takes control of any one of the vehicle functions, control automatically is returned to the operator.

The system also provides an emergency override button (not shown; also referred to as a 'panic' button) which, when activated, disables all electronically controlled systems and returns the vehicle 102 to manual control 4402.

The system also provides for sensing the pneumatic pressure which is a key part for actuating some of the key systems. If this pressure falls below some preset threshold, it is assumed that there is a problem and the vehicle control system reverts to manual control 4402 and the vehicle 102 is stopped.

FIG. 48 depicts the system used to control engine speed. This system uses electronically controlled valves 4808 and 4812 to regulate pneumatic pressure in parallel to a pedal 4806 which can be manually operated to override electronic control of the engine speed 4622. The pressure sensor 4802 and the engine speed sensor 4622 provide the necessary feedback for the electronic speed control system 4304.

Also required to control the vehicle speed is a transmission control 4616. The basic control system is readily available on the particular vehicle used for this purpose.

In addition to controlling the engine speed 4622 as a means of regulating vehicle speed, it is also necessary to control the vehicle service brakes 4606. This system is shown in FIG. 47 and is necessary to effect normal stoppage or slowing of the vehicle 102. This system uses electronically controlled pneumatic valves 4712 and 4716 in parallel with a manually operated brake pedal 4708 and/or retarder lever 4710 to regulate the braking force. These two manual inputs can override the electronic control system when actuated. The pressure sensor 4702 and the vehicle speed sensor 4624 provide the necessary feedback to regulate the braking force.

Figure 49:
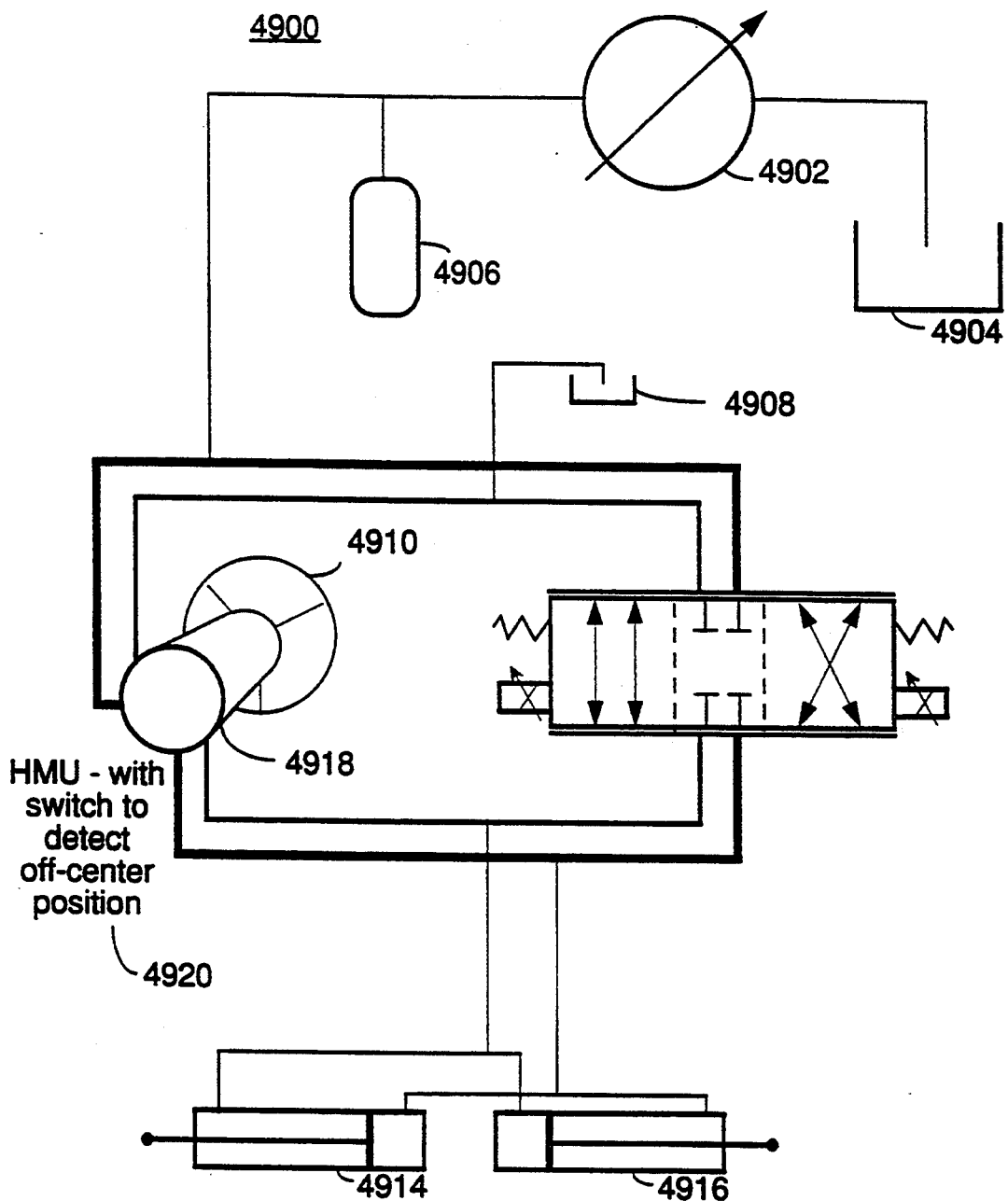
FIG. 49 is a high level block diagram 4900 of a steering control circuit 4306 of the steering control system of the preferred embodiment of the present invention.

Control of vehicle steering is also required for the vehicle to operate autonomously. The system which performs this function is shown in FIG. 49. The system consists of a Rexroth proportional hydraulic valve 4912 which can be actuated electronically to provide flow to hydraulic cylinders 4914 and 4916 attached to the vehicle steering linkage. The system also comprises a manually operable hand-metering unit, or HMU, 4918, which is in parallel to the electronically controlled system. The manual system can override the electronic system, if required, as a safety measure. Also, the system provides a switch 4920 on the HMU to detect when the manual steering wheel 4910 is different from the centered position. When not centered, the autonomous system assumes that the system is being operated manually 4402 and disables autonomous control of the vehicle 102.

Electronic control of the vehicle parking brake is also included as an added safety feature. This system is shown in FIG. 50. For proper operation under autonomous control, the parking brake is manually placed in the 'ON' position. When the vehicle proceeds through the status modes (MANUAL 4402, READY 4404, and AUTO 4408), the parking brake is automatically released by electronically controlling the pneumatic valve 5008. This system is in parallel to the manual systems comprised of the brake lever release valve 5016 and the Emergency brake lever 5014.

When a problem is encountered, the vehicle 102 is automatically placed under manual control. Since the manual setting of the park brake is normally 'ON', this activates the parking brake, stopping the vehicle 102 as quickly as possible.

4. Steering Control

Referring again to FIG. 43, the steering control functional block 4306 is responsible for controlling the steer angle of the vehicle's wheels. It sends out commands to a valve 4912 to control the steer angle and receives information from a resolver (not shown) mounted on the tie rod system, so that it knows what the actual wheel angle is.

The steering angle can be controlled with an accuracy on the order of a half a degree, and the resolver is accurate to something less than that, on the order of an eighth of a degree.

At some point in the useful life of the vehicle 102 the resolver may go out of adjustment. If this happens, the vehicle will not be able to track the path 3312 properly.

However, the navigator 406 constantly monitors the vehicle 102 to determine how far the vehicle 102 is from the desired path 3312. (The vehicle 102 is always off the desired path 3812 to some extent, and the system is constantly correcting.) If the vehicle 102 is more than a certain distance, for example several meters, from the desired path 3312, the navigator 406 stops the vehicle as a safety precaution.

The steering control system 4306 itself is also always checking to make sure the resolver is accurate, and that steering commands 420 received have not been corrupted (not shown) by noise or other error sources. A steering simulation model may also be implemented as an additional check of the system.

The autonomous steering system 4900 may be designed to be implemented in parallel with a manual steering system, and can be retro-fitted on to the vehicle 102 in a similar manner as the speed control system.

As shown in FIG. 49, the existing or production manual steering system has a manual steering wheel 4910 which turns a hand metering unit, or HMU 4918. The HMU 4918 controls a valve 4912 which controls flow of hydraulic fluid to steering cylinders 4914, 4916, which turn the wheels (not shown).

A switch 4920 on the HMU 4918 detects off-center position of the steering wheel 4910 as an indication to change to manual control of steering. An operator riding in the cab can merely turn the steering wheel 4910 to disable autonomous steering control 4408.

Under autonomous steering control 4408, the manual steering wheel 4910 in the cab remains centered no matter what position the autonomous steering control has turned the wheels to. There is no mechanical linkage between the steering wheel 4910 and the wheels themselves.

Of course a vehicle 102 may be manufactured without any manual steering system at all on the vehicle if desired. To drive the vehicle manually, the tele-panel 410 could be used, or some sort of tele-panel might be plugged into the side of the vehicle 102 to control it without a radio link 4506 in close quarters, for instance. A jump seat might be provided for an operator in such situations.

Some discussion of the steering model developed may facilitate a better understanding of the present invention.

a. Steering Model

The basis for the steering planner is a tricycle steering model shown in FIG. 5.1. This model permits the calculation of the required steer angle independent of the velocity of the vehicle.

$$\Phi = \tan^{-1} LC \text{ path}$$

To use this model, the desired path 3312 must contain the curvature of the path to be followed. The curvature is the inverse of the instantaneous radius of curvature at the point of the curve.

b. Path Representation

Referring to FIGS. 22-34, the response of autonomous vehicle 102 in tracking a path 3312 depends partly on the characteristics of the path 3312. In particular, continuity of the curvature and the rate of change of curvature (sharpness) of the path 3312 are of particular importance, since these parameters govern the idealized steering motions to keep the vehicle 102 on the desired path 3312. In the case where a path 3312 is specified as a sequence of arcs and lines, there are discontinuities of curvature at the point where two arcs of differing radii meet. Discontinuities in curvature are troublesome, since they require an infinite acceleration of the steering wheel. A vehicle travelling through such transition points with non-zero velocity will experience an offset error along the desired path 3312.

Figure 33:
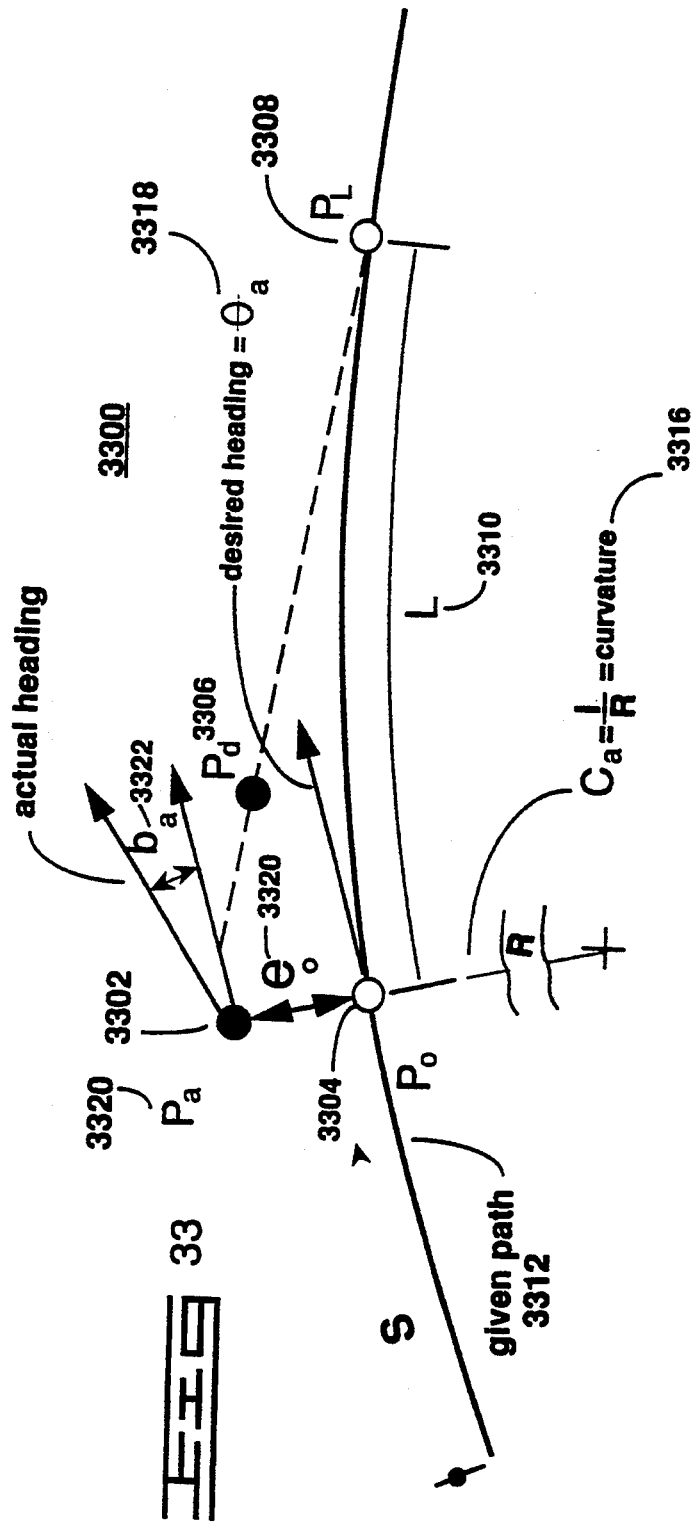
FIG. 33 is a diagram 3300 showing how an error vector including curvature is computed.
Figure 34:
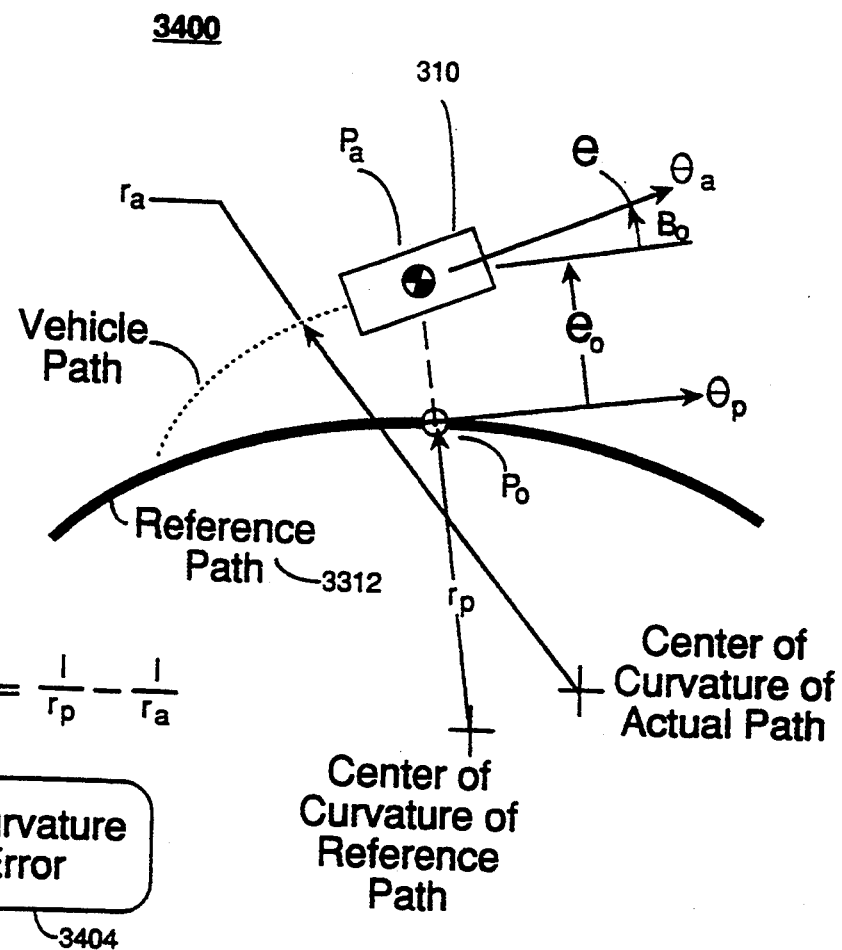
FIG. 34 is a diagram 3400 showing how an error vector including curvature is computed with the vehicle path included.

In general, and as shown in FIG. 33, if a posture 3314 is desired as the quadruple of parameters—position 3320, heading 3318, and curvature 3316 (x, y, 0, c), then it is required that the path 3812 be posture-continuous. In addition, the extent to which steering motions are likely to keep the vehicle 102 on the desired path 3312 correlates with the linearity of sharpness of the path, since linear curvature along a path means linear steering velocity while moving along the path.

Certain spline curves guarantee posture continuity. However, these spline curves do not guarantee linear gradients of curvature along curves. Clothoid curves 2602 have the "good" property that their curvature varies linearly with distance along the curve. Paths composed of (a) arcs and straight lines or (b) clothoid segments have been developed.

A path that has discontinuities in curvature results in larger steady state tracking errors. This is particularly the case when the actuators are slow.

The path representation must contain sufficient information to calculate the steer angle 3112 (See FIG. 31) needed to drive the desired path 3312, that is, it must consist of at least the position, heading, curvature and speed. A position on the desired path 3312 has been defined as a posture 3314, and the structure of a posture in the present invention is given by:

c. Posture Definition

North: desired north coordinate
East: desired east coordinate
Heading: desired heading
Curvature: desired curvature
Speed: desired ground speed
Distance: distance between current posture and the previous posture.

d. Position Information

The position information 3322 is obtained from the VPS 1000 and is, for example, 71 bytes of data. The structure of the information used to track the desired path 3312 is a subset of the 71 byte VPS output and is given by the VPS short definition shown below.

e. VPS Short Definition

Time: gps time
North: wgs 84_northing
East: wgs 84_easting
Heading: compass direction vehicle is moving
Curvature: calculated from other variable
N_velocity: north velocity
E_velocity: east velocity
Yaw rate: rate of change of the heading
G_speed: ground speed distance travelled f. Steering Method

The steering planner calculates the steer angle needed to follow the desired path. If the vehicle 102 was on the desired path 3312, the steer angle is:

ON PATH $\Phi steer = f(Cdesired) = \tan^{-1} LC$

If the vehicle 102 is off the desired path 3312, then the steer angle is:

OFF PATH $\Phi steer = f(Cdesired + Cerror)$.

The method of the present invention used to calculate Cerror is a quintic method. The quintic is a fifth degree polynomial in an error space that defines a smooth path back to the desired path 3312. The degree of the polynomial is defined by the needed data, that is, Cerror and the known end constraints.

Polynomial in error space:

$$\text{error}(s) = a_0 + a_1 s + a_2 s^2 + a_3 s^3 + a_4 s^4 + a_5 s^5 \Big|_0^L$$

$$\text{error}'(s) = a_1 + 2a_2 s + 3a_3 s^2 + 4a_4 s^3 + 5a_5 s^4 \Big|_0^L$$

$$\text{error}''(s) = 2a_2 + 6a_3 s + 12a_4 s^2 + 20a_5 s^3 \Big|_0^L$$

at s=O:
  error (O) position = current desired position − current actual position
  error' (O) heading = current desired heading − current actual heading
  error" (O) curvature = current desired curvature − current actual curvature at s=L (L=lookahead distance):
  error (L) position = O
  error (L) heading = O
  error (L) curvature = O The coefficients of the polynomial error(s) are functions of L, the distance at which the errors go to zero:

$$\text{error}(O) = a_0$$

$$\text{error}'(O) = a_1$$

$$\text{error}''(O) = 2a_2$$

$$\text{error}(L) = a_0 + a_1 L + a_2 L^2 + a_3 L^3 + a_4 L^4 + a_5 L^5$$

$$\text{error}'(L) = a_1 + 2a_2 L + 3a_3 L^2 + 4a_4 L^3 + 5a_5 L^4$$

$$\text{error}''(L) = 2a_2 + 6a_3 L + 12a_4 L^2 + 20a_5 L^3$$

These five equations are solved symbolically for the coefficients $a_0, a_1 \ldots a_5$. Then, each coefficient can be easily determined for any reasonable set of boundary conditions.

Once the coefficients of the polynomial are obtained, the error"(s) can be evaluated for some picked_s, which corresponds to a distance along desired path from s=O and is presently defined as:

$s_{picked}$ = ground speed*planning interval to obtain the correction term:

$Cerror = error''(s_{picked})$curvature to calculate the new steer angle:

$\Phi steer = \tan^{-1} [(Cdesired + Cerror_{@spicked}) L]$

This calculation is done at each planning interval which is presently 0.25 sec. (dt_plan).

5. Monitor/Auxiliary

Referring now to FIG. 43, the monitor/auxiliary functional block(s) 4308 and 4310 take care of some miscellaneous functions not performed by the other blocks of the vehicle control system. For instance, start or kill the engine 4616, honk the horn, raise or lower the bed, setting the parking brake on or off, turning the lights on or off, are some of its functions.

The monitor block 4310 also checks the commands that are being sent by or to the other functional blocks on the bus 4314 to see if they are valid. If error is detected, it will signal the shutdown circuits block 4312 and the system will shutdown as discussed below.

6. Safety System (Shutdown)

a. Introduction

The safety system, including shutdown circuits 4312, (see FIGS. 43 and 52) operates to stop the vehicle 102 on detection of a variety of error conditions by setting the parking brake on. This results in the vehicle 102 coming to a safe stop in the shortest distance possible.

Since the parking brake is designed to be normally "set" or "on," and the electronic circuits operate to release it, upon a failure of the electronic controlling system(s) the power 5216 is turned off to the actuators 5006, so that there is no power to actuate valves, and the parking brake returns to its normal position, called "set."

Whenever several erroneous commands are received, or whenever the speed and/or steering simulation models disagree beyond an acceptable tolerance with vehicle sensor outputs 4622 and 4624, are examples of conditions which could result in shutdown of the system. The shutdown system 4312 is an independent and separate subsystem from the other autonomous control subsystems (see FIGS. 43 and 52).

b. Shutdown Control

Figure 52:
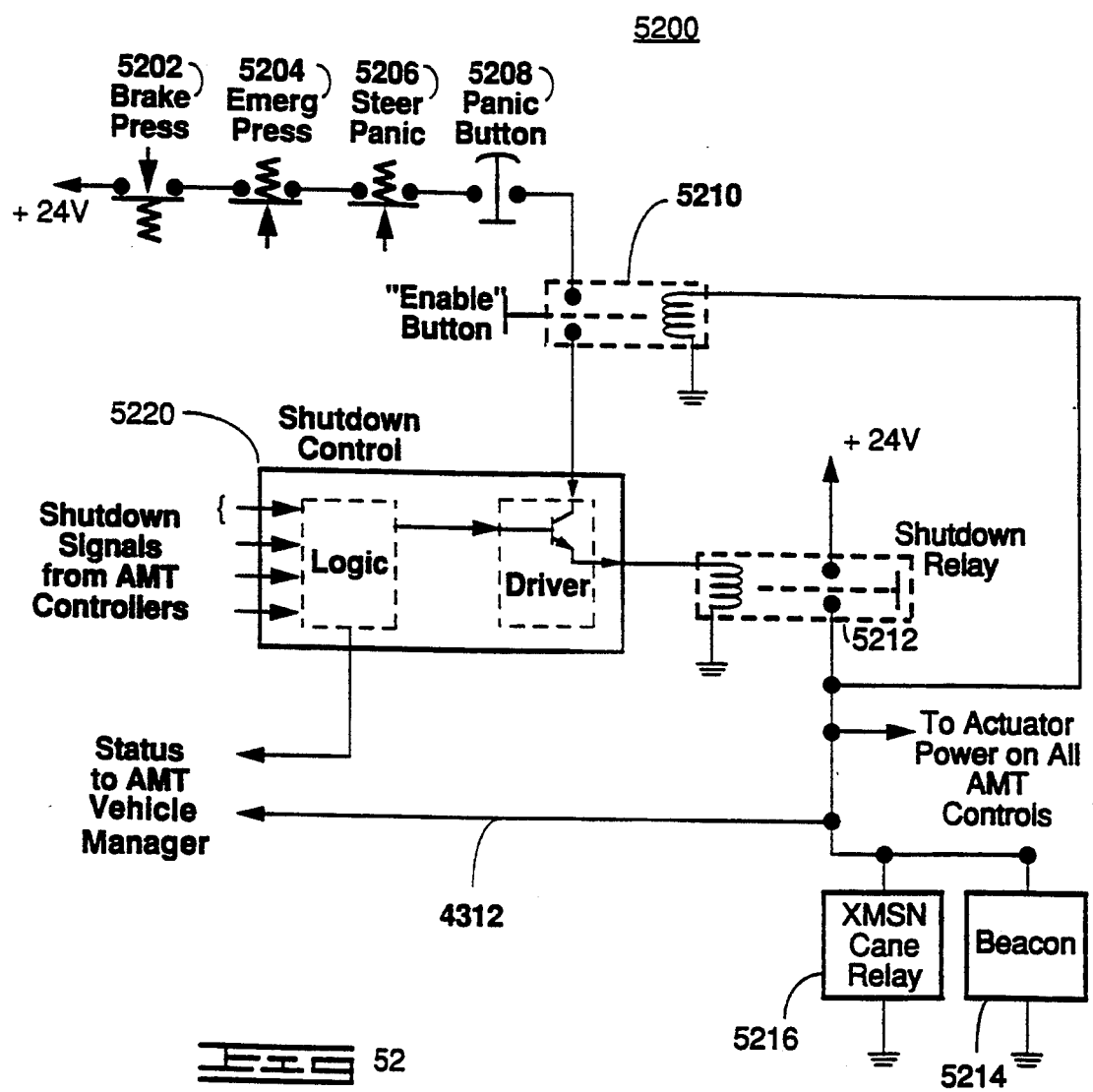
FIG. 52 is an intermediate level block diagram 5200 showing an embodiment of a shutdown circuit of the present invention.

The safety system shutdown circuits 4312 shown in FIG. 43 connected to receive the outputs of the other vehicle control system functional blocks is shown in more detail in FIG. 52.

It is a fail-safe type design. It contains no microprocessor at all. It is all hard-wired, discrete logic.

A feature of the vehicle control system 4312 design is that all functional blocks are capable of detecting errors in the output of the others on the serial bus 4314. So if one of them senses that another is not functioning correctly, it can send a signal to the shutdown circuits 4312 to shut the system down.

For example, the speed and steering blocks each look at their received commands (received via the vehicle manager 4302) to make sure they are valid. They also make sure that what they are told to execute, that is, what they are requested to command, is within predetermined bounds. If not, they will act to shut the system down.

The safety system may also be monitoring oil, hydraulic and pneumatic pressures, and temperatures, for instance, making sure they are sufficient to safely operate and control the vehicle.

The safety system includes switches for manual override, including a panic stop 5208, switches on the brake pedal 5202 and steering wheel 5206.

7. Bus Architecture

The bus 4314 that inter-connects the vehicle control system functional units 4302, 4304, 4306, 4308, and 4310 is a serial data type common bus implemented in a ring structure using a data packet collision detection scheme.

F. Functional Descriptions/Methods

1. Navigator

Figure 53A:
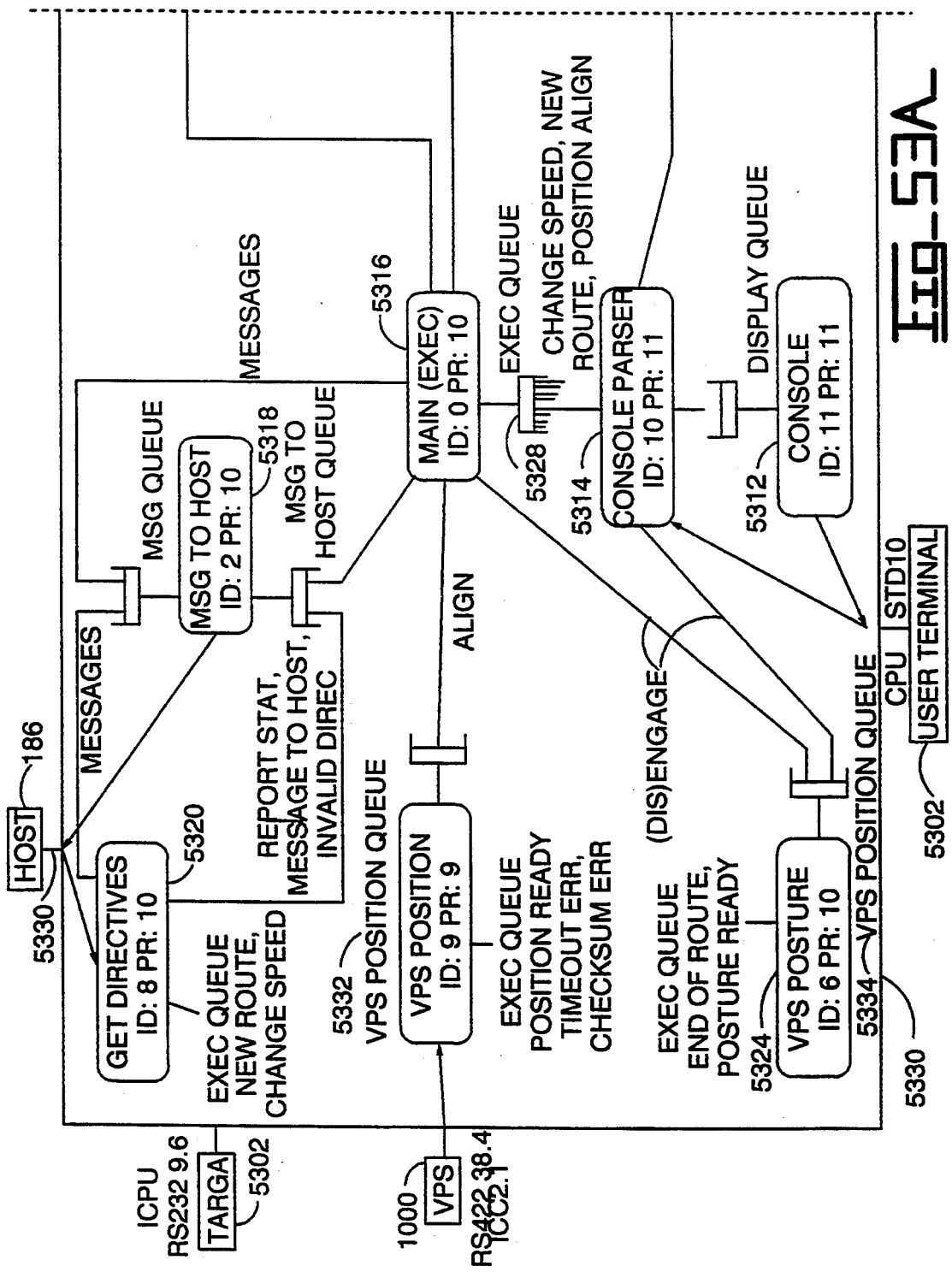
FIG. 53 is a low level communications diagram 5300 showing tasks of a navigator 406.
Figure 53B:
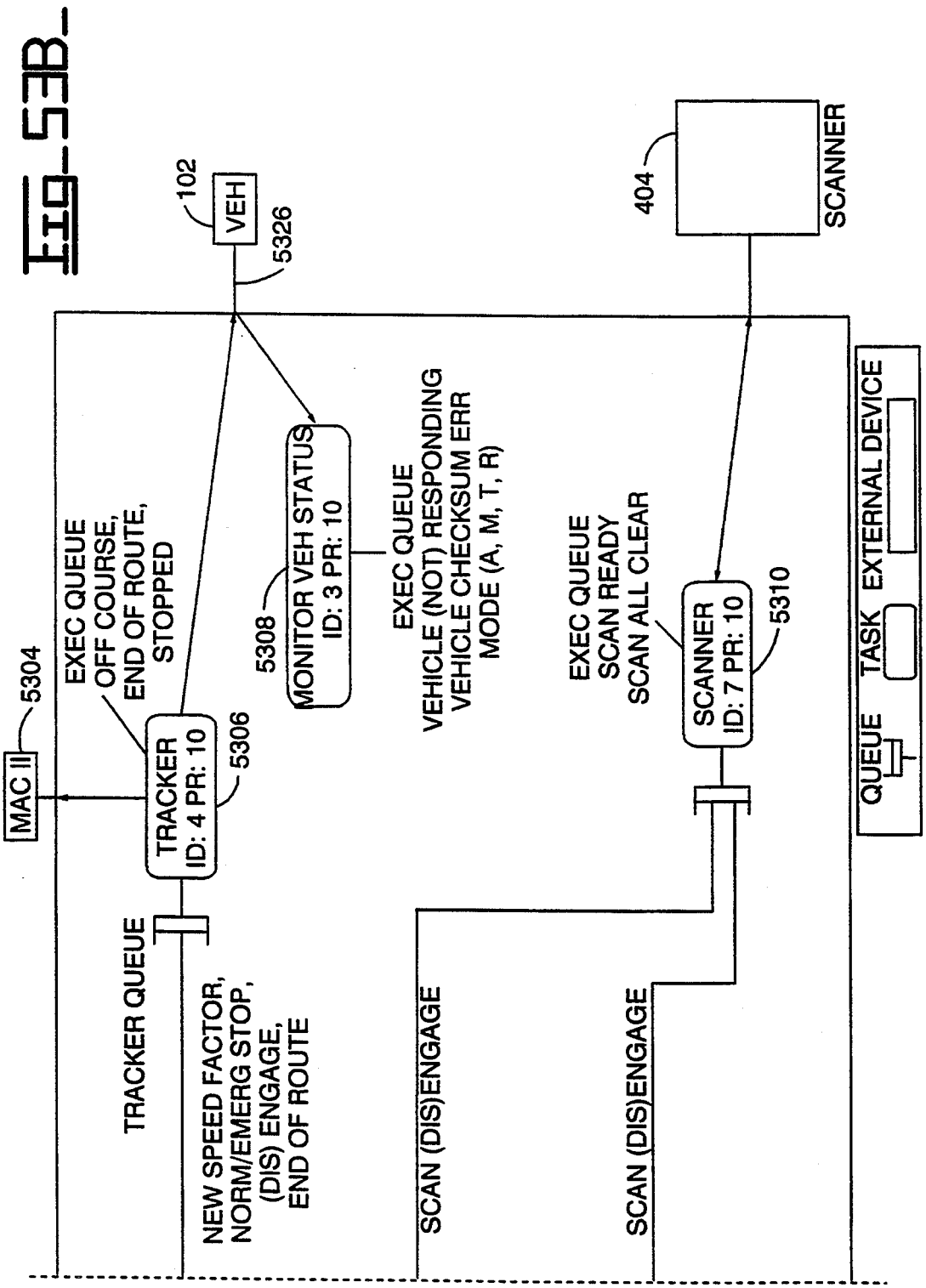

The following is a description of the navigator 406, shown in FIG. 53, titled TASK DIAGRAM. Each of the tasks diagrammed is discussed below.

a. Main (Executive)

In the center of FIG. 53 is a task labelled "main (exec)" 5316. This task 5316 coordinates inter-task communications and performs high level decision making for the navigator 406. One of the primary decisions the task 5316 makes is when to (dis)engage the tracker 5306, based on messages received from the other tasks in the system.

b. Monitor_VEH Status

This task 5308 is shown above and to the right of the "main" task 5316. It functions to read the vehicle port 5326, and report vehicle mode changes and navigator-to-vehicle communication state to the "main" 5316 via the EXEC QUEUE 5328. Additionally, the status of the vehicle 102 is written to a global memory structure 5400 (see FIG. 54).

c. Scanner

Shown in the lower right-hand corner of the task diagram FIG. 53 is the scanner task 53n10, which provides for communication to the "main" 5316 of data from the obstacle detection system 404.

d. Console and Console_Parser

The console 5312 and the console-parser 5314 are shown just below the "main" task 5316 in the task diagram FIG. 53. These tasks were developed as a debugging tool during the development of the system. They display and manipulate navigator 406 states according to user input from a terminal 5302. The console_parser task 5314 also is used to set tracker parameters.

e. Get_Directives

This task 5320 is shown in the upper left-hand corner of the task diagram FIG. 53. It is part of the host-navigator interface 5330. Messages from the host processing system 186 are received and decoded by this task 5320. Then, depending on the message, the message is either communicated to the "main" task 5316, or to another task. This other task would then formulate an appropriate response from the navigator 406 to the host processing system 186.

f. MSG_To_Host

This task 5318, shown just above and to the left of the "main" task 5316, formulates messages from the navigator 406 to the host processing system 186 and communicates them to the host processing system 186.

g. VPS_Position

This task 5322 is shown at the left side of the task diagram FIG. 53. The vps_position task 5322 reads the (20 Hz) output from the VPS 1000. The data is checked for correctness (for example, "checksum") and if correct, it is put into a global memory structure 5400, the position buffer (VPS_POSITION_QUEUE) 5332. The task sends a message to the "main" 5316 whenever a position fault occurs.

h. VPS_Posture

This task 5324 is shown at the lower left-hand corner of the task diagram. When the vehicle is tracking, this task maintains the posture buffer (VPS_POSTURE_QUEUE) 5334. The task (5324) monitors the vehicle's position and maintains approximately 50 postures, from the current vehicle position in the direction of travel, in the posture buffer (3000).

i. Tracker

Shown in the upper right-hand corner of the task diagram FIG. 53, the task 5306 reads the current position 5332 and posture buffers 5334. Based on the information read, task 5306 calculates steer and speed corrections 420. It sends them to the vehicle 102, thereby controlling the vehicle's course.

j. Navigator Shared (Global) Memory

As mentioned above With regard to the navigator tasks 5300, the navigator 406 has a global memory structure 5400 which the various tasks read/write. This memory structure 5400 is illustrated in FIG. 54.

Referring now to FIG. 54, the tasks are depicted as ellipsoids, with the particular task written inside. The memory 5400 is depicted in the center section of FIG. 54 as a stack of boxes. Unprotected memory is depicted as a single box in the stack of boxes. Semaphore protected memory is depicted as a box within a box in the stack.

An arrow points in the direction of data transfer between tasks and memory. Therefore, a write to memory from a task is shown as a line with an arrow pointing towards the memory in question from the task. Likewise, a read from memory by a task is depicted by a line with an arrow pointing towards the task in question from the memory. Where two-way data transfer between task and memory exists, a line with an arrow at both ends is shown.

k. Main (Exec) Flow Charts

FIGS. 55 and 56A–56D are flow charts of the navigator main or executive task 5316.

Figure 55:
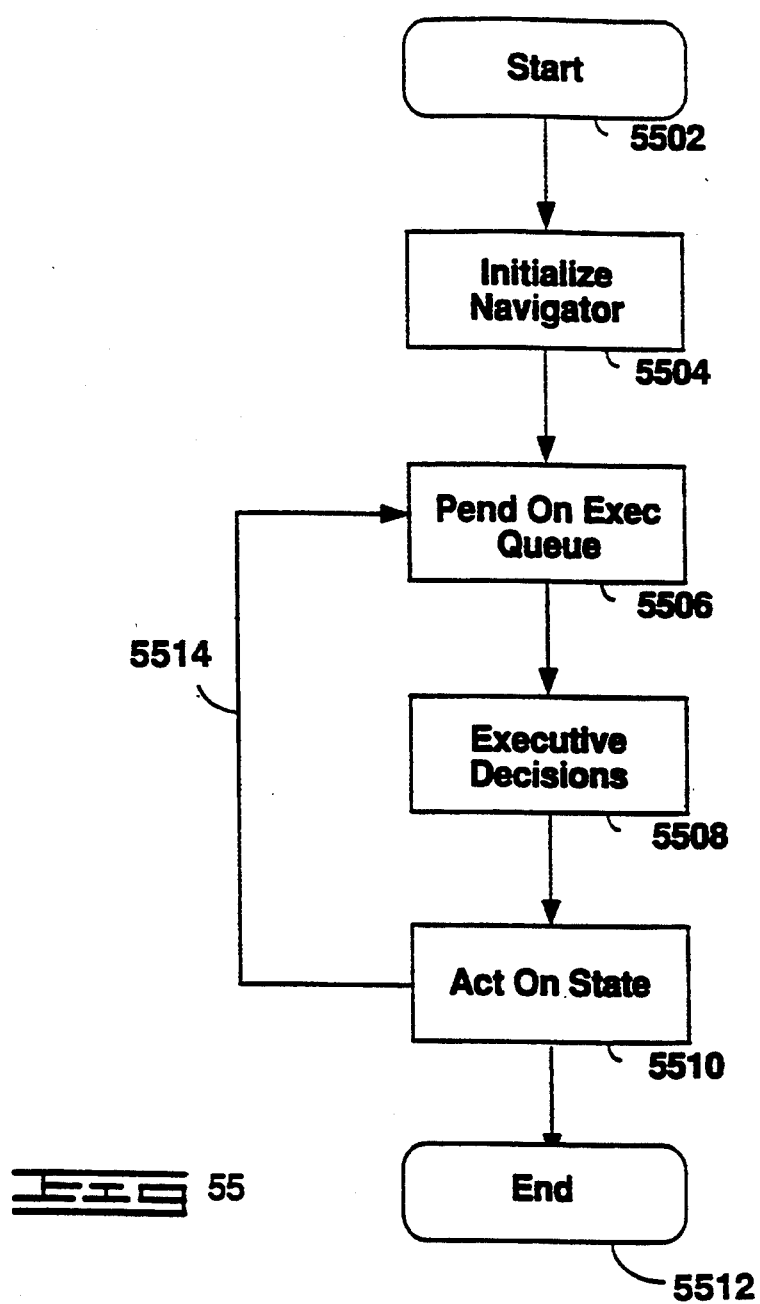
FIG. 55 is a high level executive flowchart 5500 pertaining to executive decisions.

Referring first to FIG. 55, it is a diagram of the general structure of the main or executive task flow. The following describes several flowcharts associated with the navigator executive task 5316.

Referring to FIG. 55, which is the executive flowchart, it shows of five blocks: block 5502 which is the Start block; block 5504 which is the initialize navigator; block 5506, which is the Pend on Exec Queue; block 5506, which is the executive decisions; and block 5510, which is the act on state.

Flowchart FIG. 55 describes how the executive task 5316 executes its functions beginning at power up (switching on electrical power) of the navigator 406. Upon power up, the executive task 5316 (or Executive) begins at the start block 5502 and proceeds immediately to initialize navigator 5504, where the executive 5316 puts the navigator 406 in a known initial state. The executive then proceeds to the Pend on exec queue 5506 and waits for a message from a number of sources to arrive in its message queue 5328. For example, a typical message could be a query for information from the host processing system 186.

Upon receipt of a message in the Exec Queue 5328, the executive 5316 proceeds to the executive decisions block 5508. In this block, the executive 5316 sets a series of status flags in a known manner. These flags put the navigator 406 in a known state, particular to the message received.

Once the status flags have been properly set, the executive 5316 then proceeds to the Act on State 5510, where the necessary action is carried out according to the type of instruction received.

Referring now to FIGS. 56A–56D, they show the flow of the "executive decisions" block 5508 of the general structure diagram FIG. 55.

The various responses which the executive task 5316 can initiate are now described in more detail. There are a known set of messages which are expected within the Exec Queue 5328. These messages are shown in detail in FIGS. 56A–56D.

Figure 56A:
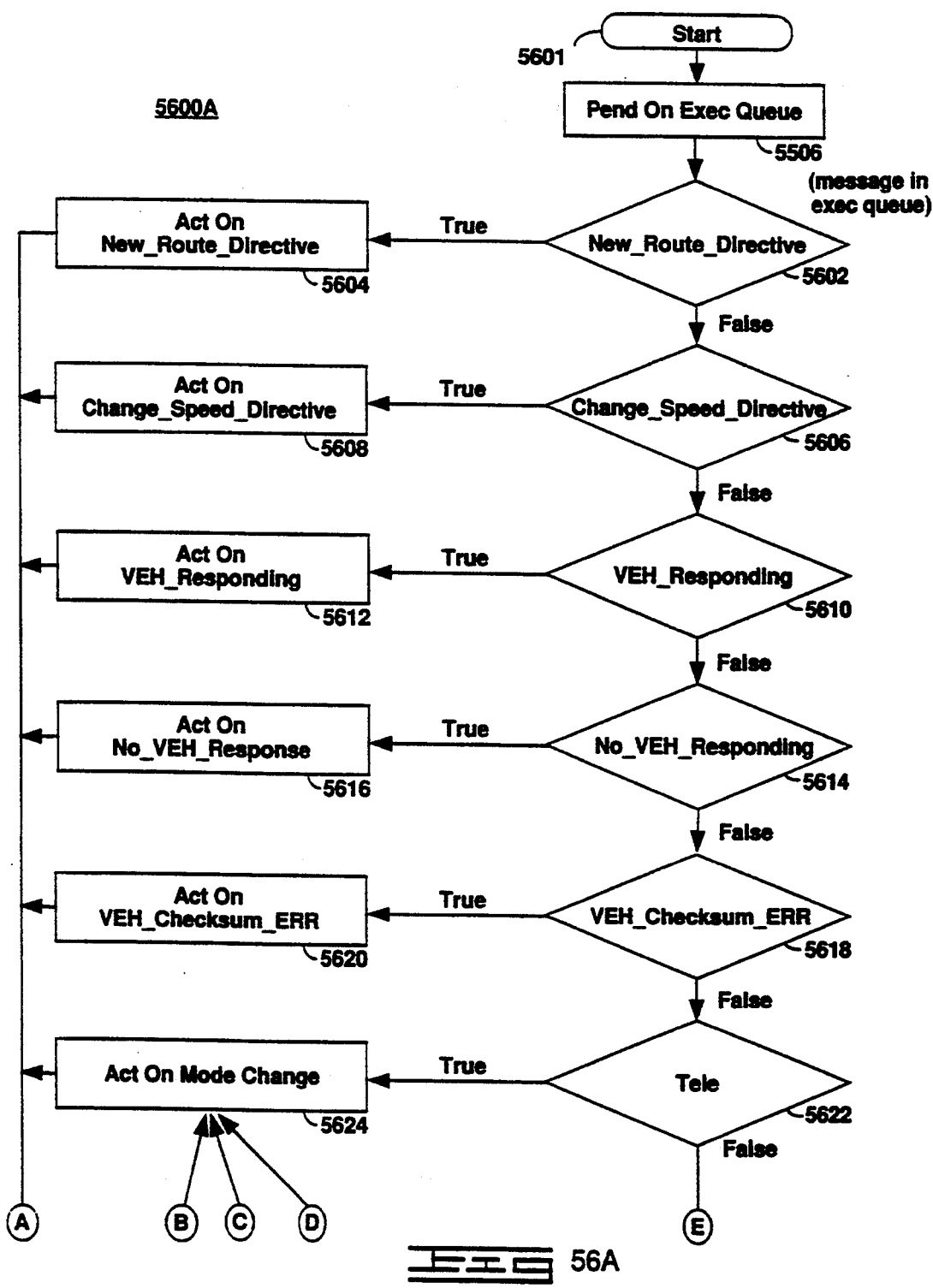

FIG. 56A diagrams the organization of FIGS. 56A–56D. FIGS. 56A–56D describe in detail the procedure which the executive 5316 uses to respond to various messages.

Referring to FIG. 56A, the action of the executive 5316 to particular messages is described. Upon receipt of a message to the Exec Queue 5328, the program flow leaves block 5506 and proceeds to block 5602, where the executive 5316 determines if the message is 'NEW_ROUTE_DIRECTIVE'. If the message is 'NEW_ROUTE_DIRECTIVE', then the executive 5316 proceeds to the Act On 'NEW_ROUTE_DIRECTIVE' block 5604. Once the action particular to the 'NEW_ROUTE_DIRECTIVE' message has been completed successfully, the executive 5316 then proceeds to the Act on State block 5510. Once the action has been completed, the executive 5316 returns to the Pend on Exec Queue block 5506 to await another message. If the initial message in block 5602 is not 'NEW_ROUTE_DIRECTIVE', then the executive 5316 proceeds to block 5606 to determine if the message is 'CHANGE_SPEED_DIRECTIVE'.

The response to messages such as 'CHANGE_SPEED_DIRECTIVE', 'VEH_RESPONDING', NO_VEH_RESPONSE', and VEH_CHECKSUM_ERR', follow a procedure similar to that described for the message 'NEW_ROUTE_DIRECTIVE'. However, the actions performed in the Act On '. . . ' blocks 5604 through 5620 are different for the different possible messages. The various types of valid messages and a brief description of each are:

- NEW_ROUTE_DIRECTIVE: set the route number for the vehicle to follow.
- CHANGE_SPEED DIRECTIVE: command a maximum possible speed for which the vehicle can traverse a particular part of the route.
- VEH_RESPONDING: the vehicle is responding to commands properly, set Navigator status flags to Healthy.
- NO_VEH_RESPONSE: the vehicle is not responding to commands, stop the vehicle.
- VEH_CHECKSUM_ERR: the vehicle is not receiving/sensing data correctly, stop the vehicle.
- TELE, MANUAL, READY, or AUTO: set the mode of the vehicle IN THE PROPER ORDER.
- VPS_TIMOUT: VPS is not sending data, stop the vehicle.
- VPS_CHECKSUM_ERROR: the VPS is sending garbled data, stop the vehicle.
- VPS_POSTURE_READY: ready to generate path postures.
- VPS_POSITION_READY: VPS data is available.
- VPS_POSITION_ALIGN: the VPS is initializing, do not move the vehicle.
- END_OF_ROUTE: the vehicle is approaching the end of the current route, has been reached inform the host processing system.
- SCAN_READY: the scanning system is ready look for objects in the path.

SCAN_ALL_CLEAR: no objects have been detected in the vehicle path, continue normally.

SCAN_OBSTACLE: an object has been detected on the vehicle path, stop the vehicle.

TRACKER_OFF_COURSE: the vehicle is not following the desired path within tolerance, stop the vehicle.

TRACKER_END_OF_ROUTE: tracker has reached the end of the path, stop the vehicle.

TRACKER_STOPPED: notify the Navigator that the tracking task has stopped the vehicle.

The responses to the messages 'TELE', 'MANUAL', 'AUTO', and 'READY' are somewhat different because these messages are related and must be acted upon in a specific order. This has been described above. The program flow for these messages is shown in FIGS. 56A and 56B with respect to block 5622-5630.

Figure 56B:
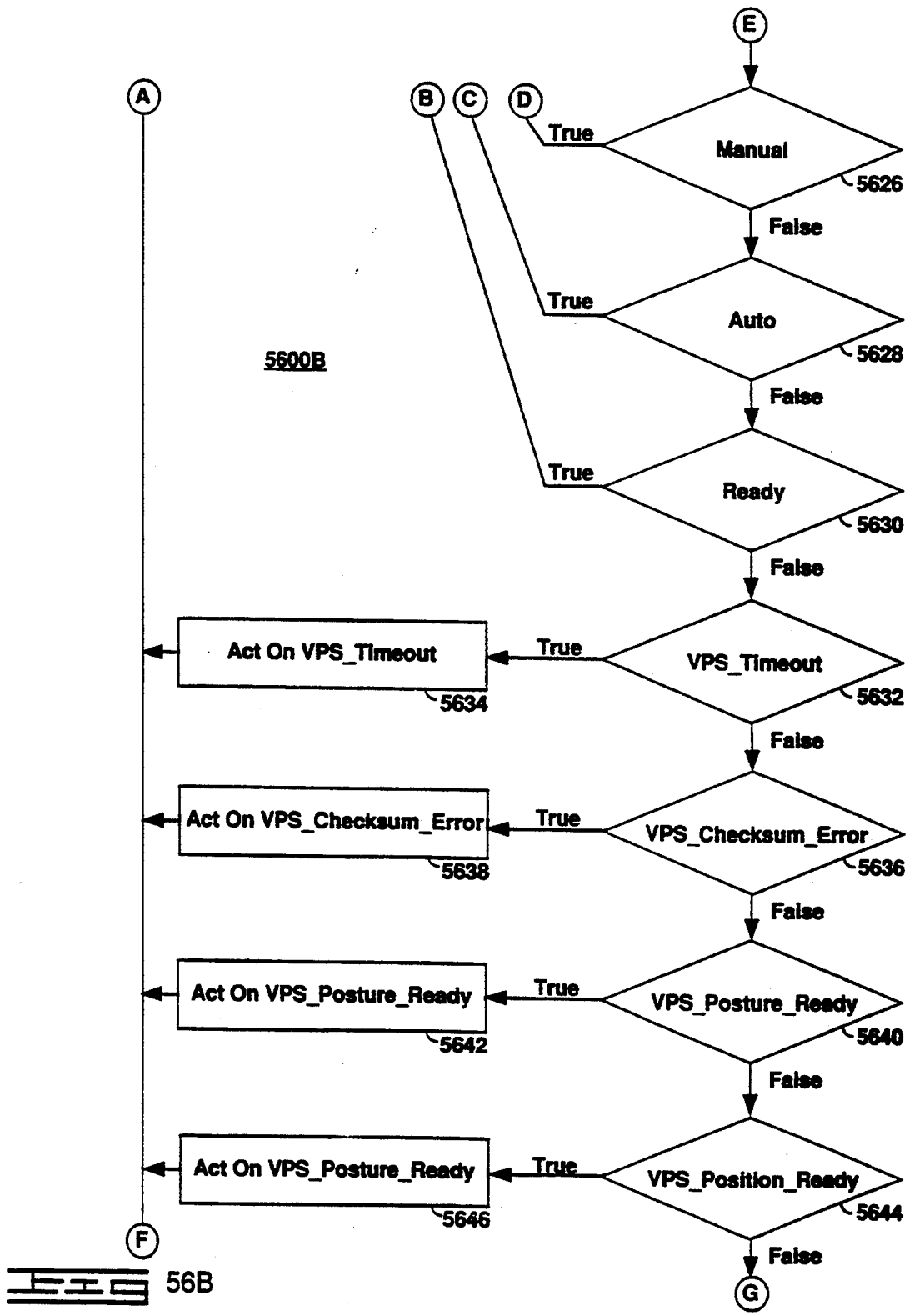
Figure 56C:
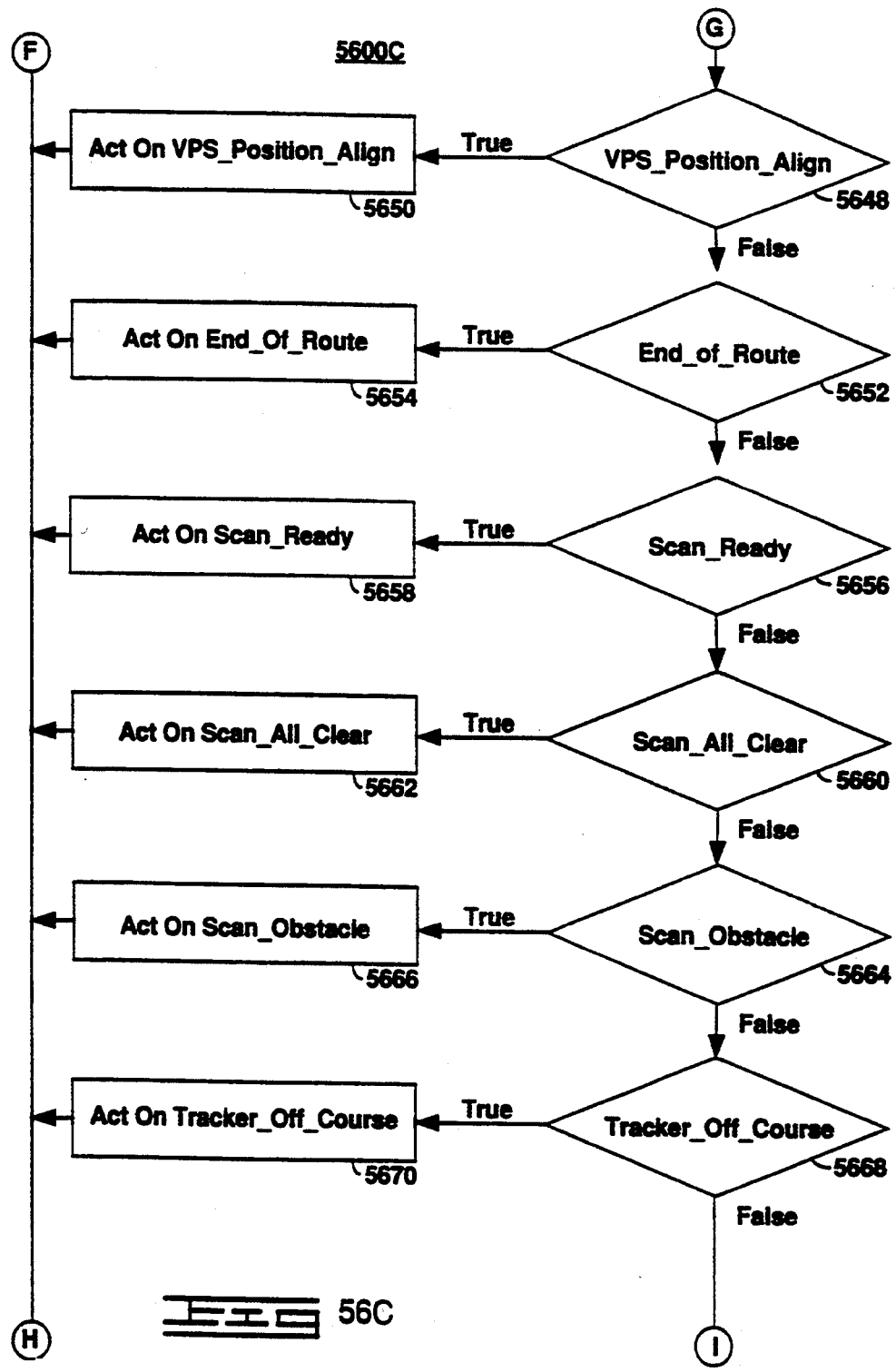

The response to subsequent message possibilities are depicted by blocks 5632 through 5678 in FIGS. 56B through 56D. These responses are similar to those described for the message 'NEW_ROUTE_DIRECTIVE'.

If the received message is not one of the expected messages, or if the message is garbled, then the executive 5316 is directed to block 5680, where the host processing system 186 is informed of the problem. The executive 5316 then returns to the Exec Queue 5506 to respond to the next message in the queue.

Figure 57A:
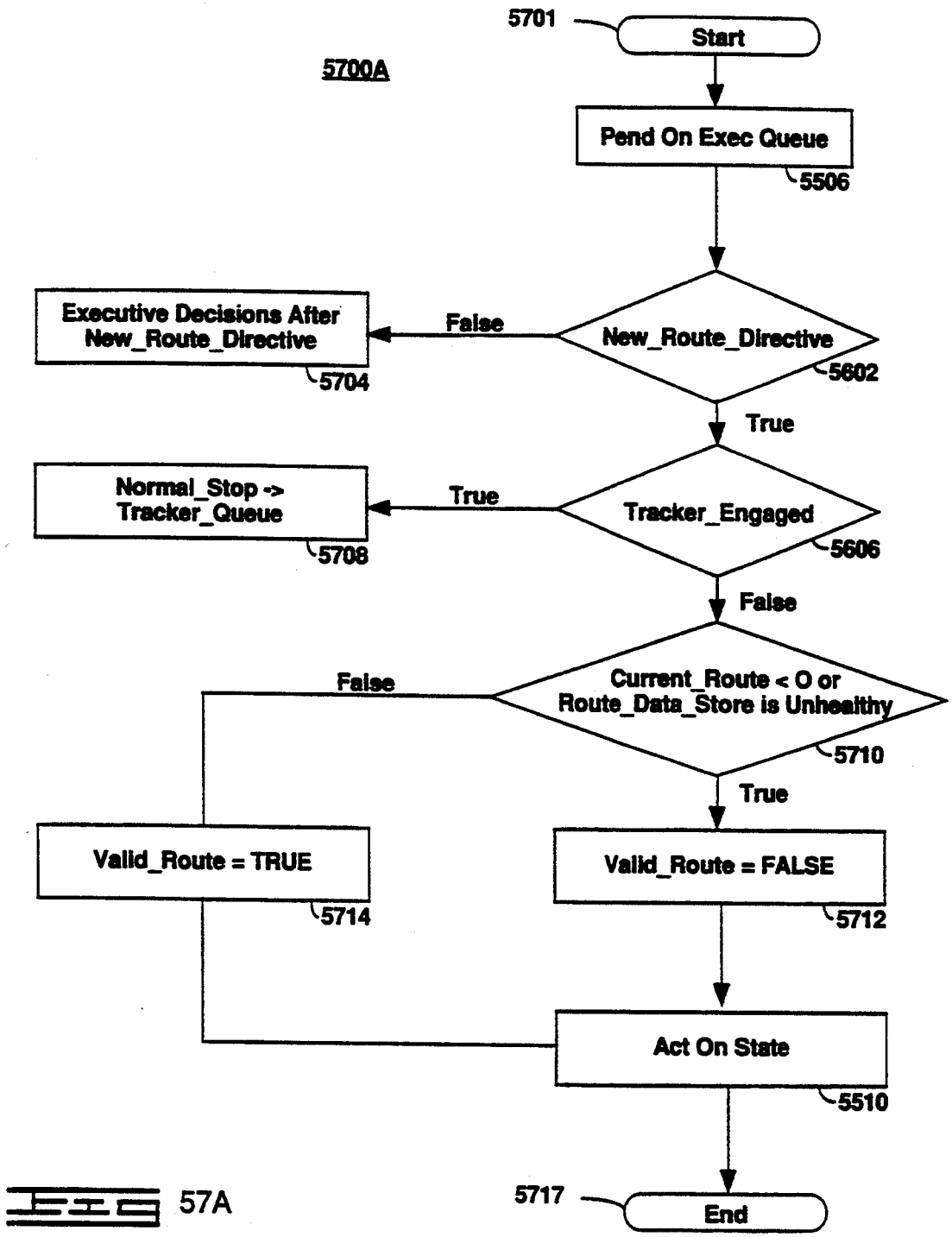
FIGS. 57A-57R are respective low level flowcharts 5700A-5700R, each showing "act on" blocks of the executive flowcharts 5600A-5600D.
Figure 57B:
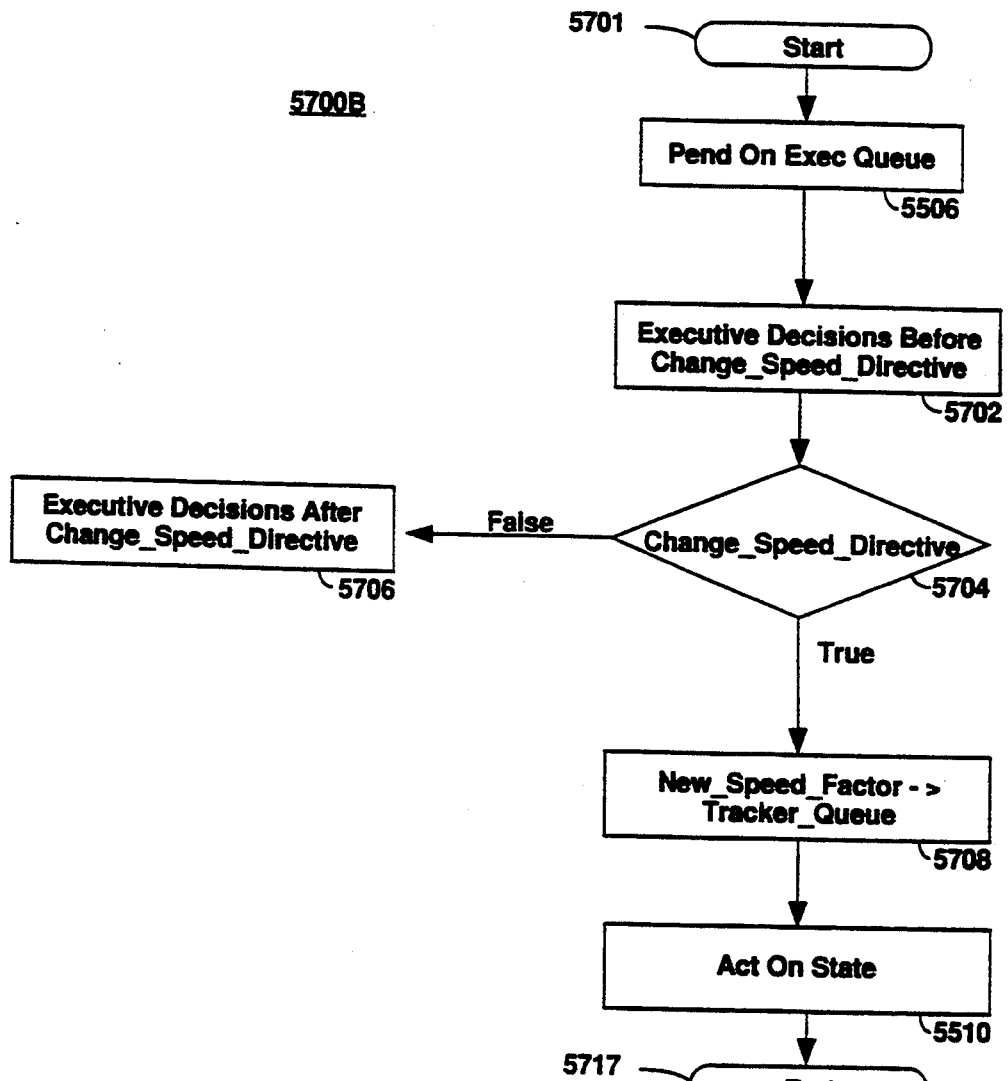
Figure 57C:
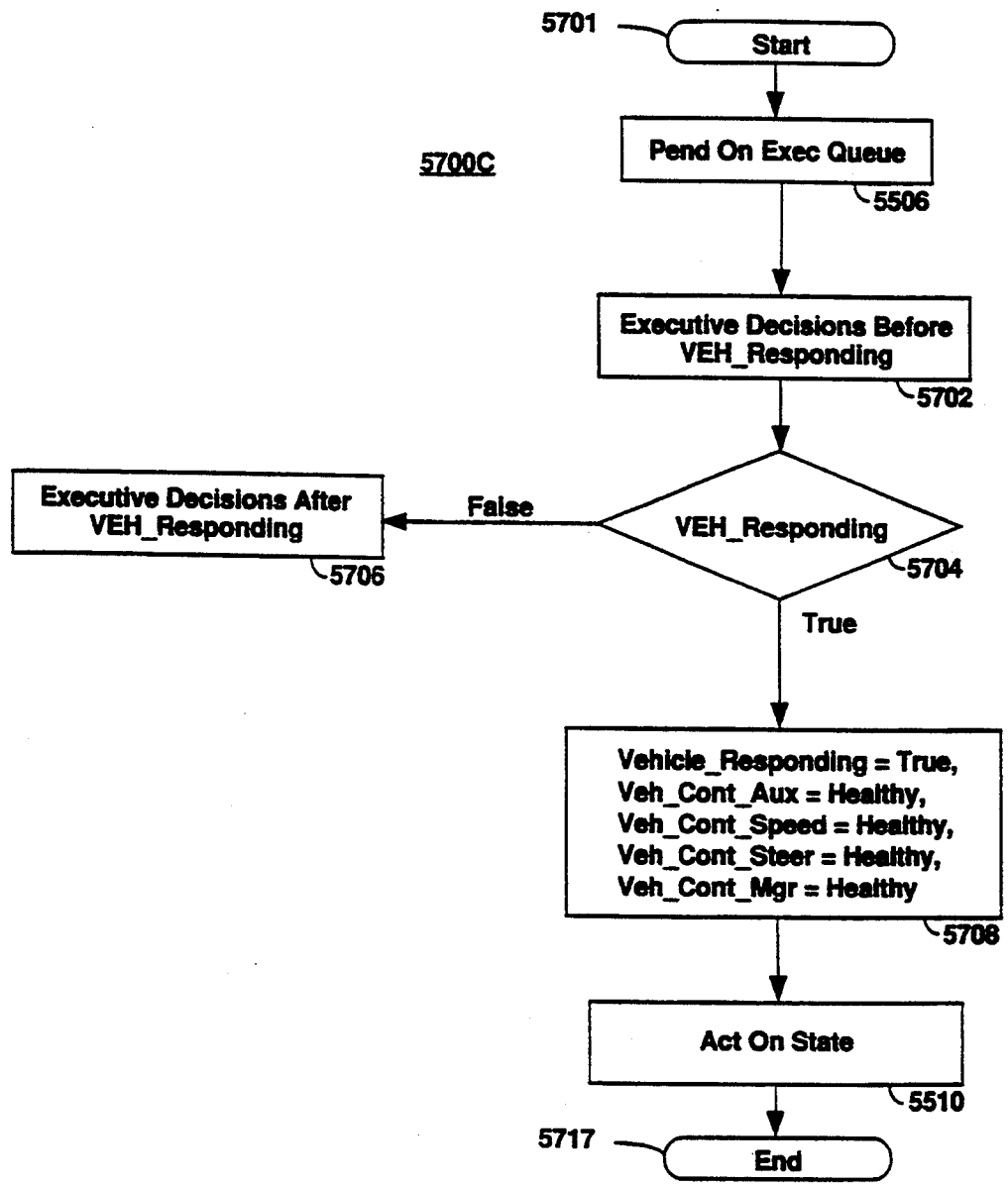
Figure 57E:
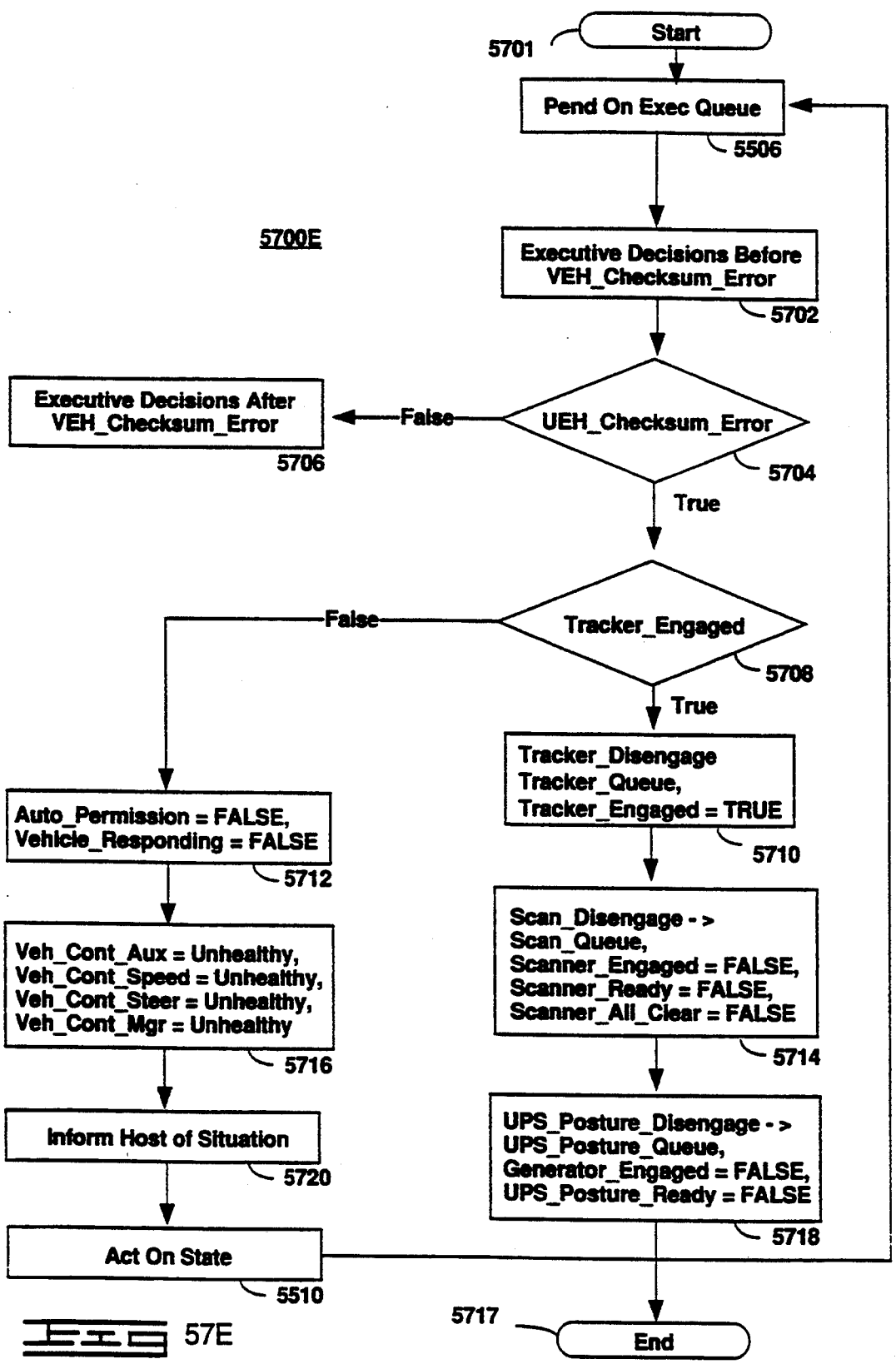
Figure 571:
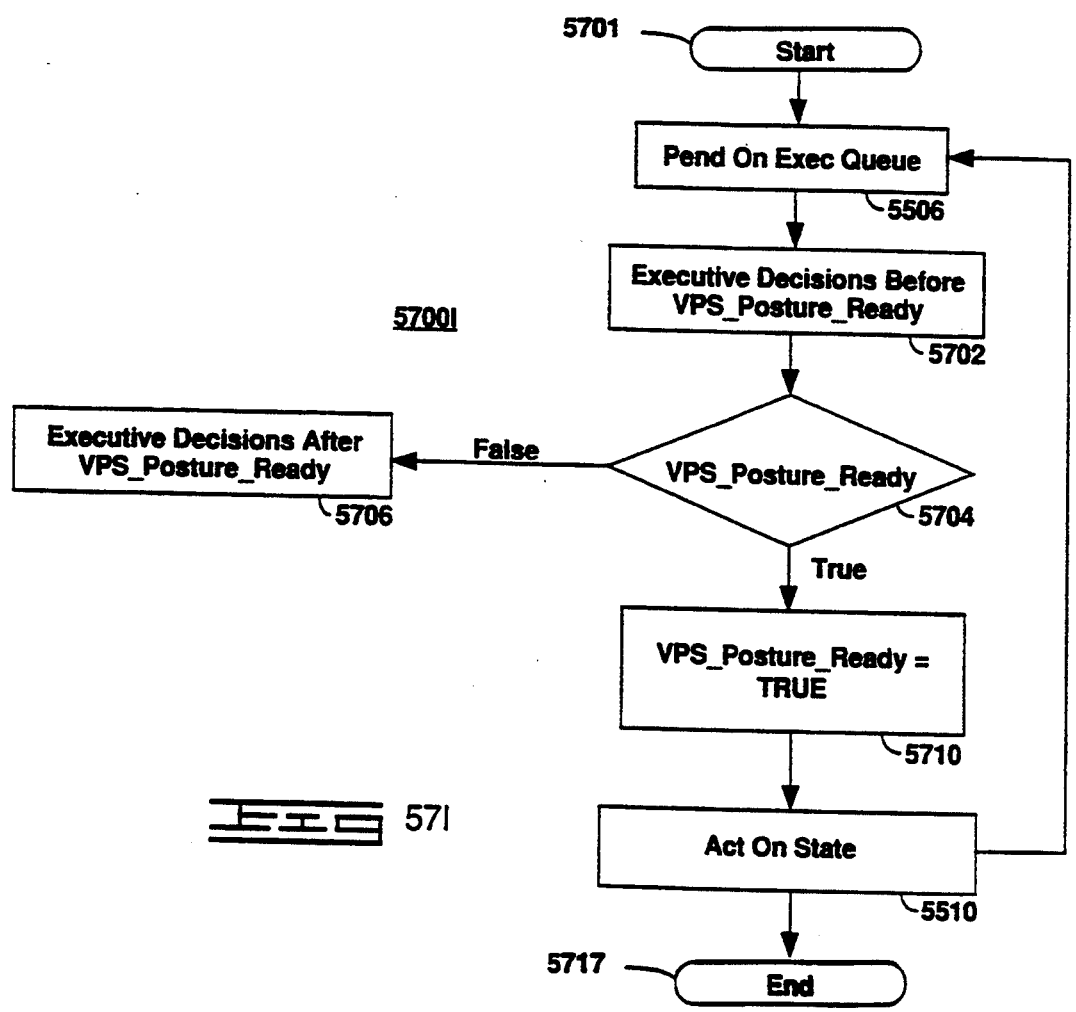
Figure 57J:
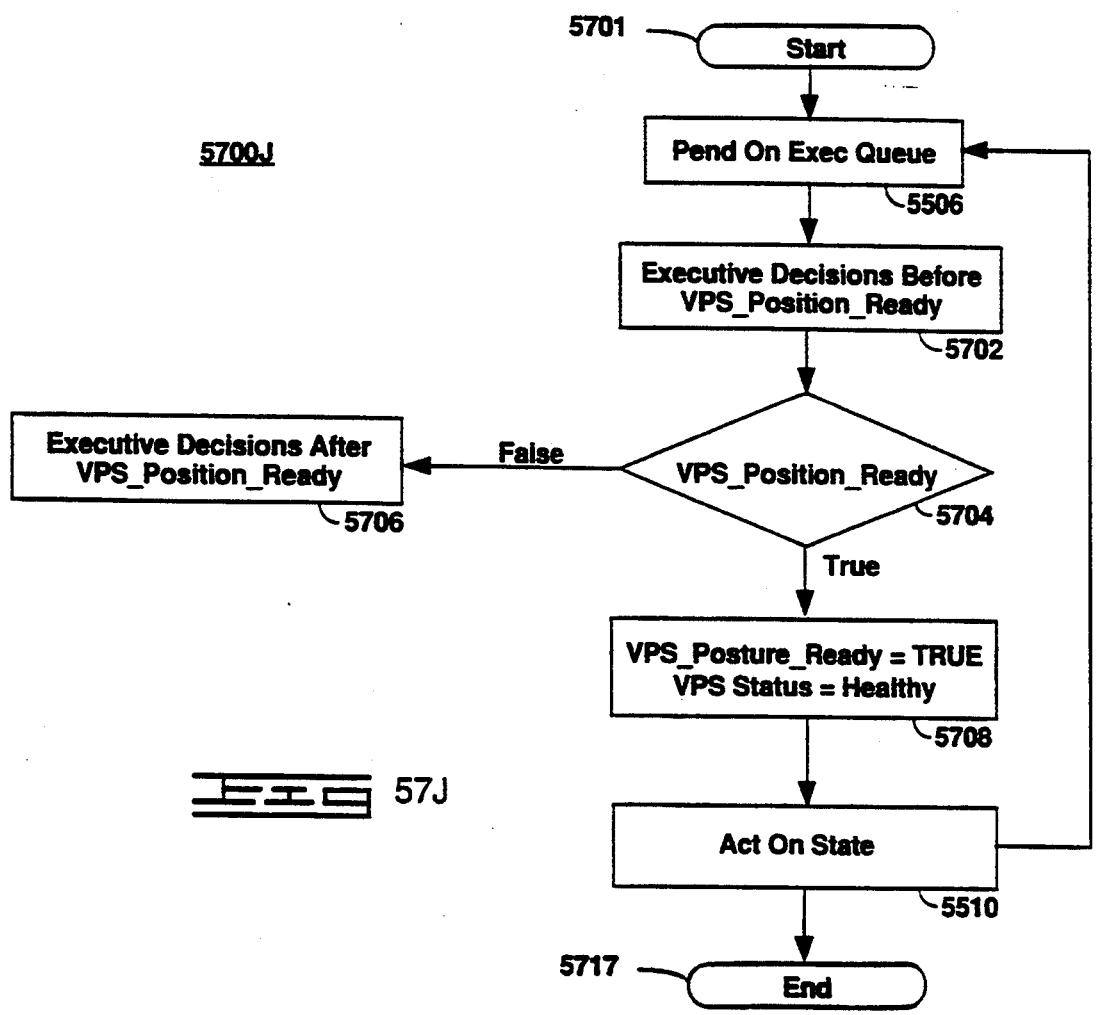
Figure 57L:
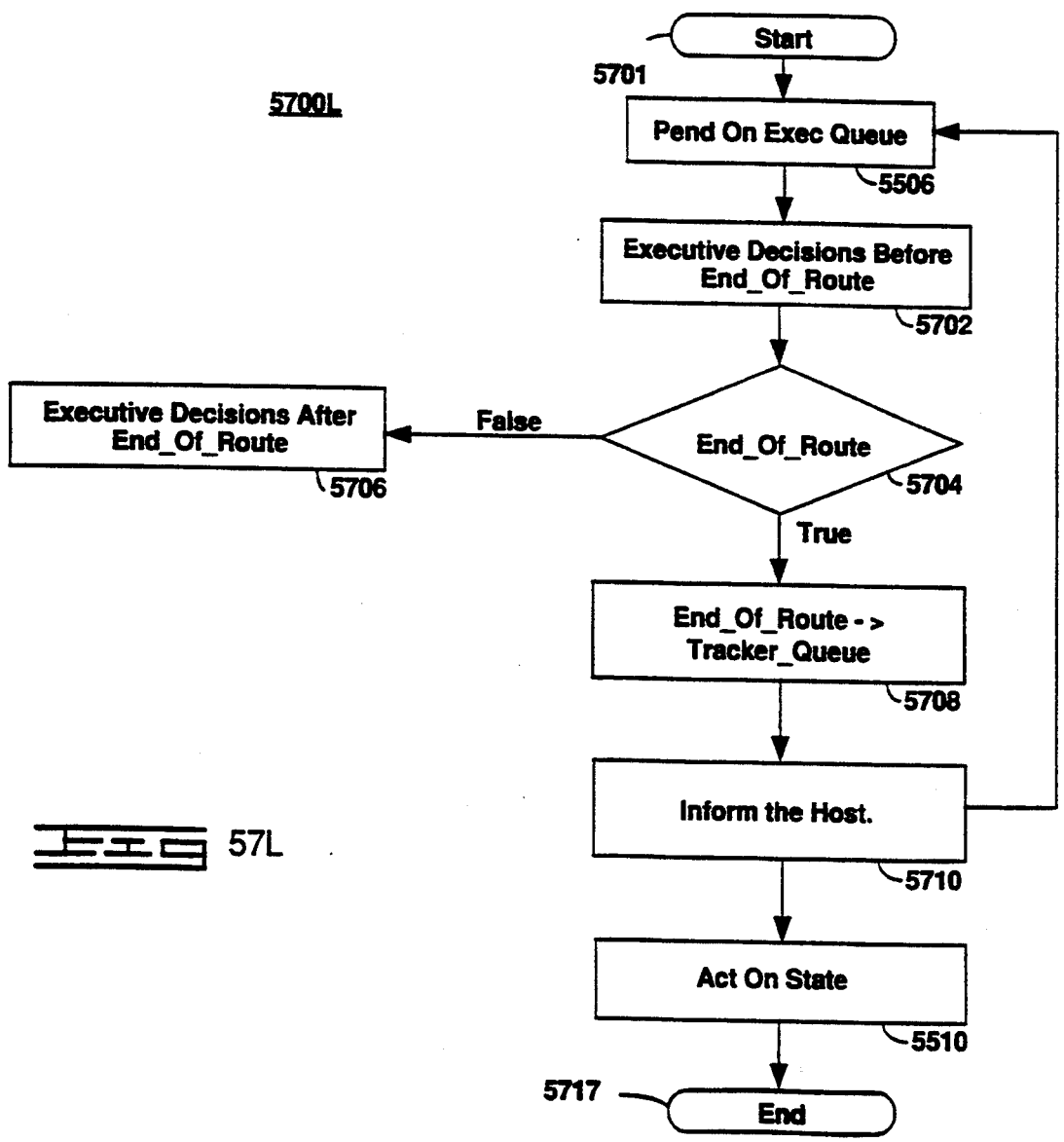
Figure 57N:
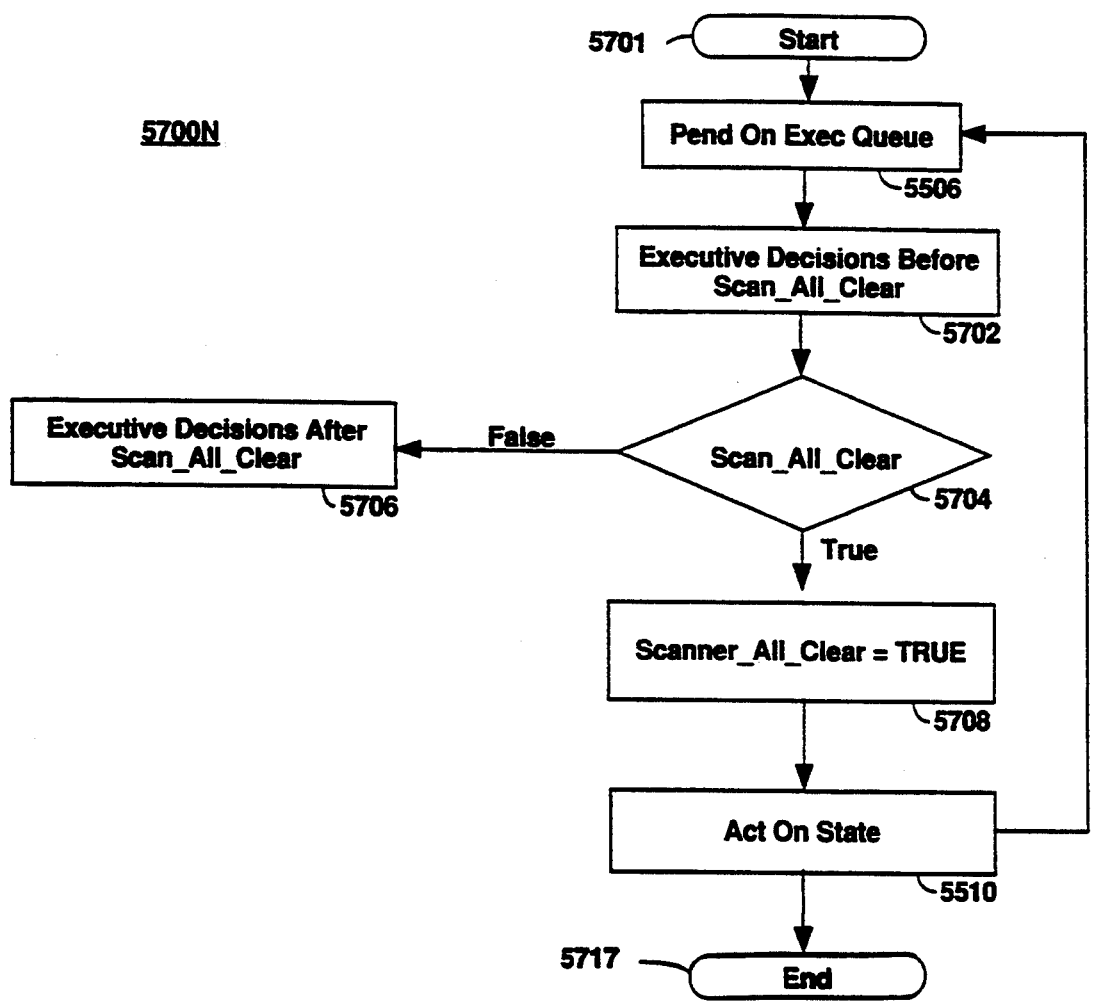
Figure 57Q:
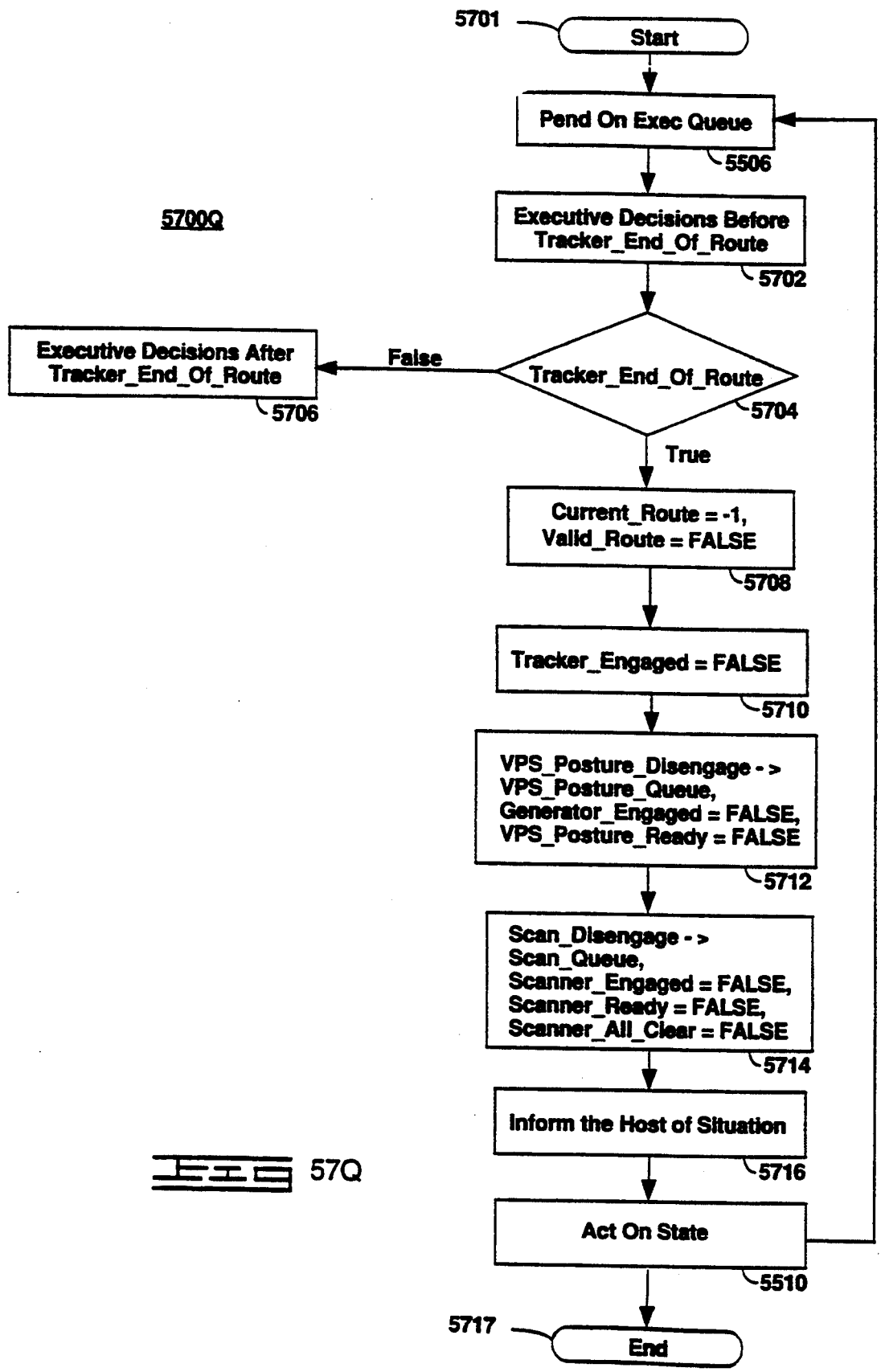

FIGS. 57A through 57R show the specific procedures which the executive 5316 uses to respond to a particular message. For example, FIG. 57A details how the executive 5316 responds to a 'NEW_ROUTE_DIRECTIVE' message. Once this message arrives in the Exec Queue 5328, the executive 5316 then proceeds to a flowchart block 5702 to determine what the message is: in this case, 'NEW_ROUTE_DIRECTIVE'. If the message is 'NEW_ROUTE_DIRECTIVE', the executive 5316 then proceeds to a flowchart block 5705 to respond to the message. Otherwise, it proceeds on to a flowchart block 5704 to determine if it is valid (one of the other possible messages) or invalid.

Given that the message is a 'NEW_ROUTE_DIRECTIVE', then the executive 5316 follows the process described in FIG. 57A to respond to the message. This process is depicted by blocks 5706 through 5714. In this procedure (and in responses to other directives), the executive 5316 checks the states of different tasks within the navigator 406 and reacts to these states in a known, predetermined manner.

The effect of this response is to set a series of status flags, which effect subsequent responses by other tasks in the navigator 406 when the executive 5316 reaches the Act On State 5510. The actual procedures implemented in block 5510 is shown in FIG. 58.

The responses of the executive 5316 to other valid messages are similar to that described for the 'NEW_ROUTE_DIRECTIVE'. The effect of each response to directives first changes a set of flags, which in turn affect the state of the navigator 406. The particular flags set depend on the particular directive. The navigator 406 responds to the changes in these flags when the executive 5316 moves to the Act On State block 5510.

Figure 58:
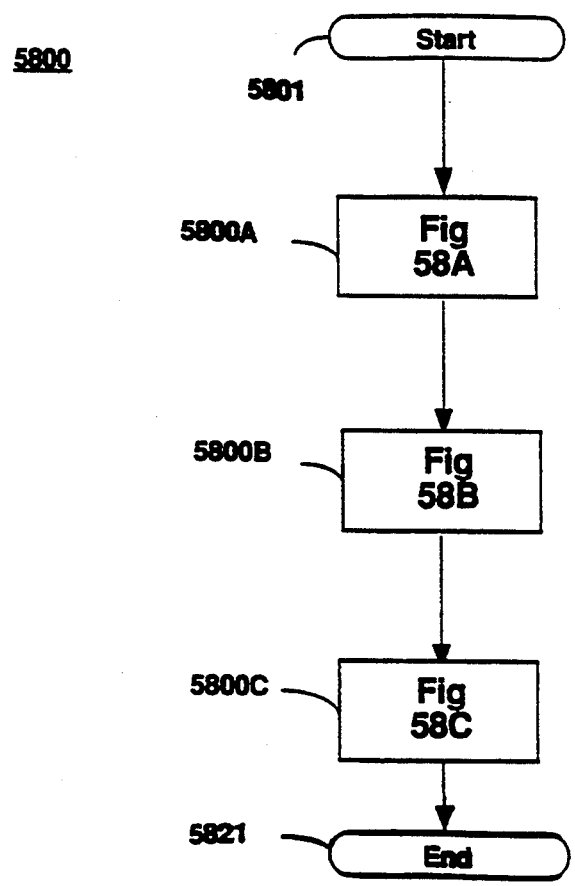
FIG. 58 is a high level flowchart 5800 of the interrelation of respective FIGS. 58A-58C.
Figure 58A:
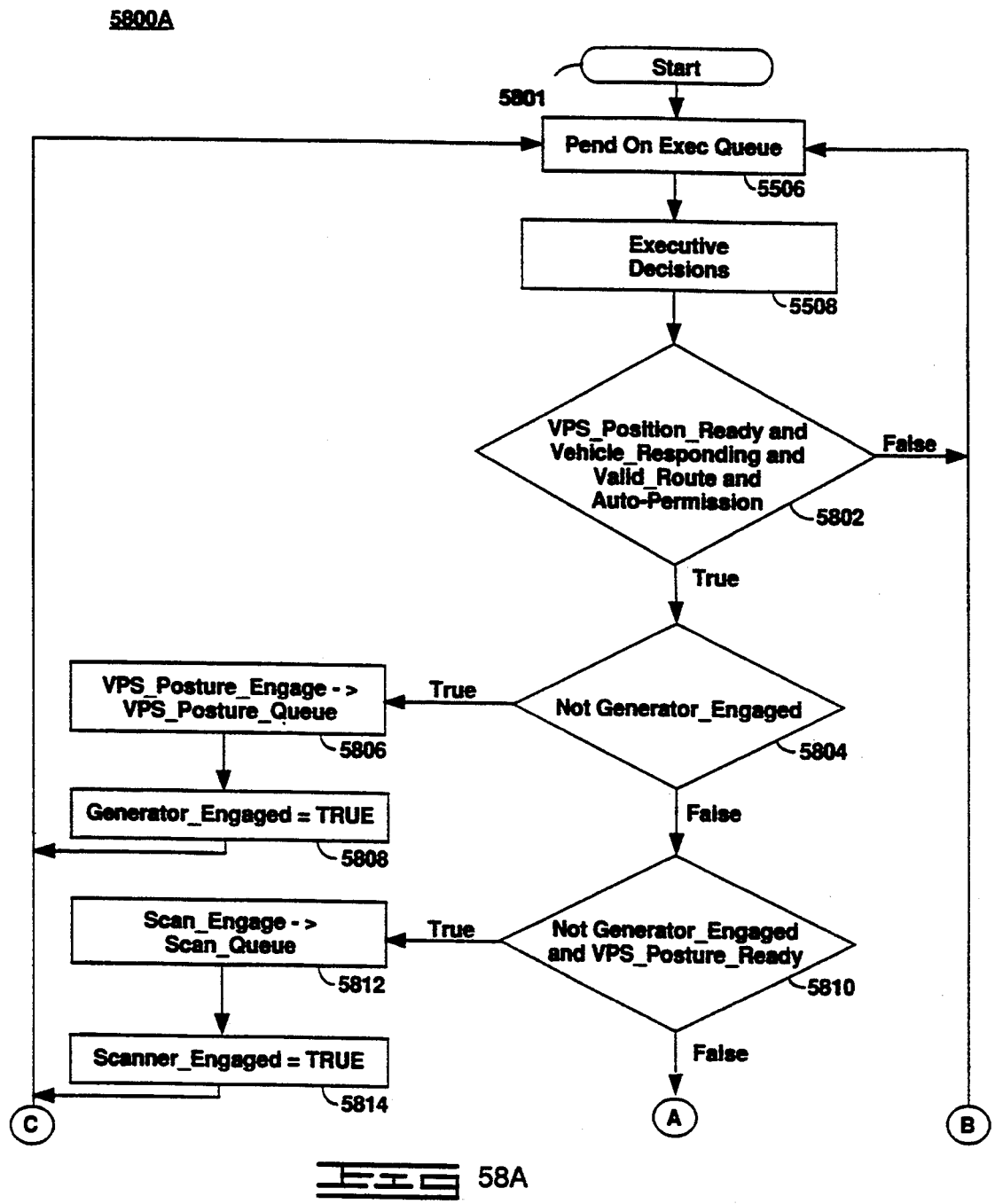

FIGS. 58A-58C illustrate the flow of the "act on state" block 5510.

The act on state block 5510 is shown in FIGS. 58A-58C. FIG. 58 shows the interrelationship of FIGS. 58A-58C, where each of these three figures depict a portion of the Act On State block 5510.

Once the executive task 5316 has set the appropriate flags in response to a particular Exec message, the executive 5316 then proceeds to send messages to the appropriate tasks or entities which must be informed of changes to the navigator 406 system as a result of the Exec message.

For example, when the executive task 5316 leaves the executive decisions 5508, and first enters the act on state block 5510, it checks to see that the status is set such that the vehicle is ready for autonomous mode (for example—VPS is ready, vehicle is communicating properly, a proper route has been commanded, and the vehicle is ready for auto mode). See block 5802. If one or more of these conditions is not met, then the Exec returns to wait for another valid message. If all of these conditions are met, then the executive 5316 checks to see that the path generator 5804 is operating. If so, then the executive 5316 proceeds to start the other systems required for autonomous operation.

If the path generation system is not operating, then the executive 5316 task sends the message 'VPS_POSTURE_ENGAGE' to the Vps Posture Queue 5334, in order to start the path generator. The executive task will then return to the Pend on Exec Queue 5506, to wait for another directive so that proper operation of the vehicle 102 is ensured.

The following is claimed:

1. A system for determining the position of a user using orbiting satellites of a global positioning system and a reference station, the system comprising:
   (a) first means for computing respective first positions of the satellites in view of a reference antenna at the reference station using previous ephemeris data and responsively determining respective predicted estimated pseudoranges ($O_{ij}$);
   (b) second means for computing respective second positions of the satellites in view of said reference antenna at the reference station using current ephemeris data and responsively determining respective current estimated pseudoranges ($N_{ij}$);
   (c) third means responsive to said first and second means, said third means for receiving said respective predicted estimated pseudoranges ($O_{ij}$) and said respective current estimated pseudoranges ($N_{ij}$), comparing said predicted estimated pseudoranges ($O_{ij}$) and said respective current estimated pseudoranges ($N_{ij}$), and responsively determining if said current ephemeris data is corrupt;
   (d) fourth means responsive to said third means, said fourth means for computing a spatial bias using said current ephemeris data if said current ephemeris data is not corrupt and computing a spatial bias using said previous ephemeris data if said current ephemeris data is corrupt;
   (e) fifth means located at the user, for receiving signals from said satellites and said spatial bias and responsively determining an estimate of the position of the user.

2. A method for determining the position of a user using orbiting satellites of a global positioning system and a reference station, the method comprising the steps of:
   (1) computing respective predicted estimated pseudoranges ($O_{ij}$) of the satellites in view of a reference antenna at the reference station using previous ephemeris data;

(2) computing current estimated pseudoranges ($N_{ij}$) of the satellites using current ephemeris data;
(3) comparing said predicted estimated pseudoranges and said current estimated pseudoranges and responsively determining if said ephemeris data is corrupt;
(4) computing a spatial bias using said current ephemeris data if said current ephemeris data is not corrupt and computing a spatial bias using said previous ephemeris data if said current ephemeris data is corrupt; and
(5) receiving, at the user, signals from the satellites and said spatial bias and responsively determining an estimate of the position of the user.

* * * * *

UNITED STATES PATENT AND TRADEMARK OFFICE
CERTIFICATE OF CORRECTION

PATENT NO. : 5,375,059

DATED : December 20, 1994

INVENTOR(S) : Kyrtsos et al

It is certified that error appears in the above-identified patent and that said Letters Patent is hereby corrected as shown below:

Title page, item [75]: James W. Sennott was omitted as one of the inventors - add --James W. Sennott, Bloomington, Ill--

Signed and Sealed this

Fourth Day of July, 1995

Attest:

BRUCE LEHMAN

*Attesting Officer*          *Commissioner of Patents and Trademarks*